(12) United States Patent
Takemoto et al.

(10) Patent No.: US 10,862,380 B2
(45) Date of Patent: Dec. 8, 2020

(54) ROTOR, STATOR AND MOTOR

(71) Applicant: ASMO CO., LTD., Shizuoka-ken (JP)

(72) Inventors: Yoshiaki Takemoto, Toyohashi (JP);
Yusuke Morimoto, Kosai (JP);
Masashi Matsuda, Kakegawa (JP);
Seiya Yokoyama, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 244 days.

(21) Appl. No.: 15/857,373

(22) Filed: Dec. 28, 2017

(65) Prior Publication Data

US 2018/0123434 A1    May 3, 2018

Related U.S. Application Data

(62) Division of application No. 14/160,391, filed on Jan. 21, 2014, now Pat. No. 9,887,608.

(30) Foreign Application Priority Data

Jan. 24, 2013 (JP) .................................. 2013-011216
Feb. 14, 2013 (JP) .................................. 2013-026694
(Continued)

(51) Int. Cl.
*H02K 1/18* (2006.01)
*H02K 16/00* (2006.01)
(Continued)

(52) U.S. Cl.
CPC ............. *H02K 16/00* (2013.01); *H02K 1/145* (2013.01); *H02K 1/2713* (2013.01); *H02K 3/525* (2013.01);
(Continued)

(58) Field of Classification Search
CPC .......... H02K 1/145; H02K 3/525; H02K 1/18; H02K 1/185; H02K 16/00; H02K 16/04;
(Continued)

(56) References Cited

U.S. PATENT DOCUMENTS 4,333,026 A * 6/1982 Bock ..................... H02K 5/04
310/257
5,057,030 A * 10/1991 Hutson .............. H01R 13/5202
439/247
(Continued)

FOREIGN PATENT DOCUMENTS

CN          2153898 Y     1/1994
CN        101882821 A    11/2010
(Continued)

*Primary Examiner* — Quyen P Leung
*Assistant Examiner* — Alexander Moraza
(74) *Attorney, Agent, or Firm* — Christensen, Fonder, Dardi & Herbert PLLC

(57) ABSTRACT

A rotor with four axially stacked rotor cores, and a plurality of field magnets interposed between them. Each rotor core includes a rotor-side claw-shaped magnetic pole. Each rotor-side claw-shaped magnetic poles are respectively extending from and formed on each rotor core at equal angle intervals. Tip end surfaces of the first and third rotor-side claw-shaped magnetic pole abut against or are closely opposed to each other axially. Tip end surfaces of the second and fourth rotor-side claw-shaped magnetic poles abut against or are closely opposed to each other in the axial direction. The plurality of field magnets are magnetized in the axial direction such that the field magnets causes the first and third rotor-side claw-shaped magnetic poles to function as first magnetic poles, and cause the second and fourth rotor-side claw-shaped magnetic poles to function as second magnetic poles.

13 Claims, 62 Drawing Sheets

(30) Foreign Application Priority Data

| Feb. 22, 2013 | (JP) | 2013-033046 |
| Jun. 13, 2013 | (JP) | 2013-124878 |
| Jul. 2, 2013 | (JP) | 2013-138981 |
| Jul. 30, 2013 | (JP) | 2013-157993 |
| Sep. 2, 2013 | (JP) | 2013-181411 |
| Oct. 25, 2013 | (JP) | 2013-222344 |
| Dec. 2, 2013 | (JP) | 2013-249520 |

(51) Int. Cl.
  H02K 1/14 (2006.01)
  H02K 21/14 (2006.01)
  H02K 1/27 (2006.01)
  H02K 3/52 (2006.01)
  H02K 15/02 (2006.01)
  H02K 1/24 (2006.01)
  H02K 21/04 (2006.01)

(52) U.S. Cl.
  CPC ......... *H02K 21/145* (2013.01); *H02K 1/185* (2013.01); *H02K 1/243* (2013.01); *H02K 3/528* (2013.01); *H02K 15/022* (2013.01); *H02K 21/048* (2013.01); *H02K 2201/06* (2013.01)

(58) Field of Classification Search
  CPC ...... H02K 1/226; H02K 1/243; H02K 21/048; H02K 5/24; H02K 3/50; H02K 3/52; H02K 3/521; H02K 3/528
  USPC .... 310/257, 156.66–156.69, 156.71–156.73, 310/263, 89, 51, 71, 422, 416, 216.118, 310/216.049, 216.019
  See application file for complete search history.

(56) References Cited

U.S. PATENT DOCUMENTS

| 5,648,692 | A | 7/1997 | Watanabe et al. | |
| 6,404,096 | B1 | 6/2002 | Kometani et al. | |
| 6,822,364 | B2* | 11/2004 | Suzuki | H02K 1/185 |
| | | | | 310/216.012 |
| 2004/0021393 | A1 | 2/2004 | Suzuki et al. | |
| 2005/0006972 | A1 | 1/2005 | Bradfield | |
| 2007/0267929 | A1 | 11/2007 | Pulnikov et al. | |
| 2007/0286753 | A1 | 12/2007 | Ihle et al. | |
| 2008/0231140 | A1 | 9/2008 | Popov | |
| 2008/0315702 | A1* | 12/2008 | Ishikawa | H02K 1/145 |
| | | | | 310/159 |
| 2009/0001843 | A1 | 1/2009 | Enomoto et al. | |
| 2009/0102314 | A1* | 4/2009 | Miyata | H02K 1/145 |
| | | | | 310/257 |
| 2012/0056502 | A1 | 3/2012 | Cai et al. | |
| 2012/0206001 | A1 | 8/2012 | Lee et al. | |
| 2013/0076160 | A1* | 3/2013 | Tang | H02K 41/031 |
| | | | | 310/12.26 |
| 2013/0093273 | A1 | 4/2013 | Murakami et al. | |
| 2013/0106230 | A1 | 5/2013 | Morita et al. | |
| 2014/0042851 | A1 | 2/2014 | Takemoto et al. | |

FOREIGN PATENT DOCUMENTS

| EP | 2 006 978 A2 | 12/2008 |
| JP | S48-21102 U | 3/1973 |
| JP | S51-107410 A | 9/1976 |
| JP | S56-54875 | 10/1979 |
| JP | S58-31771 U | 3/1983 |
| JP | S60-117684 U | 8/1985 |
| JP | S63-77362 A | 4/1988 |
| JP | H01-194843 A | 8/1989 |
| JP | H2-14260 U | 1/1990 |
| JP | H3-7672 U | 1/1991 |
| JP | H03-106850 U | 11/1991 |
| JP | 5-43749 U | 6/1993 |
| JP | H06-105490 A | 4/1994 |
| JP | H07-75302 A | 3/1995 |
| JP | H08-19241 A | 1/1996 |
| JP | H11-266575 A | 9/1999 |
| JP | 2000-184682 A | 6/2000 |
| JP | 2000-350431 A | 12/2000 |
| JP | 2001-069705 A | 3/2001 |
| JP | 2001-314071 A | 11/2001 |
| JP | 2003-009499 A | 1/2003 |
| JP | 2004-064925 A | 2/2004 |
| JP | 2007-028760 A | 2/2007 |
| JP | 2007-181303 A | 7/2007 |
| JP | 2007-288956 A | 11/2007 |
| JP | 2008-237011 A | 10/2008 |
| JP | 2009-077514 A | 4/2009 |
| JP | 2009-142087 A | 6/2009 |
| JP | 2010-035254 A | 2/2010 |
| JP | 2010-213455 A | 9/2010 |
| JP | 2011-120419 A | 6/2011 |
| JP | 2011-239576 A | 11/2011 |
| JP | 2013-090405 A | 5/2013 |
| JP | 2013-099102 A | 5/2013 |
| JP | 2013-226026 A | 10/2013 |
| WO | WO 2007/043161 A1 | 4/2007 |
| WO | WO 2009/087835 A1 | 7/2009 |

* cited by examiner

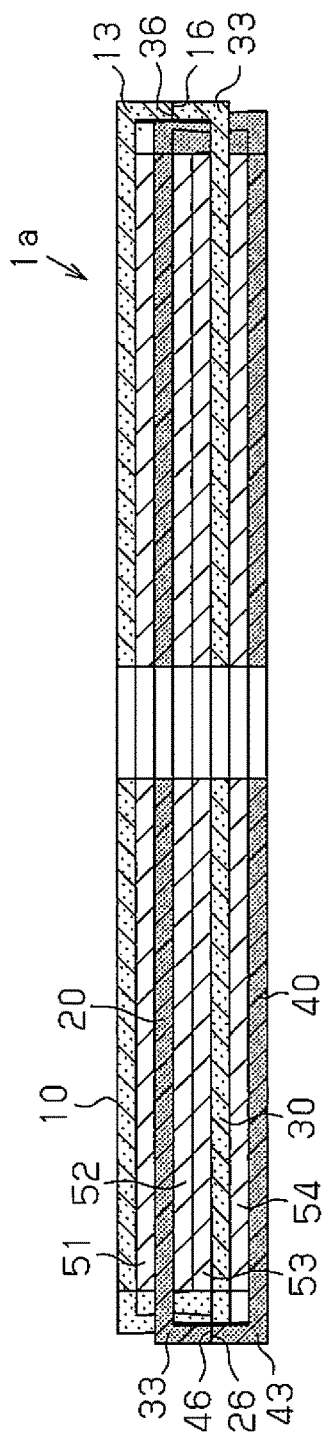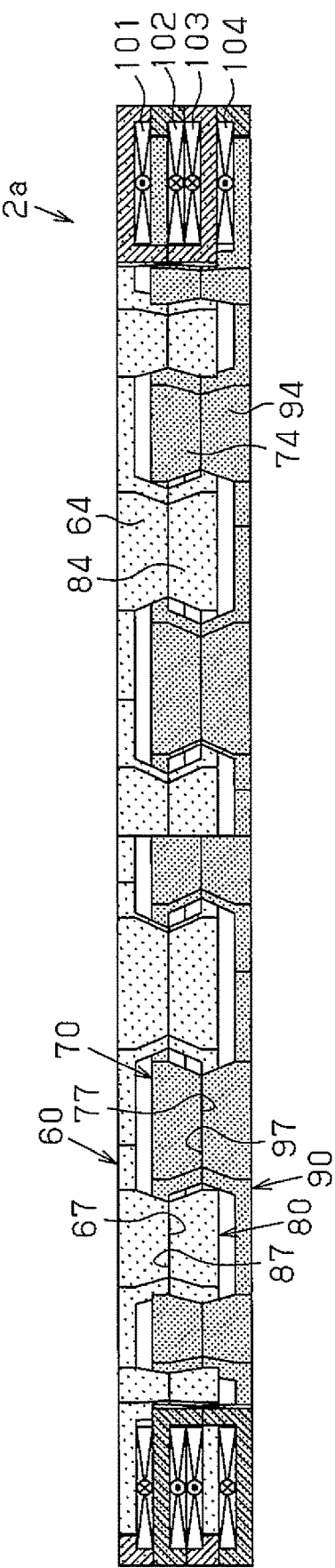

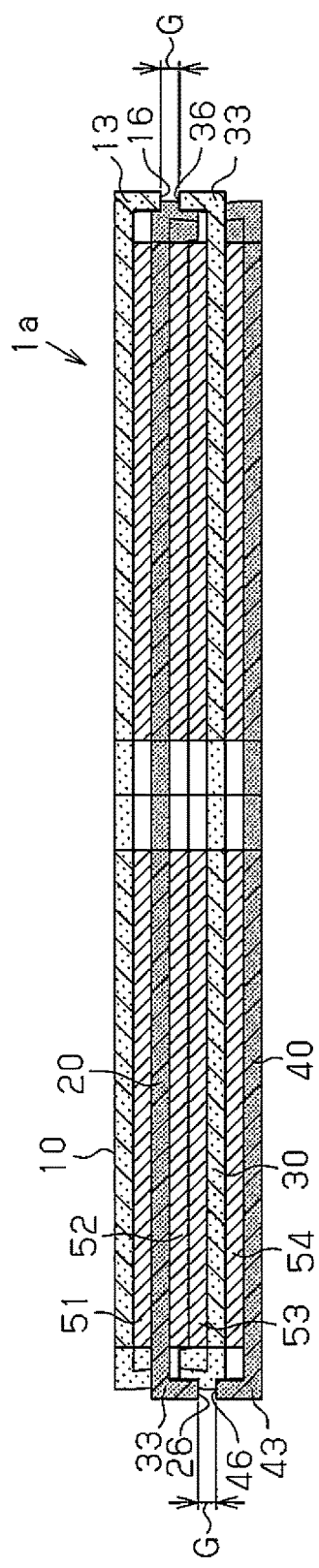
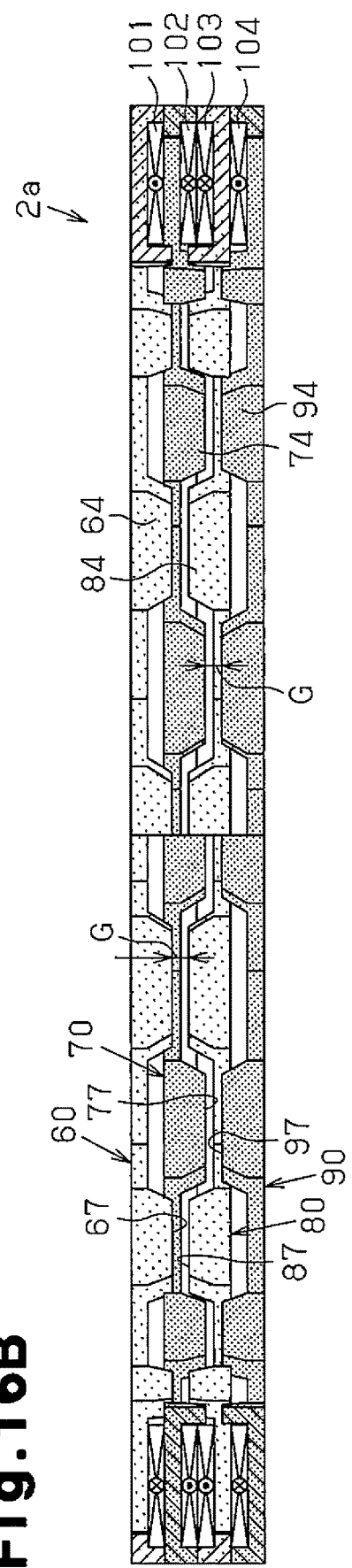
Fig.16A
Fig.16B

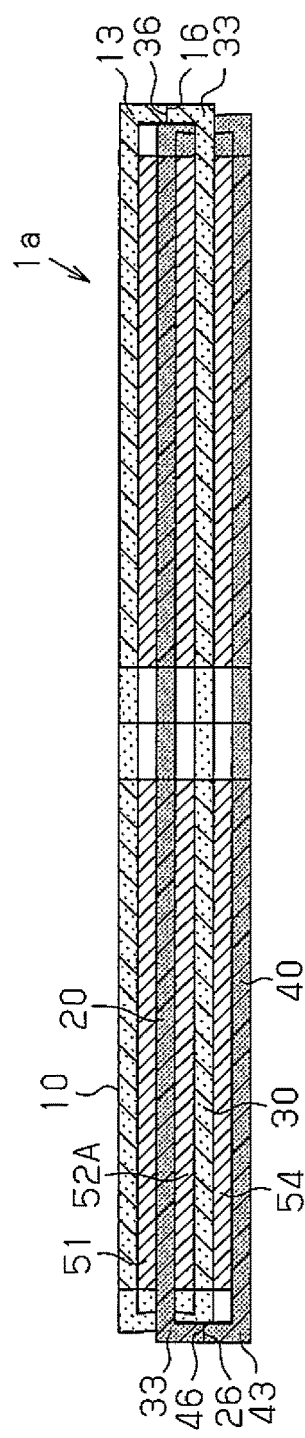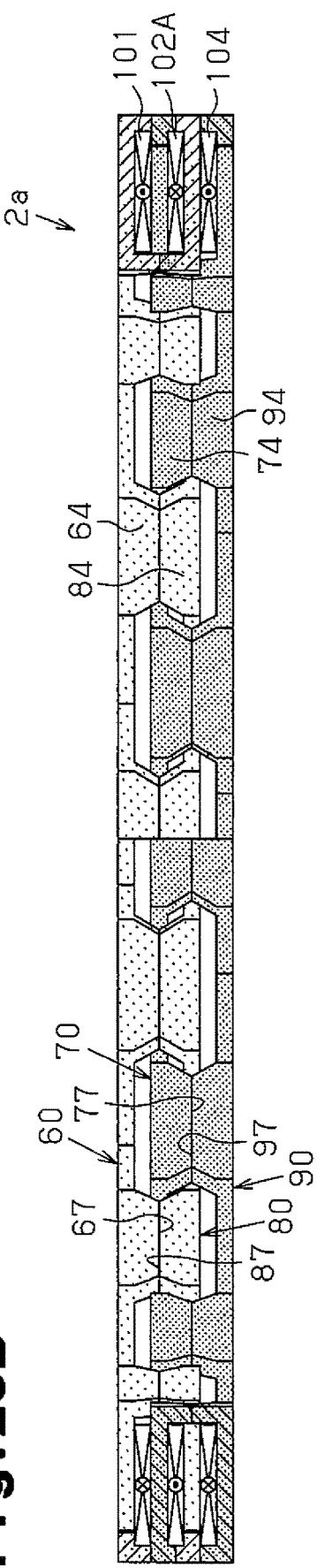
Fig.23A
Fig.23B

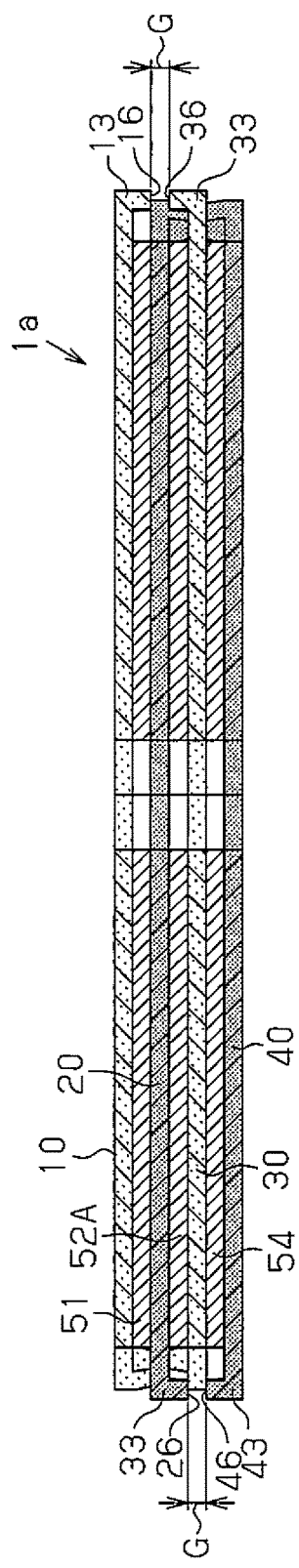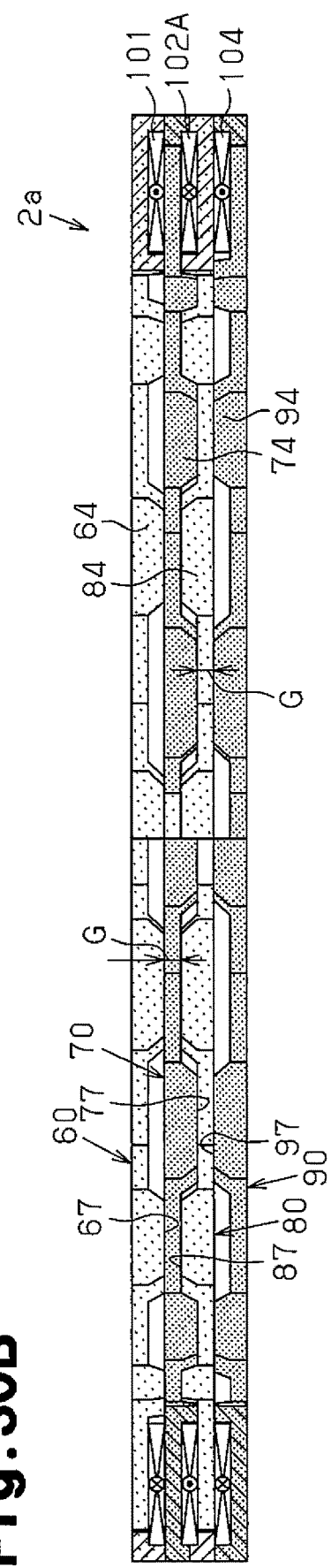

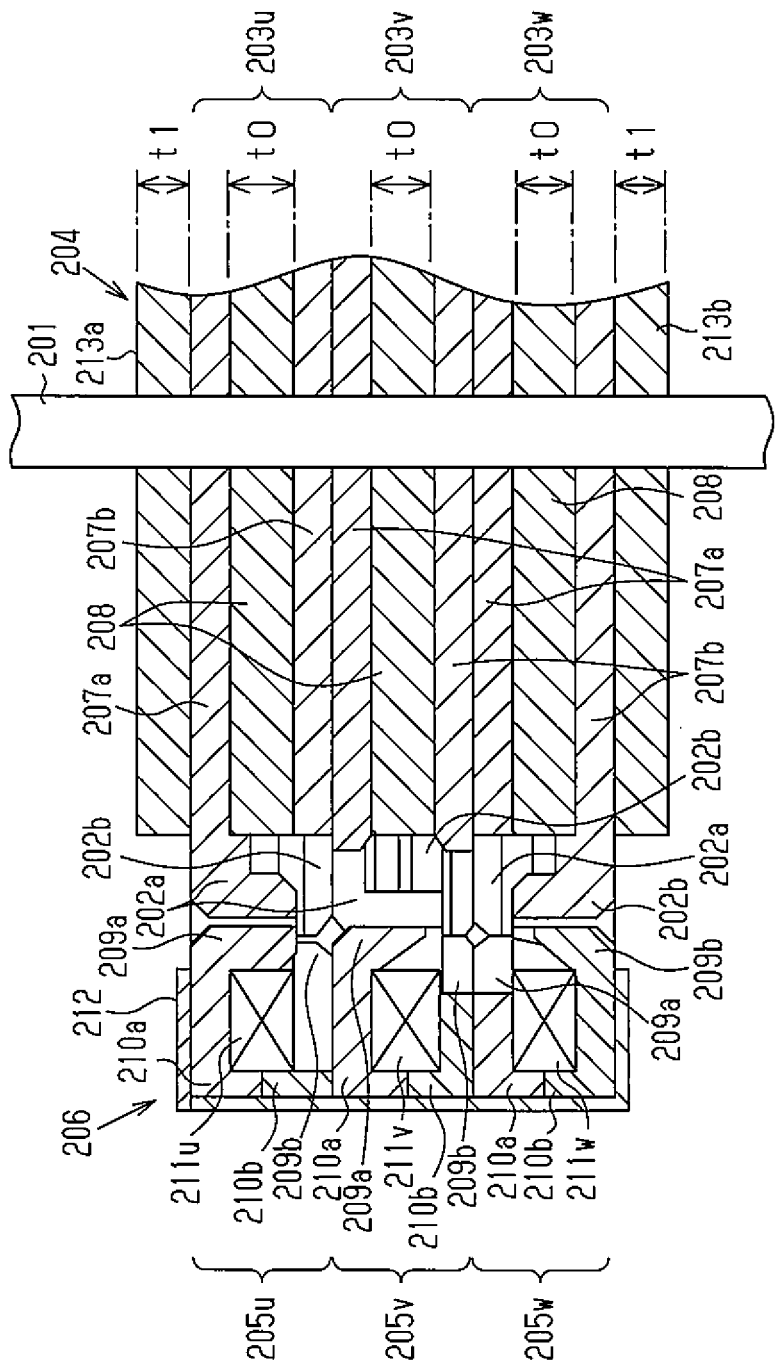

Fig. 54
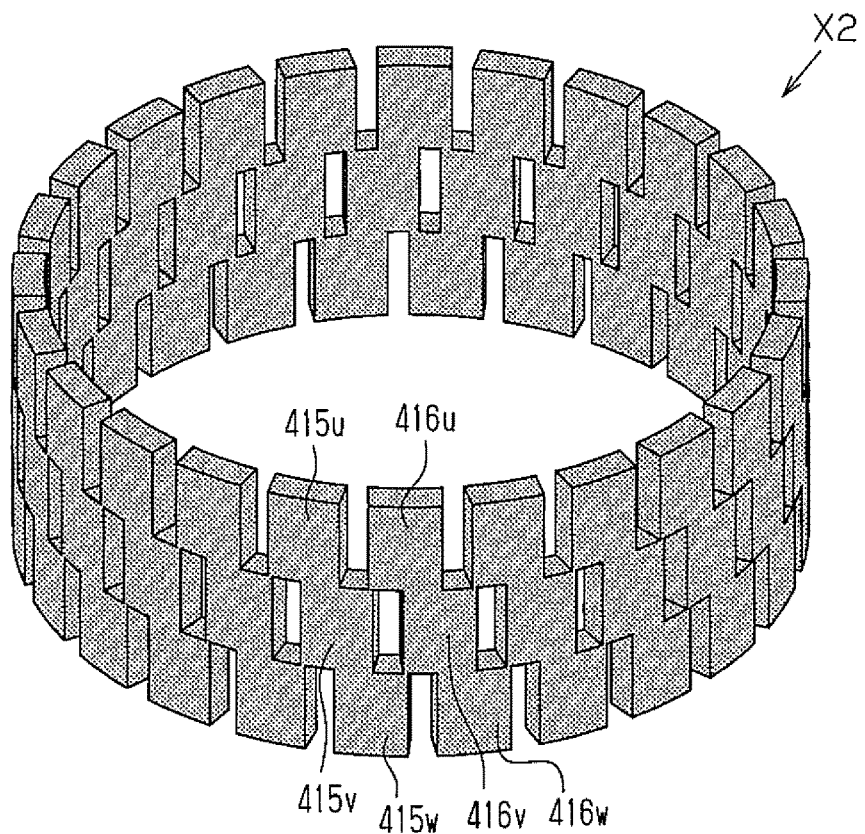
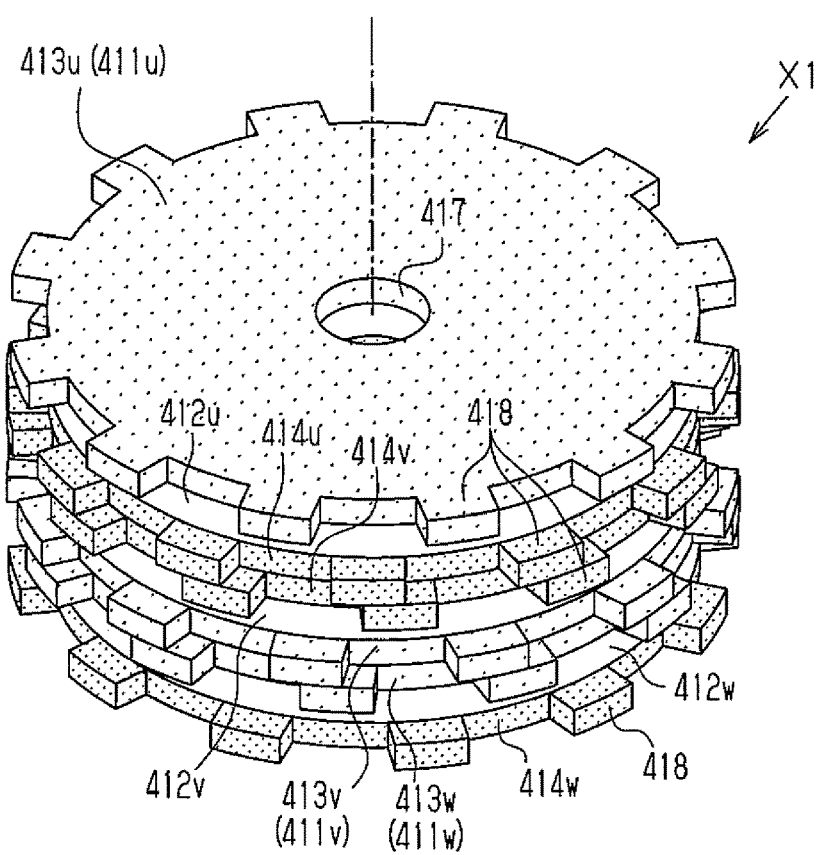

ROTOR, STATOR AND MOTOR

CROSS-REFERENCE TO RELATED APPLICATIONS

The present application is a divisional application of U.S. patent application Ser. No. 14/160,391, filed Jan. 21, 2014, which claims priority to Japanese Patent Application No. 2013-011216, filed Jan. 24, 2013, Japanese Patent Application No. 2013-026694, filed Feb. 14, 2013, Japanese Patent Application No. 2013-033046, filed Feb. 22, 2013, Japanese Patent Application No. 2013-124878, filed Jun. 13, 2013, Japanese Patent Application 2013-138981, filed Jul. 2, 2013, Japanese Patent Application No. 2013-157993, filed Jul. 30, 2013, Japanese Patent Application No. 2013-181411, filed Sep. 2, 2013, Japanese Patent Application No. 2013-222344, filed Oct. 25, 2013, and Japanese Patent Application No. 2013-249520, filed Dec. 2, 2013, the disclosures of which are hereby incorporated by reference herein in their entireties.

BACKGROUND OF THE INVENTION

The present invention relates to a rotor, a stator and a motor.

A rotor of a so-called Lundell type structure is a known rotor used for a motor. The rotor of the Lundell type structure has a pair of rotor cores and a field magnet placed between the pair of rotor cores in an axial direction of the rotor. Each of the rotor cores includes a disk-shaped core base and a plurality of claw-shaped magnetic poles arranged on an outer periphery of the core base. The pair of rotor cores are combined with each other such that the claw-shaped magnetic poles are alternately arranged in a circumferential direction of the rotor. The claw-shaped magnetic poles alternately function as north poles and south poles. For example, a rotor of a Lundell type structure disclosed in Japanese Laid-Open Utility Model Publication No. 5-43749 is of a two-part structure using two sets of rotor structures each including a pair of rotor cores and a field magnet.

The rotor of the Lundell type structure has room for improvement in terms of higher output and assembling properties.

SUMMARY OF THE INVENTION

It is an object of the present invention to provide a rotor, a stator and a motor capable of improving their outputs and assembling properties.

To achieve the above objectives, according to first aspect of the present invention, a rotor includes first to fourth four rotor cores stacked on one another in order in an axial direction of the rotor, and a plurality of field magnets respectively interposed between the first to fourth rotor cores. The first to fourth rotor cores respectively include same number of first to fourth rotor-side claw-shaped magnetic poles. The first to fourth rotor-side claw-shaped magnetic poles are respectively extending from and formed on the first to fourth rotor cores at equal angle intervals. A tip end surface of the first rotor-side claw-shaped magnetic pole and a tip end surface of the third rotor-side claw-shaped magnetic pole abut against or are closely opposed to each other in the axial direction. A tip end surface of the second rotor-side claw-shaped magnetic pole and a tip end surface of the fourth rotor-side claw-shaped magnetic pole abut against or are closely opposed to each other in the axial direction. The plurality of field magnets are magnetized in the axial direction such that the field magnets cause the first and third rotor-side claw-shaped magnetic poles to function as first magnetic poles, and cause the second and fourth rotor-side claw-shaped magnetic poles to function as second magnetic poles.

According to second aspect of the present invention, a stator includes first to fourth four stator cores stacked on one another in order in an axial direction of the stator, and a plurality of annular windings respectively interposed between the first to fourth stator cores. The first to fourth stator cores respectively include same number of first to fourth stator-side claw-shaped magnetic poles. The first to fourth stator-side claw-shaped magnetic poles are respectively extending from and formed on the first to fourth stator cores at equal angle intervals. A tip end surface of the first stator-side claw-shaped magnetic pole and a tip end surface of the third stator-side claw-shaped magnetic pole abut against or are closely opposed to each other in the axial direction. A tip end surface of the second stator-side claw-shaped magnetic pole and a tip end surface of the fourth stator-side claw-shaped magnetic pole abut against or are closely opposed to each other in the axial direction. Directions of AC current flowing through the plurality of annular windings are different from one another such that a variation cycle of magnetic fluxes from the first and third stator-side claw-shaped magnetic poles and a variation cycle of magnetic fluxes from the second and fourth stator-side claw-shaped magnetic poles are deviated from each other in phase by 180°.

According to third aspect of the present invention, a motor includes a shaft extending along an axial direction of the motor; a rotor; and a stator. The rotor includes a first rotor core having a plurality of first rotor claw-shaped magnetic poles arranged at equal intervals from one another in a circumferential direction of the motor, a second rotor core having a plurality of second rotor claw-shaped magnetic poles arranged at equal intervals from one another in the circumferential direction, and an annular field magnet placed between the first and second rotor cores and magnetized in the axial direction. The first and second rotor claw-shaped magnetic poles are alternately placed in the circumferential direction. The field magnet is configured so as to cause the first and second rotor claw-shaped magnetic poles to function as magnetic poles which are different from each other. The stator includes a first stator core having a plurality of first stator claw-shaped magnetic poles arranged at equal intervals from one another in the circumferential direction, a second stator core having a plurality of second stator claw-shaped magnetic poles arranged at equal intervals from one another in the circumferential direction, and a coil portion placed between the first and second stator cores and wound in the circumferential direction. The first and second stator claw-shaped magnetic poles are placed alternately in the circumferential direction and are opposed to the first and second rotor claw-shaped magnetic poles. The coil portion is configured so as to cause the first and second stator claw-shaped magnetic poles to function as magnetic poles which are different from each other based on energization to the coil portion, and cause polarities of the first and second stator claw-shaped magnetic poles to switch to each other. The shaft extends through one of the rotor and the stator. The first and second rotor and the first and second stator have an equal number of claw-shaped magnetic poles.

BRIEF DESCRIPTION OF THE DRAWINGS

The invention, together with objects and advantages thereof, may best be understood by reference to the following description of the presently preferred embodiments together with the accompanying drawings in which:

FIG. 5A is a combined sectional view of a single rotor shown in FIG. 4 taken along line A-O-A;

FIG. 5B is a combined sectional view of a single stator shown in FIG. 4 taken along line A-O-A;

FIG. 16A is a sectional view of a single rotor shown in FIG. 15;

FIG. 16B is a sectional view of a single stator shown in FIG. 15;

FIG. 23A is a sectional view of a single rotor shown in FIG. 22;

FIG. 23B is a sectional view of a single stator shown in FIG. 22;

FIG. 30A is a sectional view of a single rotor shown in FIG. 29;

FIG. 30B is a sectional view of a single stator shown in FIG. 29;

FIG. 42 is a sectional view of a motor of a multi-Lundell type structure according to a sixth embodiment of the present invention;

FIG. 54 is an exploded perspective view of the rotor shown in FIG. 52;

DETAILED DESCRIPTION OF PREFERRED EMBODIMENTS

First Embodiment

A first embodiment of a motor will be described in accordance with FIGS. 1 to 14.

Figure 1:
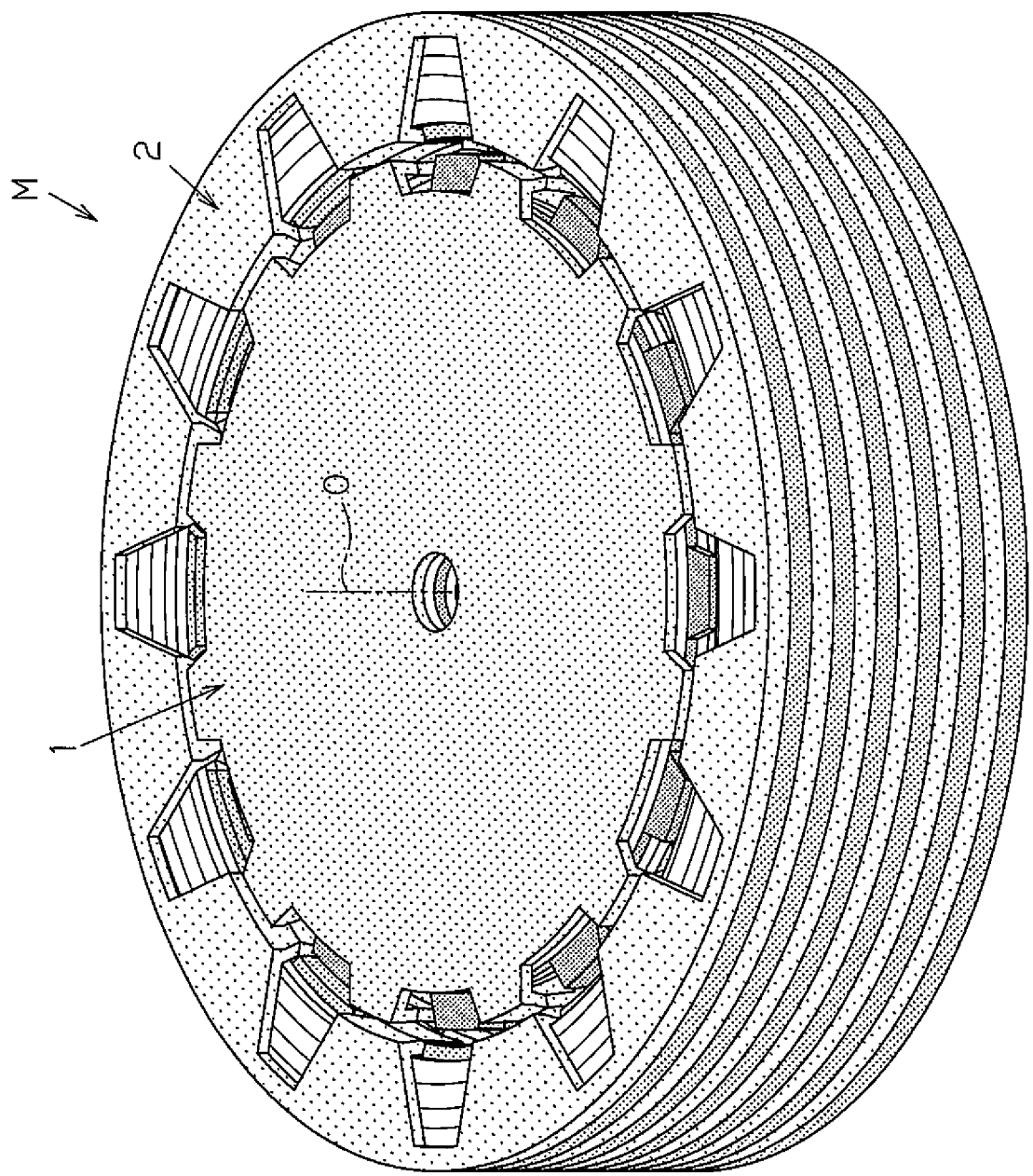
FIG. 1 is a perspective view of a brushless motor according to a first embodiment of the present invention.
Figure 2:
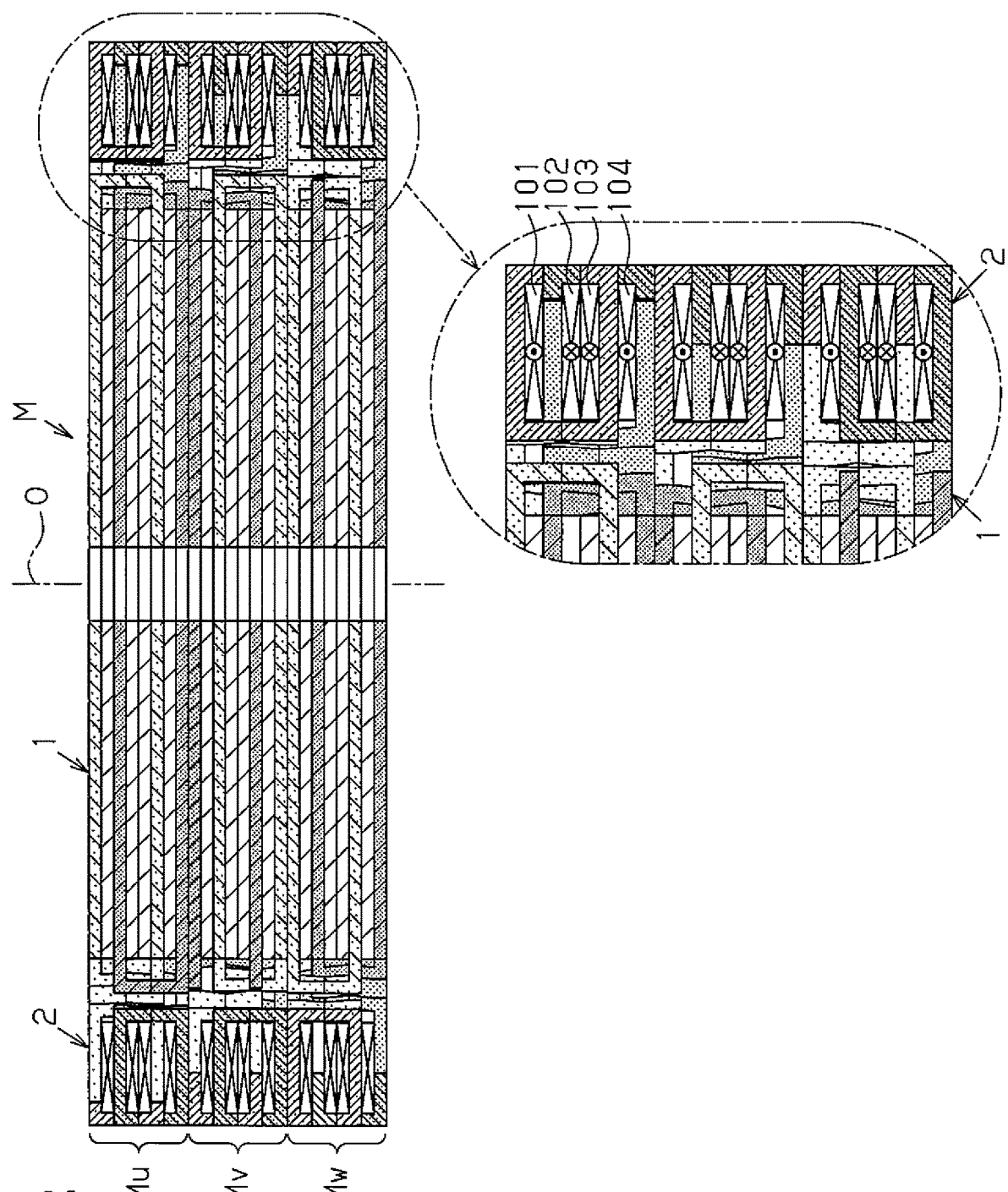
FIG. 2 is a sectional view of the brushless motor shown in FIG. 1.
Figure 3:
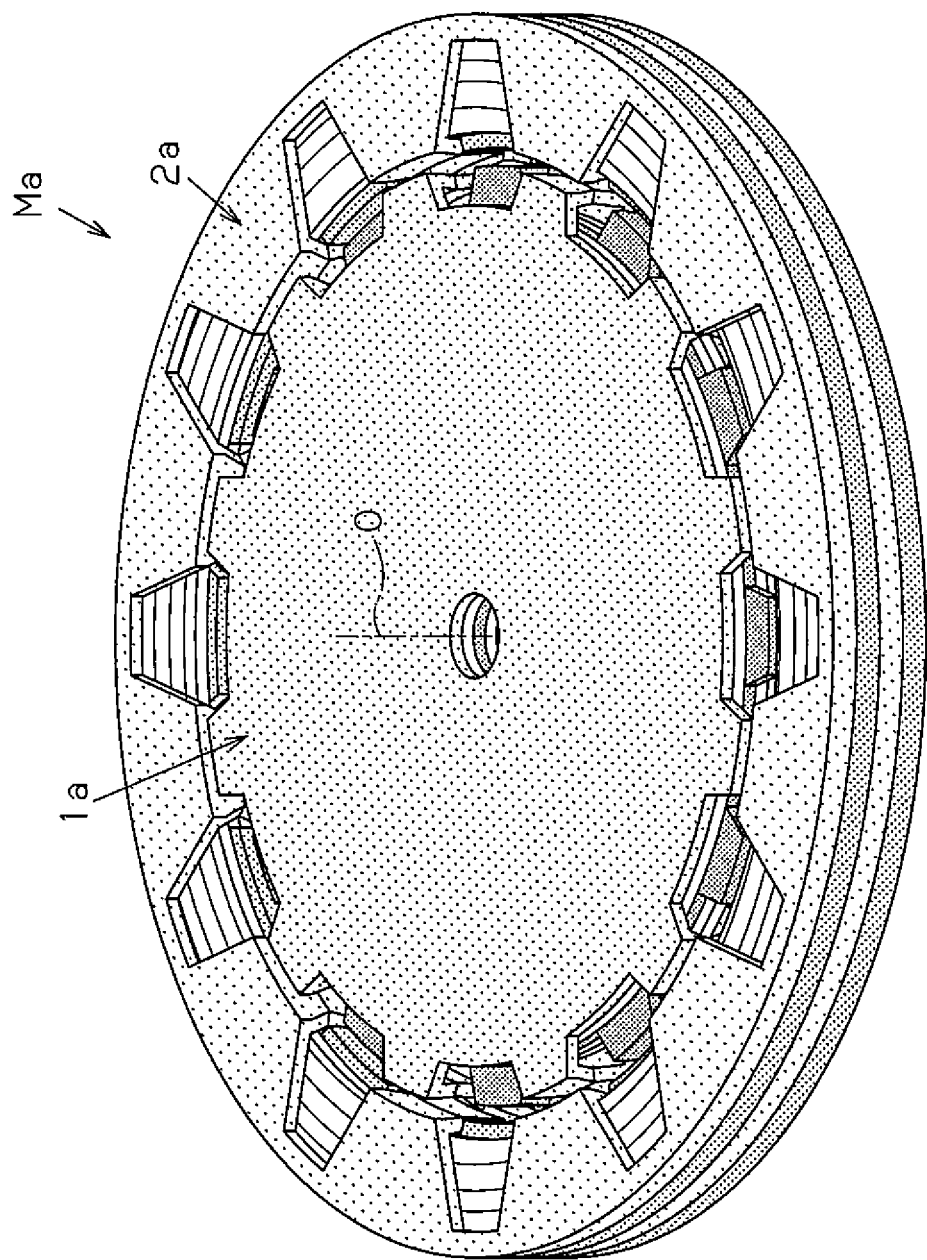
FIG. 3 is a perspective view of a single motor shown in FIG. 1.
Figure 4:
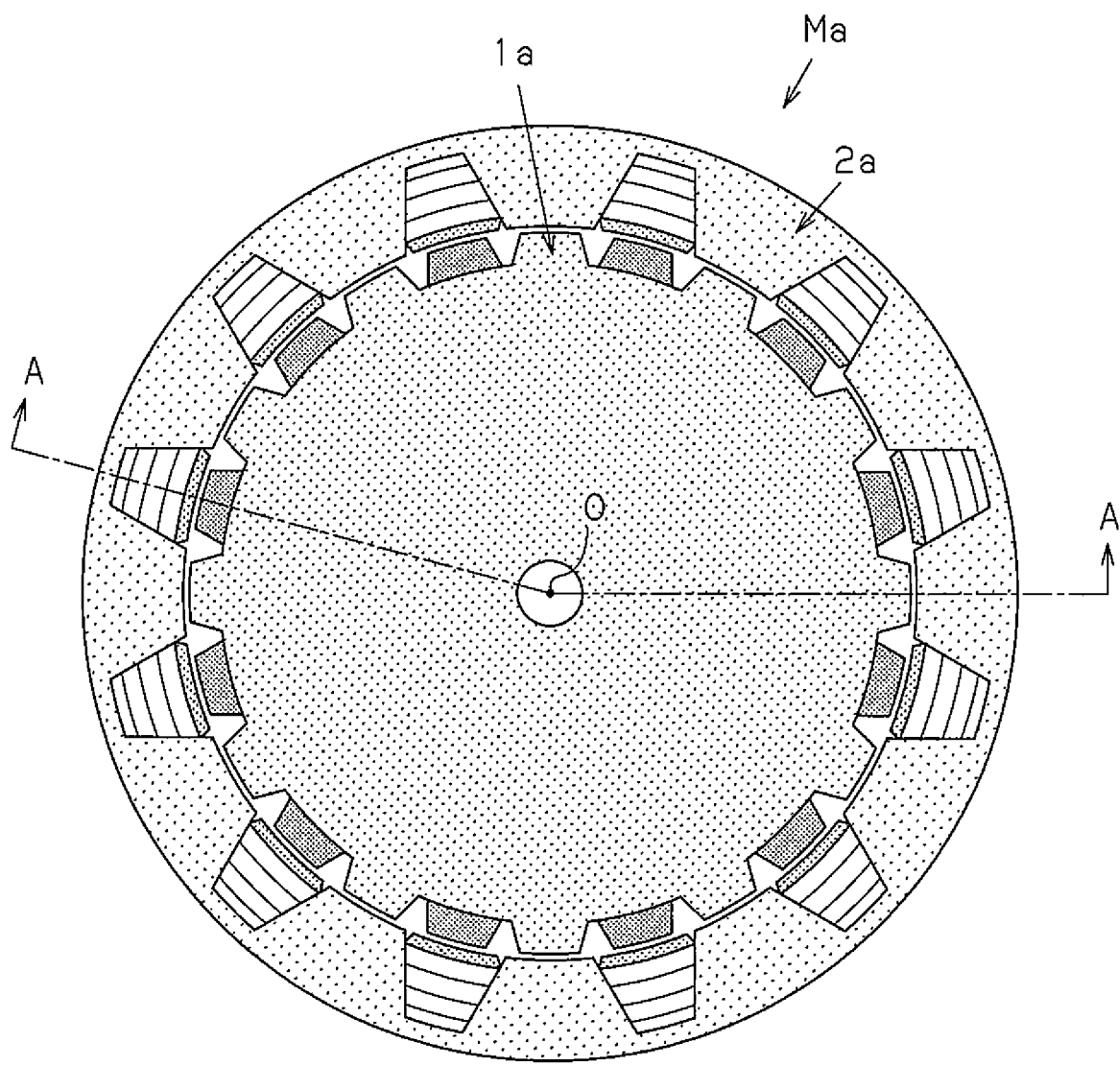
FIG. 4 is a front view of the single motor shown in FIG. 3 as viewed from its axial direction.
Figure 6:
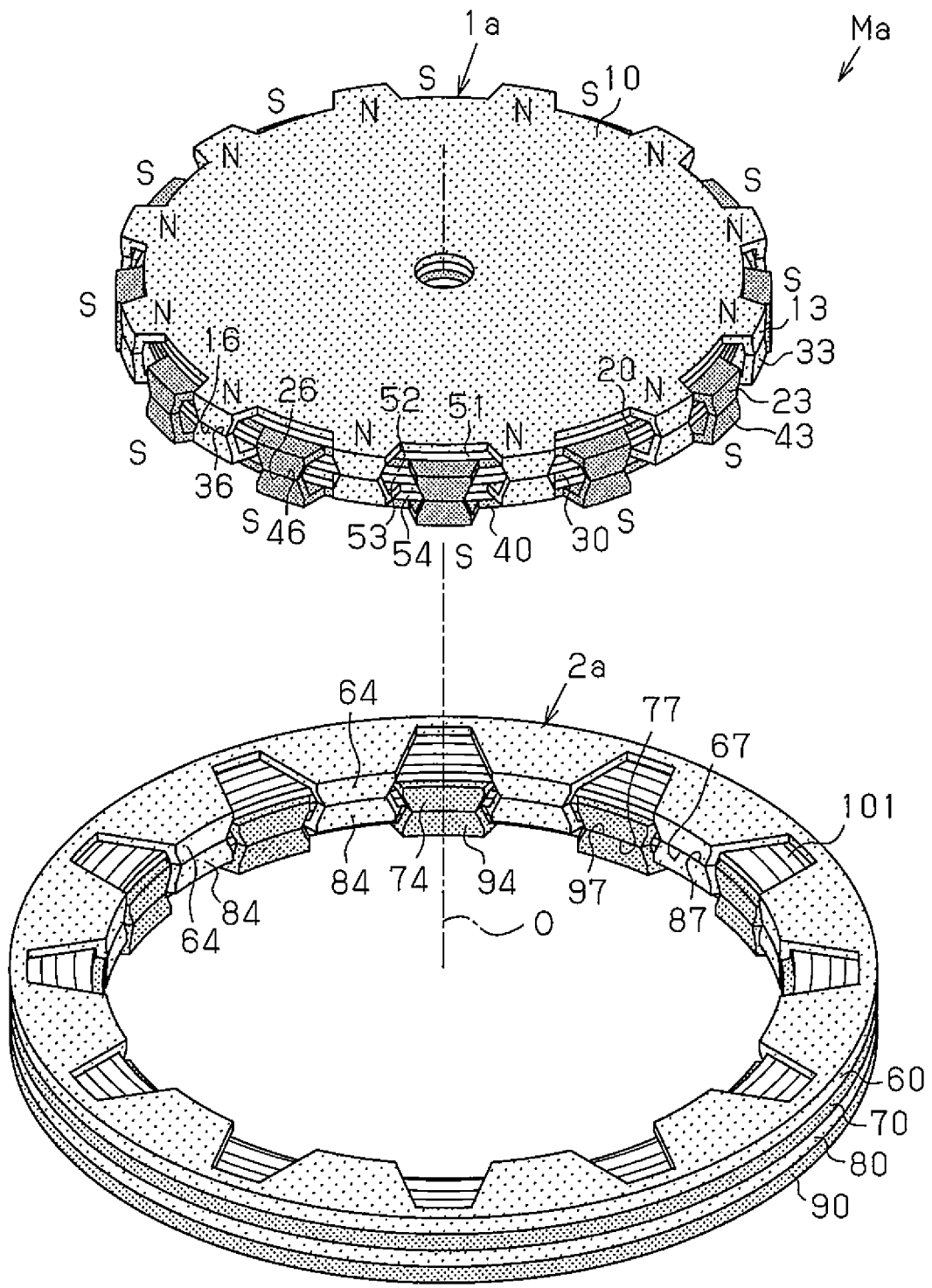
FIG. 6 is an exploded perspective view of the single motor shown in FIG. 3.

As shown in FIGS. 1 and 2, a three-phase brushless motor M includes a rotor 1 fixed to a rotation shaft (not shown), and an annular stator 2 placed outside of the rotor 1 and fixed to a motor housing (not shown).

As shown in FIGS. 3 to 6, the brushless motor M is a three-phase motor in which three single motors Ma each including a single rotor 1a and a single stator 2a are stacked on one another. That is, as shown in FIG. 2, a single motor Ma of a U-phase motor portion Mu, a single motor Ma of a V-phase motor portion Mv and a single motor Ma of a W-phase motor portion Mw are stacked on one another in this order from above.

(Rotor 1)

Figure 9:
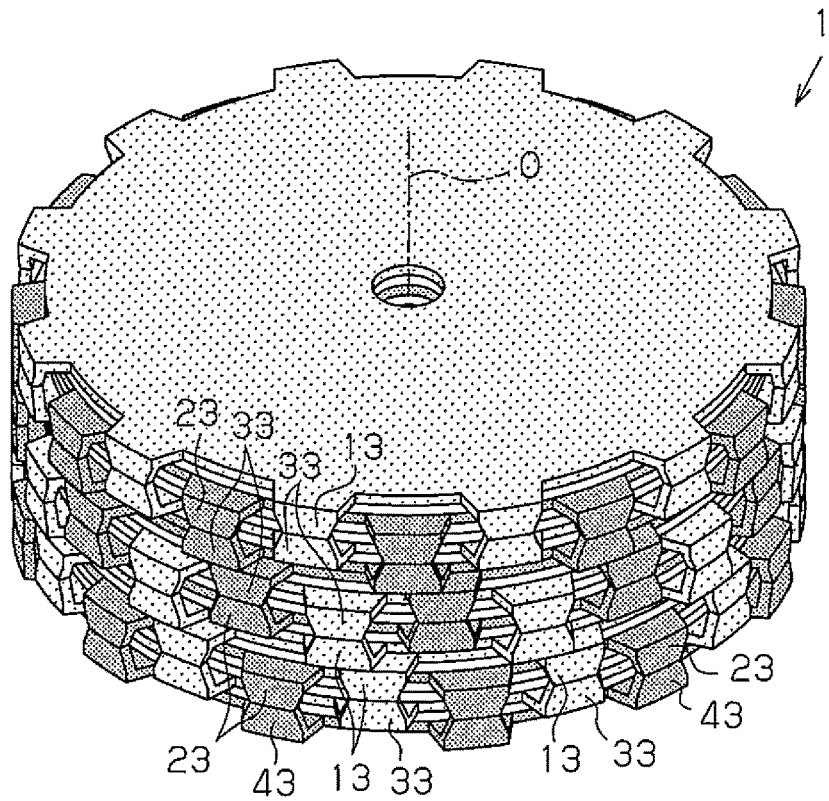
FIG. 9 is a perspective view of an entire three-phase rotor shown in FIG. 1.
Figure 10:
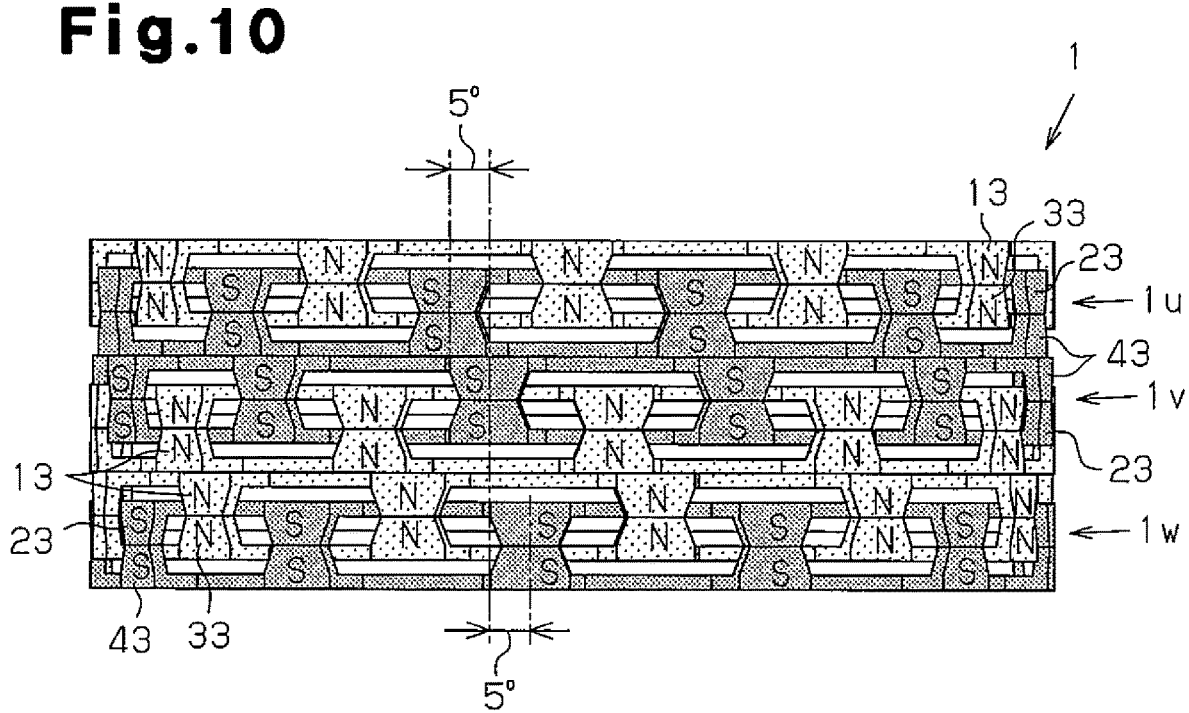
FIG. 10 is a front view of the three-phase rotor shown in FIG. 9 as viewed from its radial direction of the rotor.
Figure 11:
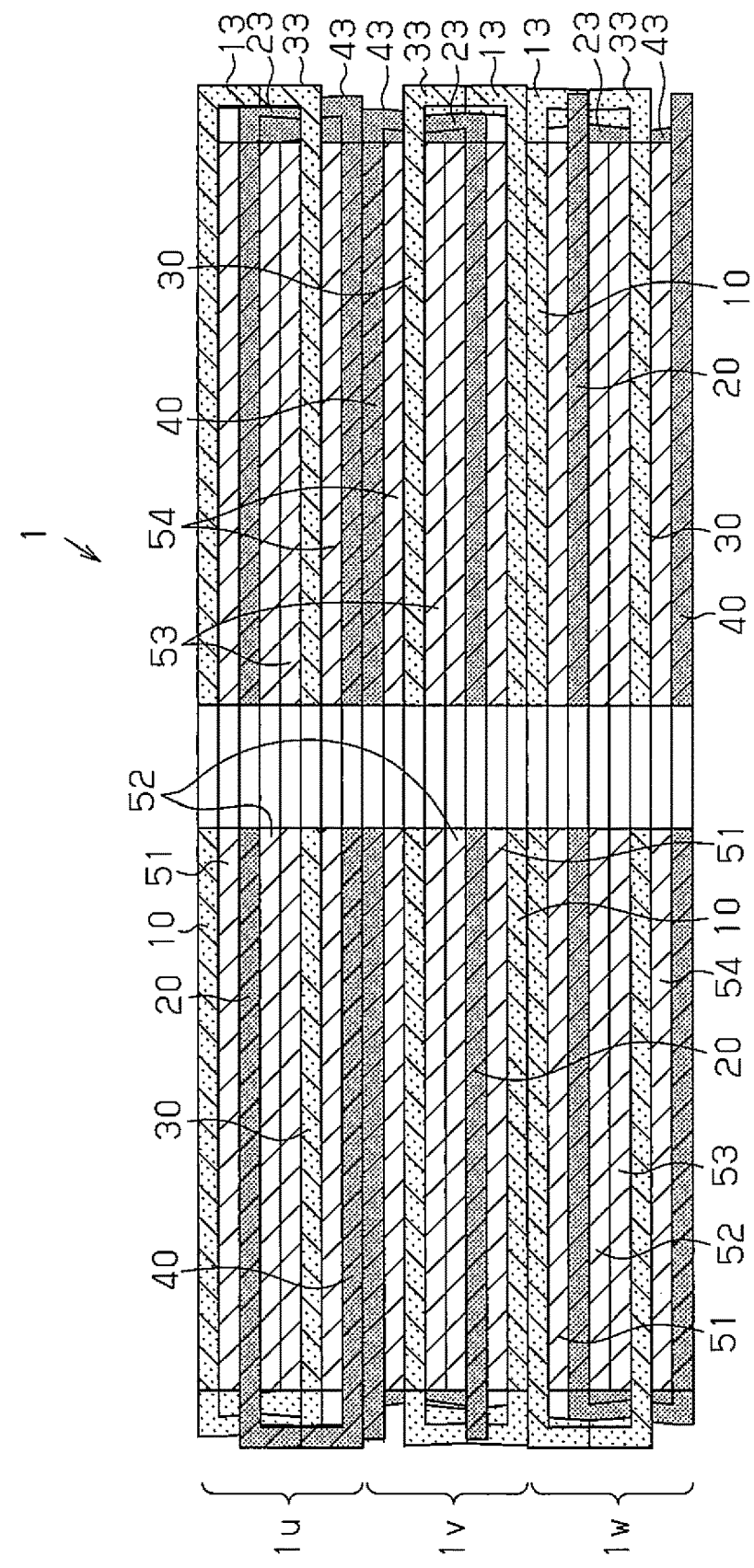
FIG. 11 is a sectional view of the three-phase rotor shown in FIG. 9.

As shown in FIGS. 9 to 11, the rotor 1 includes three rotors, i.e., a U-phase rotor 1u, a V-phase rotor 1v and a W-phase rotor 1w. In the first embodiment, the three-phase rotors 1u, 1v and 1w have the same configurations. When the rotors 1u, 1v and 1w of the phases are collectively called, they will be called as a single rotor 1a for the sake of convenience.

Figure 7:
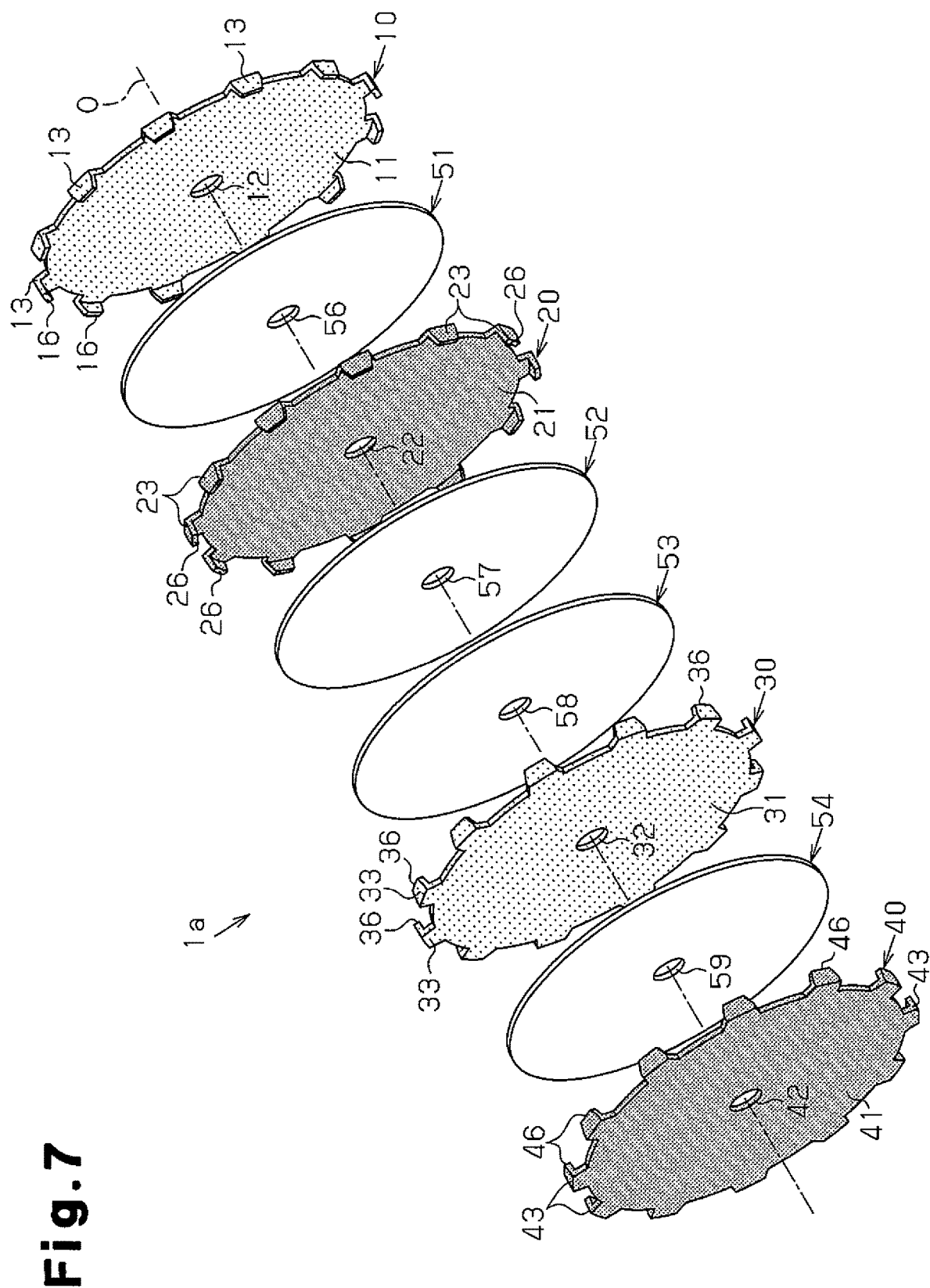
FIG. 7 is an exploded perspective view of the single rotor shown in FIG. 3.

As shown in FIGS. 5A and 7, the single rotor 1a includes first to fourth four rotor cores 10, 20, 30 and 40 and first to fourth four field magnets 51, 52, 53 and 54.

(First Rotor Core 10)

As shown in FIG. 7, the first rotor core 10 includes a first rotor core base 11 formed from a disk-shaped electromagnetic steel plate. A through hole 12 is formed in a central position of the first rotor core base 11, and a rotation shaft (not shown) is inserted through and fixed to the through hole 12. On the outer peripheral surface of the first rotor core base 11, twelve first rotor-side claw-shaped magnetic poles 13 are formed at equal intervals from one another. The twelve first rotor-side claw-shaped magnetic poles 13 project radially outward from the outer peripheral surface of the first rotor core base 11, and tip ends of the poles 13 bend and extend toward the second rotor core 20 along an axial direction of the rotor 1.

Circumferential both end surfaces of each of the first rotor-side claw-shaped magnetic poles 13 are flat surfaces, and the first rotor-side claw-shaped magnetic pole 13 is tapered toward its tip end as viewed from a radial direction of the rotor 1. A radial outer surface and a radial inner surface of the first rotor-side claw-shaped magnetic pole 13 which bends toward the second rotor core 20 along the axial direction are arc surfaces which form concentric circles centering on a center axis O of the rotation shaft (not shown). Therefore, a tip end surface 16 of each of the first rotor-side claw-shaped magnetic poles 13 is a flat surface extending in a direction intersecting with the axial direction at right angles, and is an arc surface which is curved toward the center axis O as viewed from the axial direction.

A length of the first rotor-side claw-shaped magnetic pole 13 in the axial direction (length between the tip end surface 16 and a surface of the first rotor core base 11 opposite from a surface thereof which faces the second rotor core 20) is three times of a thickness (length in axial direction) of the first rotor core base 11.

An angle of the first rotor-side claw-shaped magnetic pole 13 in the circumferential direction, i.e., an angle formed between both end surfaces thereof in the circumferential direction and the center axis O of the rotation shaft (not shown) is set smaller than an angle of a gap between the first rotor-side claw-shaped magnetic poles 13 which are adjacent to each other.

(Second Rotor Core 20)

As shown in FIGS. 5A and 7, the second rotor core 20 is placed such that it faces the first rotor core 10 in the axial direction through the first field magnet 51. The second rotor core 20 is made of the same material and has the same shape as those of the first rotor core 10. A through hole 22 is formed in a central position of a substantially disk-shaped second rotor core base 21, and the rotation shaft (not shown) is inserted through and fixed to the through hole 22.

On an outer peripheral surface of the second rotor core base 21, twelve second rotor-side claw-shaped magnetic poles 23 are formed at equal intervals from one another like the first rotor core 10. The twelve second rotor-side claw-shaped magnetic poles 23 project radially outward from the outer peripheral surface of the second rotor core base 21, tip ends of which bend and extend toward the third rotor core 30 along the axial direction.

Circumferential both end surfaces of each of the second rotor-side claw-shaped magnetic poles 23 are flat surfaces, and the second rotor-side claw-shaped magnetic pole 23 is tapered toward its tip end as viewed from the radial direction. A radial outer surface and a radial inner surface of the second rotor-side claw-shaped magnetic pole 23 which bends toward the third rotor core 30 along the axial direction are arc surfaces which form concentric circles centering on the center axis O of the rotation shaft. Therefore, a tip end surface 26 of each of the second rotor-side claw-shaped magnetic poles 23 is a flat surface extending in a direction intersecting with the axial direction at right angles, and is an arc surface which is curved toward the center axis O as viewed from the axial direction.

A length of the second rotor-side claw-shaped magnetic pole 23 in the axial direction (length between the tip end surface 26 and a surface of the second rotor core base 21 opposite from a surface thereof which faces the third rotor core 30) is three times of a thickness (length in axial direction) of the second rotor core base 21.

An angle of the second rotor-side claw-shaped magnetic pole 23 in the circumferential direction, i.e., an angle formed between both end surfaces thereof in the circumferential direction and the center axis O of the rotation shaft is set smaller than an angle of a gap between the second rotor-side claw-shaped magnetic poles 23 which are adjacent to each other.

The second rotor core base 21 is assembled together with the first rotor core base 11 such that the twelve second rotor-side claw-shaped magnetic poles 23 are placed at intermediate positions between the twelve first rotor-side claw-shaped magnetic poles 13 as viewed from the axial direction.

(Third Rotor Core 30)

As shown in FIGS. 5A and 7, the third rotor core 30 is placed such that it faces the second rotor core 20 in the axial direction through the second and third field magnets 52 and 53. The third rotor core 30 is made of the same material and has the same shape as those of the first rotor core 10. A through hole 32 is formed in a central position of a substantially disk-shaped third rotor core base 31, and the rotation shaft (not shown) is inserted through and fixed to the through hole 32.

On an outer peripheral surface of the third rotor core base 31, twelve third rotor-side claw-shaped magnetic poles 33 are formed at equal intervals from one another. The twelve third rotor-side claw-shaped magnetic poles 33 project radially outward from the outer peripheral surface of the third rotor core base 31, tip ends of which bend and extend toward the second rotor core 20 along the axial direction.

Circumferential both end surfaces of each of the third rotor-side claw-shaped magnetic poles 33 are flat surfaces, and the third rotor-side claw-shaped magnetic pole 33 is tapered toward its tip end as viewed from the radial direction. A radial outer surface and a radial inner surface of the third rotor-side claw-shaped magnetic pole 33 which bends toward the second rotor core 20 along the axial direction are arc surfaces which form concentric circles centering on the center axis O of the rotation shaft. Therefore, a tip end surface 36 of each of the third rotor-side claw-shaped magnetic poles 33 is a flat surface extending in a direction intersecting with the axial direction at right angles, and is an arc surface which is curved toward the center axis O as viewed from the axial direction.

A length of the third rotor-side claw-shaped magnetic pole 33 in the axial direction (length between the tip end surface 36 and a surface of the third rotor core base 31 opposite from the surface thereof which faces the second rotor core 20) is three times of a thickness (length in axial direction) of the third rotor core base 31.

An angle of the third rotor-side claw-shaped magnetic pole 33 in the circumferential direction, i.e., an angle formed between both end surfaces thereof in the circumferential direction and the center axis O of the rotation shaft is set smaller than an angle of a gap between the third rotor-side claw-shaped magnetic poles 33 which are adjacent to each other.

The third rotor core base 31 is assembled together with the first rotor core base 11 such that the twelve third rotor-side claw-shaped magnetic poles 33 are placed such that they are faced to the corresponding twelve first rotor-side claw-shaped magnetic poles 13 as viewed from the axial direction.

Therefore, each of sets of the mutually opposed first rotor-side claw-shaped magnetic poles 13 and third rotor-side claw-shaped magnetic poles 33 is bent such that the pole 13 and the pole 33 are faced to each other in the axial direction. As a result, entire surfaces of the tip end surfaces 16 of the first rotor-side claw-shaped magnetic poles 13 and entire surfaces of the tip end surfaces 36 of the third rotor-side claw-shaped magnetic poles 33 abut against each other in the axial direction.

(Fourth Rotor Core 40)

As shown in FIGS. 5A and 7, the fourth rotor core 40 is placed such that it faces the third rotor core 30 in the axial direction through the fourth field magnet 54. The fourth rotor core 40 is made of the same material and has the same shape as those of the first rotor core 10. A through hole 42 is formed in a central position of a substantially disk-shaped fourth rotor core base 41, and the rotation shaft (not shown) is inserted through and fixed to the through hole 42.

On an outer peripheral surface of the fourth rotor core base 41, twelve fourth rotor-side claw-shaped magnetic poles 43 are formed at equal intervals from one another. The twelve fourth rotor-side claw-shaped magnetic poles 43 project radially outward from the outer peripheral surface of the fourth rotor core base 41, tip ends of which bend and extend toward the third rotor core 30 along the axial direction.

Circumferential both end surfaces of each of the fourth rotor-side claw-shaped magnetic poles 43 are flat surfaces, and the fourth rotor-side claw-shaped magnetic pole 43 is tapered toward its tip end as viewed from the radial direction. A radial outer surface and a radial inner surface of the fourth rotor-side claw-shaped magnetic pole 43 which bends toward the third rotor core 30 along the axial direction are arc surfaces which form concentric circles centering on the center axis O of the rotation shaft. Therefore, tip end surface 46 of each of the fourth rotor-side claw-shaped magnetic poles 43 is a flat surface extending in a direction intersecting with the axial direction at right angles, and is an arc surface which is curved toward the center axis O as viewed from the axial direction.

A length of the fourth rotor-side claw-shaped magnetic pole 43 in the axial direction (length between the tip end surface 46 and a surface of the fourth rotor core base 41 opposite from a surface thereof which faces the third rotor core 30) is three times of a thickness (length in axial direction) of the fourth rotor core base 41.

An angle of the fourth rotor-side claw-shaped magnetic pole 43 in the circumferential direction, i.e., an angle formed between both end surfaces thereof in the circumferential direction and the center axis O of the rotation shaft is set smaller than an angle of a gap between the fourth rotor-side claw-shaped magnetic poles 43 which are adjacent to each other.

The fourth rotor core base 41 is assembled together with the second rotor core base 21 such that the twelve fourth rotor-side claw-shaped magnetic poles 43 are placed such that they are faced to the corresponding twelve second rotor-side claw-shaped magnetic poles 23 as viewed from the axial direction.

Therefore, each of sets of the mutually opposed second rotor-side claw-shaped magnetic poles 23 and fourth rotor-side claw-shaped magnetic poles 43 is bent such that the pole 23 and the pole 43 are faced to each other in the axial direction. As a result, entire surfaces of the tip end surfaces 26 of the second rotor-side claw-shaped magnetic poles 23 and entire surfaces of the tip end surfaces 46 of the fourth rotor-side claw-shaped magnetic poles 43 abut against each other in the axial direction.

A magnetic pole of each of sets of the first rotor-side claw-shaped magnetic poles 13 and the third rotor-side claw-shaped magnetic poles 33 and a magnetic pole of each of sets of the second rotor-side claw-shaped magnetic poles 23 and the fourth rotor-side claw-shaped magnetic poles 43 are determined by the first to fourth field magnets 51 to 54 placed between the first to fourth rotor cores 10, 20, 30 and 40.

(First to Fourth Field Magnets 51 to 54)

As shown in FIG. 7, in the first embodiment, the first to fourth field magnets 51 to 54 are formed from disk-shaped permanent magnets each made of ferrite magnet, and through holes 56 to 59 are formed in central positions of the field magnets 51 to 54, and the rotation shaft (not shown) is inserted through the through holes.

Outer diameters of the first to fourth field magnets 51 to 54 coincide with outer diameters of the first to fourth rotor core bases 11, 21, 31 and 41. Thicknesses (lengths in axial direction) of the first to fourth field magnets 51 to 54 coincide with thicknesses (lengths in axial direction) of the first to fourth rotor core bases 11, 21, 31 and 41.

As shown in FIGS. 5A and 7, the first field magnet 51 is stacked between the first rotor core 10 and the second rotor core 20. The second field magnet 52 and the third field magnet 53 are stacked between the second rotor core 20 and the third rotor core 30. The fourth field magnet 54 is stacked between the third rotor core 30 and the fourth rotor core 40.

As described above, a length of each of the first to fourth rotor-side claw-shaped magnetic poles 13, 23, 33 and 43 in the axial direction is three times of the thickness (length in axial direction) of each of the first to fourth rotor core bases 11, 21, 31 and 41. According to this, when the first to fourth rotor cores 10, 20, 30 and 40 are stacked on one another in the axial direction through the first to fourth field magnets 51 to 54, the tip end surfaces 16 of the first rotor-side claw-shaped magnetic poles 13 and the tip end surfaces 36 of the third rotor-side claw-shaped magnetic poles 33 abut against each other. Similarly, the tip end surfaces 26 of the second rotor-side claw-shaped magnetic poles 23 and the tip end surfaces 46 of the fourth rotor-side claw-shaped magnetic poles 43 abut against each other.

(First Field Magnet 51)

The first field magnet 51 is magnetized in the axial direction such that a portion thereof (first portion) closer to the first rotor core 10 becomes north pole and a portion thereof (second portion) closer to the second rotor core 20 becomes south pole. Therefore, by this first field magnet 51, the first rotor-side claw-shaped magnetic poles 13 of the first rotor core 10 function as north poles (first magnetic poles), and the second rotor-side claw-shaped magnetic poles 23 of the second rotor core 20 function as south poles (second magnetic poles).

(Second Field Magnet 52)

The second field magnet 52 is magnetized in the axial direction such that a portion thereof (first portion) closer to the second rotor core 20 becomes south pole and a portion thereof (second portion) closer to the third field magnet 53 becomes north pole. Therefore, by this second field magnet 52, the second rotor-side claw-shaped magnetic poles 23 of the second rotor core 20 function as south poles (second magnetic poles). That is, the second rotor-side claw-shaped magnetic poles 23 of the second rotor core 20 become south poles by the second field magnet 52 and the first field magnet 51.

(Third Field Magnet 53)

The third field magnet 53 is magnetized in the axial direction such that a portion thereof (first portion) closer to the second field magnet 52 becomes south pole and a portion thereof (second portion) closer to the third rotor core 30 becomes north pole. Therefore, by this third field magnet 53, the third rotor-side claw-shaped magnetic poles 33 of the third rotor core 30 function as north poles (first magnetic poles).

(Fourth Field Magnet 54)

The fourth field magnet 54 is magnetized in the axial direction such that a portion thereof (first portion) closer to the third rotor core 30 becomes north pole and a portion thereof (second portion) closer to the fourth rotor core 40 becomes south pole. Therefore, by this fourth field magnet 54, the third rotor-side claw-shaped magnetic poles 33 of the third rotor core 30 function as north poles (first magnetic poles), and the fourth rotor-side claw-shaped magnetic poles 43 of the fourth rotor core 40 function as south poles (second magnetic poles). That is, the third rotor-side claw-shaped magnetic poles 33 of the third rotor core 30 become north poles by the fourth field magnet 54 and the third field magnet 53.

Further, since the tip end surfaces 36 of the third rotor-side claw-shaped magnetic poles 33 and the tip end surfaces 16 of the corresponding first rotor-side claw-shaped magnetic poles 13 abut against each other in the axial direction, the sets of mutually opposed first rotor-side claw-shaped magnetic poles 13 and third rotor-side claw-shaped magnetic poles 33 become north poles.

Similarly, since the tip end surfaces 46 of the fourth rotor-side claw-shaped magnetic poles 43 and the tip end surfaces 26 of the second rotor-side claw-shaped magnetic poles 23 abut against each other in the axial direction, the sets of mutually opposed second rotor-side claw-shaped magnetic poles 23 and fourth rotor-side claw-shaped magnetic pole 43 become south poles.

The single rotor 1a configured in this manner is a rotor of so-called Lundell type structure using the first to fourth four rotor cores 10, 20, 30 and 40 and the first to fourth four field magnets 51 to 54. In the single rotor 1a, sets of the first rotor-side claw-shaped magnetic poles 13 and the third rotor-side claw-shaped magnetic poles 33 which become north poles, and sets of the second rotor-side claw-shaped magnetic poles 23 and the fourth rotor-side claw-shaped magnetic poles 43 which become south poles are alternately placed in the circumferential direction, and the number of magnetic poles is twenty four (the number of pairs of poles is twelve).

As shown in FIGS. 9 to 11, the single rotors 1a are used as a U-phase rotor 1u, a V-phase rotor 1v and a W-phase rotor 1w and these rotors 1u, 1v and 1w are stacked on one another in the axial direction to form the three-phase rotor 1.

More specifically, the U-phase rotor 1u, the V-phase rotor 1v and the W-phase rotor 1w are stacked on one another in this order as shown in FIG. 11. The U-phase rotor 1u and the W-phase rotor 1w are placed such that placement directions of the first to fourth rotor cores 10, 20, 30 and 40 (first to fourth field magnets 51 to 54) become the same.

On the other hand, as shown in FIG. 11, the V-phase rotor 1v which is stacked between the U-phase rotor 1u and the W-phase rotor 1w is placed such that placement directions of the first to fourth rotor cores 10, 20, 30 and 40 (first to fourth field magnets 51 to 54) become opposite from the placement directions of the first to fourth rotor cores 10, 20, 30 and 40 (first to fourth field magnets 51 to 54) of the U-phase rotor 1u and the W-phase rotor 1w.

That is, the V-phase rotor 1v is stacked between the U-phase rotor 1u and the W-phase rotor 1w such that the fourth rotor core 40 of the V-phase rotor 1v and the fourth rotor core 40 of the U-phase rotor 1u abut against each other, and the first rotor core 10 of the V-phase rotor 1v and the first rotor core 10 of the W-phase rotor 1w abut against each other.

At this time, as shown in FIG. 10, the U-phase rotor 1u, the V-phase rotor 1v and the W-phase rotor 1w configuring the three-phase rotor 1 are stacked on one another such that these rotors 1u, 1v and 1w are displaced from one another by 5° in mechanical angle (60° in electrical angle).

More specifically, the V-phase rotor 1v is fixed to the rotation shaft in a state where the V-phase rotor 1v is displaced from the U-phase rotor 1u by 5° in machine angle (60° in electrical angle) around the center axis O of the rotation shaft in the counterclockwise direction as viewed from the U-phase rotor 1u. The W-phase rotor 1w is fixed to the rotation shaft in a state where the W-phase rotor 1w is displaced from the V-phase rotor 1v by 5° in mechanical angle (60° in electrical angle) around the center axis O of the rotation shaft in the counterclockwise direction as viewed from the V-phase rotor 1v.

(Stator 2)

Figure 12:
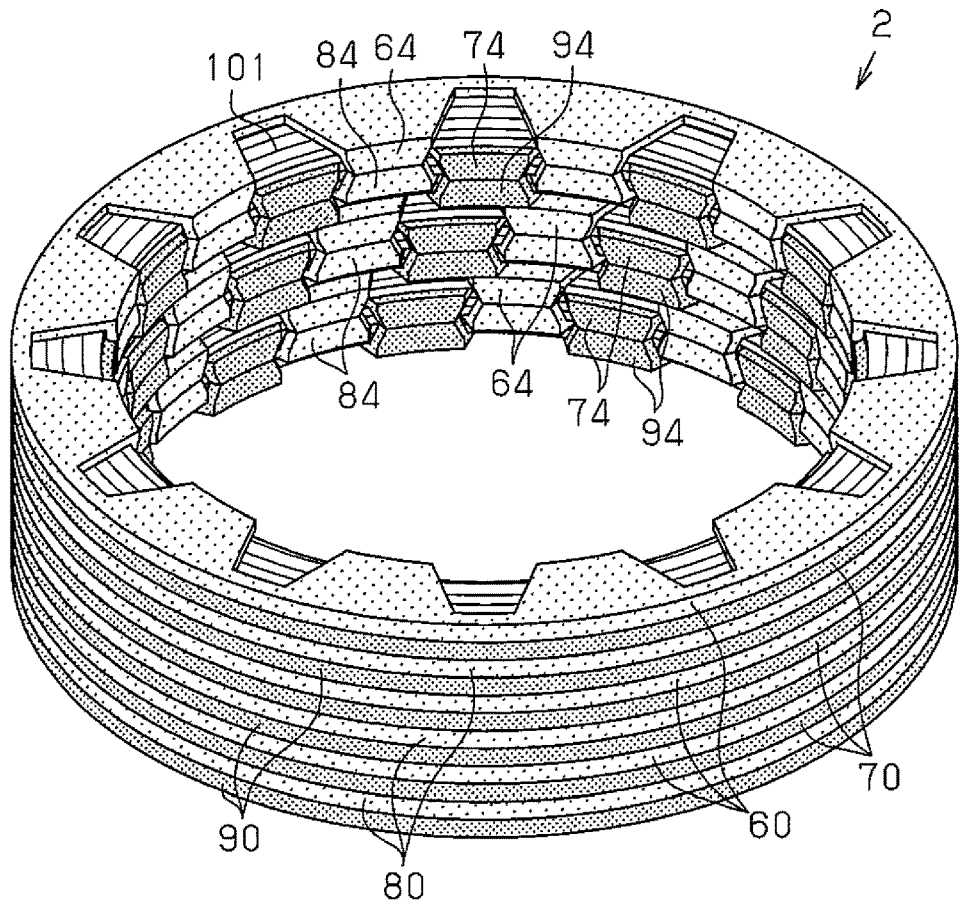
FIG. 12 is a perspective view of an entire three-phase stator shown in FIG. 9.
Figure 13:
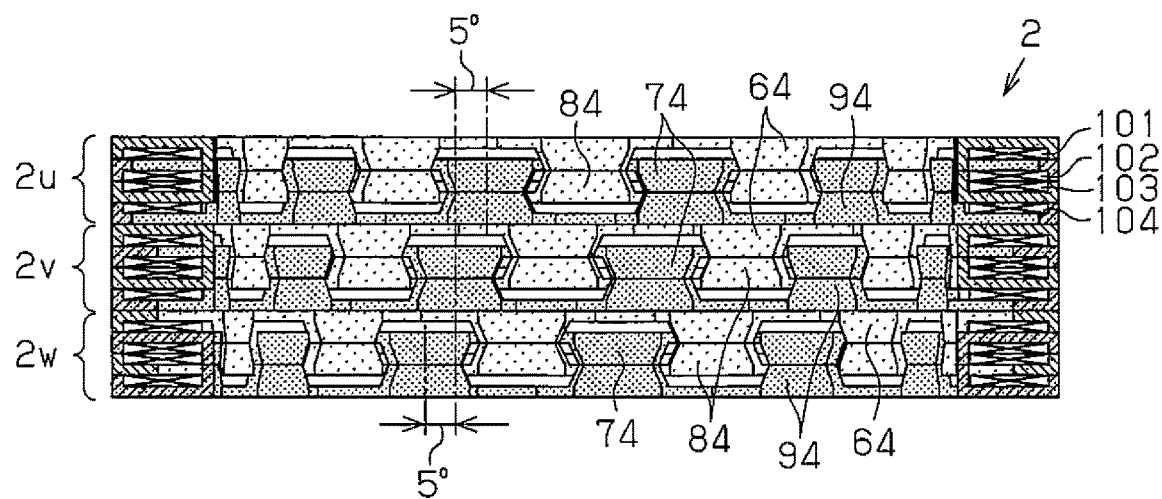
FIG. 13 is a sectional view of the three-phase stator shown in FIG. 9.

As shown in FIGS. 12 and 13, the stator 2 which is placed at a radially outside of the three-phase rotor 1 includes three stators, i.e., a U-phase stator 2u, a V-phase stator 2v and a W-phase stator 2w. The stators 2u, 2v and 2w are stacked on one another in this order in the axial direction such that the stators 2u, 2v and 2w face the U-phase rotor 1u, the V-phase rotor 1v and the W-phase rotor 1w which respectively correspond to the stators 2u, 2v and 2w in the radial direction.

The stators 2u, 2v and 2w have the same configurations. For the sake of convenience of description, when the stators 2u, 2v and 2w of the phases are collectively called, they will be called a single stator 2a.

Figure 8:
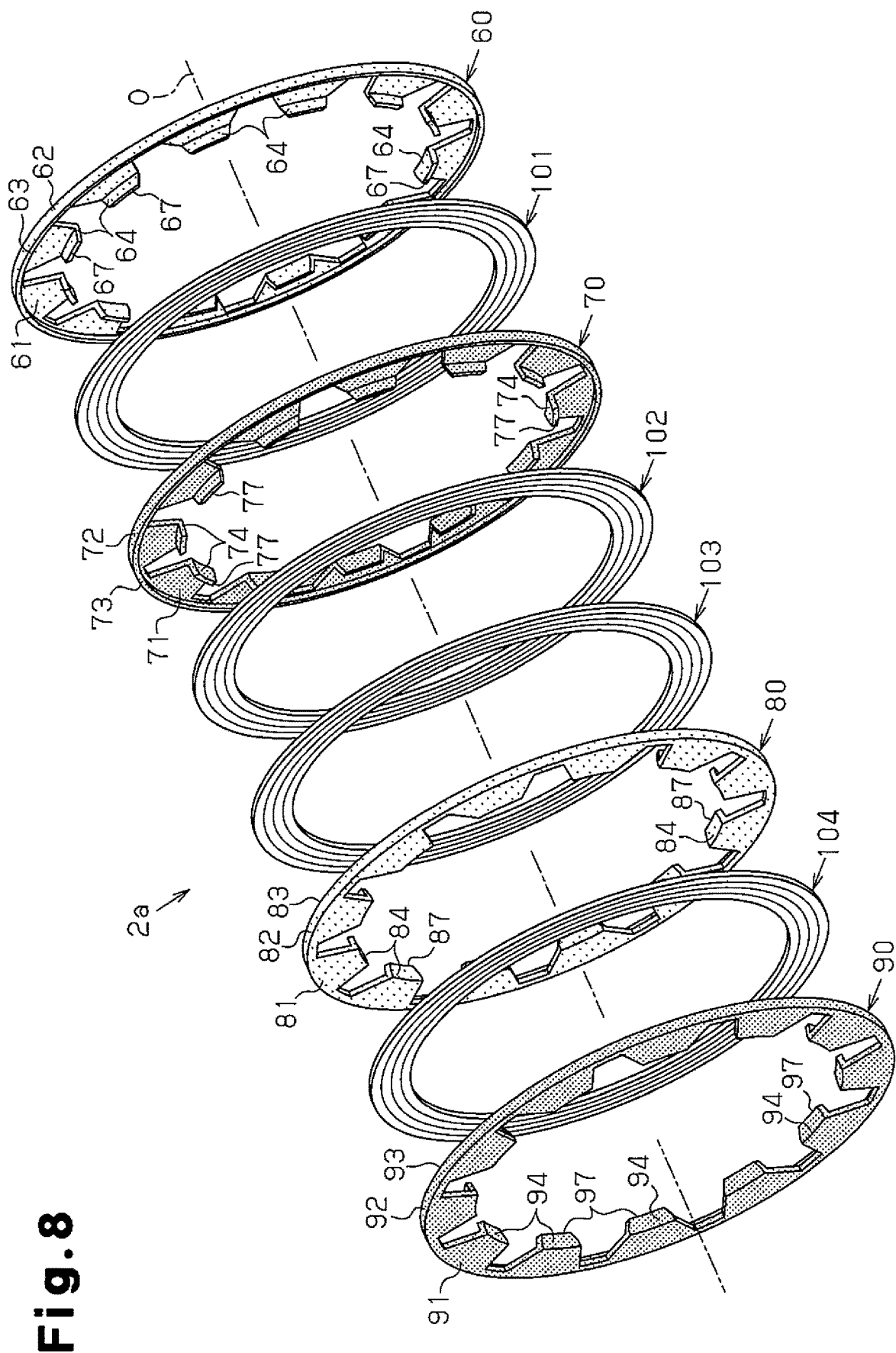
FIG. 8 is an exploded perspective view of the single stator shown in FIG. 3.

As shown in FIGS. 5B and 8, the single stator 2a includes first to fourth four stator cores 60, 70, 80 and 90, and first to fourth four annular windings 101, 102, 103 and 104.

(First Stator Core 60)

As shown in FIG. 8, the first stator core 60 includes a first stator core base 61 formed from an annular electromagnetic steel plate. A first cylindrical wall 62 is formed on an outer periphery of the first stator core base 61. The first cylindrical wall 62 extends from a surface of the first stator core base 61 which faces the second stator core 70 of the first stator core base 61 along the axial direction toward the second stator core 70. This extending length of the first cylindrical wall 62 corresponds to a thickness of the first stator core base 61. An outer peripheral surface of the first cylindrical wall 62 abuts against and is fixed to an inner surface of a motor housing (not shown). An annular tip end surface 63 of the first cylindrical wall 62 abuts against second stator core bases 71 of the second stator core 70.

On the other hand, on an inner peripheral surface of the first stator core base 61, twelve first stator-side claw-shaped magnetic poles 64 are formed at equal intervals. The twelve first stator-side claw-shaped magnetic poles 64 extend radially inward from the inner peripheral surface of the first stator core base 61 and then, bend and extend toward the second stator core 70 along the axial direction.

Circumferential both end surfaces of each of the first stator-side claw-shaped magnetic poles 64 are flat surfaces, and the first stator-side claw-shaped magnetic pole 64 is tapered toward its tip end as viewed from the radial direction. A radial outer surface and a radial inner surface of the first stator-side claw-shaped magnetic pole 64 which bends toward the second stator core 70 along the axial direction are arc surfaces which become concentric circles centering on the center axis O of the rotation shaft. Therefore, a tip end surface 67 of each of the first stator-side claw-shaped magnetic poles 64 is a flat surface extending in a direction intersecting with the axial direction at right angles, and is an arc surface which is curved toward the center axis O as viewed from the axial direction.

A length (length between the tip end surface 67 and a surface of the first stator core base 61 opposite from a surface thereof which faces the second stator core 70) of the first stator-side claw-shaped magnetic pole 64 in the axial direction is three times of a thickness (length in axial direction) of the first stator core base 61.

An angle of each of the first stator-side claw-shaped magnetic poles 64 in the circumferential direction, i.e., an angle formed between both end surfaces thereof in the circumferential direction and the center axis O of the rotation shaft is set smaller than an angle of a gap between the first stator-side claw-shaped magnetic poles 64 which are adjacent to each other.

(Second Stator Core 70)

As shown in FIG. 8, the second stator core 70 includes an annular plate-shaped second stator core base 71 made of the same material and having the same shape as those of the first stator core 60. A cylindrical second cylindrical wall 72 is formed on an outer periphery of the second stator core bases 71. The second cylindrical wall 72 extends from a surface of the second stator core base 71 which faces the third stator core 80 toward the third stator core 80 along the axial direction, and this extending length of the second cylindrical wall 72 corresponds to a thickness of the second stator core base 71. An outer peripheral surface of the second cylindrical wall 72 abuts against and is fixed to an inner surface of the motor housing (not shown). An annular tip end surface 73 of the second cylindrical wall 72 abuts against a tip end surface 83 of the third cylindrical wall 82 of the third stator core 80.

On the other hand, on an inner peripheral surface of the second stator core base 71, twelve second stator-side claw-shaped magnetic poles 74 are formed at equal intervals. The twelve second stator-side claw-shaped magnetic poles 74 extend radially inward from the inner peripheral surface of the second stator core base 71 and then, bend and extend toward the third stator core 80 along the axial direction.

Circumferential both end surfaces of each of the second stator-side claw-shaped magnetic poles 74 are flat surfaces, and the second stator-side claw-shaped magnetic pole 74 is tapered toward its tip end as viewed from the radial direction. A radial outer surface and a radial inner surface of the second stator-side claw-shaped magnetic pole 74 which bends toward the third stator core 80 along the axial direction are arc surfaces which become concentric circles centering on the center axis O of the rotation shaft. Therefore, a tip end surface 77 of each of the second stator-side claw-shaped magnetic poles 74 is a flat surface extending in a direction intersecting with the axial direction at right angles, and is an arc surface which is curved toward the center axis O as viewed from the axial direction.

A length (length between the tip end surface 77 and a surface of the second stator core base 71 opposite from a surface thereof which faces the third stator core 80) of the second stator-side claw-shaped magnetic pole 74 in the axial direction is three times of a thickness (length in axial direction) of the second stator core base 71.

An angle of each of the second stator-side claw-shaped magnetic poles 74 in the circumferential direction, i.e., an angle formed between both end surfaces thereof in the circumferential direction and the center axis O of the rotation shaft is set smaller than an angle of a gap between the second stator-side claw-shaped magnetic poles 74 which are adjacent to each other.

The second stator core 70 is fixed to the first stator core 60 such that the second stator-side claw-shaped magnetic poles 74 of the second stator core 70 are placed at intermediate positions between the first stator-side claw-shaped magnetic poles 64 as viewed from the axial direction.

Since the annular tip end surface 63 of the first cylindrical wall 62 formed on the first stator core 60 abuts against the outer periphery of the second stator core base 71 of the second stator core 70, an annular space is formed between the first stator core base 61 and the second stator core base 71. The first annular winding 101 is wound and placed in the annular space.

(Third Stator Core 80)

As shown in FIG. 8, the third stator core 80 includes an annular plate-shaped third stator core base 81 made of the same material and having the same shape as those of the first stator core 60. A cylindrical third cylindrical wall 82 is formed on an outer periphery of the third stator core base 81. The third cylindrical wall 82 extends from a surface of the third stator core base 81 which faces the second stator core 70 toward the second stator core 70 along the axial direction, and this extending length of the third cylindrical wall 82 corresponds to a thickness of the third stator core base 81. An outer peripheral surface of the third cylindrical wall 82 abuts against and is fixed to an inner surface of the motor housing (not shown). An annular tip end surface 83 of the third cylindrical wall 82 abuts against a tip end surface 73 of the second cylindrical wall 72 of the second stator core 70.

On the other hand, on an inner peripheral surface of the third stator core base 81, twelve third stator-side claw-shaped magnetic poles 84 are formed at equal intervals. The twelve third stator-side claw-shaped magnetic poles 84 extend radially inward from the inner peripheral surface of the third stator core base 81 and then, bend and extend toward the second stator core 70 along the axial direction.

Circumferential both end surfaces of each of the third stator-side claw-shaped magnetic poles 84 are flat surfaces, and the third stator-side claw-shaped magnetic pole 84 is tapered toward its tip end as viewed from the radial direction. A radial outer surface and a radial inner surface of the third stator-side claw-shaped magnetic pole 84 which bends toward the second stator core 70 along the axial direction are arc surfaces which become concentric circles centering on the center axis O of the rotation shaft. Therefore, a tip end surface 87 of each of the third stator-side claw-shaped magnetic poles 84 is a flat surface extending in a direction intersecting with the axial direction at right angles, and is an arc surface which is curved toward the center axis O as viewed from the axial direction.

A length (length between the tip end surface 87 and a surface of the third stator core base 81 opposite from a surface thereof which faces the second stator core 70) of the third stator-side claw-shaped magnetic pole 84 in the axial direction is three times of a thickness (length in axial direction) of the third stator core base 81.

An angle of each of the third stator-side claw-shaped magnetic poles 84 in the circumferential direction, i.e., an angle formed between both end surfaces thereof in the circumferential direction and the center axis O of the rotation shaft is set smaller than an angle of a gap between the third stator-side claw-shaped magnetic poles 84 which are adjacent to each other.

The third stator core 80 is placed on and fixed to the first stator core 60 such that the first stator-side claw-shaped magnetic poles 64 of the first stator core 60 face the corresponding third stator-side claw-shaped magnetic poles 84 as viewed from the axial direction. Entire surfaces of the tip end surfaces 67 of the first stator-side claw-shaped magnetic poles 64 and entire surfaces of the tip end surfaces 87 of the third stator-side claw-shaped magnetic poles 84 faces to each other in the axial direction and abut against each other.

Here, the annular tip end surface 73 of the second cylindrical wall 72 and the annular tip end surface 83 of the third cylindrical wall 82 abut against each other, and the tip end surfaces 67 of the first stator-side claw-shaped magnetic poles 64 and the tip end surfaces 87 of the third stator-side claw-shaped magnetic poles 84 abut against each other. Therefore, an annular space is formed between the second stator core base 71 and the third stator core base 81. An axial length of this annular space is two times of an axial length of an annular space formed between the first stator core base 61 and the second stator core base 71. This is because that the annular space formed between the first stator core base 61 and the second stator core base 71 is determined by the axial length of the first cylindrical wall 62, while the annular space formed between the second stator core base 71 and the third stator core base 81 is determined by axial lengths of the second cylindrical wall 72 and the third cylindrical wall 82.

The second annular winding 102 is wound and placed in a portion of this annular space closer to the second stator core base 71, and the third annular winding 103 is wound and placed in a portion of this annular space closer to the third stator core base 81.

(Fourth Stator Core 90)

As shown in FIG. 8, the fourth stator core 90 includes an annular plate-shaped fourth stator core base 91 made of the same material and having the same shape as those of the first stator core 60. A cylindrical fourth cylindrical wall 92 is formed on an outer periphery of the fourth stator core base 91. The fourth cylindrical wall 92 extends from a surface of the fourth stator core base 91 which faces the third stator core 80 toward the third stator core 80 along the axial direction, and this extending length of the fourth cylindrical wall 92 corresponds to a thickness of the fourth stator core base 91. An outer peripheral surface of the fourth cylindrical wall 92 abuts against and is fixed to an inner surface of the motor housing (not shown). An annular tip end surface 93 of the fourth cylindrical wall 92 abuts against the third stator core base 81 of the third stator core 80.

On the other hand, on an inner peripheral surface of the fourth stator core base 91, twelve fourth stator-side claw-shaped magnetic poles 94 are formed at equal intervals from one another. The twelve fourth stator-side claw-shaped magnetic poles 94 extend radially inward from the inner peripheral surface of the fourth stator core base 91 and then, bend and extend toward the third stator core 80 along the axial direction.

Circumferential both end surfaces of each of the fourth stator-side claw-shaped magnetic poles 94 are flat surfaces, and the fourth stator-side claw-shaped magnetic pole 94 is tapered toward its tip end as viewed from the radial direction. A radial outer surface and a radial inner surface of the fourth stator-side claw-shaped magnetic pole 94 which bends toward the third stator core 80 along the axial direction are arc surfaces which become concentric circles centering on the center axis O of the rotation shaft. Therefore, a tip end surface 97 of each of the fourth stator-side claw-shaped magnetic poles 94 is a flat surface extending in a direction intersecting with the axial direction at right angles, and is an arc surface which is curved toward the center axis O as viewed from the axial direction.

A length (length between the tip end surface 97 and a surface of the fourth stator core base 91 opposed to a surface thereof which faces the third stator core 80) of the fourth stator-side claw-shaped magnetic pole 94 in the axial direction is three times of a thickness (length in axial direction) of the fourth stator core base 91.

An angle of each of the fourth stator-side claw-shaped magnetic poles 94 in the circumferential direction, i.e., an angle formed between both end surfaces thereof in the circumferential direction and the center axis O of the rotation shaft is set smaller than an angle of a gap between the fourth stator-side claw-shaped magnetic poles 94 which are adjacent to each other.

The fourth stator core 90 is placed on and fixed to the second stator core 70 such that the second stator-side claw-shaped magnetic poles 74 of the second stator core 70 face the corresponding fourth stator-side claw-shaped magnetic poles 94 as viewed from the axial direction. Entire surfaces of the tip end surfaces 77 of the second stator-side claw-shaped magnetic poles 74 and entire surfaces of the tip end surfaces 97 of the fourth stator-side claw-shaped magnetic poles 94 face and abut against each other in the axial direction.

Since the annular tip end surface 93 of the fourth cylindrical wall 92 formed on the fourth stator core 90 abuts against the outer periphery of the third stator core base 81 of the third stator core 80, an annular space is formed between the third stator core base 81 and the fourth stator core base 91. The fourth annular winding 104 is wound and placed in this annular space.

(First to Fourth Annular Windings 101 to 104)

As shown in FIGS. 5B and 8, the first annular winding 101 is sandwiched between the first stator core base 61 and the second stator core base 71. The second annular winding 102 and the third annular winding 103 are sandwiched between the second stator core base 71 and the third stator core base 81. The second annular winding 102 is placed in a space closer to the second stator core base 71, and the third annular winding 103 is placed in a space closer to the third stator core base 81. The fourth annular winding 104 is sandwiched between the third stator core base 81 and the fourth stator core base 91.

The first to fourth annular windings 101 to 104 are connected to one another in series, and the windings 101 to 104 have the same winding number (number of windings, or winding times). The first annular winding 101 and the fourth annular winding 104 are wound in a normal direction. The second annular winding 102 and the third annular winding 103 are wound in a direction opposite from the normal direction of the first annular winding 101 and the fourth annular winding 104.

(First Annular Winding 101)

As shown in FIGS. 5B and 8, the first annular winding 101 is an annular winding, and is placed in an annular space formed between the first stator core base 61 and the second stator core base 71. An outer diameter of the first annular winding 101 is substantially equal to an inner diameter of the first cylindrical wall 62, and the first annular winding 101 is placed such that an outer peripheral surface thereof in the radial direction abuts against an inner peripheral surface of the first cylindrical wall 62. An inner diameter of the first annular winding 101 is substantially equal to an outer diameter of the first stator-side claw-shaped magnetic poles 64. The first annular winding 101 is placed such that a radial inner surface thereof abuts against outer surfaces of the first stator-side claw-shaped magnetic poles 64.

An outer surface of the first annular winding 101 which faces the first stator core 60 in the axial direction abuts against the first stator core bases 61, and an outer surface of the first annular winding 101 which faces the second stator core 70 in the axial direction abuts against the second stator core base 71.

A length of the first annular winding 101 in the axial direction coincides with a thickness (length of first cylindrical wall 62 in axial direction) of the first stator core 60.

(Second Annular Winding 102)

As shown in FIGS. 5B and 8, the second annular winding 102 is an annular winding. The second annular winding 102 is made of the same material and has the same shape as those of the first annular winding 101. The second annular winding 102 is placed in a portion of an annular space formed between the second stator core base 71 and the third stator core base 81 at a location closer to the second stator core base 71.

An outer diameter of the second annular winding 102 is substantially equal to an inner diameter of the second cylindrical wall 72, and the second annular winding 102 is placed such that an outer peripheral surface thereof in the radial direction abuts against an inner peripheral surface of the second cylindrical wall 72. An inner diameter of the second annular winding 102 is substantially equal to an outer diameter of the second stator-side claw-shaped magnetic poles 74. The second annular winding 102 is placed such that a radial inner surface thereof abuts against outer surfaces of the second stator-side claw-shaped magnetic poles 74.

An outer surface of the second annular winding 102 which faces the second stator core 70 in the axial direction abuts against the second stator core base 71, and an outer surface of the second annular winding 102 which faces the third stator core 80 in the axial direction abuts against the third annular winding 103.

A length of the second annular winding 102 in the axial direction coincides with a thickness (length of second cylindrical wall 72 in axial direction) of the second stator core 70.

(Third Annular Winding 103)

As shown in FIGS. 5B and 8, the third annular winding 103 is an annular winding. The third annular winding 103 is made of the same material and has the same shape as those of the first annular winding 101. The third annular winding 103 is placed in a portion of the annular space formed between the second stator core base 71 and the third stator core base 81 located at a location closer to the third stator core base 81.

An outer diameter of the third annular winding 103 is substantially equal to an inner diameter of the third cylindrical wall 82, and the third annular winding 103 is placed such that an outer peripheral surface thereof in the radial direction abuts against an inner peripheral surface of the third cylindrical wall 82. An inner diameter of the third annular winding 103 is substantially equal to an outer diameter of the third stator-side claw-shaped magnetic poles 84. The third annular winding 103 is placed such that a radial inner surface thereof abuts against outer surfaces of the third stator-side claw-shaped magnetic poles 84.

An outer surface of the third annular winding 103 which faces the second stator core 70 in the axial direction abuts against the second annular winding 102, and an outer surface of the third annular winding 103 which faceas the third stator core 80 in the axial direction abuts against the third stator core base 81.

A length of the third annular winding 103 in the axial direction coincides with a thickness (length of third cylindrical wall 82 in axial direction) of the third stator core 80.

(Fourth Annular Winding 104)

As shown in FIGS. 5B and 8, the fourth annular winding 104 is an annular winding. The fourth annular winding 104 is made of the same material and has the same shape as those of the first annular winding 101. The fourth annular winding 104 is placed in an annular space formed between the third stator core base 81 and the fourth stator core base 91.

An outer diameter of the fourth annular winding 104 is substantially equal to an inner diameter of the fourth cylindrical wall 92, and the fourth annular winding 104 is placed such that an outer peripheral surface thereof in the radial direction abuts against an inner peripheral surface of the fourth cylindrical wall 92. An inner diameter of the fourth annular winding 104 is substantially equal to an outer diameter of the fourth stator-side claw-shaped magnetic poles 94. The fourth annular winding 104 is placed such that a radial inner surface thereof abuts against outer surfaces of the fourth stator-side claw-shaped magnetic poles 94.

An outer surface of the fourth annular winding 104 which faces the third stator core 80 in the axial direction abuts against the third stator core base 81, and an outer surface of the fourth annular winding 104 which faces the fourth stator core 90 in the axial direction abuts against the fourth stator core base 91.

A length of the fourth annular winding 104 in the axial direction coincides with a thickness (length of fourth cylindrical wall 92 in axial direction) of the fourth stator core 90.

As described above, lengths of the first to fourth stator-side claw-shaped magnetic poles 64, 74, 84 and 94 in the axial direction are three times of thicknesses (lengths in axial direction) of the first to fourth stator core bases 61, 71, 81 and 91. According to this, when the first to fourth stator cores 60, 70, 80 and 90 are stacked on one another in the axial direction through the first to fourth annular windings 101 to 104, tip end surfaces 67 of the first stator-side claw-shaped magnetic poles 64 and tip end surfaces 87 of the third stator-side claw-shaped magnetic poles 84 respectively abut against each other. Similarly, the tip end surfaces 77 of the second stator-side claw-shaped magnetic poles 74 and the tip end surfaces 97 of the fourth stator-side claw-shaped magnetic poles 94 respectively abut against each other.

As described above, the first and fourth annular windings 101 and 104 are wound in the normal direction, and the second and third annular windings 102 and 103 are wound in the opposite direction. Therefore, when current is made to flow through the first to fourth annular windings 101 to 104 which are connected to one another in series, a direction of current flowing through the second and third annular windings 102 and 103 is always opposite from a direction of current flowing through the first and fourth annular windings 101 and 104.

When single-phase AC current is made to flow through the first to fourth annular windings 101 to 104, the first to fourth stator-side claw-shaped magnetic poles 64, 74, 84 and 94 are excited to magnetic poles which are different from each other at each timing.

That is, the tip end surfaces 67 of the first stator-side claw-shaped magnetic poles 64 and the tip end surfaces 87 of the corresponding third stator-side claw-shaped magnetic poles 84 respectively abut against each other, and a magnetic flux density of the magnetic poles varies at the same timing and with the same cycle. Similarly, the tip end surfaces 77 of the second stator-side claw-shaped magnetic poles 74 and the tip end surfaces 97 of the corresponding fourth stator-side claw-shaped magnetic poles 94 respectively abut against each other, and a magnetic flux density of the magnetic poles varies at the same timing and with the same cycle.

Further, a variation cycle of a magnetic flux density of the first and third stator-side claw-shaped magnetic poles 64 and 84 and a variation cycle of a magnetic flux density of the second and fourth stator-side claw-shaped magnetic poles 74 and 94 are deviated from each other by 180° in phase.

The single stator 2a configured as described above is a stator of a so-called Lundell type (claw pole type) structure having twenty four poles in which sets of the first stator-side claw-shaped magnetic poles 64 and the third stator-side claw-shaped magnetic poles 84 and sets of the second stator-side claw-shaped magnetic poles 74 and the fourth stator-side claw-shaped magnetic poles 94 are excited into magnetic poles which are different from each other at each timing by the first to fourth stator cores 60, 70, 80 and 90 and the first to fourth annular windings 101 to 104.

In the first embodiment, thicknesses of the first to fourth stator core bases 61, 71, 81 and 91 and the first to fourth rotor core bases 11, 21, 31 and 41 are equal to each other. As a result, lengths of the single stator 2a and the single rotor 1a in the axial direction are the same.

Therefore, in the single motor Ma in which the single rotor 1a is placed on the inner side of the single stator 2a, sets of the first rotor-side claw-shaped magnetic poles 13 and the third rotor-side claw-shaped magnetic poles 33 and sets of the first stator-side claw-shaped magnetic poles 64 and the third stator-side claw-shaped magnetic poles 84 are placed such that they face to each other in the radial direction. Similarly, sets of the second rotor-side claw-shaped magnetic poles 23 and the fourth rotor-side claw-shaped magnetic poles 43 and sets of the second stator-side claw-shaped magnetic poles 74 and the fourth stator-side claw-shaped magnetic poles 94 are placed such that they face to each other in the radial direction.

As shown in FIGS. 12 and 13, the single stators 2a are used as the U-phase stator 2u, the V-phase stator 2v and the W-phase stator 2w and they are stacked on one another in the axial direction to form the three-phase stator 2.

More specifically, the U-phase stator 2u, the V-phase stator 2v and the W-phase stator 2w are stacked on one another in this order.

At this time, as shown in FIG. 13, the three-phase stator 2 including the U-phase stator 2u, the V-phase stator 2v and the W-phase stator 2w is configured by stacking the U-phase stator 2u, the V-phase stator 2v and the W-phase stator 2w on one another such that the stators 2u, 2V and 2W are displaced from one another by 5° in mechanical angle (60° in electrical angle).

More specifically, the V-phase stator 2v is fixed to the motor housing such that the V-phase stator 2v is displaced by 5° in mechanical angle (60° in electrical angle) from the U-phase stator 2u around the center axis O in the clockwise direction as viewed from the U-phase stator 2u. The W-phase stator 2w is fixed to the motor housing such that the W-phase stator 2w is displaced by 5° in mechanical angle (60° in electrical angle) from the V-phase stator 2v around the center axis O in the clockwise direction as viewed from the V-phase stator 2v.

Figure 14:
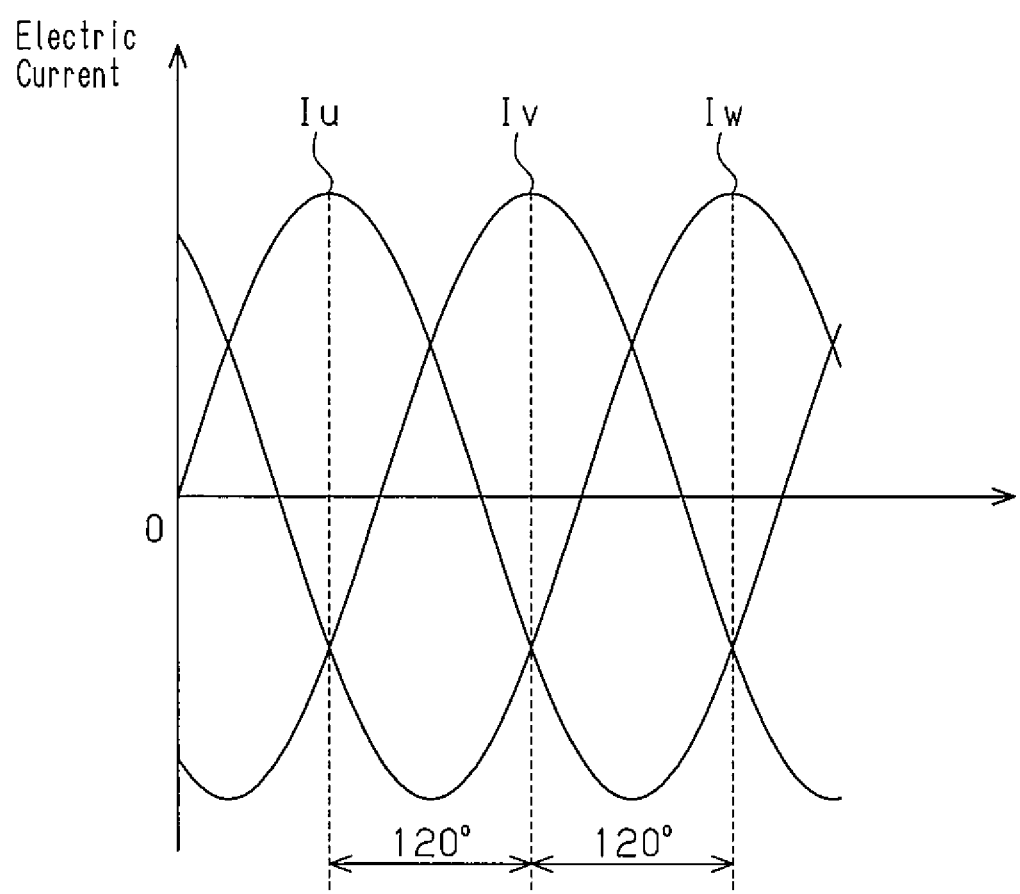
FIG. 14 is a waveform diagram of each of phases of a three-phase AC power source shown in FIG. 9.

As shown in FIG. 14, U-phase AC current Iu (single phase current) of the three-phase AC power source flows through the first to fourth annular windings 101 to 104 of the U-phase stator 2u. V-phase AC current Iv (single phase current) of the three-phase AC power source flows through the first to fourth annular windings 101 to 104 of the V-phase stator 2v. W-phase AC current Iw (single phase current) of the three-phase AC power source flows through the first to fourth annular windings 101 to 104 of the W-phase stator 2w.

Next, operations of the brushless motor M of the first embodiment having the above-described configuration will be described.

Three-phase AC power source is applied to the three-phase stator 2. That is, U-phase AC current Iu flows through the first to fourth annular windings 101 to 104 of the U-phase stator 2u, V-phase AC current Iv flows through the first to fourth annular windings 101 to 104 of the V-phase stator 2v, and W-phase AC current Iw flows through the first to fourth annular windings 101 to 104 of the W-phase stator 2w. According to this, rotating field is generated in the three-phase stator 2, and the three-phase rotor 1 is rotated and driven.

At this time, the three-phase stator 2 is formed into the three-part structure of the U-phase stator 2u, V-phase stator 2v and W-phase stator 2w in accordance with the three-phase AC power source. In accordance with this, the three-phase rotor 1 is also formed into the three-part structure of the U-phase rotor 1u, the V-phase rotor 1v and the W-phase rotor 1w. According to this, in the stators and rotors of the respective phases, the stators which face along the axial direction can receive magnetic flux of the first to fourth field magnets 51 to 54, and output can be increased.

In the rotors (single rotor 1a) of the respective phases, the first to fourth four rotor cores 10, 20, 30 and 40 are stacked on one another in the axial direction in this order such that the first to fourth field magnets 51 to 54 are respectively interposed therebetween. By the first to fourth field magnets 51 to 54, the first rotor-side claw-shaped magnetic poles 13 of the first rotor core 10 and the third rotor-side claw-shaped magnetic poles 33 of the third rotor core 30 are made north poles, and the second rotor-side claw-shaped magnetic poles 23 of the second rotor core 20 and the fourth rotor-side claw-shaped magnetic poles 43 of the fourth rotor core 40 are made south poles.

The tip end surfaces 16 of the first rotor-side claw-shaped magnetic poles 13 and the tip end surfaces 36 of the third rotor-side claw-shaped magnetic pole 33 are made to abut against each other in the axial direction, and the tip end surfaces 26 of the second rotor-side claw-shaped magnetic pole 23 and the tip end surfaces 46 of the fourth rotor-side claw-shaped magnetic pole 43 are made to abut against each other in the axial direction.

As a result, variation in a magnetic flux density between base ends and tip ends of the first rotor-side claw-shaped magnetic poles 13 (third rotor-side claw-shaped magnetic poles 33) becomes small as compared with a case where the tip end surfaces 16 of the first rotor-side claw-shaped magnetic poles 13 and the tip end surfaces 36 of the third rotor-side claw-shaped magnetic poles 33 are separated from each other. Similarly, variation in a magnetic flux density between base ends and tip ends of the second rotor-side claw-shaped magnetic poles 23 (fourth rotor-side claw-shaped magnetic poles 43) becomes small as compared with a case where the tip end surfaces 26 of the second rotor-side claw-shaped magnetic poles 23 and the tip end surfaces 46 of the fourth rotor-side claw-shaped magnetic poles 43 are separated from each other.

That is, when both the tip end surfaces 16 and 36 of the first and third rotor-side claw-shaped magnetic poles 13 and 33 are separated from each other and opened, the a magnetic flux density of the base ends of the first and third rotor-side claw-shaped magnetic poles 13 and 33 is high (dense), and magnetic resistance of the opened portions between the tip ends of the first and third rotor-side claw-shaped magnetic poles 13 and 33 becomes large, and the magnetic flux density of these portions becomes low (sparse).

In other words, a magnetic flux density distribution of the north poles largely varies in the axial direction, and an uneven magnetic flux density distribution in the axial direction is given to the first and third stator-side claw-shaped magnetic poles 64 and 84 of the single stator 2a.

Similarly, when both the tip end surfaces 26 and 46 of the second and fourth rotor-side claw-shaped magnetic poles 23 and 43 are separated from each other and opened, the magnetic flux density of the base ends of the second and fourth rotor-side claw-shaped magnetic poles 23 and 43 is high, and magnetic resistance of the opened portions between the tip ends of the second and fourth rotor-side claw-shaped magnetic poles 23 and 43 becomes large, and the magnetic flux density of these portions becomes low.

In other words, the magnetic flux density distribution of south poles largely varies in the axial direction, and an uneven magnetic flux density distribution in the axial direction is given to the second and fourth stator-side claw-shaped magnetic poles 74 and 94 of the single stator 2a.

On the other hand, since both the tip end surfaces 16 and 36 of the first and third rotor-side claw-shaped magnetic poles 13 and 33 abut against each other, magnetic resistance between the tip ends of the first and third rotor-side claw-shaped magnetic poles 13 and 33 becomes small, and variation in the magnetic flux density between the base ends and the tip ends of the first and third rotor-side claw-shaped magnetic poles 13 and 33 becomes small. As a result, variation in the magnetic flux density distribution of the north poles becomes small in the axial direction, and a uniform magnetic flux density distribution in the axial direction is given to the first and third stator-side claw-shaped magnetic poles 64 and 84 of the single stator 2a.

Similarly, since both the tip end surfaces 26 and 46 of the second and fourth rotor-side claw-shaped magnetic poles 23 and 43 abut against each other, magnetic resistance between the tip ends of the second and fourth rotor-side claw-shaped magnetic poles 23 and 43 becomes small, and variation in the magnetic flux density between the base ends and the tip ends of the second and fourth rotor-side claw-shaped magnetic poles 23 and 43 becomes small. As a result, variation in the magnetic flux density distribution of the south poles becomes small in the axial direction, and a uniform magnetic flux density distribution in the axial direction is given to the second and fourth stator-side claw-shaped magnetic poles 74 and 94 of the single stator 2a.

According to this, the rotors of the respective phases can individually give magnetic flux having a uniform magnetic flux density distribution in the axial direction to the opposed stators, and output can further be enhanced.

In the stators (single stators 2a) of the respective phases, the first to fourth four stator cores 60, 70, 80 and 90 are stacked on one another in the axial direction in this order such that the first to fourth annular windings 101 to 104 are respectively interposed therebetween.

The tip end surfaces 67 of the first stator-side claw-shaped magnetic poles 64 and the tip end surfaces 87 of the third stator-side claw-shaped magnetic poles 84 are made to abut against each other in the axial direction, and the tip end surfaces 77 of the second stator-side claw-shaped magnetic poles 74 and the tip end surfaces 97 of the fourth stator-side claw-shaped magnetic poles 94 are made to abut against each other in the axial direction.

As a result, variation in a magnetic flux density between the base ends and the tip ends of the first stator-side claw-shaped magnetic poles 64 (third stator-side claw-shaped magnetic poles 84) becomes small as compared with a case where the tip end surfaces 67 of the first stator-side claw-shaped magnetic poles 64 and the tip end surfaces 87 of the third stator-side claw-shaped magnetic poles 84 are separated from each other. Similarly, variation in a magnetic flux density between the base ends and the tip ends of the second stator-side claw-shaped magnetic poles 74 (fourth stator-side claw-shaped magnetic poles 94) becomes small as compared with a case where the tip end surfaces 77 of the second stator-side claw-shaped magnetic pole 74 and the tip end surfaces 97 of the fourth stator-side claw-shaped magnetic poles 94 are separated from each other.

That is, when both the tip end surfaces 67 and 87 of the first and third stator-side claw-shaped magnetic poles 64 and 84 are separated from each other and opened, the magnetic flux density of the base ends of the first and third stator-side claw-shaped magnetic poles 64 and 84 is high, and magnetic resistance of the opened portions between the tip ends of the first and third stator-side claw-shaped magnetic poles 64 and 84 becomes large, and the magnetic flux density of these portions becomes low.

In other words, the magnetic flux density distribution (strength distribution of rotating field in axial direction) in the axial direction largely varies, and an uneven magnetic flux density distribution in the axial direction is given to the first and third rotor-side claw-shaped magnetic poles 13 and 33 of the single rotor 1a.

Similarly, when both the tip end surfaces 77 and 97 of the second and fourth stator-side claw-shaped magnetic poles 74 and 94 are separated from each other and opened, the magnetic flux density of the base ends of the second and fourth stator-side claw-shaped magnetic poles 74 and 94 is high, and magnetic resistance of the opened portions between the tip ends of the second and fourth stator-side claw-shaped magnetic poles 74 and 94 becomes large, and the magnetic flux density of these portions becomes low.

In other words, the magnetic flux density distribution (strength distribution of rotating field in axial direction) in the axial direction largely varies in the axial direction, and an uneven magnetic flux density distribution in the axial direction is given to the second and fourth rotor-side claw-shaped magnetic poles 23 and 43 of the single rotor 1a.

On the other hand, since both the tip end surfaces 16 and 36 of the first and third stator-side claw-shaped magnetic poles 64 and 84 abut against each other, magnetic resistance between the tip ends of the first and third stator-side claw-shaped magnetic poles 64 and 84 becomes small, and variation in the magnetic flux density between the base ends and the tip ends of the first and third stator-side claw-shaped magnetic poles 64 and 84 becomes small. As a result, variation in the magnetic flux density distribution in the axial direction (strength distribution of rotating field in axial direction) becomes small, and a uniform magnetic flux density distribution in the axial direction is given to the first and third rotor-side claw-shaped magnetic poles 13 and 33 of the single rotor 1a.

Similarly, since both the tip end surfaces 77 and 97 of the second and fourth stator-side claw-shaped magnetic poles 74 and 94 abut against each other, magnetic resistance between the tip ends of the second and fourth stator-side claw-shaped magnetic poles 74 and 94 becomes small, and variation in the magnetic flux density between the base ends and the tip ends of the second and fourth stator-side claw-shaped magnetic poles 74 and 94 becomes small. As a result, variation in the magnetic flux density distribution in the axial direction (strength distribution of rotating field in axial direction) becomes small, and a uniform magnetic flux density distribution in the axial direction is given to the second and fourth rotor-side claw-shaped magnetic poles 23 and 43 of the single rotor 1a.

Further, a variation cycle of a magnetic flux density of the first and third stator-side claw-shaped magnetic poles 64 and 84 and a variation cycle of a magnetic flux density of the second and fourth stator-side claw-shaped magnetic poles 74 and 94 are deviated from each other by 180° in phase.

According to this, the stators of the respective phases can individually give magnetic flux having a uniform magnetic flux density distribution in the axial direction to the opposed rotors, and output can be increased.

The U-phase stator 2u, the V-phase stator 2v and the W-phase stator 2w of the three-phase stator 2 are displaced from one another in the clockwise direction by 5° in mechanical angle (60° in electrical angle in clockwise direction), whereas the U-phase rotor 1*u*, the V-phase rotor 1*v* and the W-phase rotor 1*w* of the three-phase rotor 1 are displaced from one another in the counter clockwise direction by 5° in mechanical angle (60° in electrical angle in counterclockwise direction). That is, between the U-phase rotor 1*u*, the V-phase rotor 1*v* and the W-phase rotor 1*w* which face the U-phase stator 2*u*, the V-phase stator 2*v* and the W-phase stator 2*w*, displacements in the circumferential direction incline in mutually opposite directions at the surfaces facing each other.

According to this, sets of the first and third rotor-side claw-shaped magnetic poles 13 and 33 in each phase and sets of the second and fourth rotor-side claw-shaped magnetic poles 23 and 43 in each phase can be made to appropriately follow the switching of magnetic flux of sets of the first and third stator-side claw-shaped magnetic poles 64 and 84 in each phase and sets of the second and fourth stator-side claw-shaped magnetic poles 74 and 94 in each phase due to AC currents Iu, Iv and Iw in each phase flowing through the first to fourth annular windings 101 to 104 in each phase. As a result, it is possible to realize excellent rotation of the three-phase rotor 1.

Next, advantages of the first embodiment will be described below.

(1) According to the first embodiment, the three-phase rotor 1 is formed into the three-part structure including the U-phase rotor 1*u*, the V-phase rotor 1*v* and the W-phase rotor 1*w* and correspondingly, the three-phase stator 2 is also formed into the three-part structure including the U-phase stator 2*u*, the V-phase stator 2*v* and the W-phase stator 2*w*. Three-phase AC power source is applied to the three-phase stator 2. In the stators and the rotors of the respective phases, the stators which face along the axial direction can individually receive magnetic fluxes of the first to fourth field magnets 51 to 54. Therefore, output of the brushless motor M can be increased.

Further, the displacement direction of the three-phase (three-part) rotors 1*u*, 1*v* and 1*w* in the circumferential direction and the displacement direction of the three-phase (three-part) stators 2*u*, 2*v* and 2*w* in the circumferential direction are opposite from each other. Therefore, it is possible to realize excellent rotation of the three-phase rotor 1.

(2) According to the first embodiment, the single rotor 1*a* is formed by stacking the first to fourth rotor cores 10, 20, 30 and 40 in the axial direction in this order such that the first to fourth field magnets 51 to 54 are respectively interposed therebetween. The tip end surfaces 16 of the first rotor-side claw-shaped magnetic poles 13 and the tip end surfaces 36 of the third rotor-side claw-shaped magnetic poles 33 are made to abut against each other in the axial direction, and the tip end surfaces 26 of the second rotor-side claw-shaped magnetic poles 23 and the tip end surfaces 46 of the fourth rotor-side claw-shaped magnetic poles 43 are made to abut against each other in the axial direction.

Therefore, the first and third rotor-side claw-shaped magnetic poles 13 and 33 of the single rotor 1*a* having the same poles can give magnetic fluxes having a magnetic flux density distribution which is uniform in the axial direction to the first and third stator-side claw-shaped magnetic poles 64 and 84 of the single stator 2*a*. Similarly, the second and fourth rotor-side claw-shaped magnetic poles 23 and 43 of the single rotor 1*a* having the same poles can give magnetic fluxes having a uniform magnetic flux density distribution in the axial direction to the second and fourth stator-side claw-shaped magnetic poles 74 and 94 of the single stator 2*a*.

According to this, the rotors of the respective phases can give magnetic fluxes of a magnetic flux density distribution which is uniform in the axial direction to the opposed stators, and output can be increased.

(3) According to the first embodiment, the single stator 2*a* is formed by stacking the first to fourth stator cores 60, 70, 80 and 90 in the axial direction in this order such that the first to fourth annular windings 101 to 104 are respectively interposed therebetween.

The tip end surfaces 67 of the first stator-side claw-shaped magnetic poles 64 and the tip end surfaces 87 of the third stator-side claw-shaped magnetic poles 84 are made to abut against each other in the axial direction, and the tip end surfaces 77 of the second stator-side claw-shaped magnetic poles 74 and the tip end surfaces 97 of the fourth stator-side claw-shaped magnetic poles 94 are made to abut against each other in the axial direction.

Therefore, the first and third stator-side claw-shaped magnetic poles 64 and 84 of the single stator 2*a* can give magnetic fluxes having a magnetic flux density distribution which is uniform in the axial direction to the first and third rotor-side claw-shaped magnetic poles 13 and 33 of the single rotor 1*a*. Similarly, the second and fourth stator-side claw-shaped magnetic poles 74 and 94 of the single stator 2*a* can give magnetic fluxes having a magnetic flux density distribution which is uniform in the axial direction to the second and fourth rotor-side claw-shaped magnetic poles 23 and 43 of the single rotor 1*a*.

As a result, the stators of the respective phases can give magnetic fluxes (rotating field) of a magnetic flux density distribution which is uniform in the axial direction to the opposed rotors, and output can further be increased.

(4) According to the first embodiment, the single rotor 1*a* includes the first to fourth rotor cores 10, 20, 30 and 40 and the first to fourth field magnets 51 to 54.

When the third and fourth rotor cores 30 and 40 are inverted in the axial direction with respect to the first and second rotor cores 10 and 20, shapes of the third and fourth rotor cores 30 and 40 become the same as those of the first and second rotor cores 10 and 20.

When the second and third field magnets 52 and 53 are inverted in the axial direction with respect to the first and fourth field magnets 51 and 54, the second and third field magnets 52 and 53 have the same magnetizing direction and the same features as those of the first and fourth field magnets 51 and 54.

Therefore, the single rotor 1*a* (three-phase rotor 1) can be formed by two types of constituent parts, management of parts becomes easy, and the assembling steps also becomes easy.

(5) According to the first embodiment, the single stator 2*a* includes the first to fourth stator cores 60, 70, 80 and 90 and the first to fourth annular windings 101 to 104.

When the third and fourth stator cores 80 and 90 are inverted in the axial direction with respect to the first and second stator cores 60 and 70, features of the third and fourth stator cores 80 and 90 become the same as those of the first and second stator cores 60 and 70.

When the second and third annular winding 102 and 103 are inverted in the axial direction with respect to the first and fourth annular windings 101 and 104, the second and third annular winding 102 and 103 have the same winding direction and the same features as those of the first and fourth annular windings 101 and 104.

Therefore, the single stator 2a (three-phase stator 2) can be formed by two types of constituent parts, management of parts becomes easy, and the assembling steps also becomes easy.

From these facts, the single motor Ma (brushless motor M) can be formed by four types of constituent parts, management of parts becomes easy, and the assembling steps also become easy.

Second Embodiment

A second embodiment of the motor will be described in accordance with FIGS. 15 to 21.

The second embodiment is characterized in that tip end surfaces 16 of first rotor-side claw-shaped magnetic poles 13 and tip end surfaces 36 of third rotor-side claw-shaped magnetic poles 33 are not made to abut against each other but are closely opposed to each other, and tip end surfaces 26 of second rotor-side claw-shaped magnetic poles 23 and tip end surfaces 46 of fourth rotor-side claw-shaped magnetic poles 43 are not made to abut against each other but are closely opposed to each other.

The second embodiment is also characterized in that tip end surfaces 67 of first stator-side claw-shaped magnetic poles 64 and tip end surfaces 87 of third stator-side claw-shaped magnetic poles 84 are not made to abut against each other but are closely opposed to each other, and tip end surfaces 77 of second stator-side claw-shaped magnetic poles 74 and tip end surfaces 97 of fourth stator-side claw-shaped magnetic pole 94 are not made to abut against each other but are closely opposed to each other.

Therefore, in the second embodiment, characteristic portions will be described in detail, the same reference numerals as those of the first embodiment are allocated to members of common portions, and detailed description thereof will be omitted for the sake of convenience of description.

Figure 15:
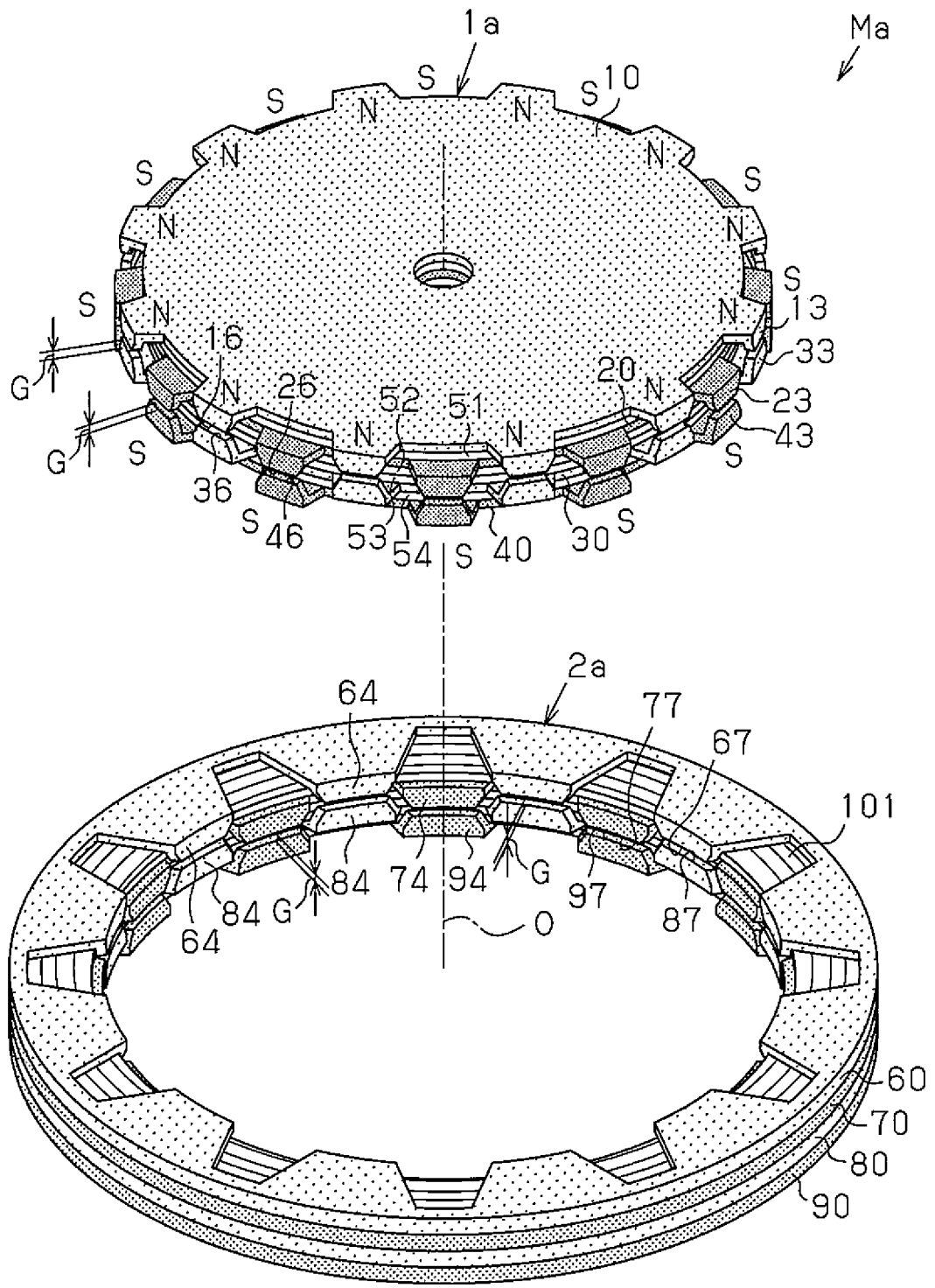
FIG. 15 is an exploded perspective view of a single motor configuring a brushless motor according to a second embodiment of the present invention.

As shown in FIG. 15, each of single motors Ma of respective phases configuring a three-phase brushless motor M includes a single rotor 1a and a single stator 2a.

(Single Rotor 1a)

As shown in FIG. 16A, thicknesses of the first to fourth field magnets 51 to 54 are the same as those of the first embodiment. On the other hand, lengths of first to fourth rotor-side claw-shaped magnetic poles 13, 23, 33 and 43 in the axial direction are less than three times of thicknesses (lengths in axial direction of rotor) of first to fourth rotor core bases 11, 21, 31 and 41.

Therefore, as shown in FIGS. 15 and 16A, the tip end surfaces 16 of the first rotor-side claw-shaped magnetic poles 13 and the tip end surfaces 36 of the third rotor-side claw-shaped magnetic poles 33 are closely opposed to each other in the axial direction, i.e., opposed to each other in the axial direction such that gaps G of a certain distance are formed therebetween. Similarly, the tip end surfaces 26 of the second rotor-side claw-shaped magnetic poles 23 and the tip end surfaces 46 of the fourth rotor-side claw-shaped magnetic poles 43 are opposed to each other in the axial direction, i.e., opposed to each other in the axial direction such that gaps G of a certain distance are formed therebetween.

That is, the single rotor 1a of the second embodiment is of a Lundell type structure having the gaps G between the tip end surfaces 16 and 36 of the first and third rotor-side claw-shaped magnetic poles 13 and 33, and between the tip end surfaces 26 and 46 of the second and fourth rotor-side claw-shaped magnetic poles 23 and 43.

Figure 17:
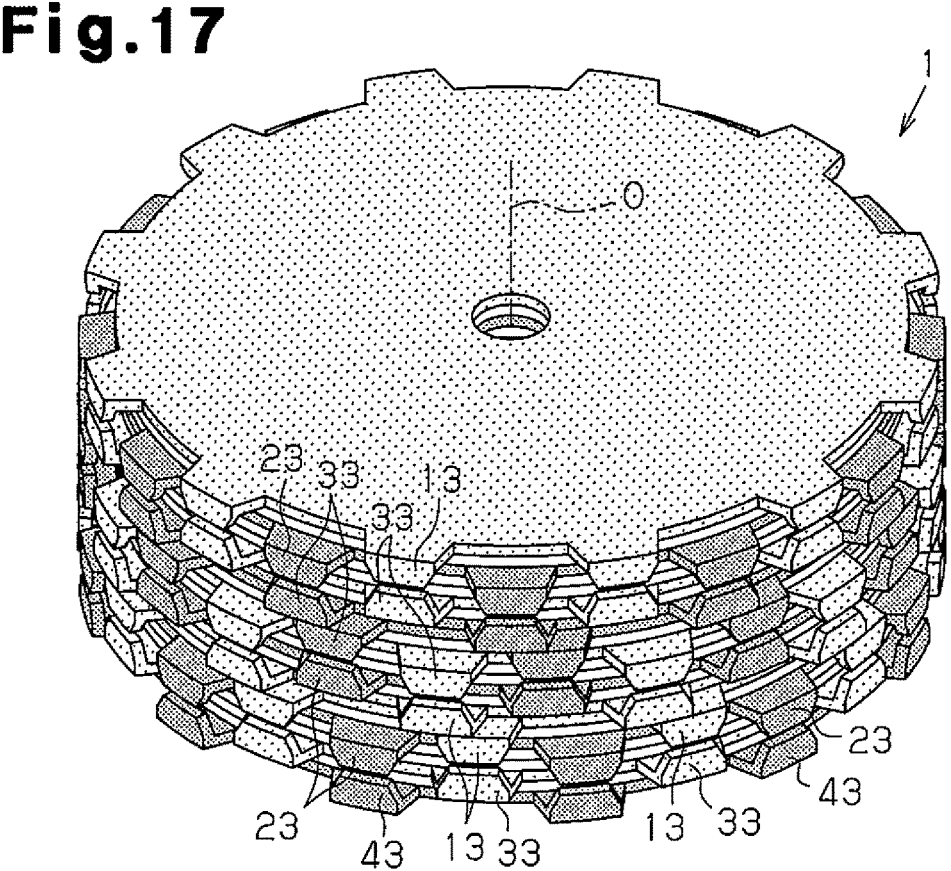
FIG. 17 is a perspective view of an entire three-phase rotor.
Figure 18:
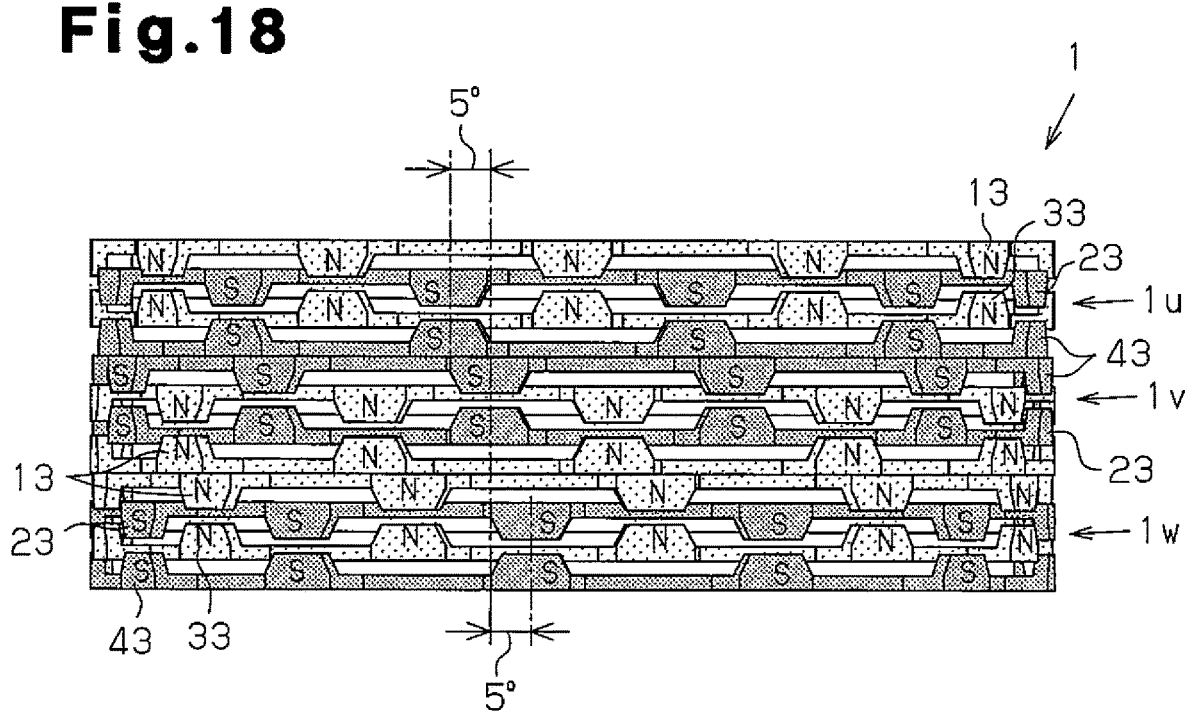
FIG. 18 is a front view of the three-phase rotor shown in FIG. 17 as viewed from its radial direction.

As shown in FIGS. 17 and 18, the single rotors 1a are used as a U-phase rotor 1u, a V-phase rotor 1v and a W-phase rotor 1w and these rotors are stacked on one another in the axial direction to form the rotor 1 of the three-phase brushless motor M as in the first embodiment.

At this time, as in the first embodiment, the U-phase rotor 1u and the W-phase rotor 1w are placed such that placement directions of first to fourth rotor cores 10, 20, 30 and 40 (first to fourth field magnets 51 to 54) become the same. On the other hand, the V-phase rotor 1v which is stacked between the U-phase rotor 1u and the W-phase rotor 1w is placed such that placement directions of the first to fourth rotor cores 10, 20, 30 and 40 (first to fourth field magnets 51 to 54) of the V-phase rotor 1v become opposite from the placement directions of the first to fourth rotor cores 10, 20, 30 and 40 (first to fourth field magnets 51 to 54) of the U-phase rotor 1u and the W-phase rotor 1w.

Further, as shown in FIG. 18, the three-phase rotor 1 including the U-phase rotor 1u, the V-phase rotor 1v and the W-phase rotor 1w is configured by stacking the U-phase rotor 1u, the V-phase rotor 1v and the W-phase rotor 1w on one another such that the rotors 1u, 1v and 1w are displaced from one another by 5° in mechanical angle (60° in electrical angle) as in the first embodiment.

(Single Stator 2a)

As shown in FIG. 16B, coil lengths (lengths in axial direction) of first to fourth annular windings 101 to 104 are the same as those of the first embodiment.

On the other hand, lengths of first to fourth stator-side claw-shaped magnetic poles 64, 74, 84 and 94 in the axial direction are less than three times of thicknesses (lengths in axial direction) of first to fourth stator core bases 61, 71, 81 and 91.

Therefore, as shown in FIGS. 15 and 16B, the tip end surfaces 67 of the first stator-side claw-shaped magnetic poles 64 and the tip end surfaces 87 of the third stator-side claw-shaped magnetic poles 84 are closely opposed to each other in the axial direction, i.e., opposed to each other in the axial direction such that gaps G of a certain distance are formed therebetween. Similarly, the tip end surfaces 77 of the second stator-side claw-shaped magnetic poles 74 and the tip end surfaces 97 of the fourth stator-side claw-shaped magnetic poles 94 are closely opposed to each other in the axial direction, i.e., opposed to each other in the axial direction such that gaps G of a certain distance are formed therebetween.

That is, the single rotor 2a of the second embodiment is of a Lundell type structure having the gaps G between the tip end surfaces 67 and 87 of the first and third stator-side claw-shaped magnetic poles 64 and 84, and between the tip end surfaces 77 and 97 of the second and fourth stator-side claw-shaped magnetic poles 74 and 94.

Figure 19:
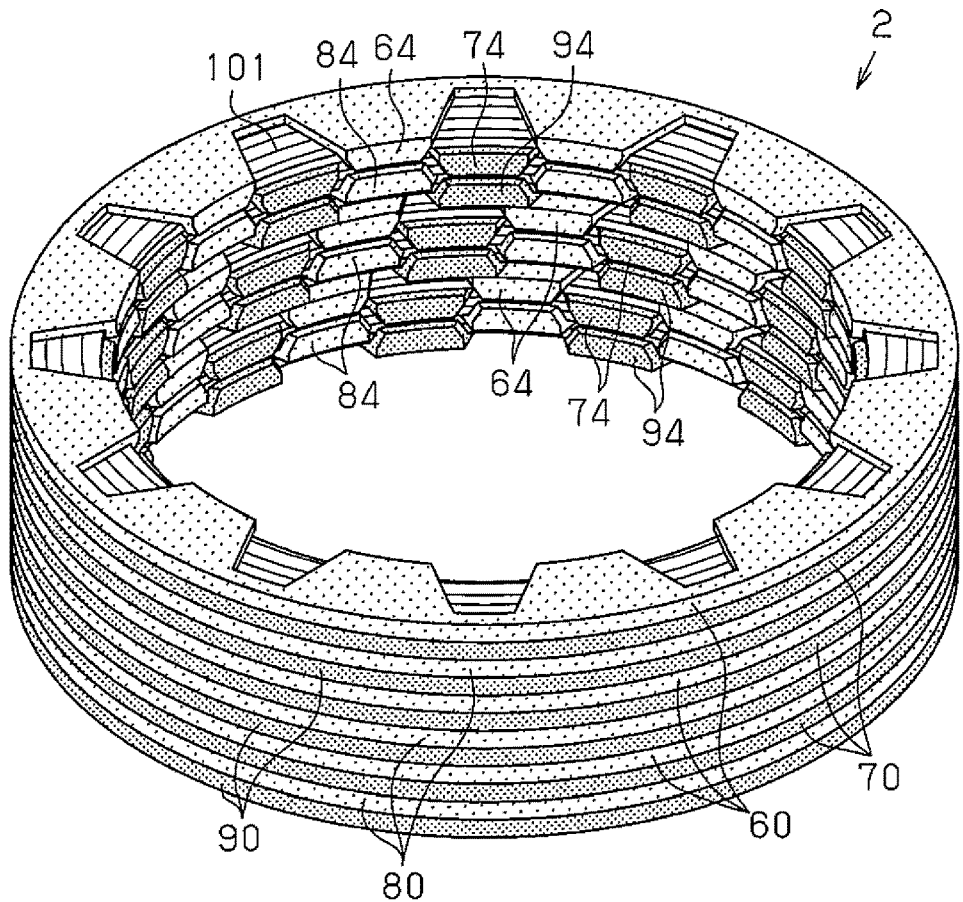
FIG. 19 is a perspective view of an entire three-phase stator.
Figure 20:
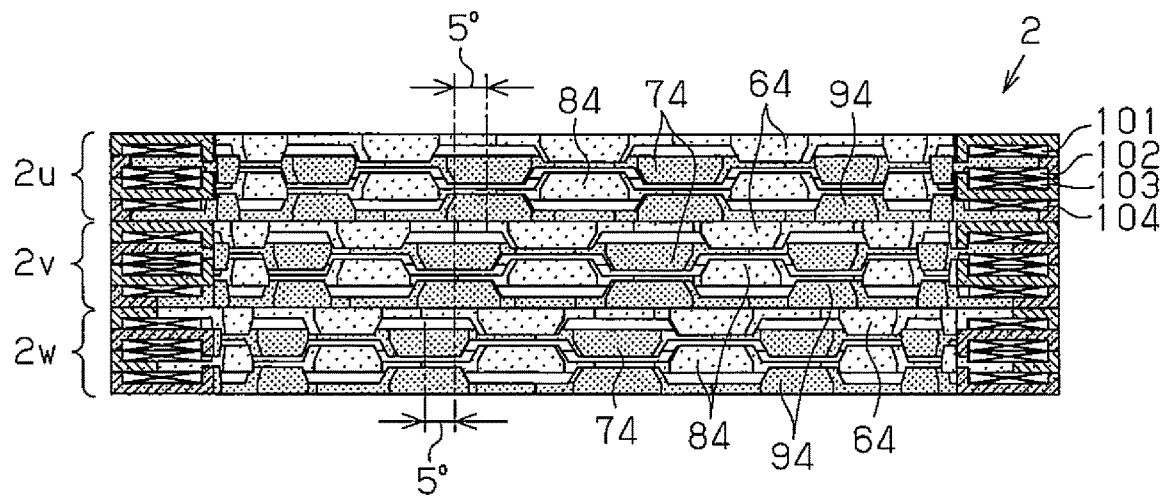
FIG. 20 is a sectional view of the three-phase stator.

As shown in FIGS. 19 and 20, the single stators 2a are used as a U-phase stator 2u, a V-phase stator 2v and a W-phase stator 2w and the stators 2u, 2v and 2w are stacked on one another in the axial direction to form the stator 2 of the three-phase brushless motor M as in the first embodiment.

At this time, as in the first embodiment, the three-phase stator 2 including the U-phase stator 2u, the V-phase stator 2v and the W-phase stator 2w is configured by stacking the U-phase stator 2u, the V-phase stator 2v and the W-phase stator 2w on one another such that these stators 2u, 2v and 2w are displaced from one another by 5° in mechanical angle (60° in electrical angle).

U-phase AC current Iu of a three-phase AC power source flows through the first to fourth annular windings 101 to 104 of the U-phase stator 2u. V-phase AC current Iv of the three-phase AC power source flows through the first to fourth annular windings 101 to 104 of the V-phase stator 2v. Further, W-phase AC current Iw of the three-phase AC power source flows through the first to fourth annular windings 101 to 104 of the W-phase stator 2w. Next, operations of the brushless motor M of the second embodiment having the above-described configuration will be described.

Now, three-phase AC power source is applied to the three-phase stator 2. That is, U-phase AC current Iu flows through the first to fourth annular windings 101 to 104 of the U-phase stator 2u, V-phase AC current Iv flows through the first to fourth annular windings 101 to 104 of the V-phase stator 2v, and W-phase AC current Iw flows through the first to fourth annular windings 101 to 104 of the W-phase stator 2w. According to this, rotating field is generated in the three-phase stator 2, and the three-phase rotor 1 is rotated and driven.

At this time, the three-phase stator 2 is formed into the three-part structure having the U-phase stator 2u, the V-phase stator 2v and the W-phase stator 2w in accordance with the three-phase AC power source. In accordance with this, the three-phase rotor 1 is also formed into the three-part structure having the U-phase rotor 1u, the V-phase rotor 1v and the W-phase rotor 1w. According to this, in the stators and the rotors of the respective phases, the stators which are opposed to each other along the axial direction can individually receive magnetic fluxes of the first to fourth field magnets 51 to 54, and output can be increased.

In the rotors (single rotors 1a) of the respective phases, the first to fourth four rotor cores 10, 20, 30 and 40 are stacked on one another in the axial direction in this order such that the first to fourth field magnets 51 to 54 are respectively interposed therebetween. By the first to fourth field magnets 51 to 54, the first rotor-side claw-shaped magnetic poles 13 of the first rotor core 10 and the third rotor-side claw-shaped magnetic poles 33 of the third rotor core 30 are made as north poles, and the second rotor-side claw-shaped magnetic poles 23 of the second rotor core 20 and the fourth rotor-side claw-shaped magnetic poles 43 of the fourth rotor core 40 are made as south poles.

At this time, a magnetic flux density of the second rotor-side claw-shaped magnetic poles 23 is determined based on three field magnets including the first, second and third field magnets 51, 52 and 53. A magnetic flux density of the third rotor-side claw-shaped magnetic poles 33 is determined based on the three field magnets including the second, third and fourth field magnets 52, 53 and 54.

On the other hand, a magnetic flux density of the first rotor-side claw-shaped magnetic poles 13 is determined based on the one first field magnet 51. Similarly, a magnetic flux density of the fourth rotor-side claw-shaped magnetic poles 43 is determined based on the one fourth field magnet 54.

As a result, a difference in generated magnetic fluxes of the mutually opposed first rotor-side claw-shaped magnetic poles 13 and third rotor-side claw-shaped magnetic poles 33 becomes large. Therefore, when the tip end surfaces 16 and 36 are in abutment against each other, magnetic fluxes reversely flow between the first rotor-side claw-shaped magnetic poles 13 and the third rotor-side claw-shaped magnetic poles 33. According to this, a magnetic flux density of north poles becomes small as a whole, and north poles of a small magnetic flux density are given to the first and third stator-side claw-shaped magnetic poles 64 and 84 of the opposed stators 2a.

Similarly, a difference in generated magnetic fluxes of the second rotor-side claw-shaped magnetic poles 23 and fourth rotor-side claw-shaped magnetic poles 43 also becomes large. Therefore, when the tip end surfaces 26 and 46 are in abutment against each other, magnetic fluxes reversely flow between the second rotor-side claw-shaped magnetic poles 23 and the fourth rotor-side claw-shaped magnetic poles 43. According to this, a magnetic flux density of south poles becomes small as a whole, and south poles of a small magnetic flux density are given to the second and fourth stator-side claw-shaped magnetic poles 74 and 94 of the opposed stators 2a.

On the other hand, the tip end surfaces 16 and 36 of the first and third rotor-side claw-shaped magnetic poles 13 and 33 are closely opposed to each other in the axial direction, and magnetic resistance between the tip end surfaces 16 and 36 is increased. As a result, reverse flow of magnetic fluxes between the first rotor-side claw-shaped magnetic poles 13 and the third rotor-side claw-shaped magnetic poles 33 based on a difference in generated magnetic fluxes is suppressed, and a magnetic flux density of north poles is increased as a whole.

Similarly, the tip end surfaces 26 and 46 of the second and fourth rotor-side claw-shaped magnetic poles 23 and 43 are closely opposed to each other in the axial direction, magnetic resistance between the tip end surfaces 26 and 46 is increased, reverse flow of magnetic fluxes between the second rotor-side claw-shaped magnetic poles 23 and the fourth rotor-side claw-shaped magnetic poles 43 based on a difference in generated magnetic fluxes is suppressed, and a magnetic flux density of south poles is increased as a whole.

According to this, the rotors of the respective phases can individually give magnetic poles having a large magnetic flux density to the opposed stators, and output can further be increased.

In the stators (single stators 2a) of the respective phases, the first to fourth four stator cores 60, 70, 80 and 90 are stacked on one another in the axial direction in this order such that the first to fourth annular windings 101 to 104 are respectively interposed therebetween.

At this time, a magnetic flux density of rotating field of the second stator-side claw-shaped magnetic poles 74 is determined based on three annular windings, i.e., the first, second and third annular windings 101, 102 and 103. A magnetic flux density of rotating field of the third stator-side claw-shaped magnetic poles 84 is determined based on three annular windings, i.e., the second, third and fourth annular windings 102, 103 and 104.

On the other hand, a magnetic flux density of rotating field of the first stator-side claw-shaped magnetic poles 64 is determined based on the one first annular winding 101. Similarly, a magnetic flux density of rotating field of the fourth stator-side claw-shaped magnetic poles 94 is determined based on the one first annular winding 104.

As a result, a difference in generated magnetic fluxes of rotating field between the mutually opposed first stator-side claw-shaped magnetic poles 64 and third stator-side claw-shaped magnetic poles 84 becomes large. Therefore, when the tip end surfaces 67 and 87 are in abutment against each other, magnetic fluxes reversely flow between the first stator-side claw-shaped magnetic poles 64 and the third stator-side claw-shaped magnetic poles 84. According to this, a magnetic flux density of rotating field becomes small as a whole, and rotating field which becomes small is given to the first and third rotor-side claw-shaped magnetic poles 13 and 33 of the opposed rotors 1a.

Similarly, a difference in generated magnetic fluxes of rotating field becomes large also in the second stator-side claw-shaped magnetic poles 74 and the fourth stator-side claw-shaped magnetic poles 94. Therefore, when the tip end surfaces 77 and 97 are in abutment against each other, magnetic fluxes reversely flow between the first stator-side claw-shaped magnetic poles 64 and the third stator-side claw-shaped magnetic poles 84. According to this, a magnetic flux density of rotating field becomes small as a whole, and rotating field which becomes small is given to the second and fourth rotor-side claw-shaped magnetic poles 23 and 43 of the opposed rotors 1a.

On the other hand, the tip end surfaces 67 and 87 of the first and third stator-side claw-shaped magnetic poles 64 and 84 are closely opposed to and separated from each other in the axial direction, and magnetic resistance between the tip end surfaces 67 and 87 is increased. As a result, reverse flow of magnetic fluxes between the first stator-side claw-shaped magnetic pole 64 and the third stator-side claw-shaped magnetic pole 84 based on a difference in generated magnetic fluxes is suppressed, and a magnetic flux density of rotating field is increased as a whole.

Similarly, the tip end surfaces 77 and 97 of the second and fourth stator-side claw-shaped magnetic poles 74 and 94 are closely opposed to each other in the axial direction, magnetic resistance between the tip end surfaces 77 and 97 is increased, reverse flow of magnetic fluxes between the second stator-side claw-shaped magnetic pole 74 and the fourth stator-side claw-shaped magnetic pole 94 based on a difference in generated magnetic fluxes is suppressed, and a magnetic flux density of rotating field is increased as a whole.

According to this, the stators of the respective phases can individually give rotating field having a large magnetic flux density to the opposed rotors, and output can further be increased.

Figure 21:
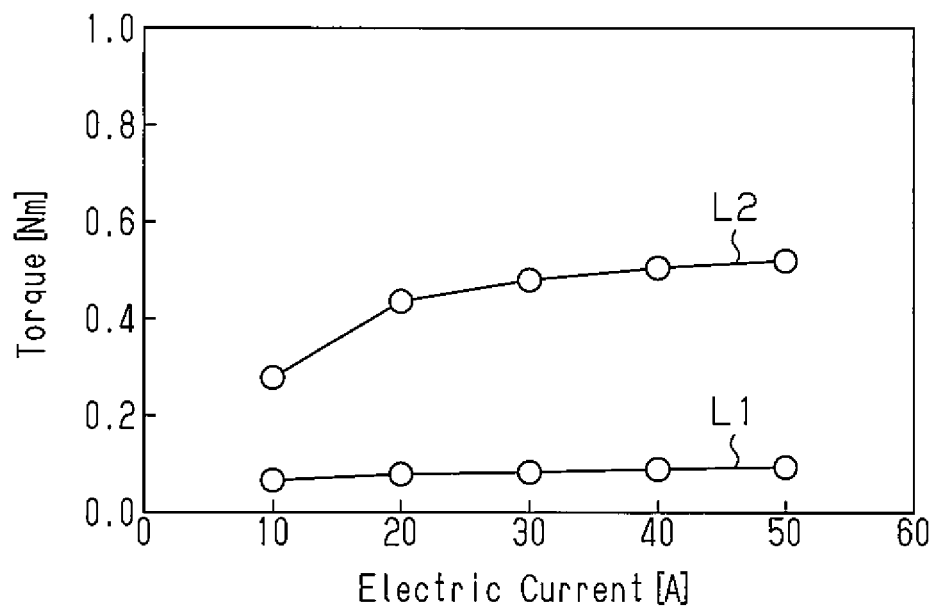
FIG. 21 is a diagram of torque characteristics showing comparison between current and torque.

FIG. 21 shows characteristic curves for comparison between torque characteristics of brushless motors M of the first embodiment and the second embodiment.

A characteristic curve L1 shows torque characteristics of the brushless motor M of the first embodiment, and a characteristic curve L2 shows torque characteristics of the brushless motor M of the second embodiment. Experiment conditions of the two embodiments are the same except a condition as to whether opposed tip end surfaces of the rotor and opposed tip end surfaces of the stator abut against or separate from each other.

From a result of this experiment, it can be understood that a brushless motor M of higher torque is obtained based on the above-described reasons.

As described above in detail, the second embodiment has the following effects in addition to the advantages of the first embodiment.

(6) According to the second embodiment, the tip end surfaces 16 and 36 of the first and third rotor-side claw-shaped magnetic poles 13 and 33 are closely opposed to each other in the axial direction, reverse flow of magnetic fluxes between the first rotor-side claw-shaped magnetic pole 13 and the third rotor-side claw-shaped magnetic pole 33 based on a difference in generated magnetic fluxes is suppressed, and a magnetic flux density of north poles is increased as a whole.

Similarly, the tip end surfaces 26 and 46 of the second and fourth rotor-side claw-shaped magnetic poles 23 and 43 are closely opposed to each other in the axial direction, reverse flow of magnetic fluxes between the second rotor-side claw-shaped magnetic pole 23 and the fourth rotor-side claw-shaped magnetic pole 43 based on a difference in generated magnetic fluxes is suppressed, and a magnetic flux density of south poles is increased as a whole.

According to this, the rotors of the respective phases can individually give magnetic poles having a large magnetic flux density to the opposed stators, and output can further be increased.

(7) According to the second embodiment, the tip end surfaces 67 and 87 of the first and third stator-side claw-shaped magnetic poles 64 and 84 are closely opposed to each other in the axial direction, reverse flow of magnetic fluxes between the first stator-side claw-shaped magnetic pole 64 and the third stator-side claw-shaped magnetic pole 84 based on a difference in generated magnetic fluxes is suppressed, and a magnetic flux density of rotating field is increased as a whole.

Similarly, the tip end surfaces 77 and 97 of the second and fourth stator-side claw-shaped magnetic poles 74 and 94 are closely opposed to each other in the axial direction, reverse flow of magnetic fluxes between the second stator-side claw-shaped magnetic pole 74 and the fourth stator-side claw-shaped magnetic pole 94 based on a difference in generated magnetic fluxes is suppressed, and a magnetic flux density of rotating field is increased as a whole.

According to this, the stators of the respective phases can individually give rotating field having a large magnetic flux density to the opposed rotors, and output can further be increased.

(8) According to the second embodiment, since the tip end surfaces 16 and 36 of the first and third rotor-side claw-shaped magnetic poles 13 and 33 are closely opposed to each other in the axial direction, variation in a magnetic flux density distribution can be reduced in the axial direction.

Similarly, since the tip end surfaces 26 and 46 of the second and fourth rotor-side claw-shaped magnetic poles 23 and 43 are closely opposed to each other in the axial direction, variation in a magnetic flux density distribution can be reduced in the axial direction.

According to this, the rotors of the respective phases can individually give magnetic fluxes of a magnetic flux density distribution having small axial variation to the opposed stators, and output can further be increased.

(9) According to the second embodiment, since the tip end surfaces 67 and 87 of the first and third stator-side claw-shaped magnetic poles 64 and 84 are closely opposed to each other in the axial direction, variation in a magnetic flux density distribution can be reduced in the axial direction.

Similarly, since the tip end surfaces 77 and 97 of the second and fourth stator-side claw-shaped magnetic poles 74 and 94 are closely opposed to each other in the axial direction, variation in a magnetic flux density distribution can be reduced in the axial direction.

As a result, the stators of the respective phases can individually give magnetic fluxes (rotating field) of a magnetic flux density distribution having small axial variation to the opposed rotors, and output can further be increased.

Third Embodiment

A third embodiment of the motor will be described in accordance with FIGS. 22 to 28.

The third embodiment is different from the first embodiment, and is characterized in that one field magnet is placed between a second rotor core 20 and a third rotor core 30, and one annular winding is placed between a second stator core 70 and a third stator core 80.

Therefore, in the third embodiment, characteristic portions will be described in detail, the same reference numerals as those of the first embodiment are allocated to members of common portions, and detailed description thereof will be omitted for the sake of convenience of description.

Figure 22:
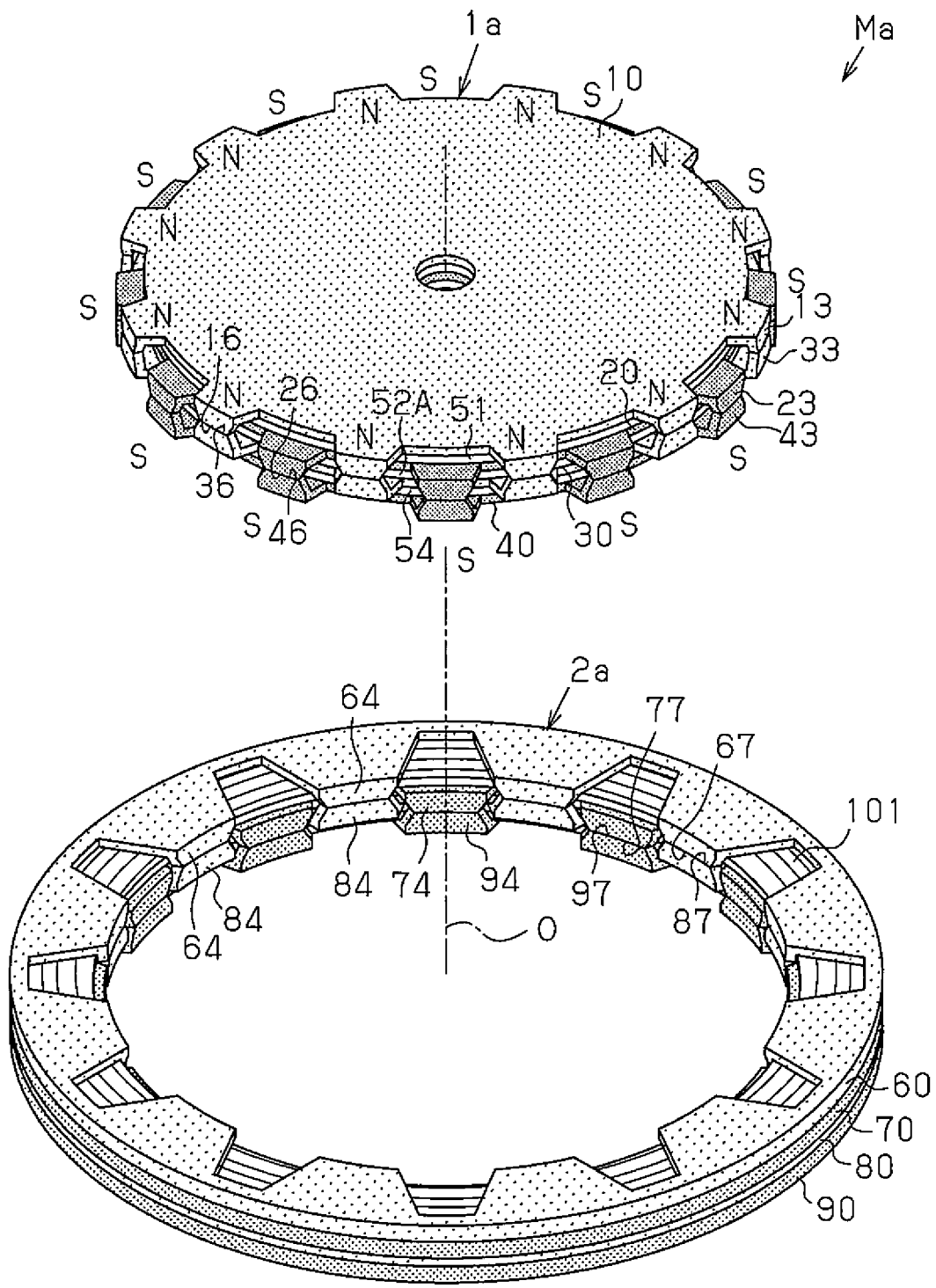
FIG. 22 is an exploded perspective view of a single motor configuring a brushless motor according to a third embodiment of the present invention.

As shown in FIG. 22, each of single motors Ma of respective phases configuring a three-phase brushless motor M includes a single rotor 1a and a single stator 2a.

(Single Rotor 1a)

As shown in FIG. 23A, one field magnet (central field magnet 52A, hereinafter) is placed between the second rotor core 20 (second rotor core base 21) and the third rotor core 30 (third rotor core base 31). The central field magnet 52A has the same shape and the same function and is made of the same material as those of the first field magnet 51 and the fourth field magnet 54.

That is, a thickness (length in axial direction of the rotor) of the central field magnet 52A is the same as those of the first field magnet 51 and the fourth field magnet 54. A diameter of the central field magnet 52A is the same as those of the first field magnet 51 and the fourth field magnet 54. Further, strength of a magnetic force of the central field magnet 52A is the same as those of the first field magnet 51 and the fourth field magnet 54.

Therefore, since the thickness of the central field magnet 52A is the same as those of the first and fourth field magnets 51 and 54, a distance between the second and third rotor core bases 21 and 31 is the same as a distance between first and second rotor core bases 11 and 21 and a distance between third and fourth rotor core bases 31 and 41.

The central field magnet 52A is magnetized in the axial direction such that a portion thereof closer to the second rotor core 20 becomes south pole, and a portion thereof closer to the third rotor core 30 becomes north pole. Therefore, by the central field magnet 52A, second rotor-side claw-shaped magnetic poles 23 of the second rotor core 20 function as south poles (second magnetic poles), and third rotor-side claw-shaped magnetic poles 33 of the third rotor core 30 function as north poles (first magnetic poles).

Since the central field magnet 52A is placed between the second rotor core base 21 and the third rotor core base 31, lengths of first to fourth rotor-side claw-shaped magnetic poles 13, 23, 33 and 43 in the axial direction are made short so that tip end surfaces 16 and 36 and tip end surfaces 26 and 46 abut against each other.

More specifically, a length of each of the first rotor-side claw-shaped magnetic poles 13 in the axial direction (length between the tip end surface 16 and a surface of first rotor core base 11 opposite from a surface thereof which faces the second rotor core 20) is 2.5 times of a thickness (length in axial direction) of the first rotor core base 11.

A length of each of the second rotor-side claw-shaped magnetic poles 23 in the axial direction (length between tip end surface 26 and surface of second rotor core base 21 opposite from surface thereof which is opposed to first rotor core 10) is 2.5 times of a thickness (length in axial direction) of the second rotor core base 21.

Further, a length of each of the third rotor-side claw-shaped magnetic poles 33 in the axial direction (length between tip end surface 36 and surface of third rotor core base 31 opposite from surface thereof which is opposed to fourth rotor core 40) is 2.5 times of a thickness (length in axial direction) of the third rotor core base 31.

Further, a length of each of the fourth rotor-side claw-shaped magnetic poles 43 in the axial direction (length between tip end surface 46 and surface of fourth rotor core base 41 opposite from surface thereof which is opposed to third rotor core 30) is 2.5 times of a thickness (length in axial direction) of the fourth rotor core base 41.

That is, in the single rotor 1a of the third embodiment, thicknesses of the first field magnet 51, the central field magnet 52A and the fourth field magnet 54 are the same. In other words, a distance between the first rotor core base 11 and the second rotor core base 21, a distance between the second rotor core base 21 and the third rotor core base 31, and a distance between the third rotor core base 31 and the fourth rotor core base 41 are the same.

Therefore, as shown in FIG. 23A, the single rotor 1a of the third embodiment is of a Lundell type structure in which the tip end surfaces 16 and 36 of the first and third rotor-side claw-shaped magnetic poles 13 and 33 whose axial lengths are shortened abut against each other, and the tip end surfaces 26 and 46 of the second and fourth rotor-side claw-shaped magnetic poles 23 and 43 whose axial lengths are shortened abut against each other.

Figure 24:
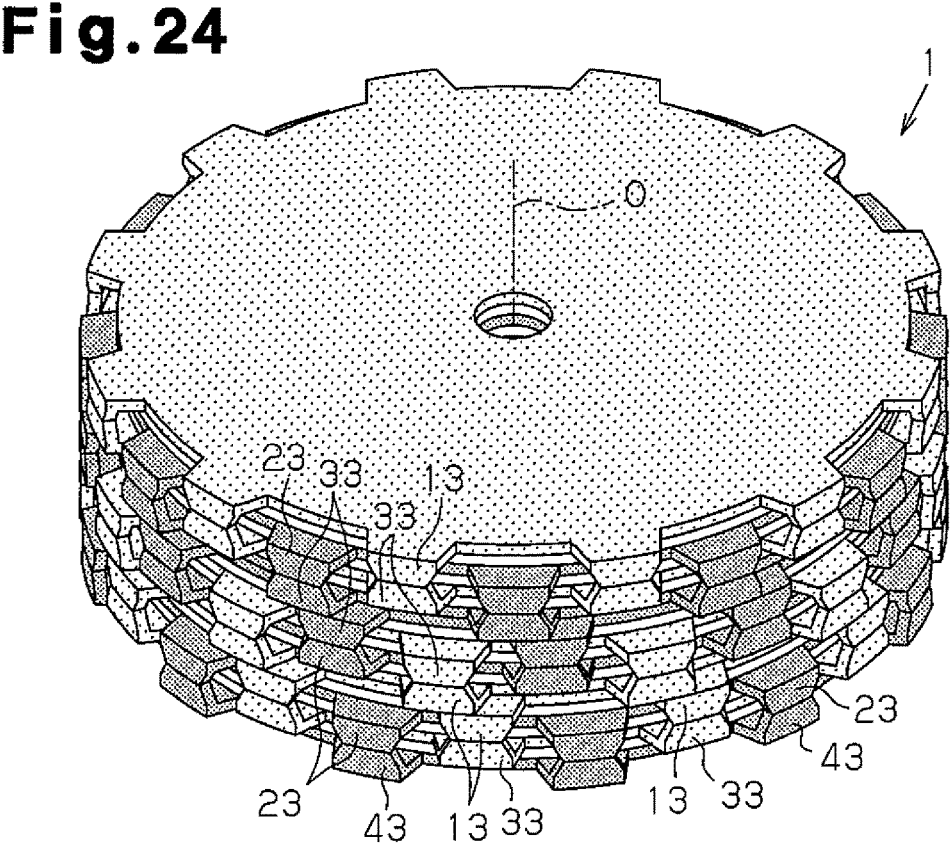
FIG. 24 is a perspective view of an entire three-phase rotor.
Figure 25:
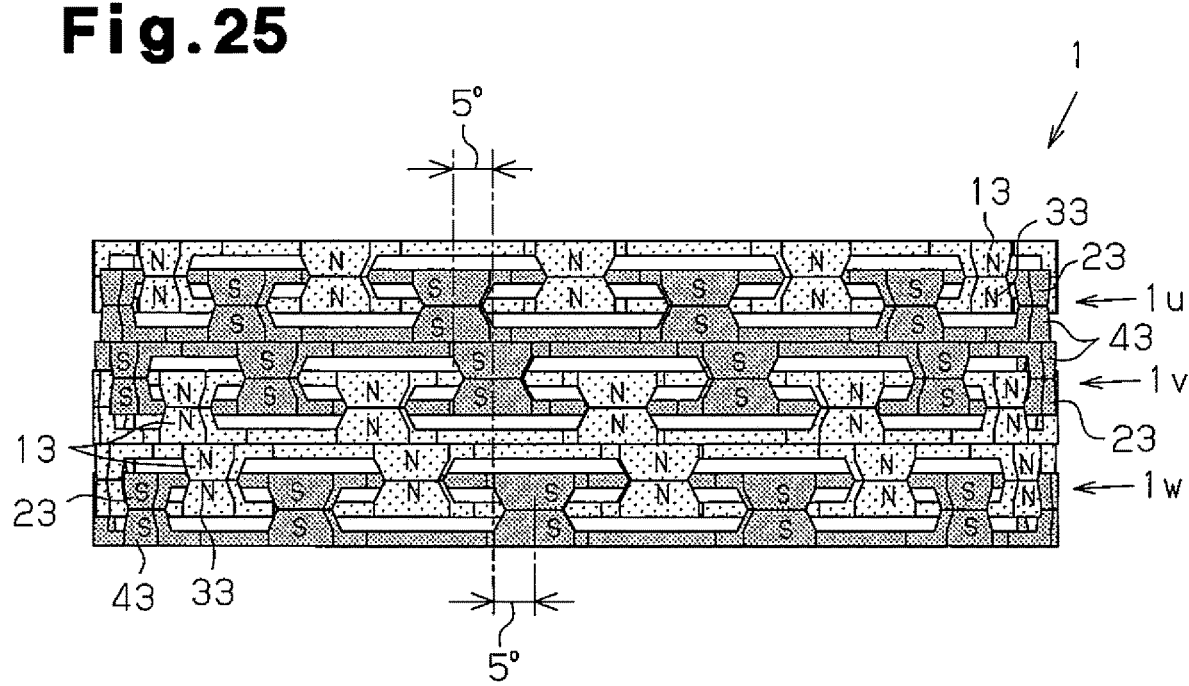
FIG. 25 is a front view of the three-phase rotor shown in FIG. 24 as viewed from its radial direction.

As shown in FIGS. 24 and 25, the single rotors 1a are used as a U-phase rotor 1u, a V-phase rotor 1v and a W-phase rotor 1w and these rotors 1u, 1v and 1w are stacked on one another in the axial direction to form the rotor 1 of the three-phase brushless motor M as in the first embodiment.

At this time, like the first embodiment, the U-phase rotor 1u and the W-phase rotor 1w are placed such that placement directions of the first to fourth rotor cores 10, 20, 30 and 40 become the same. On the other hand, the V-phase rotor 1v stacked between the U-phase rotor 1u and the W-phase rotor 1w is placed such that placement directions of the first to fourth rotor cores 10, 20, 30 and 40 of the V-phase rotor 1v become opposite from the placement directions of the first to fourth rotor cores 10, 20, 30 and 40 of the U-phase rotor 1u and the W-phase rotor 1w.

Further, as shown in FIG. 25, the three-phase rotor 1 including the U-phase rotor 1u, the V-phase rotor 1v and the W-phase rotor 1w of is configured by stacking the U-phase rotor 1u, the V-phase rotor 1v and the W-phase rotor 1w on one another such that these rotors 1u, 1v and 1w are displaced from one another by 5° in mechanical angle (60° in electrical angle) as in the first embodiment.

(Single Stator 2a)

As shown in FIG. 23B, one annular winding (central annular winding 102A, hereinafter) is placed between the second stator core 70 (second stator core base 71) and the third stator core 80 (third stator core base 81).

The central annular winding 102A is made of the same material and has the same shape as those of the first annular winding 101 placed between the first stator core base 61 and the second stator core base 71 and the fourth annular winding 104 placed between the third stator core base 81 and the fourth stator core base 91.

That is, a coil length (length in axial direction) of the central annular winding 102A is the same as those of the first annular winding 101 and the fourth annular winding 104. Further, a coil diameter of the central annular winding 102A is the same as those of the first annular winding 101 and the fourth annular winding 104. Further, the winding number (number of windings, or winding times) of the central annular winding 102A is the same as those of the first annular winding 101 and the fourth annular winding 104.

Therefore, since the coil length of the central annular winding 102A is the same as those of the first and fourth annular windings 101 and 104, a distance between the second and third stator core bases 71 and 81 is the same as a distance between the first and second stator core bases 61 and 71 and a distance between the third and fourth stator core bases 81 and 91.

That is, a second cylindrical wall 72 of the second stator core 70 extends toward the third stator core 80 from a surface of the second stator core base 71 which is opposed to the third stator core 80 along the axial direction by a half distance of a thickness of the second stator core base 71. Similarly, a third cylindrical wall 82 of the third stator core 80 extends toward the second stator core 70 from a surface of the third stator core base 81 which is opposed to the second stator core 70 along the axial direction by a half distance of a thickness of the third stator core base 81.

According to this, if an annular tip end surface 73 of the second cylindrical wall 72 and an annular tip end surface 83 of the third cylindrical wall 82 abut against each other, a distance between the second stator core base 71 and the third stator core base 81 becomes the same as a distance between the first and second stator core bases 61 and 71 and a distance between the third and fourth stator core bases 81 and 91.

Since the central annular winding 102A is placed between the second and third stator core bases 71 and 81, lengths of the first to fourth stator-side claw-shaped magnetic poles 64, 74, 84 and 94 in the axial direction are formed short so that the tip end surfaces 67 and 87 abut against each other and the tip end surfaces 77 and 97 abut against each other.

More specifically, a length of each of the first stator-side claw-shaped magnetic poles 64 in the axial direction (length between tip end surface 67 and surface of first stator core base 61 opposite from surface thereof which is opposed to second stator core 70) is 2.5 times of a thickness (length in axial direction) of the first stator core base 61.

A length of each of the second stator-side claw-shaped magnetic poles 74 in the axial direction (length between tip end surface 77 and surface of second rotor core base 71 opposite from surface thereof which is opposed to first stator core 60) is 2.5 times of a thickness (length in axial direction) of the second stator core base 71.

Further, a length of each of the third stator-side claw-shaped magnetic poles 84 in the axial direction (length between tip end surface 87 and surface of third stator core base 81 opposite from surface thereof which is opposed to fourth stator core 90) is 2.5 times of a thickness (length in axial direction) of the third stator core base 81.

Further, a length of each of the fourth stator-side claw-shaped magnetic poles 94 in the axial direction (length between tip end surface 97 and surface of fourth stator core base 91 opposite from surface thereof which is opposed to third stator core 80) is 2.5 times of a thickness (length in axial direction) of the fourth stator core base 91.

That is, in the single stator 2a of the third embodiment, coil lengths of the first annular winding 101, the central annular winding 102A and the fourth annular winding 104 are the same. In other words, a distance between the first stator core base 61 and the second stator core base 71, a distance between the second stator core base 71 and the third stator core base 81, and a distance between the third stator core base 81 and the fourth stator core base 91 are the same.

Therefore, as shown in FIG. 23A, the single stator 2a of the third embodiment is of a Lundell type structure in which the tip end surfaces 67 and 87 of the first and third stator-side claw-shaped magnetic poles 64 and 84 whose axial lengths are shortened abut against each other, and the tip end surfaces 77 and 97 of the second and fourth stator-side claw-shaped magnetic poles 74 and 94 whose axial lengths are shortened abut against each other.

Figure 26:
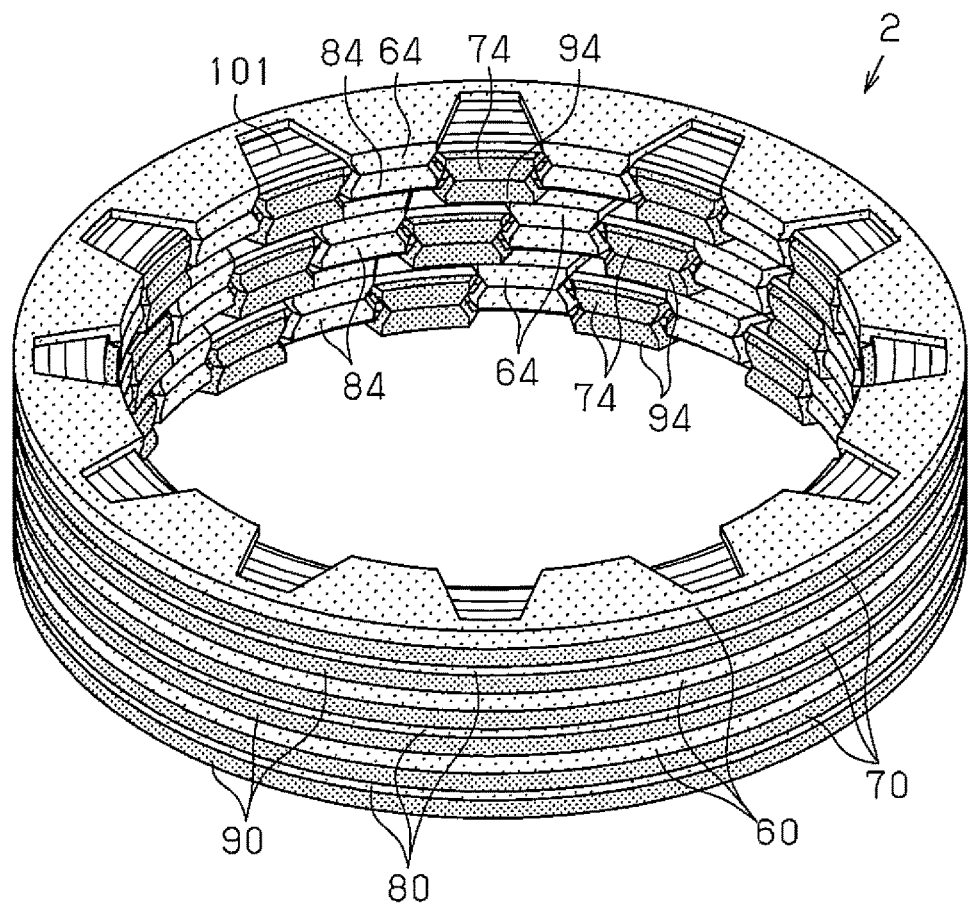
FIG. 26 is a perspective view of an entire three-phase stator.
Figure 27:
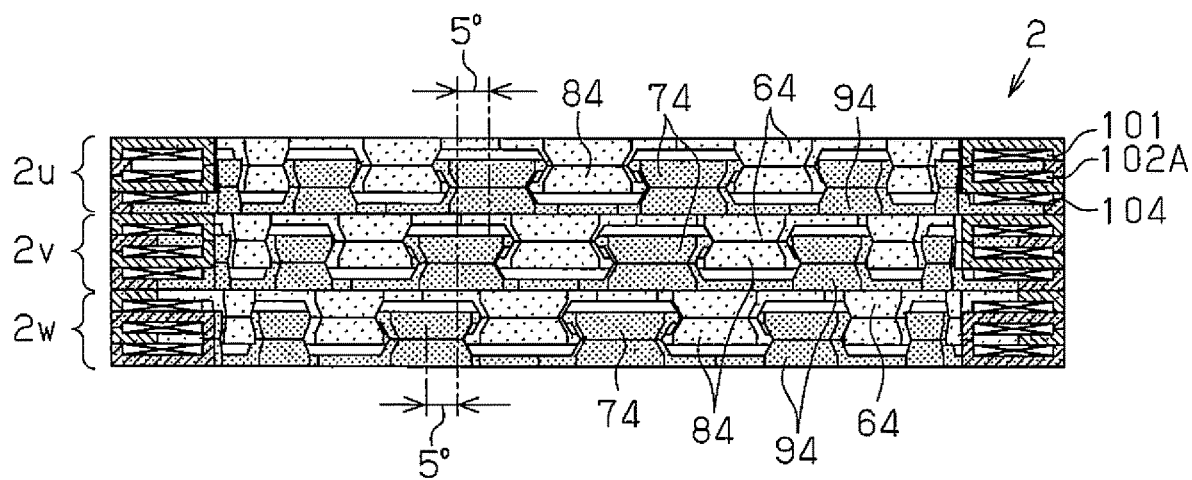
FIG. 27 is a sectional view of the three-phase stator shown in FIG. 26.

As shown in FIGS. 26 and 27, the single stators 2a are used as a U-phase stator 2u, a V-phase stator 2v and a W-phase stator 2w and these stators 2u, 2v and 2w are stacked on one another in the axial direction to form the stator 2 of the three-phase brushless motor M as in the first embodiment.

At this time, like the first embodiment, the three-phase stator 2 including the U-phase stator 2u, the V-phase stator 2v and the W-phase stator 2w is configured by stacking the U-phase stator 2u, the V-phase stator 2v and the W-phase stator 2w on one another such that the stators 2u, 2V and 2W are displaced from one another by 5° in mechanical angle (60° in electrical angle).

U-phase AC current Iu of the three-phase AC power source flows through the U-phase stator 2u. V-phase AC current Iv of the three-phase AC power source flows through the V-phase stator 2v. W-phase AC current Iw of the three-phase AC power source flows through the W-phase stator 2w.

Next, operations of the brushless motor M of the third embodiment having the above-described configuration will be described.

In the rotor of each of the respective phases, the first to fourth four rotor cores 10, 20, 30 and 40 are stacked on one another in the axial direction in this order such that the first, central and fourth field magnets 51, 52A and 54 are respectively interposed therebetween. By the first, central and fourth field magnets 51, 52A and 54, the first and third rotor-side claw-shaped magnetic poles 13 and 33 become north poles, and the second and fourth rotor-side claw-shaped magnetic poles 23 and 43 become south poles.

At this time, a magnetic flux density of the second rotor-side claw-shaped magnetic poles 23 is determined based on the two field magnets, i.e., the first field magnet 51 and the central field magnet 52A. A magnetic flux density of the third rotor-side claw-shaped magnetic poles 33 is determined based on the two field magnets, i.e., the central field magnet 52A and the fourth field magnet 54.

On the other hand, a magnetic flux density of the first rotor-side claw-shaped magnetic poles 13 is determined based on the one first field magnet 51. Similarly, a magnetic flux density of the fourth rotor-side claw-shaped magnetic poles 43 is determined based on the one fourth field magnet 54.

As a result, in the mutually opposed first rotor-side claw-shaped magnetic poles 13 and third rotor-side claw-shaped magnetic poles 33, a difference in generated magnetic fluxes becomes small as compared with the first embodiment. That is, reverse flow of magnetic fluxes generated between the first rotor-side claw-shaped magnetic poles 13 and the third rotor-side claw-shaped magnetic poles 33 whose tip end surfaces 16 and 36 abut against each other becomes small as compared with the first embodiment. According to this, a magnetic flux density of north poles becomes large as a whole as compared with the first embodiment, north poles of a magnetic flux density which is larger than that of the first embodiment is given to the first and third stator-side claw-shaped magnetic poles 64 and 84 of the opposed stators 2a.

Similarly, in the second rotor-side claw-shaped magnetic poles 23 and the fourth rotor-side claw-shaped magnetic poles 43 also, a difference in generated magnetic fluxes becomes small as compared with the first embodiment. That is, reverse flow of magnetic fluxes generated between the first rotor-side claw-shaped magnetic poles 13 and the third rotor-side claw-shaped magnetic poles 33 whose tip end surfaces 26 and 46 abut against each other becomes small as compared with the first embodiment. According to this, a magnetic flux density of south poles becomes large as a whole as compared with the first embodiment, and south poles of a magnetic flux density which is larger than that of the first embodiment is given to the second and fourth stator-side claw-shaped magnetic poles 74 and 94 of the opposed stators 2*a*.

According to this, the rotors of the respective phases can give magnetic poles having large magnetic flux densities to the opposed stators, and output can further be increased.

In the stator (single stator 2*a*) of each of phases, the first to fourth four stator cores 60, 70, 80 and 90 are stacked on one another in the axial direction in this order such that the first, central and fourth annular windings 101, 102A and 104 are respectively interposed therebetween.

At this time, a magnetic flux density of rotating field of the second stator-side claw-shaped magnetic poles 74 is determined based on the two annular windings, i.e., the first annular winding 101 and the central annular winding 102A. A magnetic flux density of rotating field of the third stator-side claw-shaped magnetic poles 84 is determined based on the two annular windings i.e., the central annular winding 102A and the fourth annular winding 104.

On the other hand, a magnetic flux density of rotating field of the first stator-side claw-shaped magnetic poles 64 is determined based on the one first annular winding 101. Similarly, a magnetic flux density of rotating field of the fourth stator-side claw-shaped magnetic poles 94 is determined based on the one fourth annular winding 104.

As a result, in the mutually opposed first and third stator-side claw-shaped magnetic poles 64 and 84, a difference in generated magnetic fluxes of the rotating field becomes small as compared with the first embodiment. That is, reverse flow of magnetic fluxes generated between the first stator-side claw-shaped magnetic poles 64 and the third stator-side claw-shaped magnetic poles 84 whose tip end surfaces 67 and 87 abut against each other becomes small as compared with the first embodiment.

According to this, a magnetic flux density of rotating field becomes large as compared with the first embodiment, and a rotating field which becomes large is given to the first and third rotor-side claw-shaped magnetic poles 13 and 33 of the opposed rotors 1*a*.

Similarly, in the mutually opposed second and fourth stator-side claw-shaped magnetic poles 74 and 94, a difference in generated magnetic fluxes of the rotating field becomes small as compared with the first embodiment. That is, reverse flow of magnetic fluxes generated between the second stator-side claw-shaped magnetic poles 74 and the fourth stator-side claw-shaped magnetic poles 94 whose tip end surfaces 77 and 97 abut against each other becomes small as compared with the first embodiment.

According to this, a magnetic flux density of rotating field becomes large as compared with the first embodiment, and the rotating field which becomes large is given to the second and fourth rotor-side claw-shaped magnetic poles 23 and 43 of the opposed rotors 1*a*.

According to this, the stators of the respective phases can give the rotating field having large magnetic flux densities to the opposed rotors, and output can further be increased.

Figure 28:
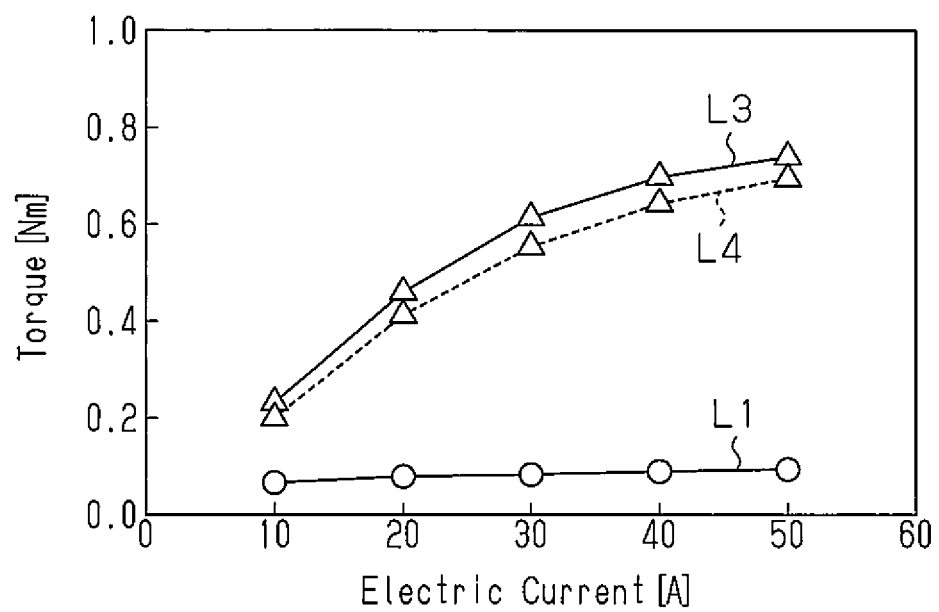
FIG. 28 is a diagram of torque characteristics showing comparison between current and torque.

FIG. 28 shows characteristic curves for comparison between torque characteristics of brushless motors M of the first embodiment and the third embodiment.

A characteristic curve L1 shows torque characteristics of the brushless motor M of the first embodiment, and a characteristic curve L3 shows torque characteristics of the brushless motor M of the third embodiment. Experiment conditions of the two embodiments are the same except the number of field magnets and the number of annular windings.

From a result of this experiment, it can be understood that a brushless motor M of higher torque is obtained based on the above-described reasons.

As described above in detail, the third embodiment has the following advantages in addition to the advantages of the first embodiment.

(10) According to the third embodiment, the one central field magnet 52A which is the same as the first field magnet 51 and the fourth field magnet 54 is placed between the second rotor core 20 and the third rotor core 30.

Reverse flow of magnetic fluxes between the first rotor-side claw-shaped magnetic poles 13 and the third rotor-side claw-shaped magnetic poles 33, and reverse flow of magnetic fluxes between the second rotor-side claw-shaped magnetic poles 23 and the fourth rotor-side claw-shaped magnetic poles 43 both based on a difference in generated magnetic fluxes are suppressed.

Therefore, the rotors of the respective phases can give magnetic poles having a large magnetic flux density to the opposed stators, and output can further be increased.

(11) According to the third embodiment, the one central annular winding 102A which is the same as the first annular winding 101 and the fourth annular winding 104 is placed between the second stator core 70 and the third stator core 80.

Reverse flow of magnetic fluxes between the first stator-side claw-shaped magnetic poles 64 and the third stator-side claw-shaped magnetic poles 84, and reverse flow of magnetic fluxes between the second stator-side claw-shaped magnetic poles 74 and the fourth stator-side claw-shaped magnetic poles 94 both based on a difference in generated magnetic fluxes are suppressed.

Therefore, the stators of the respective phases can give the rotating field having a large magnetic flux density to the opposed rotors, and output can further be increased.

Fourth Embodiment

A fourth embodiment will be described below in accordance with FIGS. 29 to 34.

The fourth embodiment is different from the third embodiment, and is characterized in that tip end surfaces 16 of first rotor-side claw-shaped magnetic poles 13 and tip end surfaces 36 of third rotor-side claw-shaped magnetic poles 33 are not made to abut against each other but are closely opposed to each other, and tip end surfaces 26 of second rotor-side claw-shaped magnetic poles 23 and tip end surfaces 46 of fourth rotor-side claw-shaped magnetic poles 43 are not made to abut against each other but are closely opposed to each other.

Further, the fourth embodiment is characterized in that tip end surfaces 67 of first stator-side claw-shaped magnetic poles 64 and tip end surfaces 87 of third stator-side claw-shaped magnetic poles 84 are not made to abut against each other but are closely opposed to each other, and tip end surfaces 77 of second stator-side claw-shaped magnetic poles 74 and tip end surfaces 97 of fourth stator-side claw-shaped magnetic poles 94 are not made to abut against each other but are closely opposed to each other.

Therefore, in the fourth embodiment, the characteristic portions will be described in detail, the same reference numerals as those of the third embodiment are allocated to members of common portions, and detailed description thereof will be omitted for the sake of convenience of description.

Figure 29:
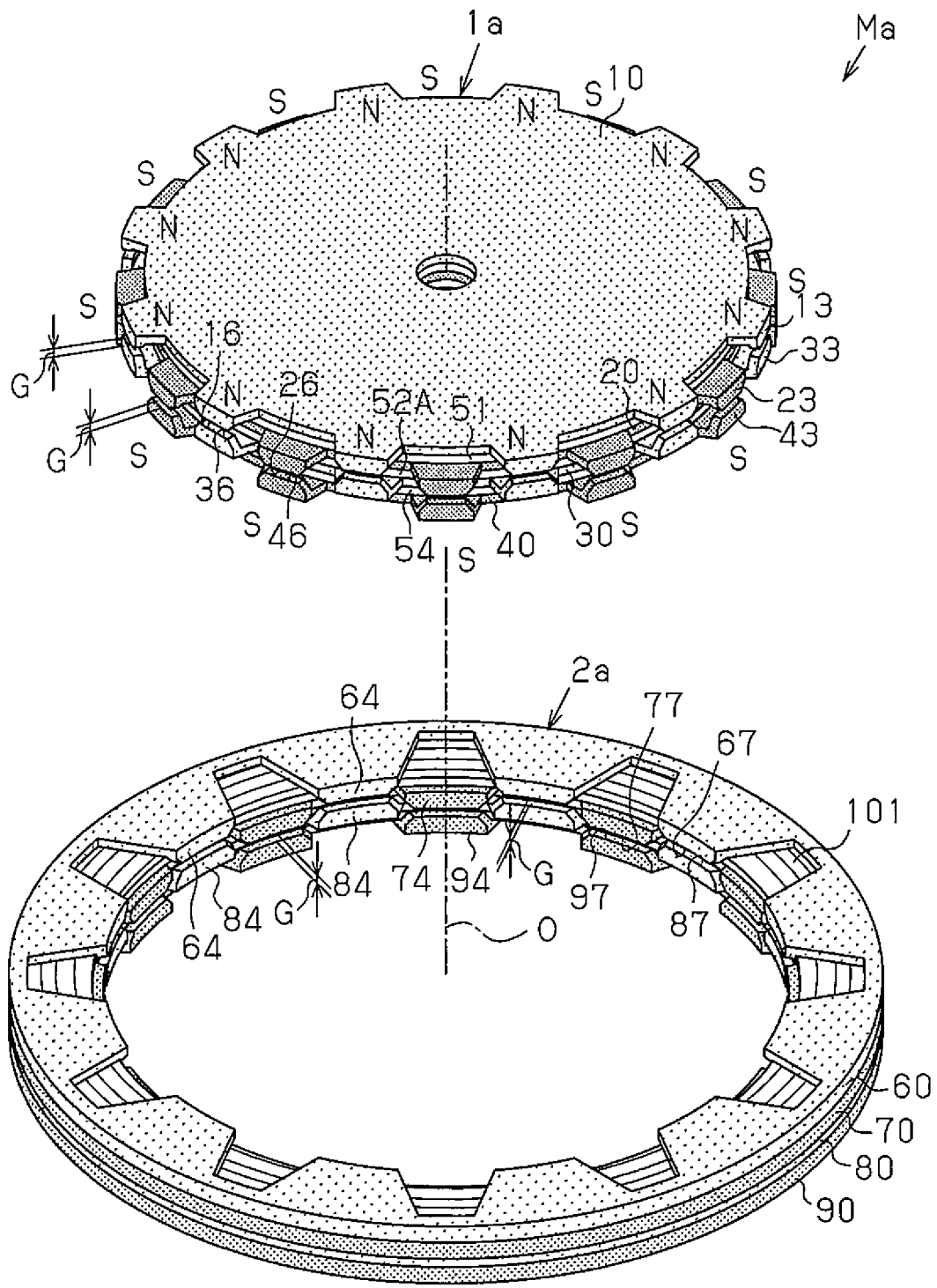
FIG. 29 is an exploded perspective view of a single motor configuring a brushless motor according to a fourth embodiment of the present invention.

As shown in FIG. 29, each of single motors Ma of respective phases configuring a three-phase brushless motor M includes a single rotor 1a and a single stator 2a.

(Single Rotor 1a)

As shown in FIG. 30A, thicknesses of first, central and fourth field magnets 51, 52A and 54 are the same as those of the third embodiment. On the other hand, lengths of first to fourth rotor-side claw-shaped magnetic poles 13, 23, 33 and 43 are less than 2.5 times of thicknesses (lengths in axial direction) of first to fourth rotor core bases 11, 21, 31 and 41.

Therefore, as shown in FIGS. 29 and 30A, the tip end surfaces 16 of the first rotor-side claw-shaped magnetic poles 13 and the tip end surfaces 36 of the third rotor-side claw-shaped magnetic poles 33 are closely opposed to each other in an axial direction of the rotor, i.e., opposed to each other in the axial direction such that gaps G of a certain distance are formed therebetween. Similarly, the tip end surfaces 26 of the second rotor-side claw-shaped magnetic poles 23 and the tip end surfaces 46 of the fourth rotor-side claw-shaped magnetic poles 43 are closely opposed to each other in an axial direction of the rotor, i.e., opposed to each other in the axial direction such that gaps G of a certain distance are formed therebetween.

That is, the single rotor 1a of the fourth embodiment is a of a Lundell type structure having the gaps G between the tip end surfaces 16 and 36 of the first and third rotor-side claw-shaped magnetic poles 13 and 33, and between the tip end surfaces 26 and 46 of the second and fourth rotor-side claw-shaped magnetic poles 23 and 43.

Figure 31:
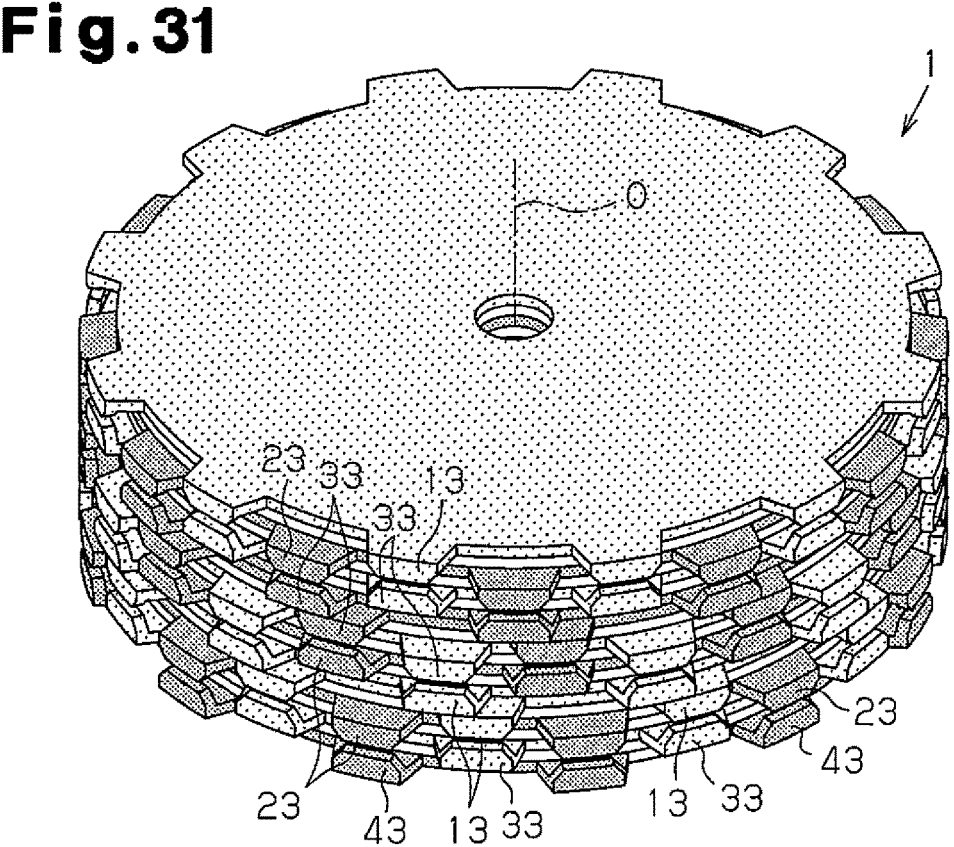
FIG. 31 is a perspective view of an entire three-phase rotor.
Figure 32:
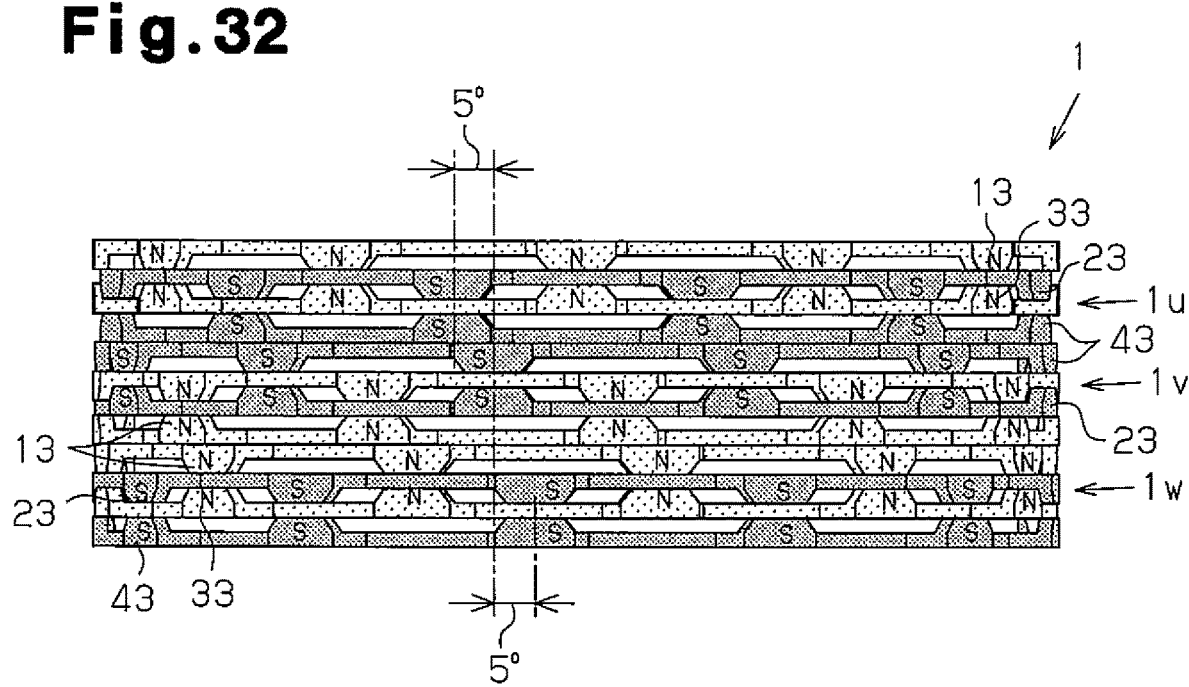
FIG. 32 is a front view of the three-phase rotor shown in FIG. 31 as viewed from its radial direction.

As shown in FIGS. 31 and 32, the single rotors 1a are used as a U-phase rotor 1u, a V-phase rotor 1v and a W-phase rotor 1w and these rotors are stacked on one another in the axial direction to form the rotor 1 of the three-phase brushless motor M as in the third embodiment.

At this time, as in the third embodiment, the U-phase rotor 1u and the W-phase rotor 1w are placed such that placement directions of first to fourth rotor cores 10, 20, 30 and 40 become the same. On the other hand, the V-phase rotor 1v which is stacked between the U-phase rotor 1u and the W-phase rotor 1w is placed such that placement directions of the first to fourth rotor cores 10, 20, 30 and 40 of the V-phase rotor 1v become opposite from the placement directions of the first to fourth rotor cores 10, 20, 30 and 40 of the U-phase rotor 1u and the W-phase rotor 1w.

Further, as shown in FIG. 32, the three-phase rotor 1 including the U-phase rotor 1u, the V-phase rotor 1v and the W-phase rotor 1w is configured by stacking the U-phase rotor 1u, the V-phase rotor 1v and the W-phase rotor 1w on one another such that these rotors 1u, 1v and 1w are displaced from one another by 5° in mechanical angle (60° in electrical angle) as in the third embodiment.

(Single Stator 2a)

As shown in FIG. 30B, coil lengths (lengths in axial direction) of first, central and fourth annular windings 101, 102A and 104 are the same as those of the third embodiment.

On the other hand, lengths of first to fourth stator-side claw-shaped magnetic poles 64, 74, 84 and 94 in the axial direction are less than 2.5 times of thicknesses (lengths in axial direction) of first to fourth stator core bases 61, 71, 81 and 91.

Therefore, as shown in FIGS. 29 and 30B, the tip end surfaces 67 of the first stator-side claw-shaped magnetic poles 64 and the tip end surfaces 87 of the third stator-side claw-shaped magnetic poles 84 are closely opposed to each other in the axial direction, i.e., opposed to each other in the axial direction such that gaps G of a certain distance are formed therebetween. Similarly, the tip end surfaces 77 of the second stator-side claw-shaped magnetic poles 74 and the tip end surfaces 97 of the fourth stator-side claw-shaped magnetic poles 94 are closely opposed to each other in the axial direction, i.e., opposed to each other in the axial direction such that gaps G of a certain distance are formed therebetween.

That is, the single stator 2a of the fourth embodiment is of a Lundell type structure having the gaps G between the tip end surfaces 67 and 87 of the first and third stator-side claw-shaped magnetic poles 64 and 84, and between the tip end surfaces 77 and 97 of the second and fourth stator-side claw-shaped magnetic poles 74 and 94.

Figure 33:
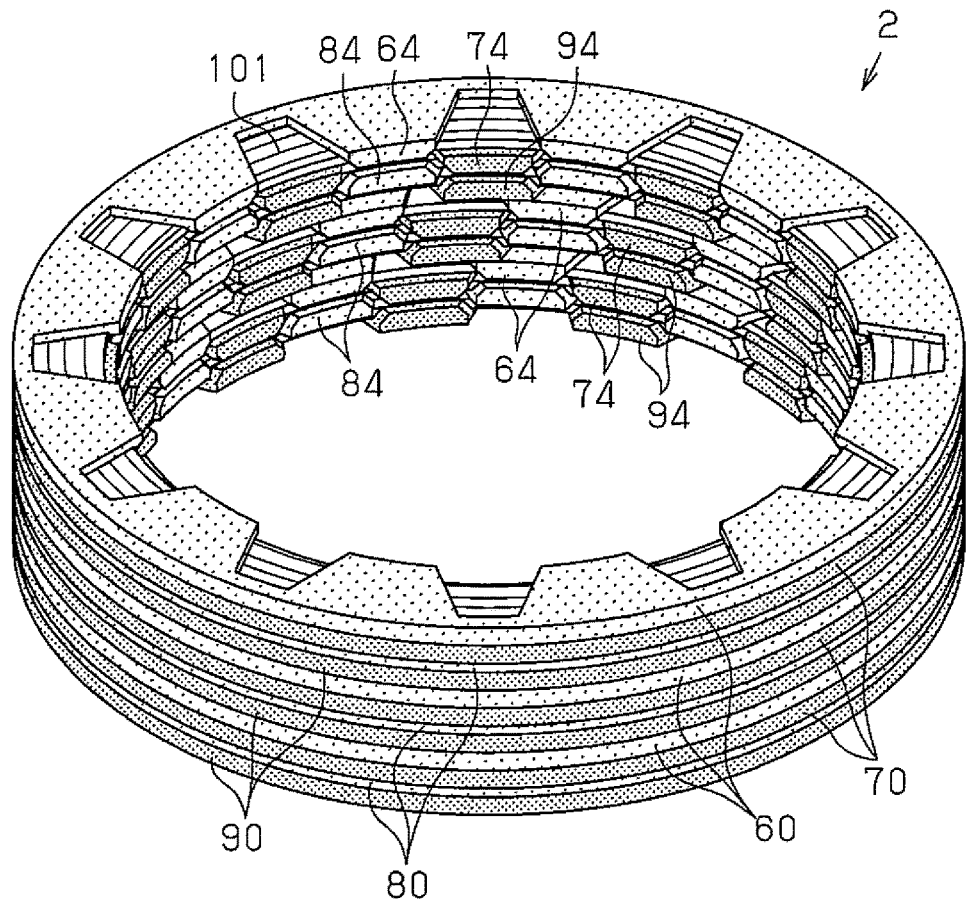
FIG. 33 is a perspective view of an entire three-phase stator.
Figure 34:
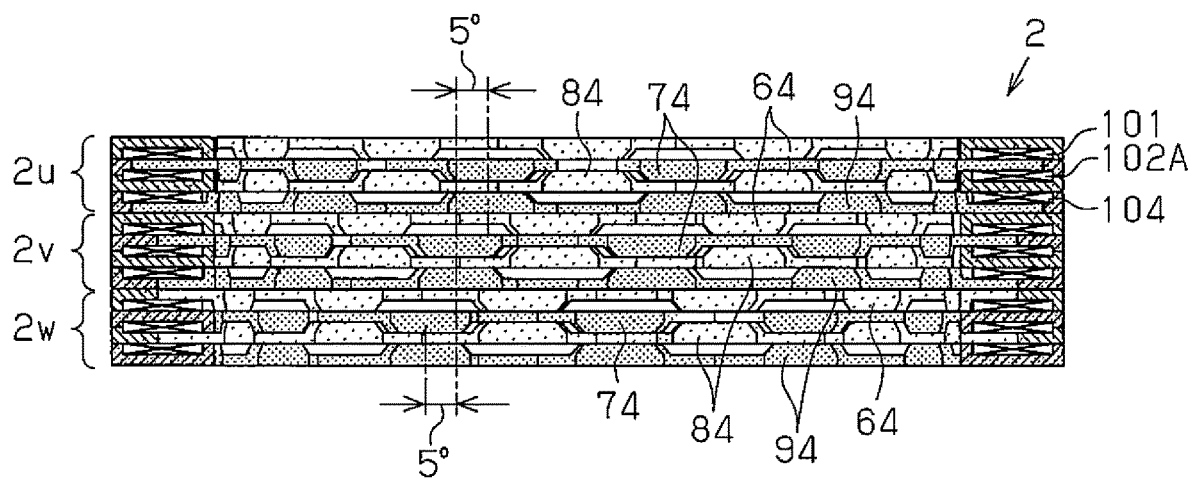
FIG. 34 is a sectional view of the three-phase stator shown in FIG. 33.

As shown in FIGS. 33 and 34, the single stators 2a are used as a U-phase stator 2u, a V-phase stator 2v and a W-phase stator 2w and these stators 2u, 2v and 2w are stacked on one another in the axial direction to form the stator 2 of the three-phase brushless motor M as in the first embodiment.

At this time, as in the third embodiment, of the three-phase stator 2 including the U-phase stator 2u, the V-phase stator 2v and the W-phase stator 2w is configured by stacking the U-phase stator 2u, the V-phase stator 2v and the W-phase stator 2w on one another such that they are displaced from one another by 5° in mechanical angle (60° in electrical angle).

U-phase AC current Iu of a three-phase AC power source flows through the U-phase stator 2u. V-phase AC current Iv of the three-phase AC power source flows through the V-phase stator 2v. Further, W-phase AC current Iw of the three-phase AC power source flows through the W-phase stator 2w.

Next, operations of the brushless motor M of the fourth embodiment having the above-described configuration will be described.

A magnetic flux density of the second rotor-side claw-shaped magnetic poles 23 is determined based on the two field magnets, i.e., the first field magnet 51 and the central field magnet 52A. A magnetic flux density of the third rotor-side claw-shaped magnetic poles 33 is determined based on the two field magnets, i.e., the central field magnet 52A and the fourth field magnet 54.

On the other hand, a magnetic flux density of the first rotor-side claw-shaped magnetic poles 13 is determined based on the one first field magnet 51. Similarly, a magnetic flux density of the fourth rotor-side claw-shaped magnetic poles 43 is determined based on the one fourth field magnet 54.

As a result, in the mutually opposed first rotor-side claw-shaped magnetic poles 13 and third rotor-side claw-shaped magnetic poles 33, a difference in generated magnetic fluxes becomes small. Further, since the tip end surfaces 16 and 36 are closely opposed to each other, reverse flow of magnetic fluxes generated between the first rotor-side claw-shaped magnetic poles 13 and the third rotor-side claw-shaped magnetic poles 33 further becomes small as compared with a case where the tip end surfaces 16 and 36 abut against each other.

According to this, since reverse flow of magnetic fluxes is suppressed to a smaller level, a magnetic flux density of north poles can be increased.

Similarly, in the second rotor-side claw-shaped magnetic poles 23 and the fourth rotor-side claw-shaped magnetic poles 43 also, a difference in generated magnetic fluxes becomes small. Further, since the tip end surfaces 26 and 46 are closely opposed to each other, reverse flow of magnetic fluxes generated between the second rotor-side claw-shaped magnetic poles 23 and the fourth rotor-side claw-shaped magnetic poles 43 further becomes small as compared with a case where the tip end surfaces 26 and 46 abut against each other.

According to this, since reverse flow of magnetic fluxes is suppressed to a smaller level, a magnetic flux density of south poles can be increased.

According to this, the rotors of the respective phases can give magnetic poles having a large magnetic flux density to the opposed stators, and output can be increased.

A magnetic flux density of the second stator-side claw-shaped magnetic poles 74 is determined based on the two annular windings, i.e., the first annular winding 101 and the central annular winding 102A. A magnetic flux density of the third stator-side claw-shaped magnetic poles 84 is determined based on the two annular windings, i.e., the central annular winding 102A and the fourth annular winding 104.

On the other hand, a magnetic flux density of the first stator-side claw-shaped magnetic poles 64 is determined based on the one first annular winding 101. Similarly, a magnetic flux density of the fourth stator-side claw-shaped magnetic poles 94 is determined based on the one fourth annular winding 104.

As a result, in the mutually opposed first stator-side claw-shaped magnetic poles 64 and third stator-side claw-shaped magnetic poles 84, a difference in generated magnetic fluxes becomes small. Further, since the tip end surfaces 67 and 87 are closely opposed to each other, reverse flow of magnetic fluxes generated between the first stator-side claw-shaped magnetic poles 64 and the third stator-side claw-shaped magnetic poles 84 further becomes small as compared with a case where the tip end surfaces 67 and 87 abut against each other.

According to this, since reverse flow of magnetic fluxes is suppressed to a smaller level, rotating field can be increased.

Similarly, in the mutually opposed second stator-side claw-shaped magnetic poles 74 and the fourth stator-side claw-shaped magnetic poles 94, a difference in generated magnetic fluxes becomes small. Further, since the tip end surfaces 77 and 97 are closely opposed to each other, reverse flow of magnetic fluxes generated between the second stator-side claw-shaped magnetic poles 74 and the fourth stator-side claw-shaped magnetic poles 94 further becomes small as compared with a case where the tip end surfaces 77 and 97 abut against each other.

According to this, since reverse flow of magnetic fluxes is suppressed to a smaller level, rotating field can be increased.

According to this, the stators of the respective phases can give large rotating field to the opposed rotors, and output can be increased.

A characteristic curve L4 shown in FIG. 28 shows torque characteristics of the brushless motor M of the fourth embodiment.

As apparent from FIG. 28, it can be understood that the brushless motor M of higher torque than the brushless motor M of the second embodiment shown in FIG. 21 is obtained.

In FIG. 28, although torque characteristics of the brushless motor M of the fourth embodiment are slightly smaller than torque characteristics of the brushless motor M of the third embodiment, it is conceived that this is caused by difference in sizes of the gaps G of the tip end surfaces 16 and 36 (tip end surfaces 26 and 46) and the gaps G of the tip end surfaces 67 and 87 (tip end surfaces 77 and 97).

That is, if the gaps are excessively large, it is conceived that variation is generated in a magnetic flux density distribution in the axial direction between the claw-shaped magnetic poles. From this reason, it is necessary to set the gaps G while taking a magnetic flux density distribution in the axial direction into consideration in the claw-shaped magnetic poles.

As described above in detail, the fourth embodiment has the following advantages in addition to the advantages of the third embodiment.

(12) According to the fourth embodiment, the tip end surfaces 16 and 36 of the first and third rotor-side claw-shaped magnetic poles 13 and 33 are closely opposed to each other in the axial direction, reverse flow of magnetic fluxes between the first rotor-side claw-shaped magnetic poles 13 and the third rotor-side claw-shaped magnetic poles 33 based on a difference in generated magnetic fluxes is suppressed, and a magnetic flux density of north poles is increased as a whole. Similarly, the tip end surfaces 26 and 46 of the second and fourth rotor-side claw-shaped magnetic poles 23 and 43 are closely opposed to each other in the axial direction, reverse flow of magnetic fluxes between the second rotor-side claw-shaped magnetic pole 23 and the fourth rotor-side claw-shaped magnetic pole 43 based on a difference in generated magnetic fluxes is suppressed, and a magnetic flux density of south poles is increased as a whole.

According to this, the rotors of the respective phases can give magnetic poles having a large magnetic flux density to the opposed stators, and output can further be increased.

(13) According to the fourth embodiment, the tip end surfaces 67 and 87 of the first and third stator-side claw-shaped magnetic poles 64 and 84 are closely opposed to each other in the axial direction, reverse flow of magnetic fluxes between the first stator-side claw-shaped magnetic pole 64 and the third stator-side claw-shaped magnetic pole 84 based on a difference in generated magnetic fluxes is suppressed, and a magnetic flux density of rotating field is increased as a whole. Similarly, the tip end surfaces 77 and 97 of the second and fourth stator-side claw-shaped magnetic poles 74 and 94 are closely opposed to each other in the axial direction, reverse flow of magnetic fluxes between the second stator-side claw-shaped magnetic pole 74 and the fourth stator-side claw-shaped magnetic pole 94 based on a difference in generated magnetic fluxes is suppressed, and a magnetic flux density of rotating field is increased as a whole.

According to this, the stators of the respective phases can give rotating field having a large magnetic flux density to the opposed rotors, and output can further be increased.

(14) According to the fourth embodiment, since the tip end surfaces 16 and 36 of the first and third rotor-side claw-shaped magnetic poles 13 and 33 are closely opposed to each other in the axial direction, variation in a magnetic flux density distribution can be made small in the axial direction.

Similarly, since the tip end surfaces 26 and 46 of the second and fourth rotor-side claw-shaped magnetic poles 23 and 43 are closely opposed to each other in the axial direction, variation in a magnetic flux density distribution can be made small in the axial direction.

According to this, the rotors of the respective phases can give magnetic fluxes of a magnetic flux density distribution having small variation in the axial direction to the opposed stators, and output can further be increased.

(15) According to the fourth embodiment, since the tip end surfaces 67 and 87 of the first and third stator-side claw-shaped magnetic poles 64 and 84 are closely opposed to each other in the axial direction, variation in a magnetic flux density distribution can be suppressed to a small level in the axial direction.

Similarly, since the tip end surfaces 77 and 97 of the second and fourth stator-side claw-shaped magnetic poles 74 and 94 are closely opposed to each other in the axial direction, variation in a magnetic flux density distribution can be made small in the axial direction.

As a result, the stators of the respective phases can give magnetic fluxes (rotating field) of a magnetic flux density distribution having small variation in the axial direction to the opposed rotors, and output can further be increased.

The first to fourth embodiments may be changed as follows.

Although the second field magnet 52 and the third field magnet 53 are separately configured in the first and second embodiments, the second field magnet 52 and the third field magnet 53 may be integrally formed as one field magnet.

Although the second annular winding 102 and the third annular winding 103 are separately configured in the first and second embodiments, the second annular winding 102 and the third annular winding 103 may be integrally formed as one annular winding.

The thicknesses of the first to fourth rotor cores 10, 20, 30 and 40 are the same in the first to fourth embodiments. However, the thicknesses of the first to fourth rotor cores 10, 20, 30 and 40 may be different from each other within such a range that the tip end surfaces 16 and 36 of the first and third rotor-side claw-shaped magnetic poles 13 and 33 abut against or are closely opposed to each other, and the tip end surfaces 26 and 46 of the second and fourth rotor-side claw-shaped magnetic poles 23 and 43 abut against or are closely opposed to each other.

The thicknesses (lengths in axial direction) of the first to fourth field magnets 51 to 54 are the same in the first and second embodiment. However, the thicknesses (lengths in axial direction) of the first to fourth field magnets 51 to 54 may be different from each other within such a range that the tip end surfaces 16 and 36 of the first and third rotor-side claw-shaped magnetic poles 13 and 33 abut against or are closely opposed to each other, and the tip end surfaces 26 and 46 of the second and fourth rotor-side claw-shaped magnetic poles 23 and 43 abut against or are closely opposed to each other.

In the second and third field magnets 52 and 53 which are placed at central positions in the axial direction and which have small flux leakage toward outside, thicknesses of the second and third field magnets 52 and 53 may be made thinner (magnetic flux densities thereof may be smaller) than those of the first and fourth field magnets 51 and 54 of course.

Thicknesses of the first to fourth rotor cores 10, 20, 30 and 40 are the same as those of the first to fourth field magnets 51 to 54 in the first and second embodiments. However, the thicknesses of the first to fourth rotor cores 10, 20, 30 and 40 may be different from those of the first to fourth field magnets 51 to 54 within such a range that the tip end surfaces 16 and 36 of the first and third rotor-side claw-shaped magnetic poles 13 and 33 abut against or are closely opposed to each other, and the tip end surfaces 26 and 46 of the second and fourth rotor-side claw-shaped magnetic poles 23 and 43 abut against or are closely opposed to each other.

In this case, it is necessary to change axial lengths of the first to fourth rotor-side claw-shaped magnetic poles 13, 23, 33 and 43.

Thicknesses of the first to fourth stator cores 60, 70, 80 and 90 are the same in the first to fourth embodiments. However, the thicknesses of the first to fourth stator cores 60, 70, 80 and 90 may be different from each other within such a range that the tip end surfaces 67 and 87 of the first and third stator-side claw-shaped magnetic poles 64 and 84 abut against or are closely opposed to each other, and the tip end surfaces 77 and 97 of the second and fourth stator-side claw-shaped magnetic poles 74 and 94 abut against or are closely opposed to each other.

The axial lengths of the first to fourth annular windings 101 to 104 are the same in the first and second embodiments. However, the axial lengths of the first to fourth annular windings 101 to 104 may be different from each other within such a range that the tip end surfaces 67 and 87 of the first and third stator-side claw-shaped magnetic poles 64 and 84 abut against or are closely opposed to each other, and the tip end surfaces 77 and 97 of the second and fourth stator-side claw-shaped magnetic poles 74 and 94 abut against or are closely opposed to each other.

In the second and third annular windings 102 and 103 which are placed at central positions in the axial direction and which have small flux leakage toward outside, the axial lengths of the second and third annular windings 102 and 103 may be shorter (the winding number may be smaller) than those of the first and fourth annular windings 101 and 104 of course.

The thicknesses of the first to fourth stator cores 60, 70, 80 and 90 are the same as the axial lengths of the first to fourth annular windings 101 to 104 in the first and second embodiments. However, the thicknesses of the first to fourth stator cores 60, 70, 80 and 90 may be different from the axial lengths of the first to fourth annular windings 101 to 104 within such a range that the tip end surfaces 67 and 87 of the first and third stator-side claw-shaped magnetic poles 64 and 84 abut against or are closely opposed to each other, and the tip end surfaces 77 and 97 of the second and fourth stator-side claw-shaped magnetic poles 74 and 94 abut against or are closely opposed to each other.

In this case, it is necessary to change axial lengths of the first to fourth stator-side claw-shaped magnetic poles 64, 74, 84 and 94.

The axial lengths of the first and third rotor-side claw-shaped magnetic poles 13 and 33 are the same in the first to fourth embodiments, but the lengths may not be the same if the tip end surfaces 16 and 36 of the first and third rotor-side claw-shaped magnetic poles 13 and 33 abut against or are closely opposed to each other. According to this, it is possible to adjust a flowing manner of magnetic fluxes which flow through the first and third rotor-side claw-shaped magnetic poles 13 and 33, and this is effective for reducing vibration.

Similarly, the axial lengths of the second and fourth rotor-side claw-shaped magnetic poles 23 and 43 are the same, but the lengths may not be the same if the tip end surfaces 26 and 46 of the second and fourth rotor-side claw-shaped magnetic poles 23 and 43 abut against or are closely opposed to each other. According to this, it is possible to adjust a flowing manner of magnetic fluxes which flow through the second and fourth rotor-side claw-shaped magnetic poles 23 and 43, and this is effective for reducing vibration.

The axial lengths of the first and third stator-side claw-shaped magnetic poles 64 and 84 are the same in the first to fourth embodiments, but the lengths may not be the same if the tip end surfaces 67 and 87 of the first and third stator-side claw-shaped magnetic poles 64 and 84 abut against or are closely opposed to each other. According to this, it is possible to adjust a flowing manner of magnetic fluxes which flow through the first and third stator-side claw-shaped magnetic poles 64 and 84, and this is effective for reducing vibration.

Similarly, the axial lengths of the second and fourth stator-side claw-shaped magnetic poles 74 and 94 are the same, but the lengths may not be the same if the tip end surfaces 77 and 97 of the second and fourth stator-side claw-shaped magnetic poles 74 and 94 abut against or are closely opposed to each other. According to this, it is possible to adjust a flowing manner of magnetic fluxes which flow through the second and fourth stator-side claw-shaped magnetic poles 74 and 94, and this is effective for reducing vibration.

The first to fourth annular windings 101 to 104 are connected to one another in series in the single stator 2a and single phase AC current flows therethrough in the first and second embodiments, but the first to fourth annular windings 101 to 104 may be connected to one another in parallel and single phase AC current may flow therethrough.

Of course, a switching circuit for selectively switching between series connection and parallel connection of the first to fourth annular windings 101 to 104 may be provided, and the series connection and parallel connection may be switched in accordance with output of the single motor Ma.

Similarly, for the stators 2u, 2v and 2w of the respective phases of the three-phase brushless motor M also, the annular windings may be connected to one another in parallel, or the connection mode may selectively be switched between series connection and parallel connection.

In the third and fourth embodiments, the first, central and fourth annular windings 101, 102A and 104 are connected to one another in series in the single stator 2a and single phase AC current flows therethrough like the first embodiment. Alternatively, the first, central and fourth annular windings 101, 102A and 104 may be connected to one another in parallel, and single phase AC current may flow therethrough.

Of course, a switching circuit for selectively switching between series connection and parallel connection of the first, central and fourth annular windings 101, 102A and 104 may be provided, and the connection mode may be switched in accordance with output of the single motor Ma.

Similarly, in the third and fourth embodiments, for the stators 2u, 2v and 2w of the respective phases of the three-phase brushless motor M also, the annular windings may be connected to one another in parallel, or the connection mode may selectively be switched between series connection and parallel connection.

In the first to fourth embodiments, the tip end surfaces 16 and 36 of the first and third rotor-side claw-shaped magnetic poles 13 and 33 are opposed to each other in the axial direction, and are made to abut against or closely opposed to each other. Alternatively, the tip end surfaces 16 and the tip end surfaces 36 may be displaced from each other in the circumferential direction by a given distance, and the tip end surfaces 16 and 36 may be made to abut against or closely opposed to each other, thereby changing center positions of the magnetic poles. According to this, it is possible to adjust a flowing manner of magnetic fluxes which flow through the first and third rotor-side claw-shaped magnetic poles 13 and 33, and this is effective for reducing vibration.

Similarly, the tip end surfaces 26 and 46 of the second and fourth rotor-side claw-shaped magnetic poles 23 and 43 are opposed to each other in the axial direction, and are made to abut against or closely opposed to each other. Alternatively, the tip end surface 26 and the tip end surface 46 may be displaced from each other in the circumferential direction by a given distance, and the tip end surfaces 26 and 46 may be made to abut against or closely opposed to each other, thereby changing center positions of the magnetic poles. According to this, it is possible to adjust a flowing manner of magnetic fluxes which flow through the second and fourth rotor-side claw-shaped magnetic poles 23 and 43, and this is effective for reducing vibration.

In the first to fourth embodiments, the tip end surfaces 67 and 87 of the first and third stator-side claw-shaped magnetic poles 64 and 84 are opposed to each other in the axial direction to be made to abut against or closely opposed to each other. Alternatively, the tip end surface 67 and the tip end surface 87 may be displaced from each other in the circumferential direction by a given distance, and the tip end surfaces 67 and 87 may be made to abut against or closely opposed to each other, thereby changing center positions of the magnetic poles. According to this, it is possible to adjust a flowing manner of magnetic fluxes which flow through the first and third stator-side claw-shaped magnetic poles 64 and 84, and this is effective for reducing vibration.

Similarly, the tip end surfaces 77 and 97 of the second and fourth stator-side claw-shaped magnetic poles 74 and 94 are opposed to each other in the axial direction to be made to abut against or closely opposed to each other. Alternatively, the tip end surface 77 and the tip end surface 97 may be displaced from each other in the circumferential direction by a given distance, and the tip end surfaces 77 and 97 may be made to abut against or closely opposed to each other, thereby changing center positions of the magnetic poles. According to this, it is possible to adjust a flowing manner of magnetic fluxes which flow through the second and fourth stator-side claw-shaped magnetic poles 74 and 94, and this is effective for reducing vibration.

In the first to fourth embodiments, the stator placed on the outer side of the single rotor 1a is the single stator 2a in which the tip end surfaces 67 and 87 of the first and third stator-side claw-shaped magnetic poles 64 and 84 are made to abut against or closely opposed to each other, and the tip end surfaces 77 and 97 of the second and fourth stator-side claw-shaped magnetic poles 74 and 94 are made to abut against or closely opposed to each other.

The stator placed on the outer side of the single rotor 1a may be of a conventional Lundell type. The conventional Lundell type stator includes one annular winding and two stator cores which sandwich the annular winding, and stator-side claw-shaped magnetic poles of the two stator cores are alternately placed in the circumferential direction. Of course, the stator placed on the outer side of the single rotor 1a may not be of the Lundell type, and may be a multi-phase stator such as three-phase stator.

In the three-phase motor also, the three-phase rotor 1 of each of the embodiments may be placed on the inner side of the conventional Lundell type three-phase stator or a three-phase stator which is not of Lundell type.

In the first to fourth embodiments, the rotor placed on the inner side of the single stator 2a is the single rotor 1a in which tip end surfaces 16 and 36 of the first and third rotor-side claw-shaped magnetic poles 13 and 33 are made to abut against or closely opposed to each other, and the tip end surfaces 26 and 46 of the second and fourth rotor-side claw-shaped magnetic poles 23 and 43 are made to abut against or closely opposed to each other.

The rotor placed on the inner side of the single stator 2a may be a conventional Lundell type rotor. The Lundell type rotor includes one field magnet and two rotor cores which sandwich the field magnet, and rotor-side claw-shaped magnetic poles of the two rotor cores are alternately placed in the circumferential direction. Of course, the rotor paced on the inner side of the single stator 2a may not be of the Lundell type.

In the three-phase motor also, similarly, the three-phase stator 2 of each of the embodiments may be placed on the outer side of a conventional Lundell type three-phase rotor or a three-phase rotor which is not of the Lundell type.

Although the number of the claw-shaped magnetic poles of the first to fourth rotor cores 10, 20, 30 and 40 is twelve in the first to fourth embodiments, the number may appropriately be changed. Similarly, although the number of claw-shaped magnetic poles of the first to fourth stator cores 60, 70, 80 and 90 is twelve, the number may appropriately be changed.

The first to fourth field magnets 51 to 54 are made of ferrite magnet in the first to fourth embodiments, but these field magnets may be made of other permanent magnet such as neodymium magnet.

In the first to fourth embodiments, the present invention is embodied in the inner rotor type single motor Ma and the inner rotor type three-phase brushless motor M, but the invention may be applied to an outer rotor type single motor and an outer rotor type three-phase brushless motor.

Fifth Embodiment

A fifth embodiment of the motor having a rotor will be described below.

Figure 35:
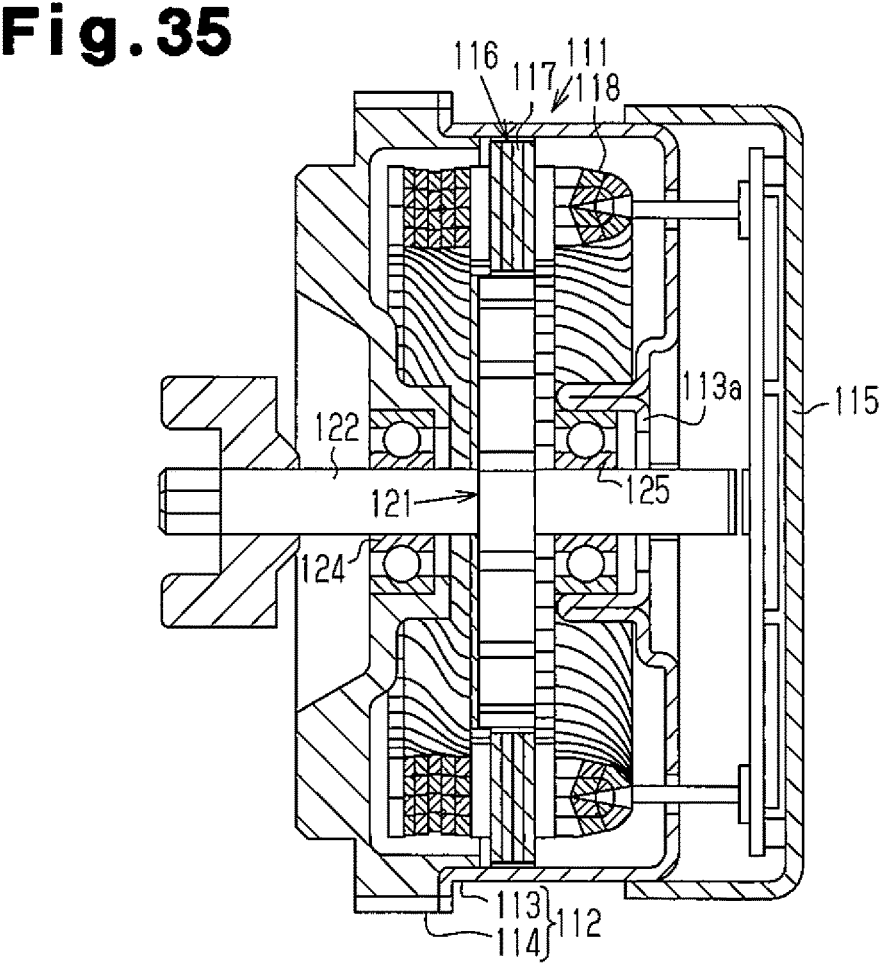
FIG. 35 is a sectional view of a motor according to a fifth embodiment of the present invention.

As shown in FIG. 35, a motor case 112 of a motor 111 includes a bottomed cylindrical housing 113, and a front end plate 114 which closes a front (left side in FIG. 35) opening of the cylindrical housing 113. A circuit accommodating box 115 is mounted on a rear (right side in FIG. 35) end of the cylindrical housing 113, and a power source circuit such as a circuit substrate is accommodated in the circuit accommodating box 115. A stator 116 is fixed to an inner peripheral surface of the cylindrical housing 113. The stator 116 includes an armature core 117 having a plurality of radially inwardly extending teeth, and a segment conductor (SC) winding 118 wound around the teeth of the armature core 117. A rotor 121 of the motor 111 includes a rotation shaft 122, and is placed on the inner side of the stator 116. The rotation shaft 122 is a non-magnetic metal shaft, and is rotatably supported by bearings 124 and 125. The bearings 124 and 125 are supported by a bottom 113a of the cylindrical housing 113 and the front end plate 114.

Figure 36:
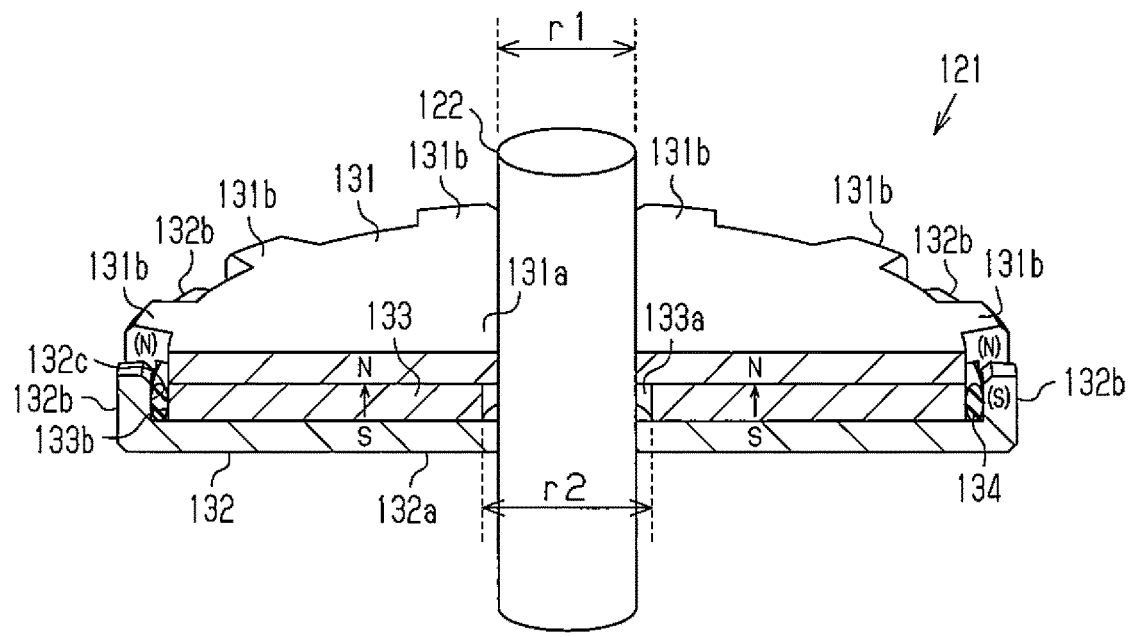
FIG. 36 is a sectional perspective view of a rotor shown in FIG. 35.
Figure 37:
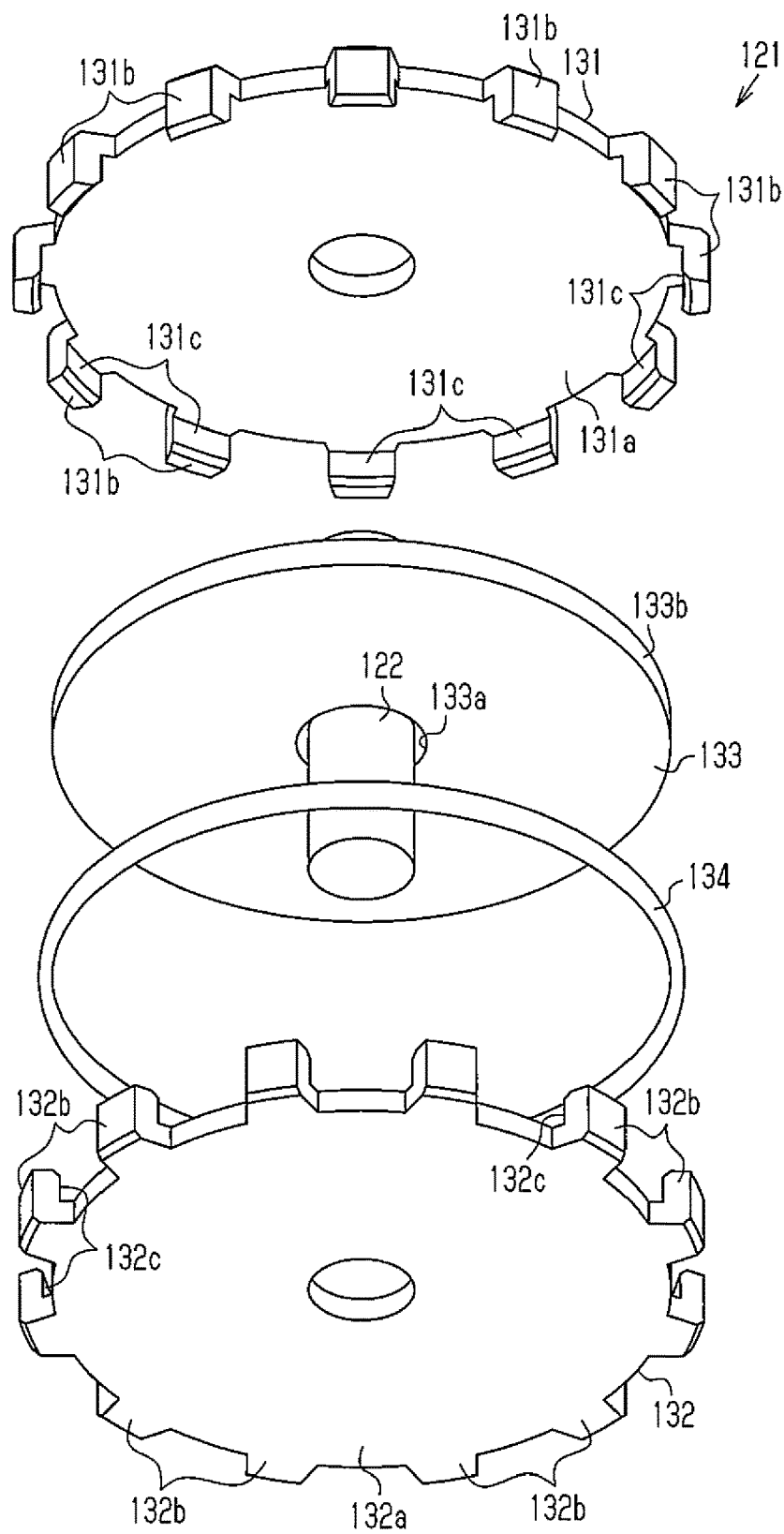
FIG. 37 is an exploded perspective view of the rotor shown in FIG. 36.

As shown in FIGS. 36 and 37, the rotor 121 includes first and second rotor cores 131 and 132, and an annular magnet 133 as a field magnet. Arrows shown by solid lines in FIG. 36 show magnetized direction (direction from south pole to north pole) of the annular magnet 133.

As shown in FIGS. 36 and 37, the first rotor core 131 includes a substantially disk-shaped first core base 131a and a plurality of (twelve in fifth embodiment) first claw-shaped magnetic poles 131b (first rotor claw-shaped magnetic poles) arranged on an outer periphery of the first core base 131a at equal intervals from one another. The first claw-shaped magnetic poles 131b project radially outward and extend in an axial direction of the rotor.

As shown in FIGS. 36 and 37, the second rotor core 132 has the same shape as that of the first rotor core 131, and includes a substantially disk-shaped second core base 132a and a plurality of second claw-shaped magnetic poles 132b (second rotor claw-shaped magnetic poles) arranged on an outer periphery of the second core base 132a at equal intervals from one another. The second claw-shaped magnetic poles 132b project radially outward and extend in the axial direction. The second rotor core 132 is assembled together with the first rotor core 131 such that the second claw-shaped magnetic poles 132b are placed between the corresponding first claw-shaped magnetic poles 131b and the annular magnet 133 is placed (sandwiched) between the first core base 131a and the second core base 132a in the axial direction. The number of first and second claw-shaped magnetic poles 131b and 132b (first and second rotor claw-shaped magnetic poles) of the rotor 121 and the number of the first and second claw-shaped magnetic poles (first and second stator claw-shaped magnetic poles) of the stator 116 are the same.

As shown in FIGS. 36 and 37, an outer diameter of the annular magnet 133 is substantially equal to outer diameters of the first and second core bases 131a and 132a. The annular magnet 133 is magnetized in the axial direction such that the annular magnet 133 causes the first claw-shaped magnetic poles 131b to function as first magnetic poles (north poles in fifth embodiment), and causes the second claw-shaped magnetic poles 132b function as second magnetic poles (south poles in fifth embodiment). Therefore, the rotor 121 of the fifth embodiment is of so-called Lundell type structure using the annular magnet 133 as the field magnet. In the rotor 121, first claw-shaped magnetic poles 131b which are north poles and the second claw-shaped magnetic poles 132b which are south poles are alternately placed in the circumferential direction, and the number of magnetic poles is twenty four (the number of pairs of poles is twelve).

A through hole 133a is formed in a center of the annular magnet 133, and the rotation shaft 122 is inserted through the through hole 133a. An inner diameter r2 of the through hole 133a is larger than an outer diameter r1 of the rotation shaft 122. An outer diameter of the annular magnet 133 is substantially equal to the outer diameters of the first and second core bases 131a and 132a as described above. An annular non-magnetic (rubber material in fifth embodiment) portion 134 is provided between the outer peripheral surface 133b of the annular magnet 133 and inner surfaces 131c and 132c of the claw-shaped magnetic poles 131b and 132b. Hence, since the annular magnet 133 abuts against the non-magnetic portion 134 in the radial direction, the annular magnet 133 is sandwiched in the radial direction, and the annular magnet 133 is restrained from moving in the radial direction.

In the motor 111 configured as described above, if three-phase drive current is supplied to the segment conductor (SC) winding 118 through the power source circuit in the circuit accommodating box 115, magnetic field for rotating the rotor 121 by the stator 116 is generated, and the rotor 121 is rotated and driven.

Next, operations of the motor 111 of the fifth embodiment will be described.

The motor 111 of the fifth embodiment includes the non-magnetic portion 134 provided radially between the annular magnet 133 as the field magnet and the claw-shaped magnetic poles 131b and 132b of the first and second rotor cores 131 and 132 configuring the rotor 121. The non-magnetic portion 134 abuts against the claw-shaped magnetic poles 131b and 132b and the annular magnet 133 in the radial direction. The non-magnetic portion 134 comes, under pressure, into contact with (is compressed between) the annular magnet 133 and the claw-shaped magnetic poles 131b and 132b. Hence, the annular magnet 133 can be positioned such that it is sandwiched from radially outside without applying an excessive load to the annular magnet 133. At this time, since the non-magnetic portion 134 is made of non-magnetic rubber material, the magnetic fluxes are restrained from being short circuited through the non-magnetic portion 134.

Next, advantages of the fifth embodiment will be described.

(16) The non-magnetic portion 134 which positions the annular magnet 133 in the radial direction is provided between the claw-shaped magnetic poles 131b and 132b and the annular magnet 133. Hence it is possible to restrain the magnetic fluxes from being short circuited, to position and fix the annular magnet 133 in the radial direction, and to restrain the annular magnet 133 from rattling.

(17) Since the non-magnetic portion 134 is made of rubber material, the non-magnetic portion 134 can come into contact, under pressure, with the claw-shaped magnetic poles 131b and 132b and the annular magnet 133 therebetween, and it is possible to prevent the annular magnet 133 from deviating in position in the circumferential direction.

(18) The inner diameter r2 of the through hole 133a of the annular magnet 133 is larger than the outer diameter r1 of the rotation shaft 122. Hence, it is possible to position and fix the annular magnet 133 by the non-magnetic portion 134 without press-fitting the rotation shaft 122.

(19) Since the non-magnetic portion 134 has the annular shape, it can abut against the disk-shaped annular magnet 133 over its entire circumference in the radial direction. Hence, it is possible to more reliably restrain the annular magnet 133 from deviating in position. Since the non-magnetic portion 134 has the annular shape, even if the annular magnet 133 as the field magnet cracks, it is possible to restrain the magnet 133 from scattering. Further, since the non-magnetic portion 134 is made of rubber material as described above, the non-magnetic portion 134 can come into contact under pressure, and it is possible to enhance its hermeticity, and to further restrain the magnet 133 from scattering.

The fifth embodiment may be changed as follows.

Figure 39A:
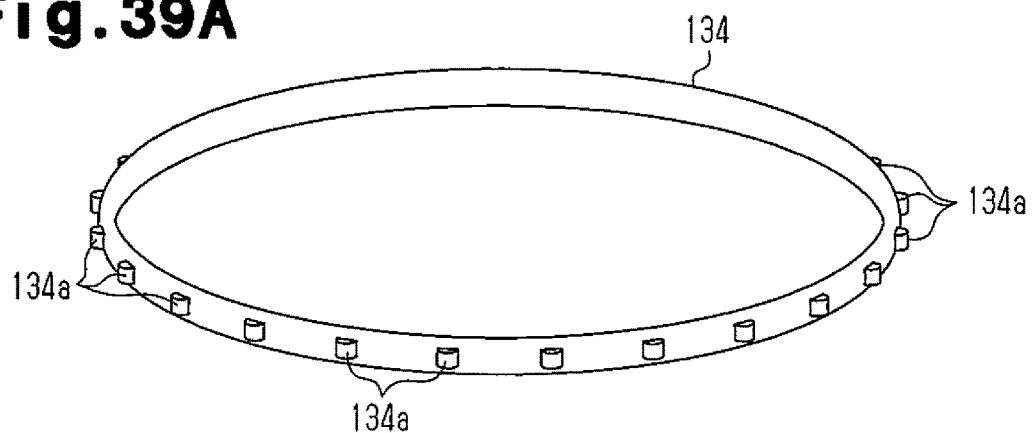
FIG. 39A is a perspective view of a non-magnetic portion in another example of the fifth embodiment.
Figure 39B:
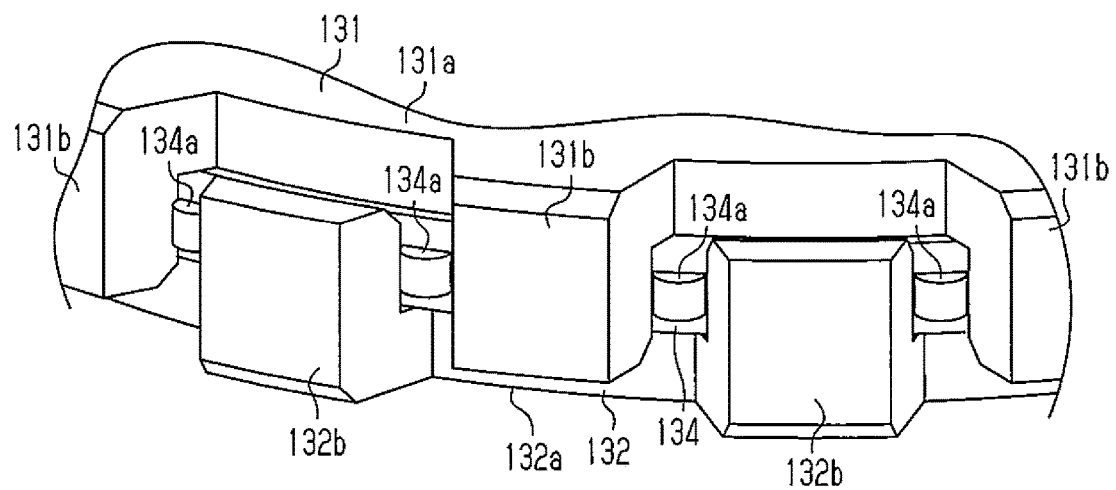
FIG. 39B is an explanatory diagram for explaining an assembled state of the non-magnetic portion shown in FIG. 39A.
Figure 40A:
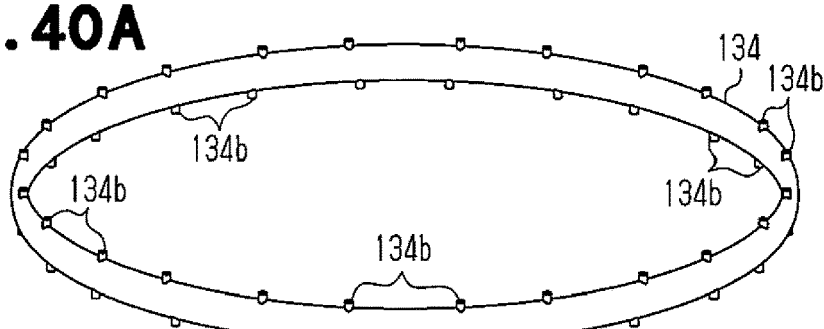
FIG. 40A is a perspective view of a non-magnetic portion in another example of the fifth embodiment.
Figure 40B:
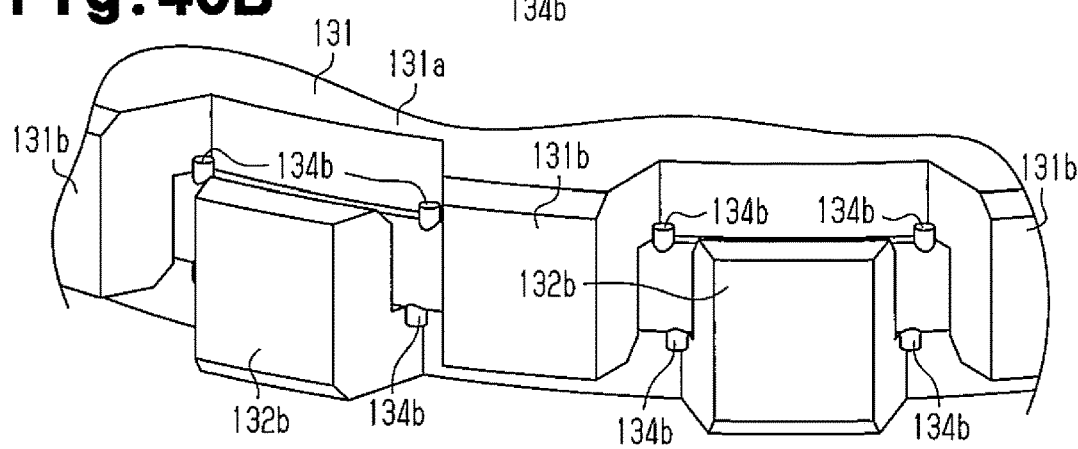
FIG. 40B is an explanatory diagram for explaining an assembled state of the non-magnetic portion shown in FIG. 40A.

Although it is not especially mentioned in the fifth embodiment, engagement projections which engage with the claw-shaped magnetic poles 131b and 132b may be arranged on the non-magnetic portion 134 as shown in FIGS. 39A to 40B. More specifically, as shown in FIG. 39A, engagement projections 134a projecting radially outward may be formed on a radial outer surface of the non-magnetic portion 134. According to this configuration, engagement projections 134b and the claw-shaped magnetic poles 131b and 132b engage with each other in the radial direction as shown in FIG. 39B. Engagement projections 134b projecting in the axial direction may be formed on an axial end surface of the non-magnetic portion 134 as shown in FIG. 40A. According to this configuration, the engagement projections 134b and the claw-shaped magnetic poles 131b and 132b engage with each other in the radial direction as shown in FIG. 40B. As described above, if the engagement projections 134a or 134b are provided and the non-magnetic portion 134 and the claw-shaped magnetic poles 131b and 132b are engaged with each other in the radial direction, it is possible to more reliably prevent the non-magnetic portion 134 from rotating. Hence, it is possible to more reliably prevent the annular magnet 133 from relatively rotating, and it is possible to restrain the annular magnet 133 from deviating in position in the circumferential direction.

Figure 38:
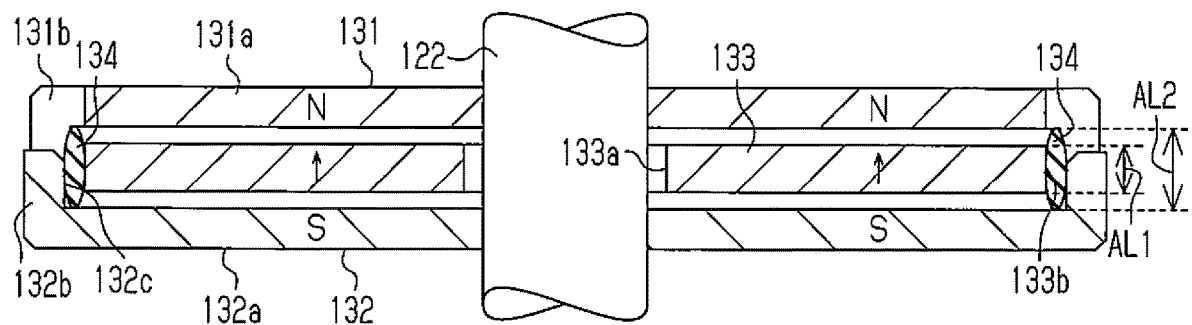
FIG. 38 is a sectional view of a rotor in another example of the fifth embodiment.

Although the axial lengths of the annular magnet 133 and the non-magnetic portion 134 are substantially equal to each other in the fifth embodiment, the present invention is not limited to this configuration. As shown in FIG. 38 for example, an axial length AL2 of the non-magnetic portion 134 may be longer than an axial length AL1 of the annular magnet 133. According to this configuration, the annular magnet can be separated away from the first and second rotor cores, and it is possible to restrain the annular magnet from being damaged.

Although the non-magnetic portion 134 is formed into the annular shape in the fifth embodiment and the other examples, the invention is not limited to this configuration. That is, a plurality of rod-shaped non-magnetic portions may be provided in the circumferential direction for example. Alternatively, the non-magnetic portion 134 may integrally be formed on the first rotor core 131, the second rotor core 132 or the annular magnet 133.

Figure 41A:
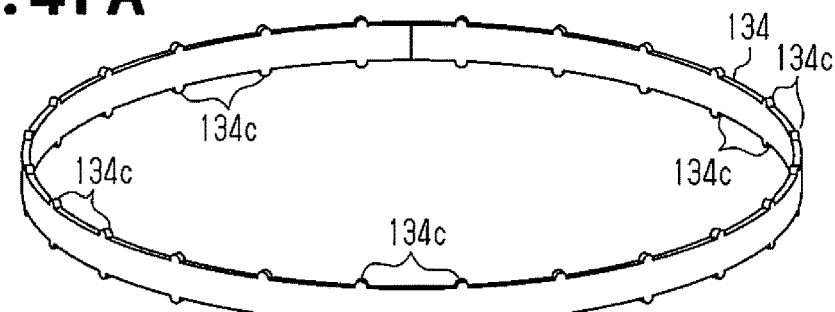
FIG. 41A is a perspective view of a non-magnetic portion in another example of the fifth embodiment.
Figure 41B:
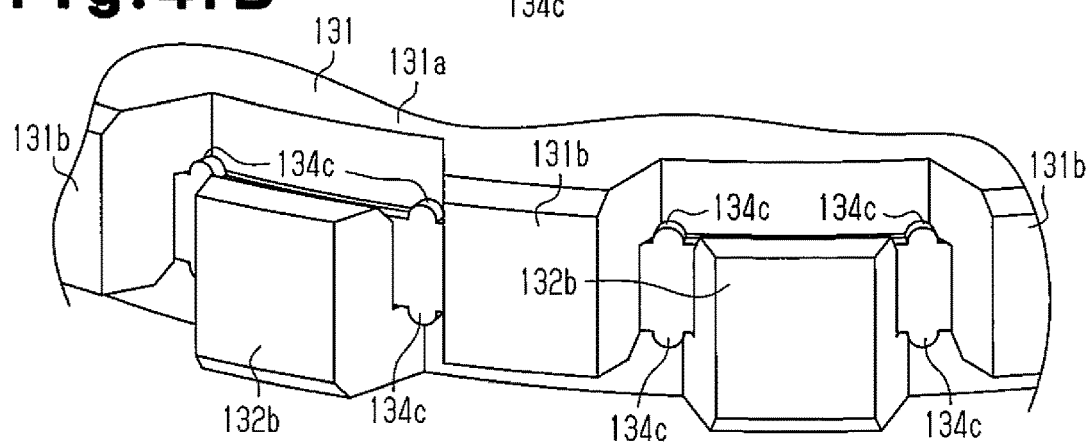
FIG. 41B is an explanatory diagram for explaining an assembled state of the non-magnetic portion shown in FIG. 41A.

Although the non-magnetic portion 134 is made of rubber material in the fifth embodiment, the material may appropriately be changed only if it is non-magnetic material. For example, the non-magnetic portion 134 may be made of non-magnetic metal such as stainless steel (SUS), copper and brass. When the non-magnetic portion 134 is made of non-magnetic metal, the non-magnetic portion 134 including engagement projections 134c (see FIGS. 41A and 41B) are punched out from metal sheet material. The punched material can be formed into an annular shape to form the annular non-magnetic portion 134 as shown in FIG. 41A. A shape of the engagement projection 134c may be substantially semi-circular shape as viewed from the radial direction as shown in FIG. 41B, or may be polygonal shape such as triangular shape and rectangular shape.

Although the segment conductor (SC) winding 118 is employed as the winding in the fifth embodiment, the winding is not limited to this.

Sixth Embodiment

A sixth embodiment of the motor will be described below in accordance with FIGS. 42 to 44. As show in FIG. 42, the motor is of multi-Lundell type structure and has a rotor and a stator both of which are of Lundell type structure. In this motor, a rotation shaft 201 is rotatably supported by a motor housing (not shown), and rotor portions of three-layer structure, i.e., rotor portions 203u, 203v and 203w are stacked in an axial direction of the rotation shaft 201 to configure the rotor 204.

The stator 206 of three-layer structure accommodated in a case 212 is placed around the rotor 204, and the case 212 is fixed to the motor housing.

The rotor portions 203u, 203v and 203w have the same configurations. Each of the rotor portions 203u, 203v and 203w has such a structure that substantially disk-shaped rotor cores 207a and 207b sandwich both upper and lower surfaces of a disk-shaped main magnet 208 in the axial direction. A plurality of (twelve for example) claw-shaped magnetic poles 202a are arranged on an outer periphery of the rotor core 207a at equal intervals from one another. The claw-shaped magnetic poles 202a extend toward the rotor core 207b along the axial direction of the rotation shaft 201. A plurality of (twelve for example) claw-shaped magnetic poles 202a are arranged on an outer periphery of the rotor core 207b at equal intervals from one another. The claw-shaped magnetic poles 202a extend toward the rotor core 207a along the axial direction of the rotation shaft 201.

The claw-shaped magnetic poles 202a and 202b are magnetized by the main magnet 208 into different polarities, and project from the rotor cores 207a and 207b in a staggered manner. According to this, the rotor portions 203u, 203v and 203w having twenty four poles are formed for example.

The rotation shaft 201 is relatively non-rotatably inserted through center portions of the rotor portions 203u, 203v and 203w configured in this manner in a state where the claw-shaped magnetic poles 202a and 202b of the rotor portions 203u, 203v and 203w are positioned such that they are displaced from one another by 60° in electrical angle.

The stator 206 includes stator portions 205u, 205v and 205w. Each of the stator portions 205u, 205v and 205w includes annular stator cores 210a and 210b, and a plurality of (twelve for example) claw-shaped magnetic poles 209a and 209b which are arranged on inner peripheries of the stator cores 210a and 210b, respectively. Like the claw-shaped magnetic poles 202a and 202b of the rotor cores 207a and 207b, the claw-shaped magnetic poles 209a and 209b vertically project from the stator cores 210a and 210b in a staggered manner.

Annular windings 211u, 211v and 211w extending along the circumferential direction of the stator cores 210a and 210b are mounted between the stator cores 210a and 210b. Three layer AC current can be supplied to the annular windings 211u, 211v and 211w.

Disk-shaped auxiliary magnets 213a and 213b having the same diameters as that of the main magnet 208 are respectively stacked on an upper surface of the rotor core 207a of the uppermost rotor portion 203u and a lower surface of the rotor core 207b of the lowermost rotor portion 203w.

Thicknesses t1 of the auxiliary magnets 213a and 213b are set in a range of 0.1×t0<t1<0.6×t0 when a thickness of the main magnet 208 is defined as t0.

The auxiliary magnet 213a is magnetized such that polarity of the lower surface of the auxiliary magnet 213a becomes the same as that of the upper surface of the main magnet 208 of the rotor portion 203u, and the auxiliary magnet 213b is magnetized such that polarity of the upper surface of the auxiliary magnet 213b becomes the same as that of the lower surface of the main magnet 208 of the rotor portion 203w.

According to this configuration, a magnetic flux distribution between the upper layer rotor portion 203u and the stator portion 205u, and a magnetic flux distribution between the intermediate layer rotor portion 203v and stator portion 205v are equalized. Further, a magnetic flux distribution between the lower layer rotor portion 203w and the stator portion 205w, and a magnetic flux distribution between the intermediate layer rotor portion 203v and stator portion 205v are equalized.

Figure 43:
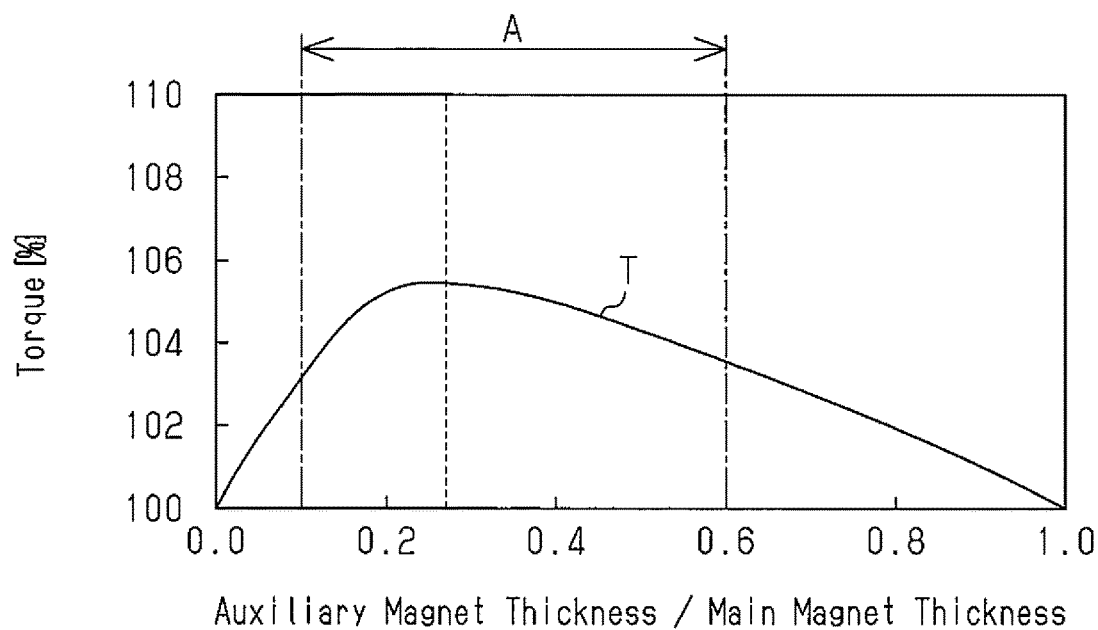
FIG. 43 is an explanatory diagram showing change in an average torque with respect to change in a ratio of thicknesses of a main magnet and an auxiliary magnet shown in FIG. 42.

FIG. 43 shows measured values T obtained by measuring variation in average torque when a ratio t1/t0 is varied, wherein t0 is the thickness of the main magnet 208 and t1 is the thicknesses of the auxiliary magnets 213a and 213b. In the measured values T, average torque when the auxiliary magnets 213a and 213b are not provided is 100.

As shown in FIG. 43, the average torque exceeds 103% when t1/t0 is in a range A of 0.1 to 0.6, and when t1/t0 is about 0.24, the average torque exceeds 105% and becomes the maximum value.

Figure 44:
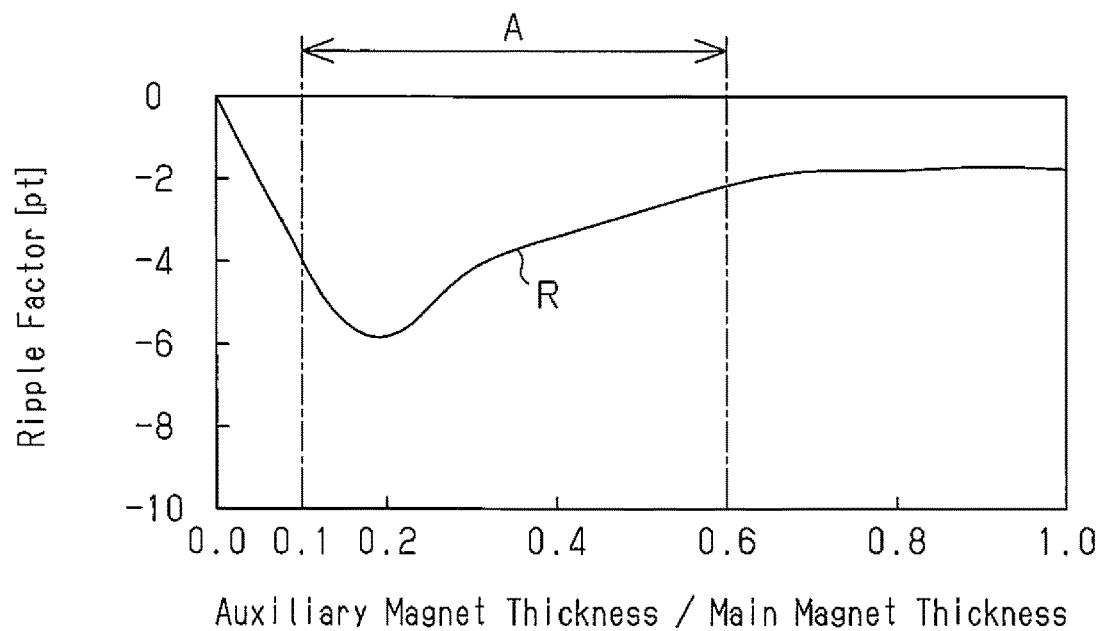
FIG. 44 is an explanatory diagram showing change in a ripple factor with respect to change in a ratio of thicknesses of the main magnet and the auxiliary magnet shown in FIG. 42.

Similarly, FIG. 44 shows measured values R obtained by measuring variation in ripple factor (pt) when the ratio t1/t0 is varied, wherein t0 is the thickness of the main magnet 208 and t1 is the thicknesses of the auxiliary magnets 213a and 213b. In the measured values R, ripple factor when the auxiliary magnets 213a and 213b are not provided is 0, and as the ripple factor is lowered, the measured values R becomes minus.

As shown in FIG. 44, the ripple factor is lowered to about −2 pt in a range A where t1/t0 is 0.1 to 0.6, and when (t1/t0) is about 0.2, the ripple factor becomes the minimum value of about −6 pt.

As described above, when t1/t0 is in the range A of 0.1 to 0.6, the average torque is reliably enhanced, and the ripple factor is reduced.

According to the motor of the multi-Lundell type structure of the sixth embodiment, the following advantages can be obtained.

(20) Torque ripple of output torque which is output from the rotation shaft 201 can be reduced, and average torque can be enhanced.

(21) Torque ripple of output torque can be reduced, and noise and vibration can be reduced.

(22) As compared with a case where the auxiliary magnets 213a and 213b are not provided, average torque can be enhanced by about 3% within the range A where t1/t0 is 0.1 to 0.6.

(23) As compared with a case where the auxiliary magnets 213a and 213b are not provided, ripple factor can be lowered to at least about −3 pt within the range A where t1/t0 is 0.1 to 0.6.

(24) When t1/t0 is about 0.24, average torque can be enhanced most and can be 105%.

(25) When t1/t0 is about 0.2, ripple factor can be enhanced most and can be −6.

The sixth embodiment may be carried out in the following manner.

The rotor portions and the stator portions may not be of three-layer structure and may be of multi-layer structure.

Seventh Embodiment

A seventh embodiment of the motor will be described below.

Figure 45:
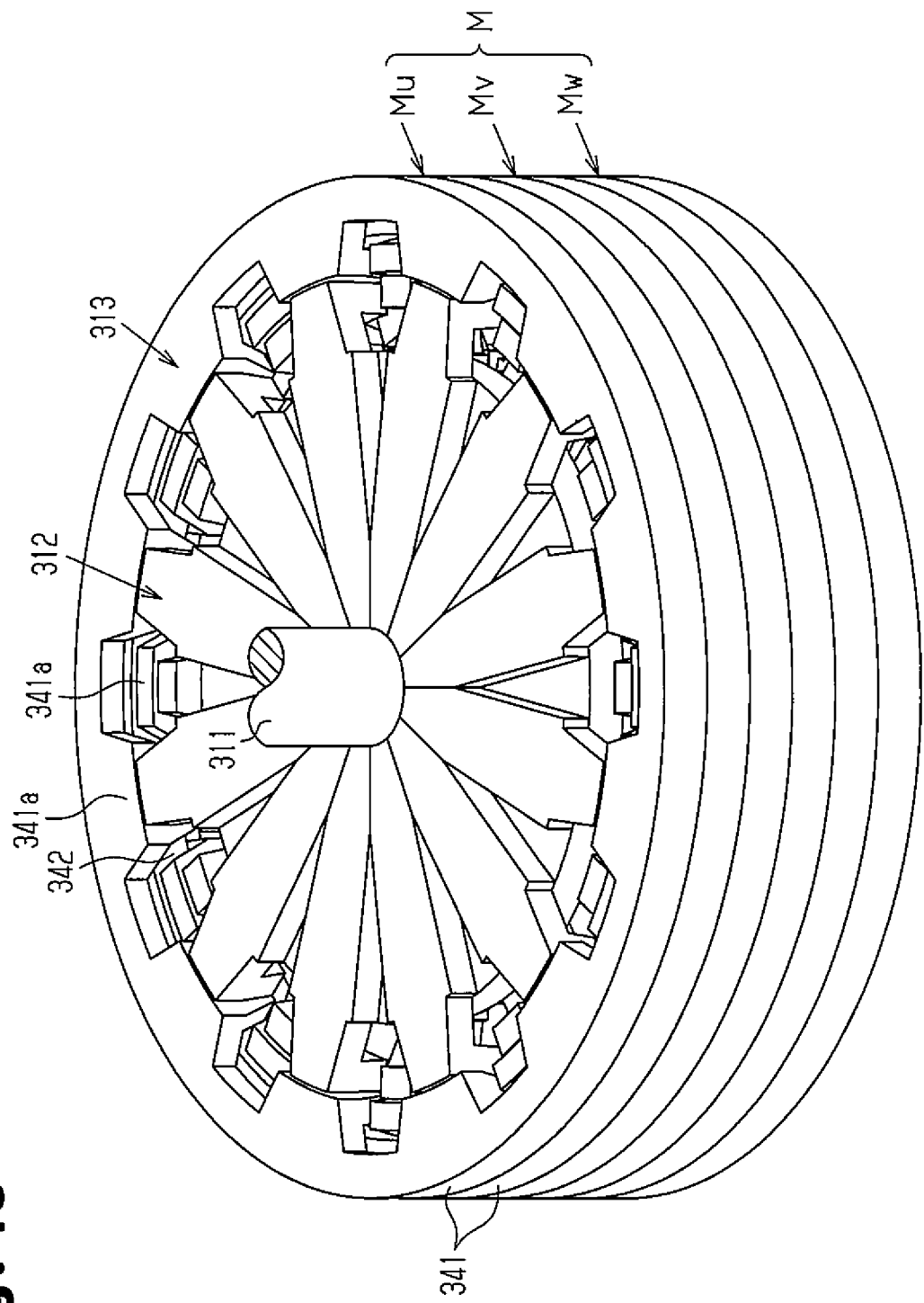
FIG. 45 is a perspective view of a motor according to a seventh embodiment of the present invention.

FIG. 45 is a perspective view of an entire brushless motor M of the seventh embodiment.

An annular stator 313 fixed to a motor housing (not shown) is placed on an outer side of a rotor 312 which is fixed to a rotation shaft 311. The brushless motor M is configured by stacking three single motor portions in an axial direction of the motor, and a U-phase motor portion Mu, a V-phase motor portion My and a W-phase motor portion Mw are stacked from above in this order.

Figure 46:
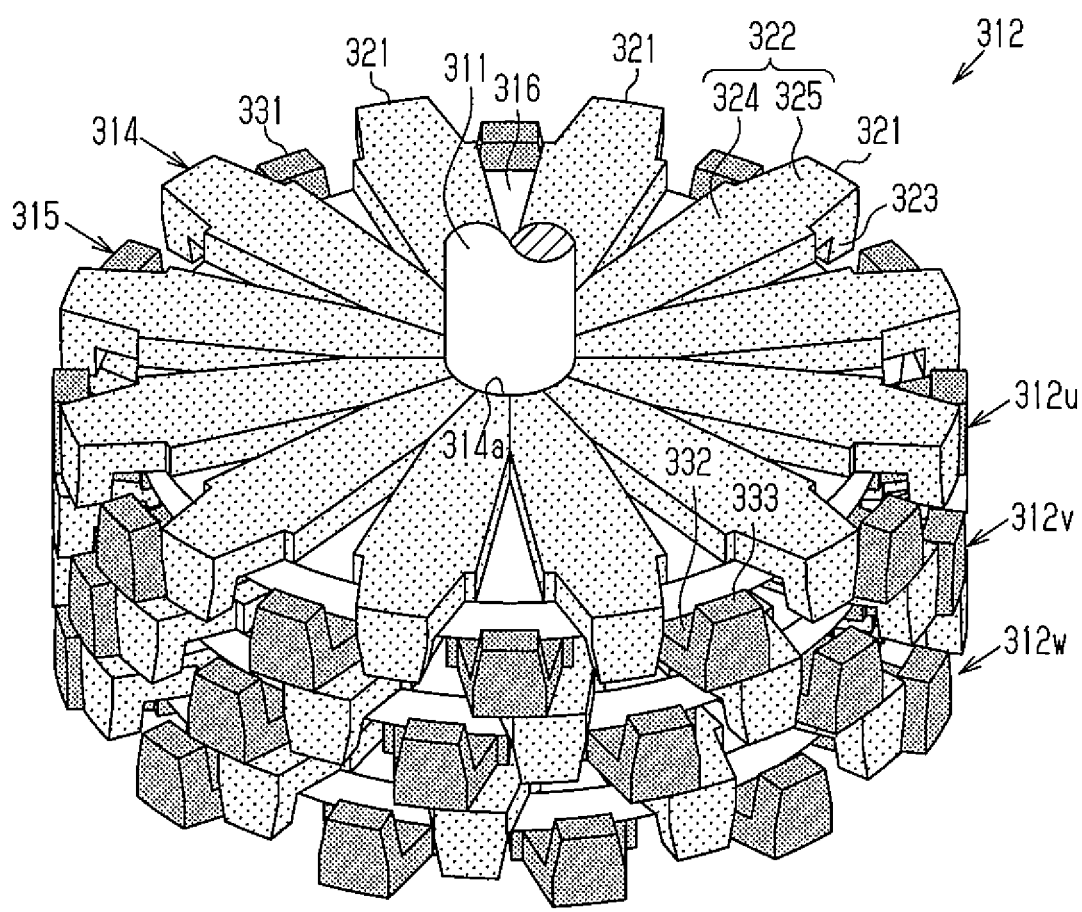
FIG. 46 is a perspective view of a rotor shown in FIG. 45.

As shown in FIG. 46, the rotor 312 includes three rotors, i.e., a U-phase rotor 312u, a V-phase rotor 312v and a W-phase rotor 312w. The rotors 312u, 312v and 312w have the same configurations.

Figure 47:
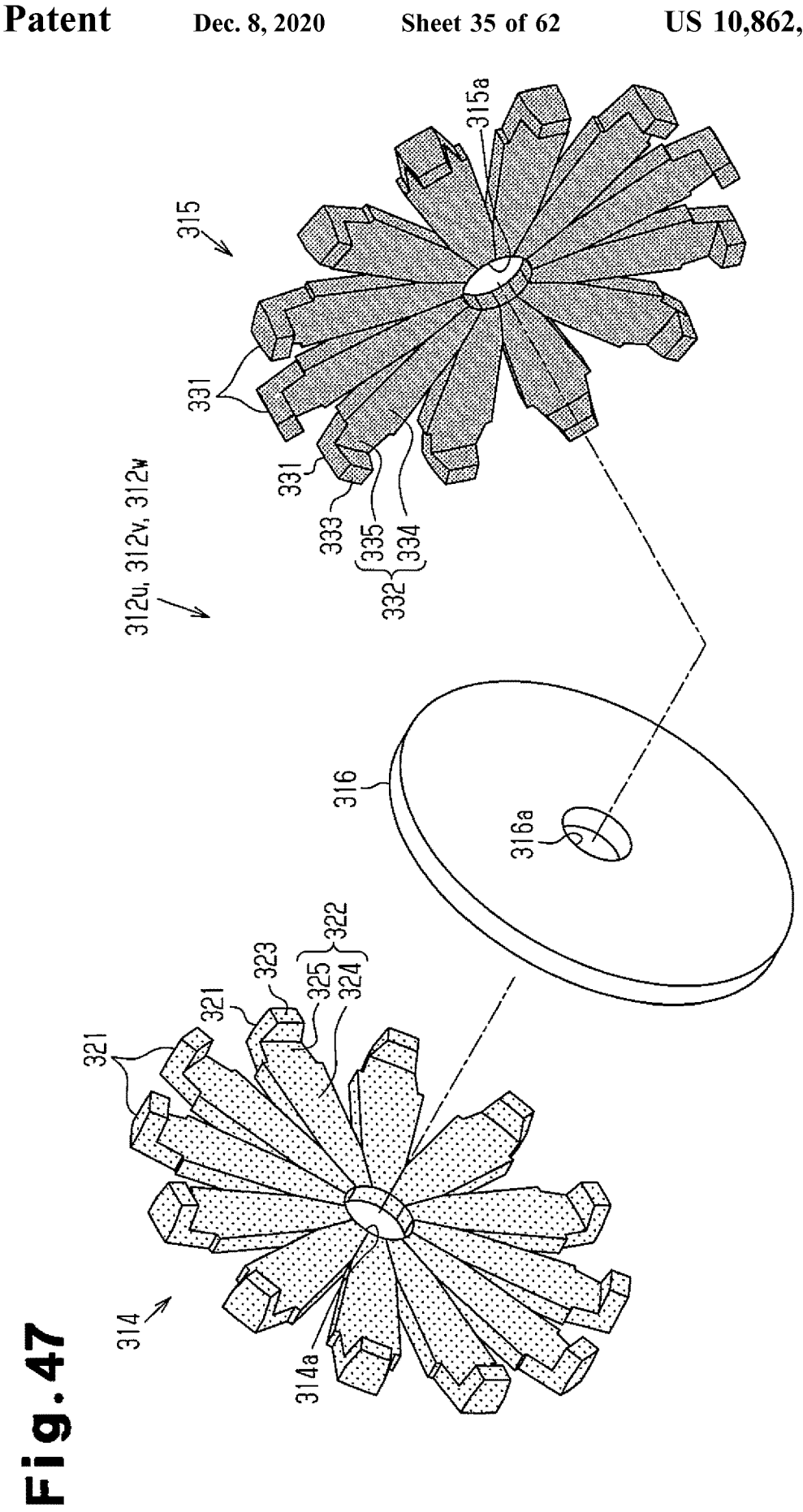
FIG. 47 is an exploded perspective view of a single rotor shown in FIG. 46.

As shown in FIGS. 46 and 47, each of the rotors 312u, 312v and 312w includes a first rotor core 314, a second rotor core 315 and a field magnet 316, and is of so-called Lundell type structure. The field magnet 316 has a disk shape, and a shaft-through hole 316a is formed in a center of the field magnet 316. Both axial end surfaces of the field magnet 316 are flat surfaces.

The first rotor core 314 includes a plurality of (twelve in seventh embodiment) first divided claw-shaped magnetic poles 321 (first claw-shaped magnetic poles) which are annularly placed in the circumferential direction and which have the same shapes. Each of the first divided claw-shaped magnetic poles 321 is punched out from a directional electromagnetic steel plate. Each of the first divided claw-shaped magnetic poles 321 includes an extending portion 322 which extends in the radial direction, and a claw 323 which extends to one side of the axial direction from radial outer end of the extending portion 322.

The extending portion 322 of each of the first divided claw-shaped magnetic poles 321 includes an abutting portion 324 which abuts against one of axial end surfaces of the field magnet 316, and an outer peripheral projection 325 which projects from the abutting portion 324 toward outer peripheries of the motor portions. The abutting portions 324 of the first divided claw-shaped magnetic poles 321 are arranged radially centering on the axis of the rotation shaft 311, and radial inner ends of adjacent abutting portions 324 are fixed to each other by adhesion or welding. A circumferential width of each of the abutting portions 324 is narrowed toward its inner peripheral side. Inner peripheral end surfaces of the abutting portions 324 configure a shaft-fixing hole 314a into which the rotation shaft 311 is inserted and fixed. Boundary lines of the adjacent abutting portions 324 form straight lines extending along the radial direction, and the boundary lines are located at equal intervals from one another in the circumferential direction.

Each of the outer peripheral projections 325 is located closer to the outer peripheries of the motor portions than an outer peripheral surface of the field magnet 316, and the outer peripheral projection 325 does not come into contact with the field magnet 316. A circumferential width of the outer peripheral end of the abutting portion 324 is wider than the outer peripheral projection 325. The outer peripheral projection 325 is formed into a trapezoidal shape which is narrowed in width toward the outer periphery as viewed from the axial direction.

The claw 323 is formed by bending an outer peripheral end of the outer peripheral projection 325 at right angles, and the outer peripheral surface of the claw 323 is opposed to the stator 313.

The second rotor core 315 has the same configuration as that of the first rotor core 314. That is, the second rotor core 315 includes a plurality of second divided claw-shaped magnetic poles 331 (second claw-shaped magnetic poles) including an extending portion 332 (including abutting portion 334 and outer peripheral projection 335) and a claw 333. The second divided claw-shaped magnetic poles 331 have the same shapes as those of the first divided claw-shaped magnetic poles 321 of the first rotor core 314.

The first and second rotor cores 314 and 315 are placed such that projections of the claws 323 and 333 are opposed to each other, and are combined with each other such that the claws 323 and 333 are alternately arranged at equal intervals from one another in the circumferential direction, and such that predetermined gaps are generated between the adjacent claws 323 and 333.

The field magnet 316 is sandwiched between the abutting portions 324 of the first divided claw-shaped magnetic poles 321 and the abutting portions 334 of the second divided claw-shaped magnetic poles 331. The abutting portions 324 and 334 abut against both axial end surfaces of the field magnet 316. One of the axial end surfaces (first axial end surface) of the field magnet 316 is exposed from gaps between the adjacent abutting portions 324, and the other axial end surface (second axial end surface) of the field magnet 316 is exposed from gaps between the adjacent abutting portions 334.

The rotation shaft 311 is inserted through the shaft-through hole 316a of the field magnet 316, and is inserted through the shaft-fixing holes 314a and 315a of the rotor cores 314 and 315. The rotation shaft 311 is fixed to the field magnet 316 and the rotor cores 314 and 315 by adhesive or the like. An outer peripheral surface of the field magnet 316 is opposed to back surfaces (inner peripheral surfaces) of the claws 323 and 333 through gaps in the radial direction. The field magnet 316 is magnetized in the axial direction such that one axial side surface thereof which abuts against the first rotor core 314 becomes north pole and one axial side surface thereof which abuts against the second rotor core 315 becomes south pole. That is, by this field magnet 316, the claws 323 of the first divided claw-shaped magnetic poles 321 function as north pole and claws 333 of the second divided claw-shaped magnetic poles 331 function as south poles. A neodymium magnet is used as the field magnet 316 for example.

The three-phase rotors 312u, 312v and 312w configured as described above are of so-called Lundell type structure using the field magnet 316. The three-phase rotors 312u, 312v and 312w are stacked on one another in the axial direction such that they are displaced from one another by 120° in electrical angle (see FIG. 46).

In the seventh embodiment, a stator of so-called Lundell type structure including a pair of stator cores 341 and a pair of coil portions 342 each including a claw-shaped magnetic pole 341a is employed for each of the stators 313 of the three-phase motor portions Mu, My and Mw (see FIG. 45). If AC voltage of corresponding phase is applied to the coil portions 342 of the three-phase stators 313, rotating field is generated and the rotor 312 rotates.

[Producing Method of First and Second Rotor Cores]

Figure 48:
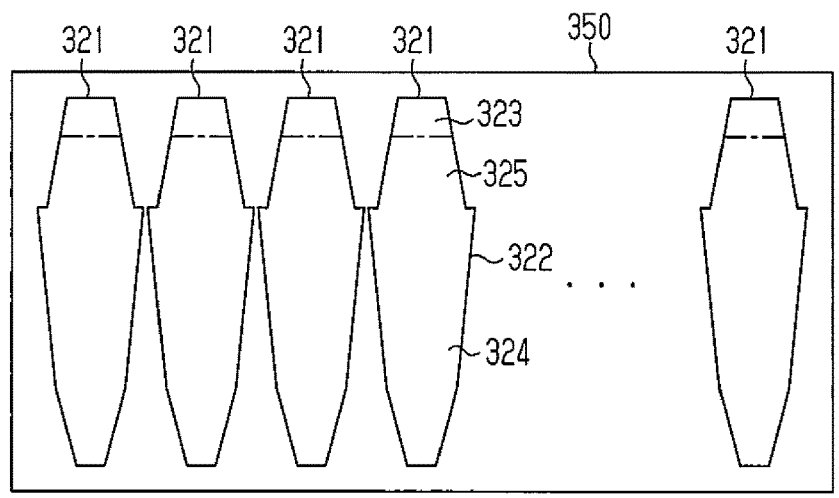
FIG. 48 is a schematic diagram for explaining a producing mode of the rotor shown in FIG. 47.
Figure 49:
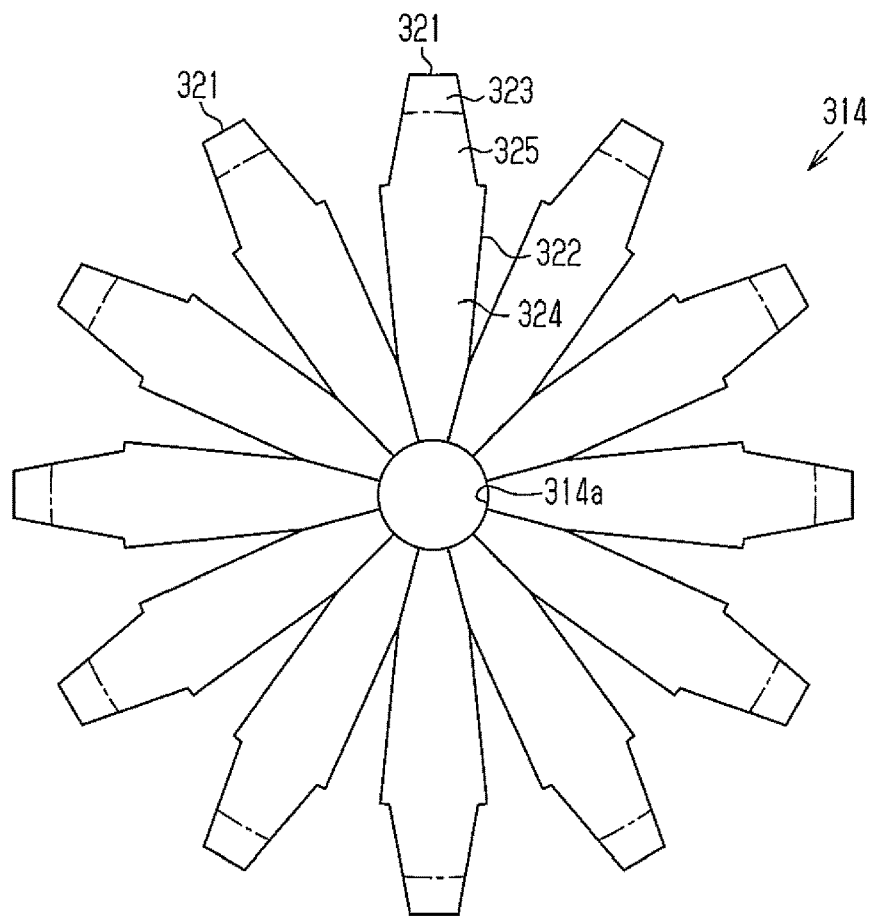
FIG. 49 is a schematic diagram for explaining a producing mode of the rotor shown in FIG. 47.

A producing method and operations of the first and second rotor cores 314 and 315 of the seventh embodiment will be described in accordance with FIGS. 48 and 49. FIGS. 48 and 49 show a producing manner of the first rotor core 314.

As shown in FIG. 48, the plurality of first divided claw-shaped magnetic poles 321 are punched out from an electromagnetic steel plate 350 by metal punching. At this time, the extending portions 322 and claws 323 (not yet bent) are formed on the first divided claw-shaped magnetic poles 321. The plurality of first divided claw-shaped magnetic poles 321 are punched out in a state where they are arranged in lines on a straight line such that the extending portions 322 are arranged in parallel to each other. The electromagnetic steel plate 350 is a directional electromagnetic steel plate which is easily magnetized only in one direction. A punching direction is set such that a magnetic characteristic direction (easily magnetized direction) and a longitudinal direction of the first divided claw-shaped magnetic pole 321 (extending portion 322) to be punched match with each other. The magnetic characteristic direction of the electromagnetic steel plate 350 matches with a rolling direction of the electromagnetic steel plate 350.

Next, as shown in FIG. 49, the plurality of punched first divided claw-shaped magnetic poles 321 are radially placed such that base ends thereof (ends opposite from the claws) are in contact with each other, and the base ends are fixed to one another through adhesive or welding.

Next, the claws 323 of the plurality of first divided claw-shaped magnetic poles 321 are bent in the same direction at right angles. According to this, the first rotor core 314 is completed. Since a producing method of the second rotor core 315 is the same that of the first rotor core 314, detailed description thereof will be omitted.

According to this producing method, since the first and second divided claw-shaped magnetic poles 321 and 331 are punched out from the electromagnetic steel plate 350 in a state where they are arranged on a straight line, a waste of the electromagnetic steel plate 350 can be reduced as compared with a case where the rotor core is not divided and the magnetic poles are punched out in their annular state, and yield is enhanced.

Next, characteristic advantages of the seventh embodiment will be described below.

(26) The first and second divided claw-shaped magnetic poles 321 and 331 respectively include the extending portions 322 and 332 extending in the radial direction, and claws 323 and 333 extending in the axial direction from radial outer ends of the extending portions 322 and 332. The field magnet 316 is placed between the extending portions 322 and 332 in the axial direction. The axial one end surface of the field magnet 316 is exposed from the gaps between the extending portions 322, and the axial other end surface of the field magnet 316 is exposed from the gaps between the extending portions 332. According to this configuration, it is possible to reduce volumes of the first and second rotor cores 314 and 315 as compared with a configuration that disk portions (core bases) which sandwich the field magnet 316 are arranged on the rotor core. According to this, a weight of the rotor can be reduced.

(27) The rotor cores 314 and 315 respectively including the divided claw-shaped magnetic poles 321 and 331 which are divided from each other. According to this, it is possible to configure the rotor cores 314 and 315 by punching the plurality of divided claw-shaped magnetic poles 321 and the plurality of divided claw-shaped magnetic poles 331 from the electromagnetic steel plate 350 such that the divided claw-shaped magnetic poles 321 and 331 are arranged on a straight line, and by annularly (radially) placing the plurality of divided claw-shaped magnetic poles 321 and the plurality of divided claw-shaped magnetic poles 331. Hence, a waste of the electromagnetic steel plate 350 can be reduced as compared with a case where the rotor core is not divided in the circumferential direction and the magnetic poles are punched out from a steel plate. As a result, yield can be enhanced. By dividing the rotor cores 314 and 315 for every divided claw-shaped magnetic pole, magnetic fluxes are easily distributed equally for the divided claw-shaped magnetic poles. As a result, it can be expected that output is enhanced and torque pulsation is reduced.

(28) Each of the divided claw-shaped magnetic poles 321 and 331 is punched out from the electromagnetic steel plate 350 which is the directional electromagnetic steel plate and is formed, the magnetic characteristic direction of the electromagnetic steel plate 350 matches with the longitudinal direction of the divided claw-shaped magnetic poles 321 and 331 (extending portions 322 and 332). According to this, magnetic fluxes easily flow in the radial direction in the extending portions 322 and 332 of the divided claw-shaped magnetic poles 321 and 331. As a result, this configuration can contribute enhancement of output.

(29) The claws 323 and 333 of the divided claw-shaped magnetic poles 321 and 331 are formed by bending in the axial direction. Hence, the claws 323 and 333 can easily be formed.

The seventh embodiment may be changed as follows.

Although the claws 323 and 333 are formed by bending in the seventh embodiment, the claws 323 and 333 may be formed separately from the extending portions 322 and 332 for example.

A fixing method of the first divided claw-shaped magnetic poles 321 (second divided claw-shaped magnetic poles 331) to one another is not limited to adhesion or welding. For example, inner peripheral ends of the divided claw-shaped magnetic poles 321 and 331 (inner peripheral ends of abutting portions 324 and 334) are projected axially outward (direction opposite from field magnet). The first divided claw-shaped magnetic poles 321 (second divided claw-shaped magnetic poles 331) may be connected to one another by collectively fitting the projecting portions of the inner peripheral ends into an annular connecting member.

Figure 50:
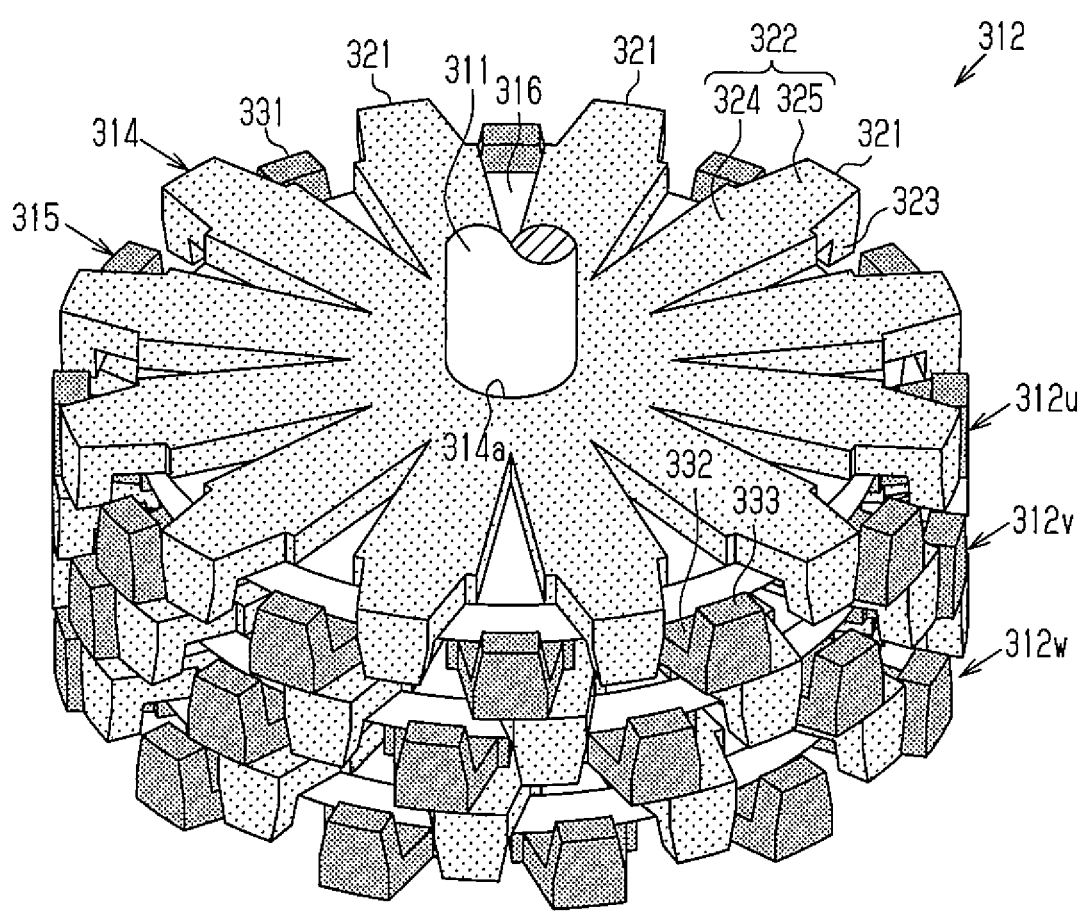
FIG. 50 is a perspective view of a rotor in another example of the seventh embodiment.

In the seventh embodiment, the plurality of divided claw-shaped magnetic poles 321 (331) are punched and formed and then, they are connected to one another, thereby forming the rotor core 314 (315), but the present invention is not limited to this configuration. For example, the rotor core may be punched in a state where the claw-shaped magnetic poles are not divided and are integral as shown in FIG. 50 for example. That is, the present invention is not limited to the configuration that the claw-shaped magnetic poles are divided for each of magnetic poles as in the seventh embodiment.

The number of the divided claw-shaped magnetic poles 321 and 331 (i.e., number of magnetic poles) is not limited to the seventh embodiment, and the number may appropriately be changed in accordance with configurations.

Although the present invention is embodied in the inner rotor type brushless motor M in which the rotor 312 is placed on the side of the inner periphery of the stator 313 in the seventh embodiment, the invention is not especially limited to this configuration. The invention may be embodied in an outer rotor type motor in which the rotor is placed on the side of an outer periphery of the stator.

Eighth Embodiment

An eighth embodiment of the motor will be described below.

Figure 51:
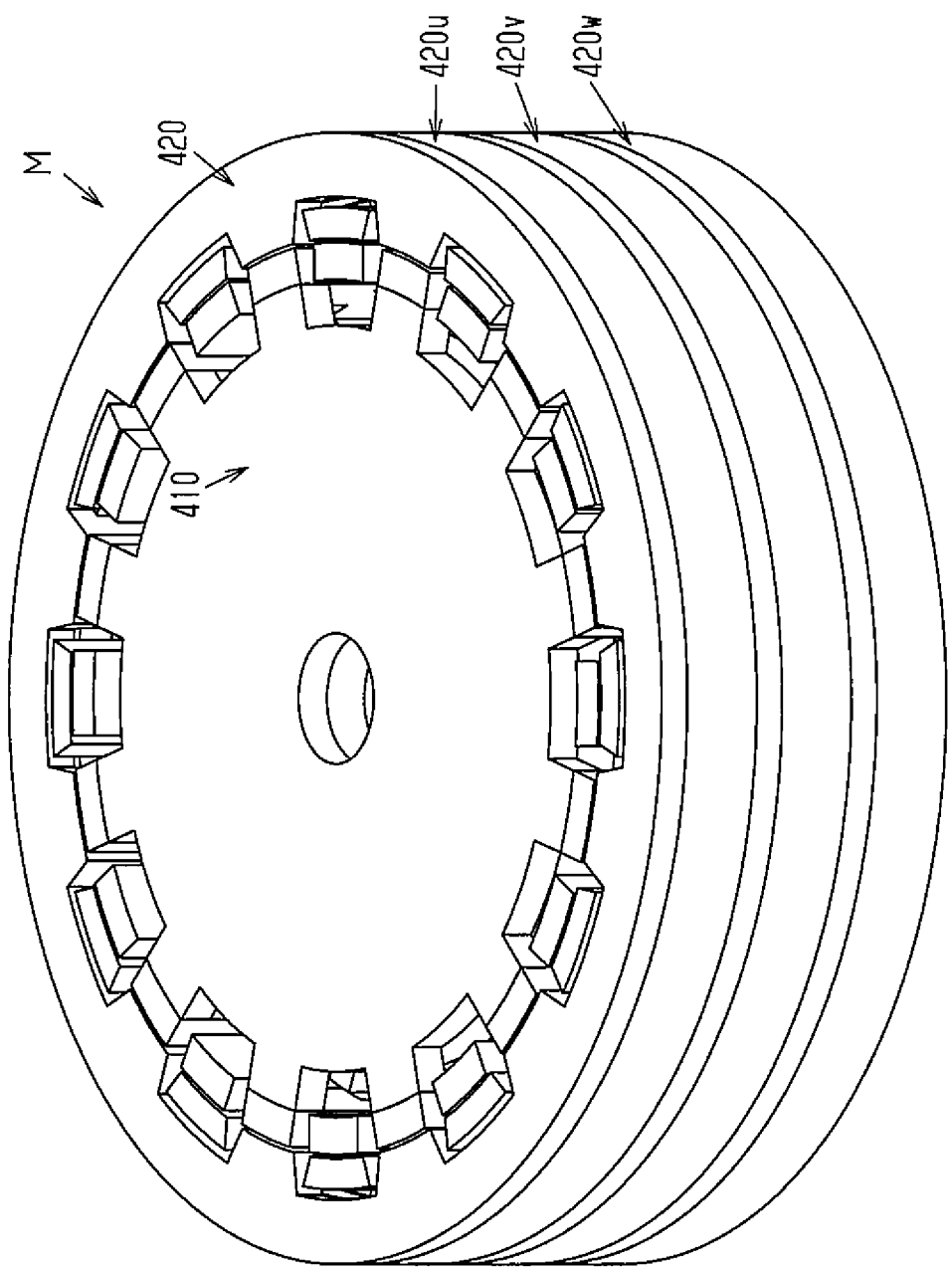
FIG. 51 is a perspective view of a motor according to an eighth embodiment of the present invention.

As shown in FIG. 51, a motor M of the eighth embodiment includes a rotor 410 fixed to a rotation shaft (not shown), and an annular stator 420 placed on the outer side of the rotor 410.

[Configuration of Rotor]

Figure 52:
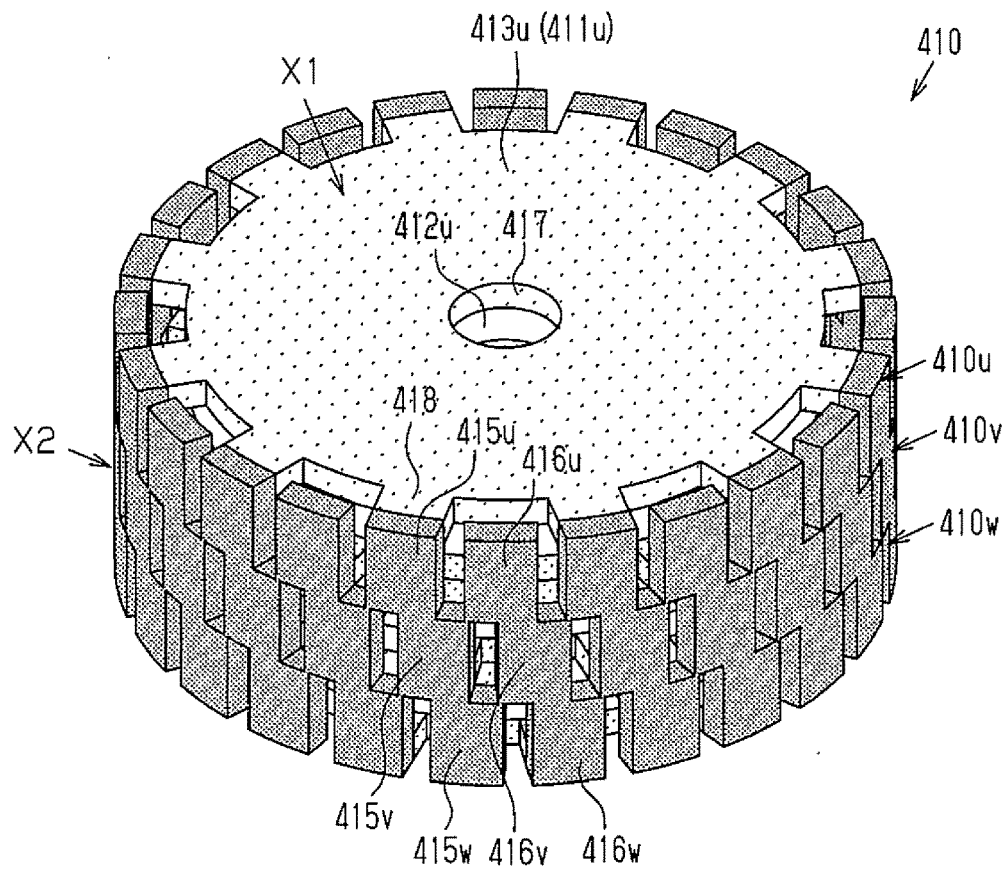
FIG. 52 is a perspective view of a rotor shown in FIG. 51.
Figure 53:
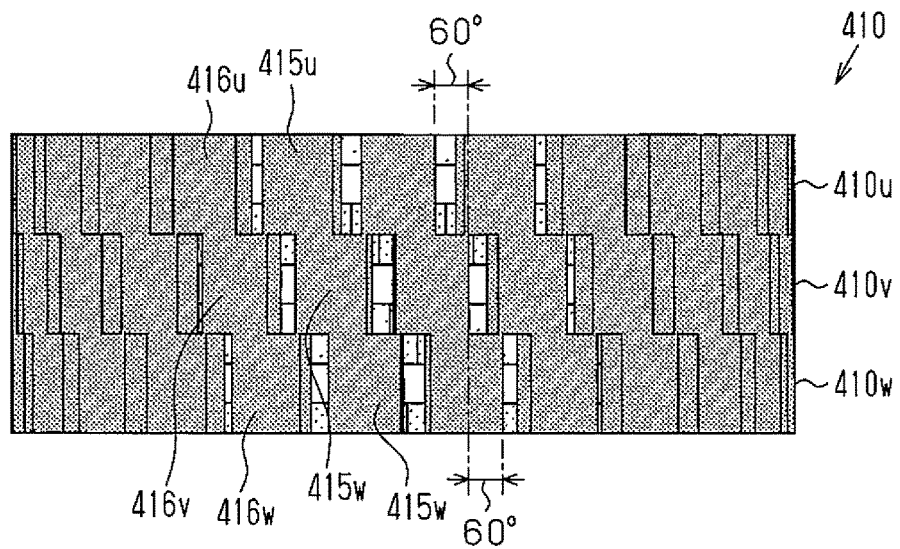
FIG. 53 is a side view of the rotor shown in FIG. 52.

As shown in FIGS. 52, 53 and 54, the rotor 410 includes a U-phase rotor 410u, a V-phase rotor 410v and a W-phase rotor 410w (three-phase single rotors) arranged in the axial direction. The U-phase rotor 410u includes a U-phase rotor core 411u and a field magnet 412u. The V-phase rotor 410v includes a V-phase rotor core 411v and a field magnet 412v. The W-phase rotor 410w includes a W-phase rotor core 411w and a field magnet 412w.

The U-phase rotor core 411u includes substantially disk-shaped first and second core bases 413u and 414u which sandwich the field magnet 412u in the axial direction, and a plurality of first claw-shaped magnetic poles 415u and a plurality of second claw-shaped magnetic poles 416u respectively arranged on outer peripheries of the core bases 413u and 414u. The plurality of first claw-shaped magnetic poles 415u and the plurality of second claw-shaped magnetic poles 416u are alternately arranged in the circumferential direction. Similarly, the V-phase rotor core 411v includes substantially disk-shaped first and second core bases 413v and 414v which sandwich the field magnet 412v in the axial direction, and a plurality of first claw-shaped magnetic poles 415v and a plurality of second claw-shaped magnetic poles 416v respectively arranged on outer peripheries of the core bases 413v and 414v. The plurality of first claw-shaped magnetic poles 415v and the plurality of second claw-shaped magnetic poles 416v are alternately arranged in the circumferential direction. Similarly, the W-phase rotor core 411w includes substantially disk-shaped first and second core bases 413w and 414w which sandwich the field magnet 412w in the axial direction, and a plurality of first claw-shaped magnetic poles 415w and a plurality of second claw-shaped magnetic poles 416w respectively arranged on outer peripheries of the core bases 413w and 414w. The plurality of first claw-shaped magnetic poles 415w and the plurality of second claw-shaped magnetic poles 416w are alternately arranged in the circumferential direction.

As shown in FIG. 54, a fixing hole 417 is formed in radial centers of the core bases 413u and 414u of the U-phase rotor core 411*u* and the rotation shaft is fixed to the fixing hole 417. A plurality of (twelve in eighth embodiment) projections 418 are formed on outer peripheral edges of the core bases 413*u* and 414*u* at equal intervals from one another. The projections 418 project radially outward. The projections 418 of the first core base 413*u* and the projections 418 of the second core base 414*u* are alternately located in the circumferential direction.

The field magnet 412*u* sandwiched between the first and second core bases 413*u* and 414*u* is an annular plate-shaped ferrite magnet for example. The field magnet 412*u* is magnetized in the axial direction such that a portion thereof closer to the first core base 413*u* becomes north pole, and a portion thereof closer to the second core base 414*u* becomes south pole.

The core bases 413*v* and 414*v* and the field magnet 412*v* of the V-phase rotor 410*v* have the same shapes as those of the core bases 413*u* and 414*u* and the field magnet 412*u* of the U-phase rotor 410*u*. The U-phase rotor core 411*u* and the V-phase rotor core 411*v* are stacked on each other in the axial direction such that their second core bases 414*u* and 414*v* abut against each other.

The core bases 413*w* and 414*w* and the field magnet 412*w* of the W-phase rotor 410*w* also have the same shapes as those of the core bases 413*u* and 414*u* and the field magnet 412*u* of the U-phase rotor 410*u*. The V-phase rotor core 411*v* and the W-phase rotor core 411*w* are stacked on each other in the axial direction such that their first core bases 413*v* and 413*w* abut against each other.

Magnetization directions of the field magnets 412*u* and 412*w* of the U-phase rotor 410*u* and the W-phase rotor 410*w* are the same (upward in FIG. 54), and magnetization directions of the field magnet 412*v* of the V-phase rotor 410*v* are opposite from the magnetization directions of the U-phase and W-phase field magnets 412*u* and 412*w*. That is, in the rotors 410*u*, 410*v* and 410*w*, portions of the field magnets 412*u*, 412*v* and 412*w* closer to the first core bases 413*u*, 413*v* and 413*w* become north poles, and portions of the field magnets 412*u*, 412*v* and 412*w* closer to the second core bases 414*u*, 414*v* and 414*w* become south poles.

In the rotor 410 of the eighth embodiment, an integral part including the first core bases 413*u*, 413*v* and 413*w*, the second core bases 414*u*, 414*v* and 414*w* and the field magnets 412*u*, 412*v* and 412*w* which are stacked one another in the axial direction is called a center member X1. A substantially cylindrical outer peripheral member X2 (annular member) is fixed to an outer periphery of the center member X1. The outer peripheral member X2 includes claw-shaped magnetic poles 415*u*, 415*v*, 415*w*, 416*u*, 416*v* and 416*w* which are integrally formed together. The outer peripheral member X2 is formed in such a manner that an electromagnetic steel plate is subjected to lightening at predetermined locations thereof (portions between claw-shaped magnetic poles 415*u* to 415*w* and 416*u* to 416*w* in circumferential direction) and then, the electromagnetic steel plate is rolled into an annular shape.

The first claw-shaped magnetic poles 415*u*, 415*v* and 415*w* and the second claw-shaped magnetic poles 416*u*, 416*v* and 416*w* are alternately placed at equal intervals from one another in the circumferential direction. In the eighth embodiment, the number of the first claw-shaped magnetic poles 415*u*, 415*v* and 415*w* and the number of the second claw-shaped magnetic poles 416*u*, 416*v* and 416*w* are twelve (the same as that of the projections 418). The U-phase first and second claw-shaped magnetic poles 415*u* and 416*u*, the V-phase first and second claw-shaped magnetic poles 415*v* and 416*v*, and the W-phase first and second claw-shaped magnetic pole 415*w* and 416*w* are arranged in the axial direction in the order of U-phase, V-phase and W-phase. In the eighth embodiment, all of the claw-shaped magnetic poles 415*u* to 415*w* and 416*u* to 416*w* have the same shapes, and the shapes are rectangular as viewed from the radial direction.

As shown in FIGS. 53 and 54, the claw-shaped magnetic poles 415*u* and 416*u*, the claw-shaped magnetic poles 415*v* and 416*v* and the claw-shaped magnetic poles 415*w* and 416*w* are placed such that they are displaced from one another in phase by 60° (electrical angle) in the counterclockwise direction. More specifically, the V-phase claw-shaped magnetic poles 415*v* and 416*v* are placed such that they are displaced from the U-phase claw-shaped magnetic poles 415*u* and 416*u* in phase by 60° in electrical angle (5° in mechanical angle) in the counterclockwise direction, and the W-phase claw-shaped magnetic pole 415*w* and 416*w* are placed such that they are displaced from the V-phase claw-shaped magnetic poles 415*v* and 416*v* in phase by 60° in electrical angle in the counterclockwise direction.

The first claw-shaped magnetic poles 415*u*, 415*v* and 415*w* and the second claw-shaped magnetic poles 416*u*, 416*v* and 416*w* are integrally formed from one electromagnetic steel plate as described above, and the claw-shaped magnetic poles 415*u* to 415*w* and 416*u* to 416*w* are integrally connected to one another at predetermined locations. More specifically, the U-phase claw-shaped magnetic poles 415*u* and 416*u* are connected to the first and second claw-shaped magnetic poles 415*v* and 416*v* (V-phase) which are located on a lower part. The W-phase claw-shaped magnetic poles 415*w* and 416*w* are connected to the first and second claw-shaped magnetic poles 415*v* and 416*v* (V-phase) which are located on an upper part. That is, the claw-shaped magnetic poles 415*u* to 415*w* and 416*u* to 416*w* are integrally connected to both the first and second claw-shaped magnetic poles which are adjacent to each other in the axial direction.

As shown in FIGS. 52 and 54, the center member X1 including the core bases 413*u* to 413*w* and 414*u* to 414*w* and the field magnets 412*u*, 412*v* and 412*w* is press fitted into the outer peripheral member X2 which is configured as described above.

Lengths of the U-phase claw-shaped magnetic poles 415*u* and 416*u* in the axial direction are equal to a length from an end surface of the U-phase first core base 413*u* which is opposed from an end surface thereof closer to the magnet to an end surface of the second core base 414*u* (surface thereof which abuts against V-phase second core base 414*v*) opposite from an end surface thereof closer to the magnet. Similarly, lengths of the V-phase first and second claw-shaped magnetic poles 415*v* and 416*v* in the axial direction are equal to a length from an end surface of the V-phase second core base 414*v* (surface thereof which abuts against U-phase second core base 414*u*) which is opposed from an end surface thereof closer to the magnet to an end surface of the first core base 413*v* (surface thereof which abuts against W-phase first core base 413*w*) opposite from an end surface thereof closer to the magnet. Similarly, lengths of the W-phase first and second claw-shaped magnetic poles 415*w* and 416*w* in the axial direction are equal to a length from an end surface of the W-phase first core bases 413*w* (surface thereof which abuts against V-phase first core base 413*v*) which is opposed from an end surface thereof closer to the magnet to an end surface of the second core base 414*w* opposite from an end surface thereof closer to the magnet.

Figure 55:
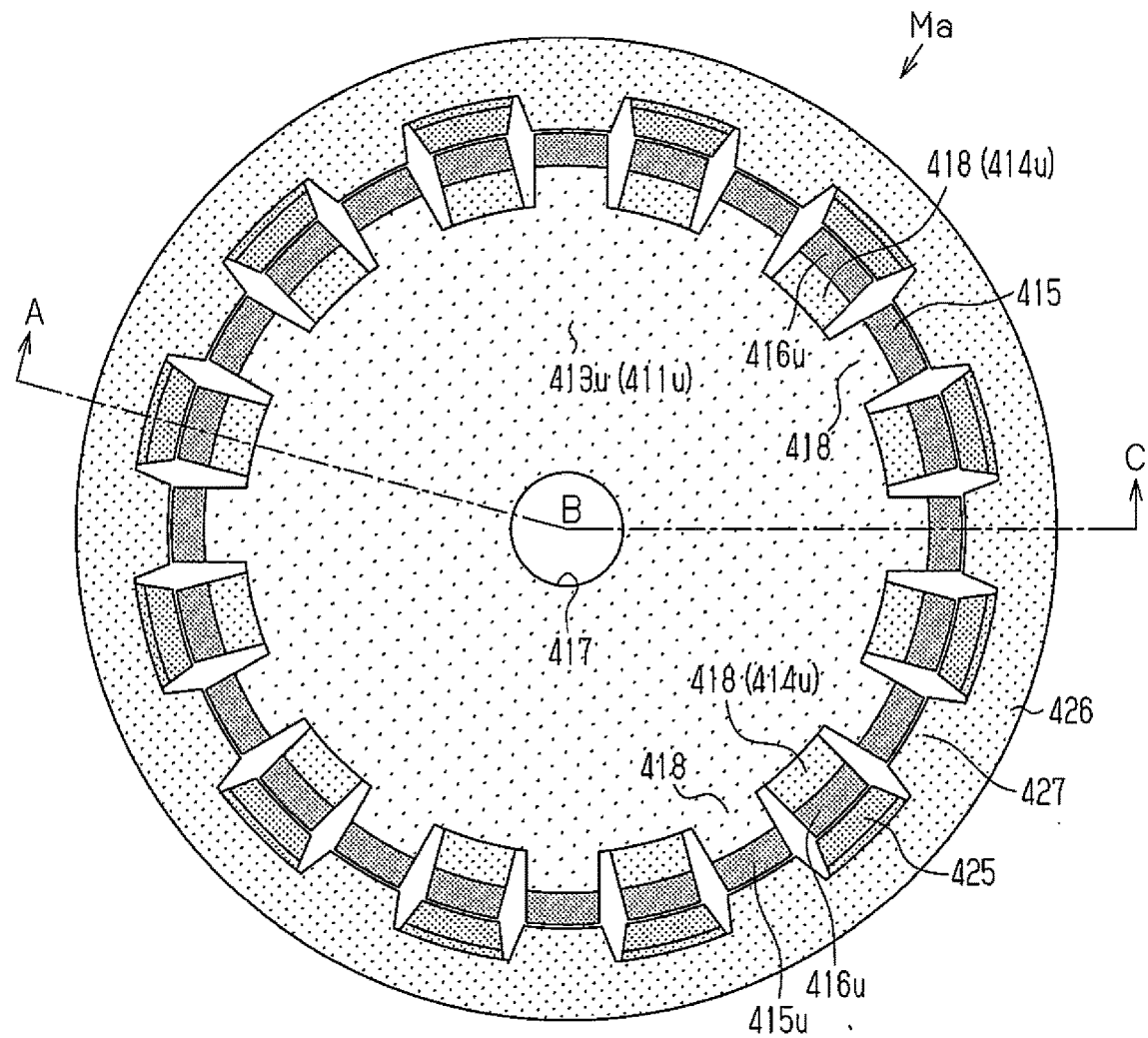
FIG. 55 is a plan view of a single rotor (U-phase rotor) and a single stator (U-phase stator)
Figure 56:
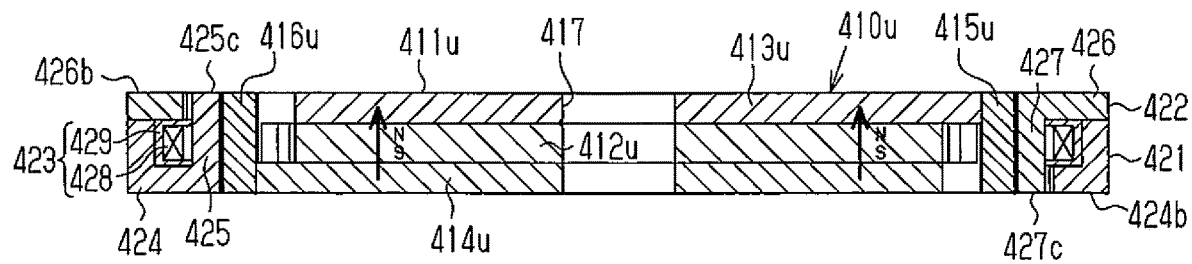
FIG. 56 is a combined sectional view taken along line A-B-C in FIG. 55.

Here, in FIGS. 55 and 56, as one phase rotor and one phase stator, the U-phase rotor 410*u* and the U-phase stator 420*u* are shown as an example. As shown in FIGS. 55 and 56, in the U-phase rotor 410*u*, the projections 418 of the first core base 413*u* abut, in the radial direction, against an inner peripheral surface of one axial end (upper end in FIG. 52) of each of the first claw-shaped magnetic poles 415*u*, and the projections 418 of the second core base 414*u* abut, in the radial direction, against an inner peripheral surface of the other axial end (lower end in FIG. 52) of each of the second claw-shaped magnetic poles 416*u*. The first claw-shaped magnetic poles 415*u* are separated away from the second core base 414*u*, and the second claw-shaped magnetic poles 416*u* are separated away from the first core base 413*u*.

In the V-phase and W-phase rotors 410*v* and 410*w* also, the projections 418 of the first core bases 413*v* and 413*w* respectively abut against the corresponding first claw-shaped magnetic poles 415*v* and 415*w*, and the projections 418 of the second core bases 414*v* and 414*w* respectively abut against the corresponding second claw-shaped magnetic poles 416*v* and 416*w*. A circumferential width of each of the projections 418 is equal to circumferential widths of the claw-shaped magnetic poles 415*u* to 415*w* and 416*u* to 416*w*.

In the rotors 410*u*, 410*v* and 410*w* configured as described above, portions of the field magnets 412*u* and 412*v* and 412*w* which are north poles are respectively magnetically connected to the first claw-shaped magnetic poles 415*u*, 415*v* and 415*w* through the first core bases 413*u*, 413*v* and 413*w*. Portions of the field magnets 412*u*, 412*v* and 412*w* which are south poles are respectively magnetically connected to the second claw-shaped magnetic poles 416*u*, 416*v* and 416*w* through the second core bases 414*u*, 414*v* and 414*w*.

Figure 57:
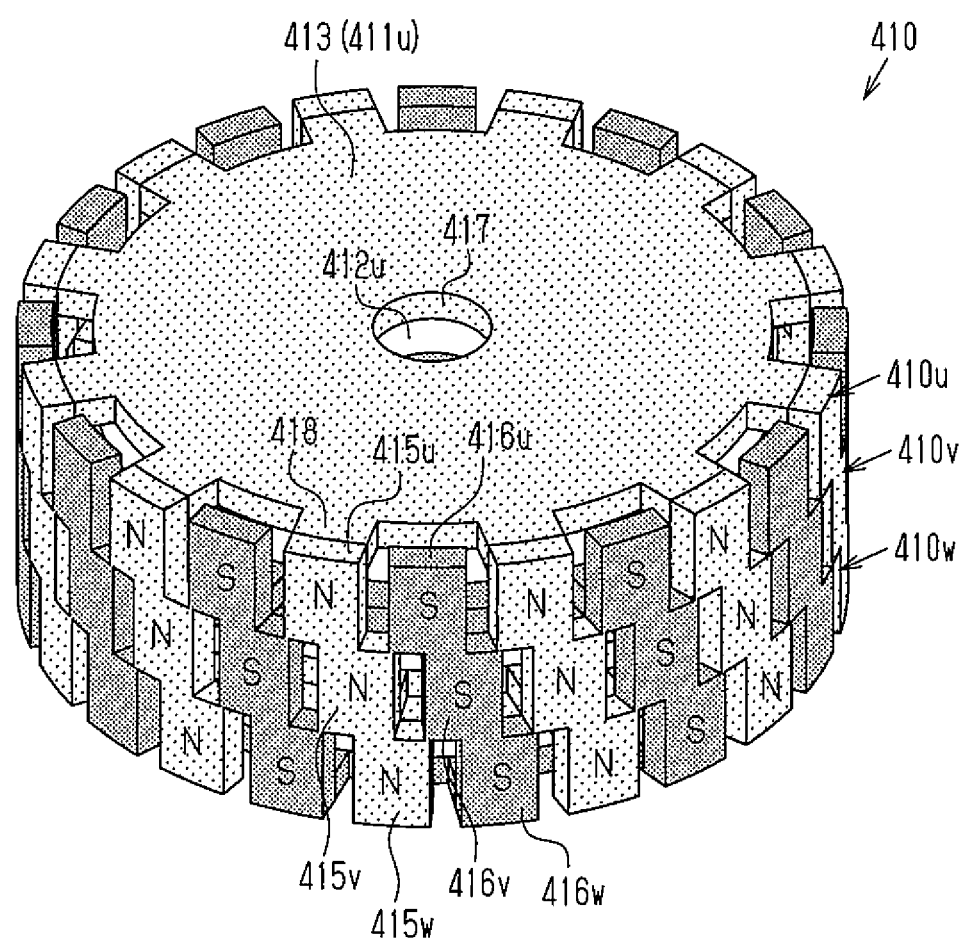
FIG. 57 is a perspective view of the rotor shown in FIG. 51.

According to this, as shown in FIG. 57, the first claw-shaped magnetic poles 415*u*, 415*v* and 415*w* function as north poles, and the second claw-shaped magnetic poles 416*u*, 416*v* and 416*w* function as south poles. In FIG. 57, the first core bases 413*u*, 413*v* and 413*w* and the first claw-shaped magnetic poles 415*u*, 415*v* and 415*w* which are north poles are shown by light dotted patterns, and the second core bases 414*u*, 414*v* and 414*w* and the second claw-shaped magnetic poles 416*u*, 416*v* and 416*w* which are south poles are shown by dense dotted patterns. That is, the rotors 410*u*, 410*v* and 410*w* are of so-called Lundell type structure having twenty four poles respectively using the field magnets 412*u*, 412*v* and 412*w*.

In the claw-shaped magnetic poles 415*u* to 415*w* and 416*u* to 416*w* of the outer peripheral member X2, widths of connection portions in which different polarities are connected to each other (i.e., connection portions through which the first claw-shaped magnetic poles 415*u* to 415*w* and the second claw-shaped magnetic poles 416*u* to 416*w* are connected to each other) are narrower than widths of connection portion in which the same polarities are connected to each other (i.e., connection portions through which the first claw-shaped magnetic poles 415*u* to 415*w* are connected to each other and the second claw-shaped magnetic poles 416*u* to 416*w* are connected to each other).

[Configuration of Stator]

Figure 58:
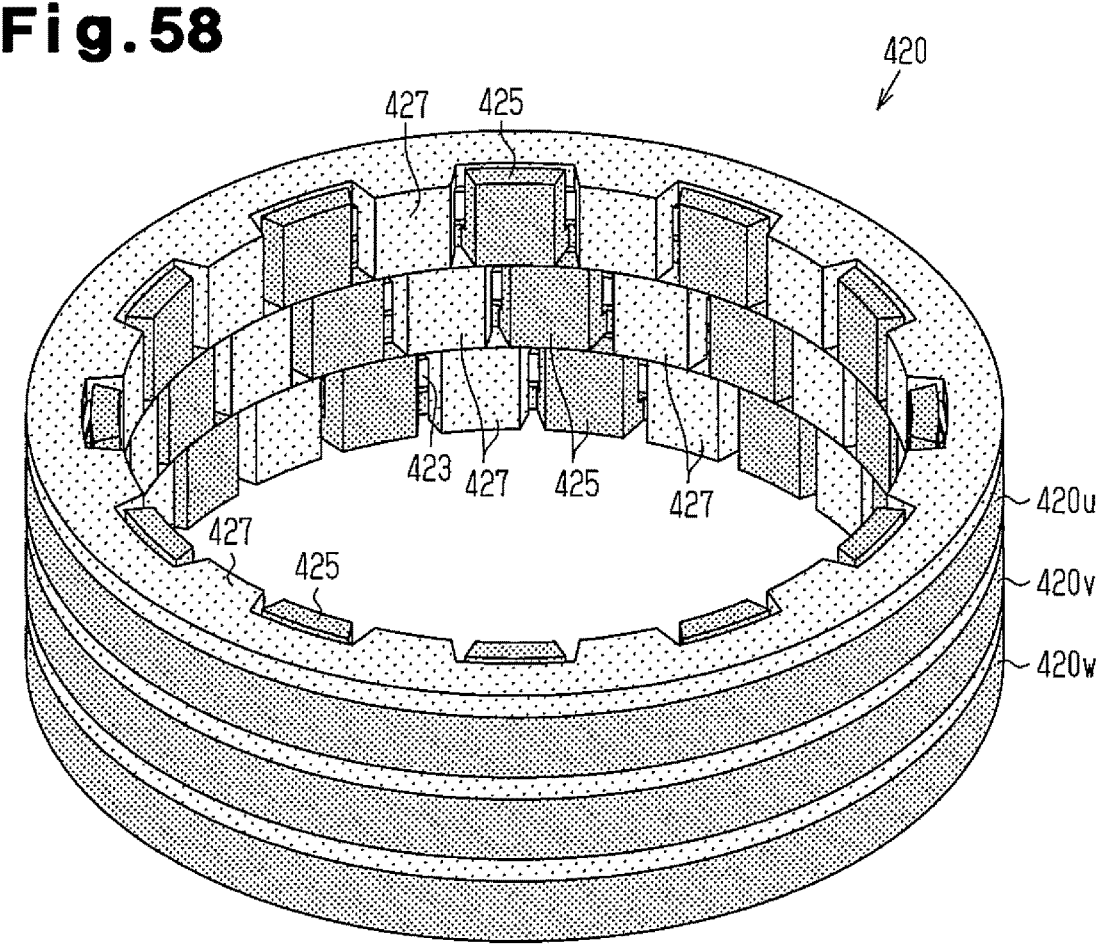
FIG. 58 is a perspective view of a stator shown in FIG. 51.
Figure 59:
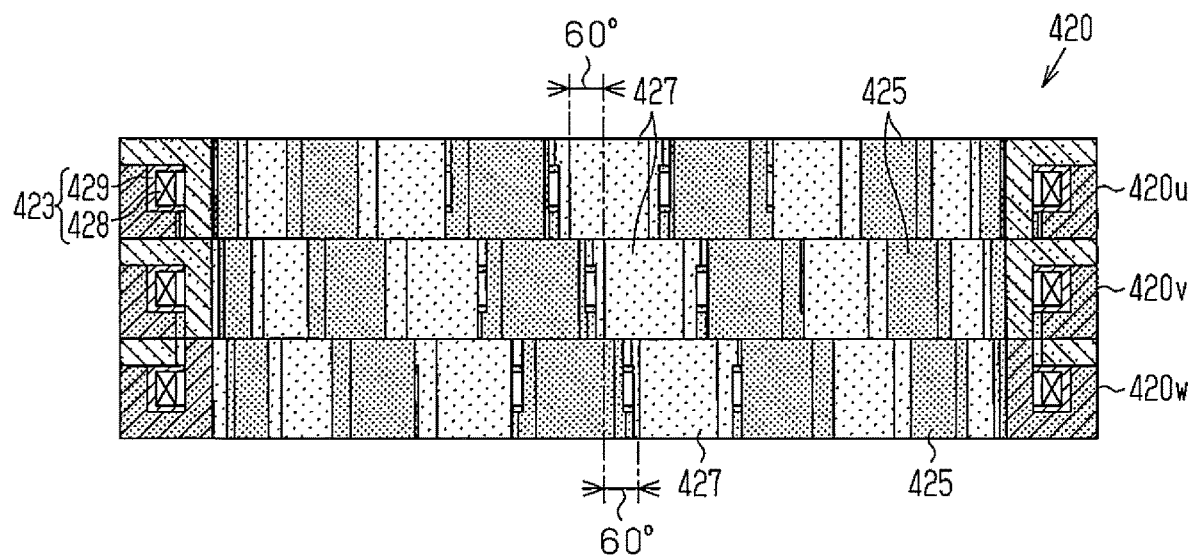
FIG. 59 is a sectional view of the stator shown in FIG. 58.

As shown in FIGS. 58 and 59, the stator 420 placed on a radial outer side of the rotor 410 includes three stators, i.e., a U-phase stator 420*u*, a V-phase stator 420*v* and a W-phase stator 420*w*. The stators 420*u*, 420*v* and 420*w* are stacked on one another in the axial direction in this order such that they are respectively opposed to the corresponding U-phase rotor 410*u*, the V-phase rotor 410*v* and the W-phase rotor 410*w* in the radial direction.

Figure 60:
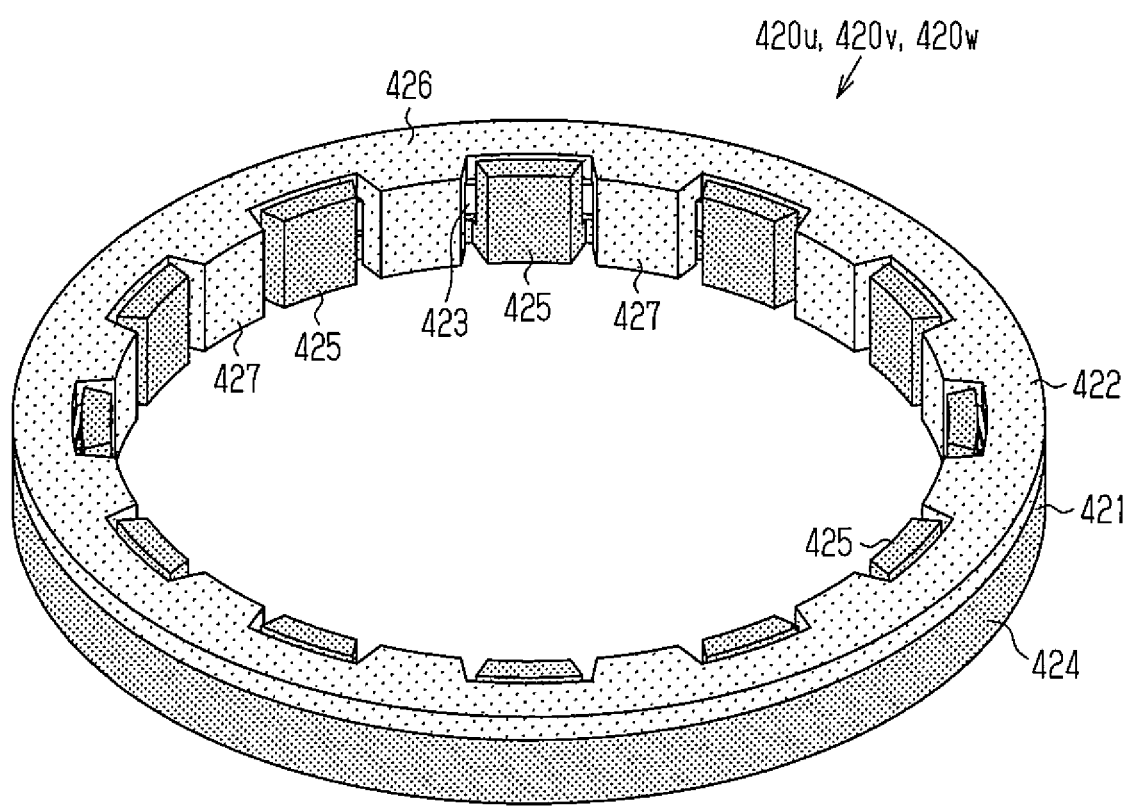
FIG. 60 is a perspective view of a single stator shown in FIG. 58.
Figure 61:
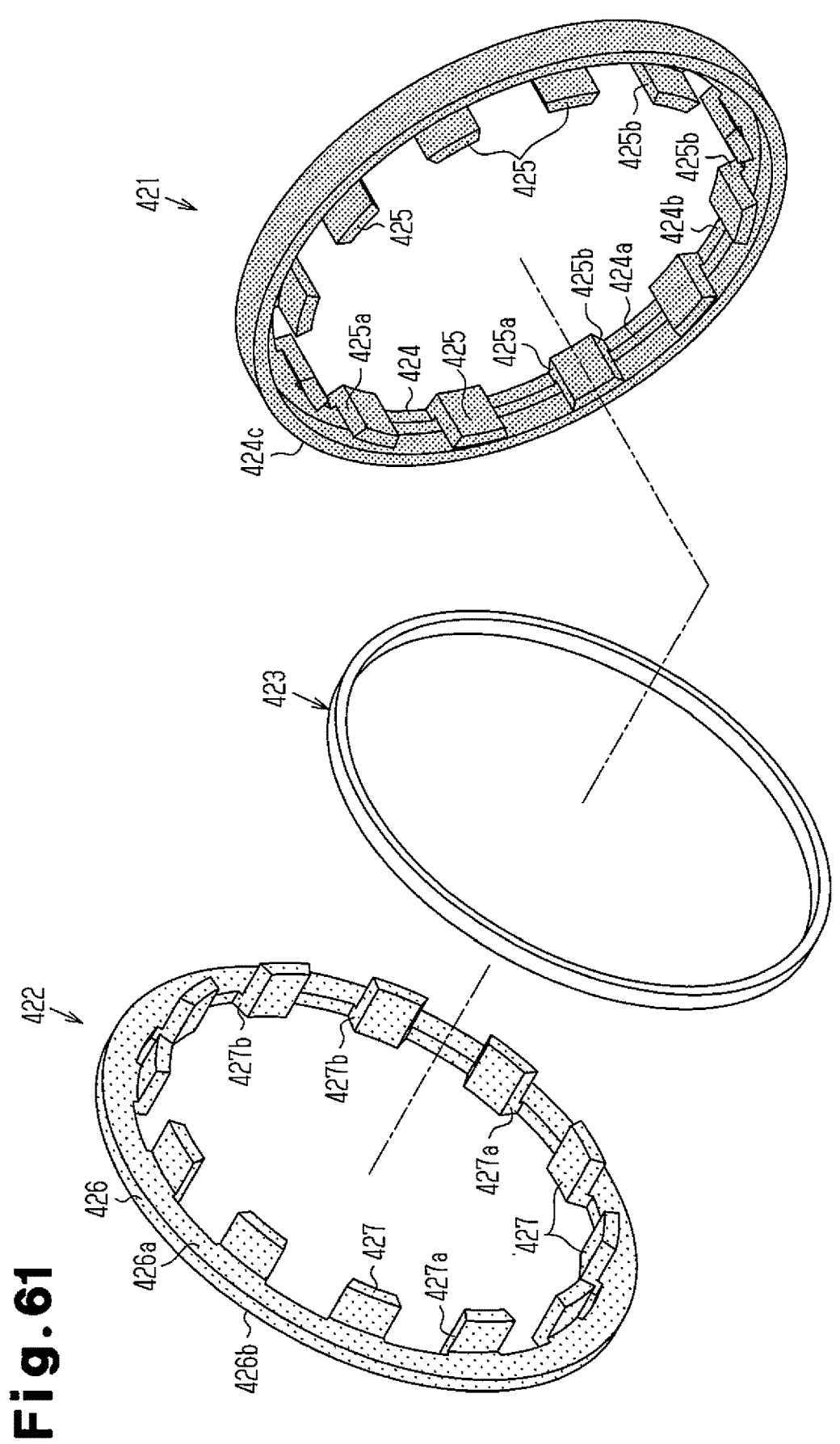
FIG. 61 is an exploded perspective view of the single stator shown in FIG. 60.

As shown in FIGS. 60 and 61, the stators 420*u*, 420*v* and 420*w* have the same configurations, and respectively include first and second stator cores 421 and 422 and a coil portion 423.

As shown in FIG. 61, the first stator core 421 includes an annular plate-shaped first stator core base 424, and a cylindrical wall 424*c* is arranged on an outer periphery of the first stator core base 424. The cylindrical wall 424*c* extends toward the second stator core 422 along the axial direction. Further, twelve first stator-side claw-shaped magnetic poles 425 are arranged on an inner periphery of the first stator core base 424 at equal intervals from one another. The first stator-side claw-shaped magnetic poles 425 extend toward the second stator core 422 along the axial direction.

Circumferential end surfaces 425*a* and 425*b* of the first stator-side claw-shaped magnetic poles 425 are flat surfaces, cross sections of the first stator-side claw-shaped magnetic poles 425 in a direction intersecting with the axial direction at right angles are sector shapes.

An angle of each of the first stator-side claw-shaped magnetic poles 425 in the circumferential direction, i.e., an angle formed between the circumferential end surfaces 425*a* and 425*b* with respect to a center axis of the rotation shaft (not shown) is set smaller than an angle of a gap between the adjacent first stator-side claw-shaped magnetic poles 425.

The second stator core 422 includes an annular plate-shaped second stator core base 426 which is made of the same material and has the same shape as those of the first stator core base 424. An outer periphery of the second stator core base 426 abuts against an annular tip end surfaces of the cylindrical wall 424*c* formed on the first stator core 421.

Further, twelve second stator-side claw-shaped magnetic poles 427 are arranged on an inner periphery of the second stator core base 426 at equal intervals from one another. The second stator-side claw-shaped magnetic poles 427 extend toward the first stator core 421.

Circumferential end surfaces 427*a* and 427*b* of each of the second stator-side claw-shaped magnetic poles 427 are flat surfaces, and a cross section of the second stator-side claw-shaped magnetic pole 427 in a direction intersecting with the axial direction at right angles has a sector shape.

An angle of each of the second stator-side claw-shaped magnetic poles 427 in the circumferential direction, i.e., an angle formed between the circumferential end surfaces 427*a* and 427*b* with respect to the center axis of the rotation shaft (not shown) is set smaller than an angle of a gap between the adjacent second stator-side claw-shaped magnetic poles 427.

That is, a shape of the second stator core 422 is the same as that of the first stator core 421 when the cylindrical wall 424*c* is omitted.

The second stator core 422 is placed on and fixed to the first stator core 421 such that the second stator-side claw-shaped magnetic poles 427 of the second stator core 422 are located between the first stator-side claw-shaped magnetic poles 425 of the first stator core 421 as viewed from the axial direction.

The second stator core 422 is assembled together with the first stator core 421 such that the coil portion 423 is placed between the first stator core 421 and the second stator core 422 in the axial direction.

More specifically, as shown in FIGS. 56 and 61, the coil portion 423 is sandwiched between a surface of the first stator core base 424 closer to the second stator core base 426 (opposed surface 424*a*) and a surface of the second stator core base 426 closer to the first stator core base 424 (opposed surface 426*a*).

At this time, one of end surfaces 425a of each of the first stator-side claw-shaped magnetic poles 425 in the circumferential direction and the other end surface 427b of each of the second stator-side claw-shaped magnetic poles 427 in the circumferential direction are parallel to each other along the axial direction. Hence, a gap between both the end surfaces 425a and 427b forms a substantially straight line along the axial direction. The other end surface 425b of each of the first stator-side claw-shaped magnetic poles 425 in the circumferential direction and the one end surface 427a of each of the second stator-side claw-shaped magnetic poles 427 in the circumferential direction are parallel to each other along the axial direction. Hence, a gap between both the end surfaces 425b and 427a forms a substantially straight line along the axial direction.

As shown in FIG. 56, the coil portion 423 includes an annular winding 428, and the annular winding 428 is incorporated in an annular coil bobbin 429. The coil bobbin 429 has a U-shaped cross section whose radial inner side opens. An outer diameter of the coil bobbin 429 is substantially equal to an inner diameter of the cylindrical wall 424c of the first stator core 421, and an outer peripheral surface of the coil bobbin 429 in the radial direction abuts against an inner peripheral surface of the cylindrical wall 424c. An inner diameter of the coil bobbin 429 is substantially equal to an outer diameter of the first stator-side claw-shaped magnetic pole 425 (second stator-side claw-shaped magnetic pole 427), and an inner tip end surface of the coil bobbin 429 in radial direction abuts against outer surfaces of the first stator-side claw-shaped magnetic pole 425 and the second stator-side claw-shaped magnetic pole 427.

An outer surface of the coil bobbin 429 closer to the first stator core 421 in the axial direction abuts against the opposed surface 424a of the first stator core base 424. An outer surface of the coil bobbin 429 closer to the second stator core 422 in the axial direction abuts against the opposed surface 426a of the second stator core base 426.

A thickness (axial length) of the coil bobbin 429 is set to a predetermined thickness in accordance with an axial length of the first stator-side claw-shaped magnetic pole 425 (second stator-side claw-shaped magnetic pole 427).

That is, the coil bobbin 429 incorporating the annular winding 428 therein is placed between the first stator core 421 and the second stator core 422. At this time, tip end surfaces 425c of the first stator-side claw-shaped magnetic poles 425 are flush with the opposed surface 426b of the second stator core base 426, and tip end surfaces 427c of the second stator-side claw-shaped magnetic poles 427 are flush with the opposed surface 424b of the first stator core base 424. Axial lengths of the first stator-side claw-shaped magnetic pole 425 and the second stator-side claw-shaped magnetic pole 427 match with axial lengths of the first claw-shaped magnetic poles 415u, 415v and 415w and the second claw-shaped magnetic poles 416u, 416v and 416w of the rotors 410u, 410v and 410w.

In FIG. 61, a pulling-out terminal of the annular winding 428 and a terminal mounting portion of the coil bobbin 429 are omitted for the sake of convenience of description. In accordance with this omission, a cut out portion for pulling, to outside, the terminal mounting portion formed on the cylindrical wall 424c of the first stator core 421 is also omitted in FIG. 61.

The U-phase, V-phase and W-phase stators 420u, 420v and 420w configured as described above are of so-called Lundell type (claw pole type) structure having twenty four poles in which the first and second stator-side claw-shaped magnetic poles 425 and 427 are excited into magnetic poles which are different from each other on a moment-to-moment basis by the annular winding 428 between the first and second stator cores 421 and 422. The U-phase, V-phase and W-phase stators 420u, 420v and 420w are stacked on one another in the axial direction to form the stator 420.

As shown in FIGS. 58 and 59, the U-phase stator 420u, the V-phase stator 420v and the W-phase stator 420w are stacked on one another such that they are displaced from one another by 60° in electrical angle (5° in mechanical angle).

More specifically, the V-phase stator 420v is fixed to the motor housing (not shown) such that the V-phase stator 420v is displaced in phase from the U-phase stator 420u by 60° in electrical angle in the clockwise direction. The W-phase stator 420w is fixed to the motor housing such that the W-phase stator 420w is displaced in phase from the V-phase stator 420v by 60° in electrical angle in the clockwise direction.

That is, between the first and second stator-side claw-shaped magnetic poles 425 and 427 and the rotor-side claw-shaped magnetic poles 415u to 415w and 416u to 416w of opposed phases, deviation in the circumferential direction inclines in opposite directions on the opposed surfaces.

U-phase power source voltage of three-phase AC power source is applied to the annular winding 428 of the U-phase stator 420u, V-phase power source voltage of three-phase AC power source is applied to the annular winding 428 of the V-phase stator 420v, and W-phase power source voltage of three-phase AC power source is applied to the annular winding 428 of the W-phase stator 420w.

Next, operations of the motor M of the eighth embodiment will be described.

When the motor M is driven, three-phase AC power source voltage is applied to the stator 420. That is, U-phase power source voltage is applied to the annular winding 428 of the U-phase stator 420u, V-phase power source voltage is applied to the annular winding 428 of the V-phase stator 420v, and W-phase power source voltage is applied to the annular winding 428 of the W-phase stator 420w. According to this, rotating field is generated in the stator 420 and the rotor 410 is rotated and driven.

Here, corresponding to the three-phase AC power source, the stator 420 includes three-part structure of the U-phase, V-phase and W-phase stators 420u, 420v and 420w and correspondingly, the rotor 410 also includes three-part structure of the U-phase, V-phase and W-phase rotors 410u, 410v and 410w. According to this, in the stators 420u, 420v and 420w and the rotors 410u, 410v and 410w, the stators 420u, 420v and 420w which are opposed to one another in the radial direction and the stators 420u, 420v and 420w which are arranged in the axial direction can receive magnetic fluxes of the field magnets 412u, 412v and 412w, and output can be increased.

In the eighth embodiment, while the stators 420u, 420v and 420w are displaced from one another by 60° in electrical angle in the clockwise direction, the U-phase, V-phase and W-phase rotors 410u, 410v and 410w of the rotors 410 are displaced from one another by 60° in electrical angle in the counterclockwise direction. That is, between the U-phase, V-phase and W-phase stators 420u, 420v and 420w and the opposed U-phase, V-phase and W-phase rotors 410u, 410v and 410w, deviation in the circumferential direction inclines in opposite directions on the opposed surfaces.

According to this, the rotors 410u, 410v and 410w of the respective phases can excellently follow the switching of the first and second stator-side claw-shaped magnetic poles 425 and 427 caused by AC current flowing through the annular windings 428 of the respective phases. As a result, the rotor 410 can excellently rotate.

In the eighth embodiment, a magnetization direction of the field magnet 412v of the V-phase rotor 410v is opposite from those of the field magnets 412u and 412w of the U-phase and W-phase rotors 410u and 410w. According to this, polarities of both sides of the V-phase field magnet 412v in the axial direction become the same as those of the U-phase and W-phase field magnets 412u and 412w which are opposed to each other in the axial direction. Hence, magnetic fluxes of the V-phase field magnet 412v are less prone to leak toward the U-phase and W-phase rotors 410u and 410w. As a result, magnetic fluxes of the V-phase field magnet 412v excellently flow toward the first and second claw-shaped magnetic poles 415v and 416v of the V-phase rotor 410v.

Further, in the eighth embodiment, since the U-phase, V-phase and W-phase rotors 410u, 410v and 410w of the rotor 410 are of Lundell type structure, although the field magnets 412u, 412v and 412w have the same structures, the number of the claw-shaped magnetic poles 415u to 415w and 416u to 416w (and number of projections 418) can be changed. Hence, when it is required to change the number of magnetic poles, it is easy to change the number of poles. Similarly, since the U-phase, V-phase and W-phase stators 420u, 420v and 420w of the stator 420 are of claw pole type structure, although the coil portions 423 have the same structures, the number of first and second stator-side claw-shaped magnetic poles 425 and 427 can be changed. Hence, it is easy to change the number of poles.

That is, according to the brushless motor of the eighth embodiment, it is easy to change the specification of various combinations of the number of magnetic poles of the rotor 410 and the stator 420 without largely changing the design.

In the rotor cores 411u, 411v and 411w of the eighth embodiment, the first core bases 413u, 413v and 413w and the first claw-shaped magnetic poles 415u, 415v and 415w are separately configured, and the second core bases 414u, 414v and 414w and the second claw-shaped magnetic poles 416u, 416v and 416w are separately configured. According to this, it is possible to individually form the core bases 413u to 413w and 414u to 414w and the claw-shaped magnetic poles 415u to 415w and 416u to 416w. Hence, it is possible to reduce a waste of material between the claw-shaped magnetic poles generated when the core base and the claw-shaped magnetic pole are integrally formed, and yield is enhanced. Further, all of the claw-shaped magnetic poles 415u to 415w and 416u to 416w are integrally formed into the annular shape from one electromagnetic steel plate. Hence, increase in the number of parts is suppressed and as a result, management of parts does not become complicated.

Next, characteristic advantages of the eighth embodiment will be described below.

(30) In the rotor cores 411u, 411v and 411w, the first claw-shaped magnetic poles 415u, 415v and 415w and the second claw-shaped magnetic poles 416u, 416v and 416w are separately configured from the first core bases 413u, 413v and 413w and the second core bases 414u, 414v and 414w which sandwich the field magnets 412u, 412v and 412w in the axial direction. According to this configuration, the core bases 413u to 413w and 414u to 414w and the claw-shaped magnetic poles 415u to 415w and 416u to 416w (outer peripheral member X2) can be separately formed. Therefore, it is possible to reduce a waste of material between the claw-shaped magnetic poles generated when the core base and the claw-shaped magnetic pole are integrally formed, and yield is enhanced. Further, eddy current which can be generated at a boundary between the claw-shaped magnetic poles 415u to 415w and 416u to 416w and the projection 418 is suppressed, and output of the motor M can be increased. Further, since the claw-shaped magnetic poles 415u to 415w and 416u to 416w which are adjacent to each other in the axial direction are integrally connected to one another between the phases, increase in the number of parts can be suppressed. As a result, this is advantageous in terms of management of parts.

(31) Since the claw-shaped magnetic poles 415u to 415w and 416u to 416w of the rotors 410u, 410v and 410w configure the integral outer peripheral member X2 (annular member), the number of parts can be reduced. As a result, management of parts becomes easier.

(32) The center member X1 including the core bases 413u to 413w and 414u to 414w and the field magnet 412u, 412v and 412w is press fitted into the outer peripheral member X2. Hence, the outer peripheral member X2 and the center member X1 can easily be fixed to each other.

(33) The annular member is formed from one steel plate material (electromagnetic steel plate). Hence, if the steel plate material is subjected to lightening at predetermined locations thereof and it is rolled into the annular shape, the outer peripheral member X2 having the claw-shaped magnetic poles 415u to 415w and 416u to 416w can be formed. Therefore, it is possible to easily form the outer peripheral member X2.

The eighth embodiment may be changed as follows.

Figure 62:
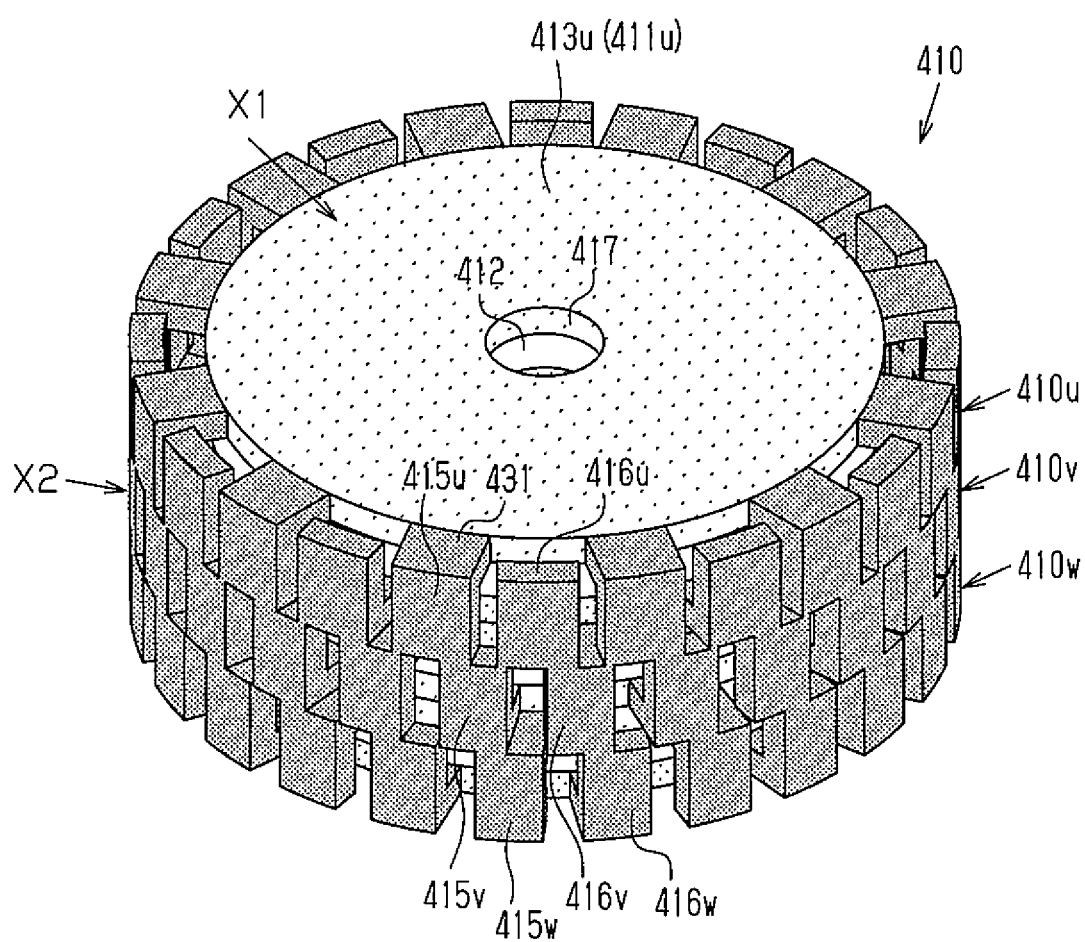
FIG. 62 is a perspective view of a rotor in another example of the eighth embodiment.

In the eighth embodiment, the inner peripheral surfaces of the claw-shaped magnetic poles 415u to 415w and 416u to 416w are fixed to the projections 418 formed on the core bases 413u to 413w and 414u to 414w, but the invention is not limited to this configuration. As shown in FIG. 62 for example, the projections 418 may be omitted from the core bases 413u to 413w and 414u to 414w of the eighth embodiment, projections 431 projecting radially inward may be formed on the claw-shaped magnetic poles 415u to 415w and 416u to 416w, and the projections 431 may be fixed to the outer peripheral surfaces of the core bases 413u to 413w and 414u to 414w. Portions extending in the radial direction like the projections 418 and 431 may be omitted.

Figure 63:
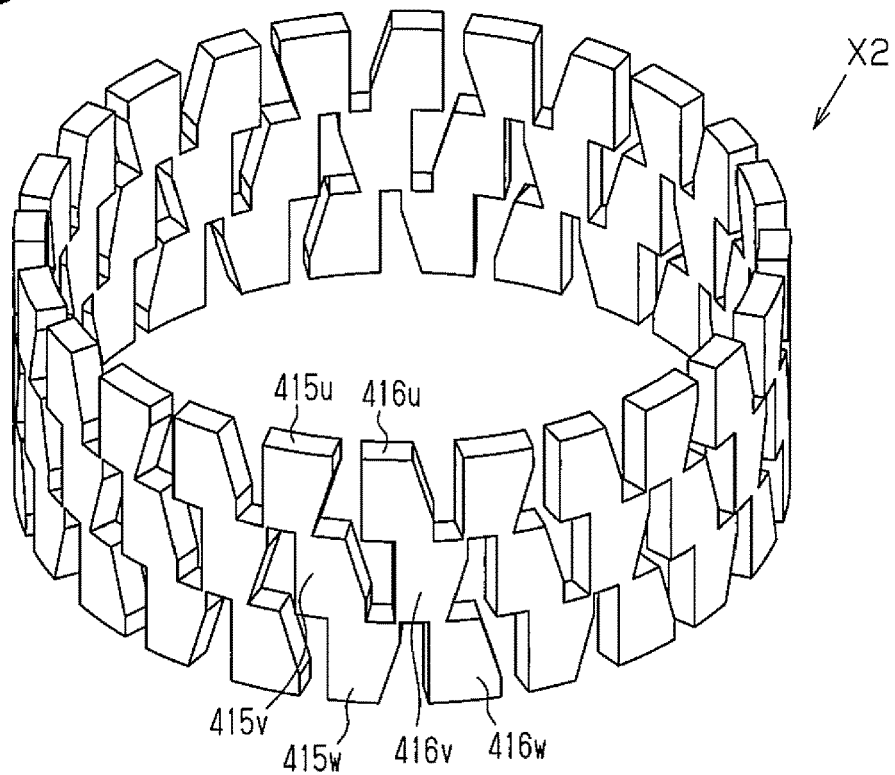
FIG. 63 is a perspective view of an outer peripheral member in another example of the eighth embodiment.

Although the claw-shaped magnetic poles 415u to 415w and 416u to 416w are formed into the rectangular shapes as viewed from the radial direction in the eighth embodiment, the invention is not limited to this configuration. As shown in FIG. 63 for example, the claw-shaped magnetic poles 415u to 415w and 416u to 416w may be formed into such shapes that circumferential widths thereof become narrower toward their axial tip ends (axial ends opposite from portions thereof fixed to the projections 418).

Figure 64:
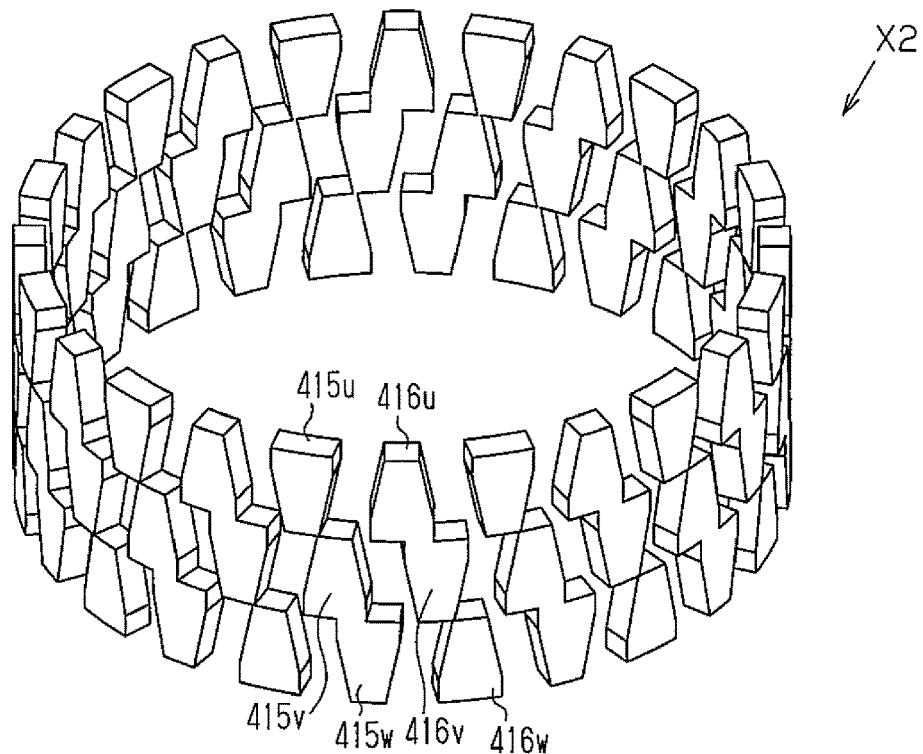
FIG. 64 is a perspective view of an outer peripheral member in another example of the eighth embodiment.

In the eighth embodiment, the claw-shaped magnetic poles 415u to 415w and 416u to 416w are integrally connected to both the first and second claw-shaped magnetic poles of phases which are adjacent to each other in the axial direction and according to this, the outer peripheral member X2 which is integrally formed into the annular shape is configured, but the invention is not limited to this configuration. As shown in FIG. 64 for example, the first claw-shaped magnetic poles 415u, 415v and 415w which are adjacent to one another in the axial direction are connected to one another, and the first claw-shaped magnetic poles 415u, 415v and 415w and the second claw-shaped magnetic poles 416u, 416v and 416w are separated away from each other. That is, each one of the U-phase, V-phase and W-phase first claw-shaped magnetic poles 415u, 415v and 415w configures one integral part. Similarly, the second claw-shaped magnetic poles 416u, 416v and 416w which are adjacent to one another in the axial direction are connected to one another, and each one of the U-phase, V-phase and W-phase second claw-shaped magnetic poles 416u, 416v and 416w configures one integral part. As described above, the outer peripheral member X2 shown in FIG. 64 has such a configuration that integral parts including the first claw-shaped magnetic poles 415u, 415v and 415w which are arranged in the axial direction and integral parts including the second claw-shaped magnetic poles 416u, 416v and 416w which are arranged in the axial direction are alternately placed in the circumferential direction, and the first claw-shaped magnetic poles 415u, 415v and 415w and the second claw-shaped magnetic poles 416u, 416v and 416w having polarities which are different from each other are separated from each other. In the example shown in FIG. 64, each of the claw-shaped magnetic poles 415u to 415w and 416u to 416w is tapered toward its axial tip end.

According to this configuration, although the number of parts is increased as compared with the eighth embodiment, since the first claw-shaped magnetic poles 415u, 415v and 415w and the second claw-shaped magnetic poles 416u, 416v and 416w having polarities which are different from each other are separated from each other, it is possible to reduce short circuit magnetic fluxes which do not contribute to rotation of the rotor 410.

In the eighth embodiment, the center member X1 is press fitted into the outer peripheral member X2, and the projections 418 of the core bases 413u to 413w and 414u to 414w are brought into contact with the inner peripheral surfaces of the claw-shaped magnetic poles 415u to 415w and 416u to 416w under pressure, but the invention is not limited to this configuration. For example, the projections 418 and the inner peripheral surfaces of the claw-shaped magnetic poles 415u to 415w and 416u to 416w may be adhered and fixed to each other.

In the eighth embodiment, the core bases 413u to 413w and 414u to 414w may be formed by stacking core sheets made of steel plate in the axial direction. The claw-shaped magnetic poles 415u to 415w and 416u to 416w may be formed by stacking core sheets made of steel plate in the circumferential direction. According to this configuration, it is possible to reduce a loss in eddy current generated by variation in magnetic fluxes.

In the eighth embodiment, the present invention is applied to the motor M in which the single rotors (rotors 410u, 410v and 410w) and the single stators (stators 420u, 420v and 420w) are of three layer structure, but the invention may be applied to a motor in which the rotors and the stators are of four or more layer structure.

Although the invention is applied to the inner rotor type motor M in which the rotor 410 is placed on the inner periphery of the stator 420 in the eighth embodiment, the invention may be applied to an outer rotor type motor.

Ninth Embodiment

A ninth embodiment of the motor will be described below.

Figure 65:
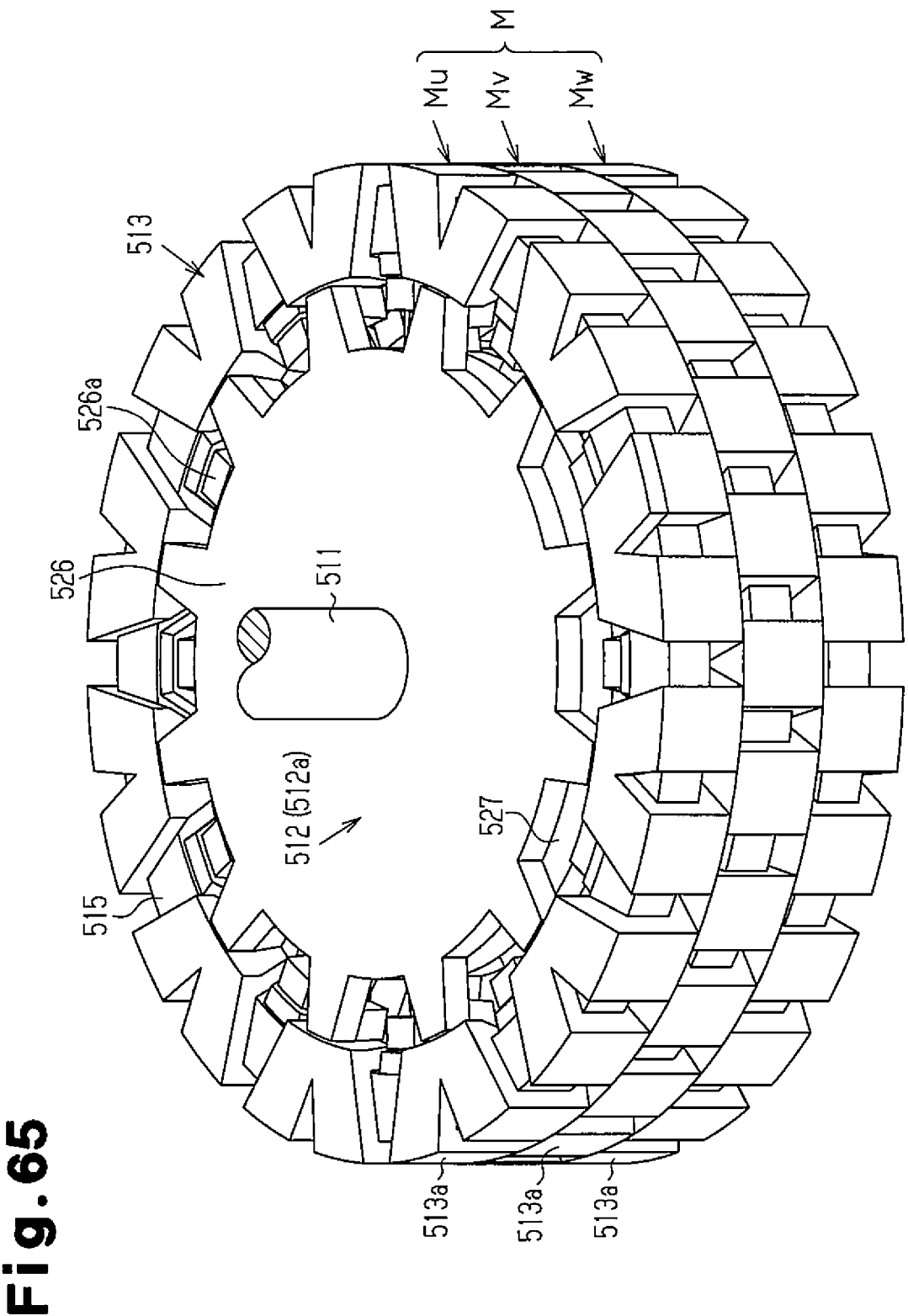
FIG. 65 is a perspective view of a motor according to a ninth embodiment of the present invention.

FIG. 65 is a perspective view of an entire brushless motor M of the ninth embodiment. An annular stator 513 fixed to a motor housing (not shown) is placed on the outer side of a rotor 512 fixed to a rotation shaft 511. The brushless motor M is formed by stacking three single motor portions, i.e., a U-phase motor portion Mu, a V-phase motor portion Mv and a W-phase motor portion Mw in an axial direction of the motor from above in this order. Each of the motor portions Mu, Mv and Mw includes a single stator 513a and a single rotor 512a (only U-phase rotor is shown in FIG. 65). The stator 513 includes the plurality of single stators 513a, and the rotor 512 includes the plurality of single rotors 512a.

Figure 66:
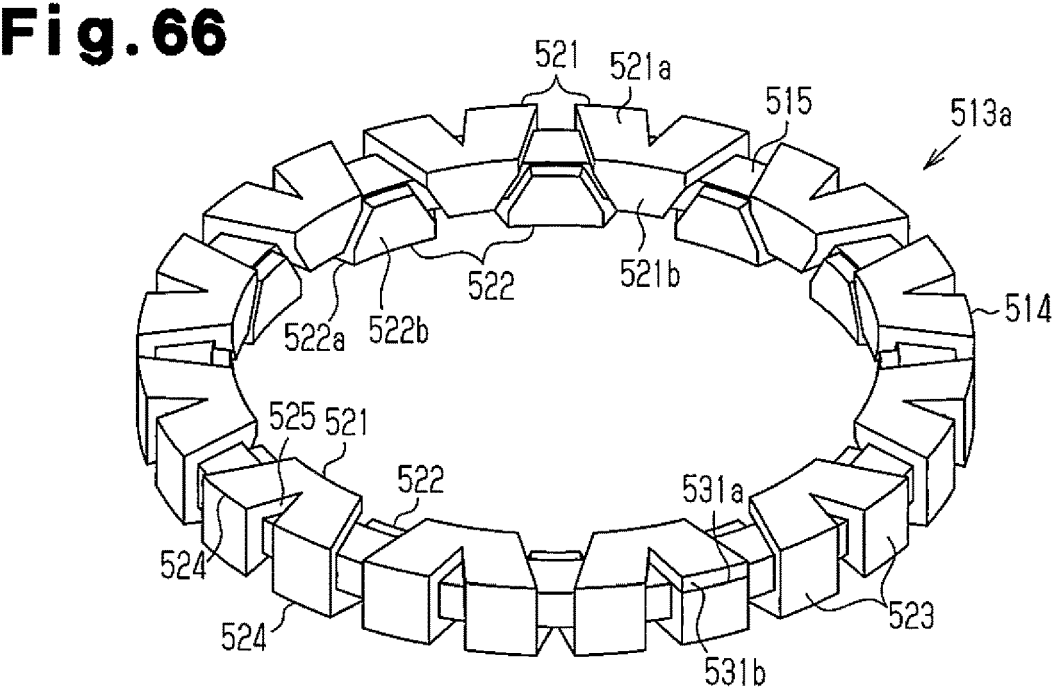
FIG. 66 is a perspective view showing a single stator shown in FIG. 65.

As shown in FIG. 66, the single stator 513a includes an annular stator core 514 and a coil portions 515 placed inside of the stator core 514.

The stator core 514 is formed in such a manner that an electromagnetic steel plate is subjected to lightening by metal punching and then, predetermined locations thereof are bent. The stator core 514 includes a plurality of (twelve in ninth embodiment) first claw-shaped magnetic poles 521 arranged at equal intervals from one another in a circumferential direction of the motor, a plurality of (same number as that of the first claw-shaped magnetic poles 521) second claw-shaped magnetic poles 522 respectively placed between the first claw-shaped magnetic poles 521 in the circumferential direction, and a plurality of core back portions 523 which connects, to each other, the first and second claw-shaped magnetic poles 521 and 522 which are adjacent to each other in the circumferential direction.

The first claw-shaped magnetic poles 521 include first extending portions 521a forming flat portions which are perpendicular to an axis of the rotation shaft 511. Each of the first extending portions 521a has a V-shape which opens toward an outer peripheral side of the motor as viewed from the axial direction, and a second extending portion 521b is located on an inner peripheral end of the first extending portion 521a. The second extending portion 521b is bent and formed to extend toward one side of the axial direction.

Each of the second claw-shaped magnetic poles 522 has the same shape as that of the first claw-shaped magnetic pole 521, and has a first extending portion 522a forming a flat portion which is perpendicular to the axis of the rotation shaft 511, and a second extending portion 522b which extends in the axial direction from an inner peripheral end of the first extending portion 522a.

The second extending portions 521b and 522b of the first and second claw-shaped magnetic poles 521 and 522 extend toward each other, and are alternately placed at equal intervals from one another in the circumferential direction. The second extending portions 521b and 522b configure an inner periphery of the stator core 514, and inner peripheral surfaces of the second extending portions 521b and 522b are opposed to the rotor 512 in the radial direction. The second extending portions 521b and 522b are formed into trapezoidal shapes whose widths become narrower toward their tip ends as viewed from the radial direction so that they do not interfere with each other. Inner peripheral surfaces of the second extending portions 521b and 522b are formed into arc shapes centering on the axis of the rotation shaft 511.

In the first extending portion 521a of the first claw-shaped magnetic poles 521 and the first extending portion 522a of the second claw-shaped magnetic poles 522 which are adjacent to each other in the circumferential direction, an outer peripheral end of the first extending portion 521a and an outer peripheral end of the first extending portion 522a are superposed on each other as viewed from the axial direction, and the superposed portions are connected to each other through the core back portion 523. Each of the core back portions 523 is connected to corresponding one of opening ends (pair of radial outer ends) of the V-shape of the first extending portions 521a and 522a. The core back portions 523 configure an outer periphery of the stator core 514. The first extending portion 521a of the first claw-shaped magnetic poles 521 extends toward an inner periphery of the motor from one of axial ends (upper end in FIG. 66) of the core back portions 523, and the first extending portion 522a of the second claw-shaped magnetic poles 522 extends toward the inner periphery of the motor from the other axial end (lower end in FIG. 66) of the core back portions 523. The first extending portions 521a and 522a of the claw-shaped magnetic poles 521 and 522 are bent with respect to the core back portions 523. A cut out portion 525 is formed in each of angle portions 524 formed between the core back portions 523 and the first extending portions 521a and 522a.

Annular coil portions 515 centering on the axis of the rotation shaft 511 are placed between the first claw-shaped magnetic poles 521 and the second claw-shaped magnetic poles 522 in the axial direction. The coil portions 515 are located between the first extending portions 521a of the first claw-shaped magnetic poles 521 and the first extending portions 522a of the second claw-shaped magnetic poles 522, and are located between the core back portions 523 and the second extending portions 521b and 522b in the radial direction. The coil portions 515 and the stator core 514 are electrically insulated from each other by coil bobbins (not shown) interposed therebetween. A pulling-out terminal (not shown) of the coil portion 515 is led out from the cut out portion 525.

Each of the motor portions Mu, My and Mw includes the stator 513a having the above-described configuration. The stator 513a of each of the phases is of so-called Lundell type (claw pole type) structure having twenty four poles in which the first and second claw-shaped magnetic poles 521 and 522 are excited into magnetic poles which are different from each other on a moment-to-moment basis by supplying power to the coil portion 515. The three-phase stators 513a are stacked on one another in the axial direction such that they are displaced from one another in phase by 60° in electrical angle. If AC voltage of corresponding phase is applied to the coil portion 515 of the three-phase stator 513a, rotating field is generated and the rotor 512 rotates.

In the ninth embodiment, as each of the rotors 512a of the motor portions Mu, My and Mw, a rotor of so-called Lundell type structure in which a pair of rotor core 526 having claw-shaped magnetic poles 526a and a field magnet 527 is employed (see FIG. 65).

[Producing Method of Stator Core]

Next, a producing method and operations of the stator core 514 of the ninth embodiment will be described.

Figure 67:
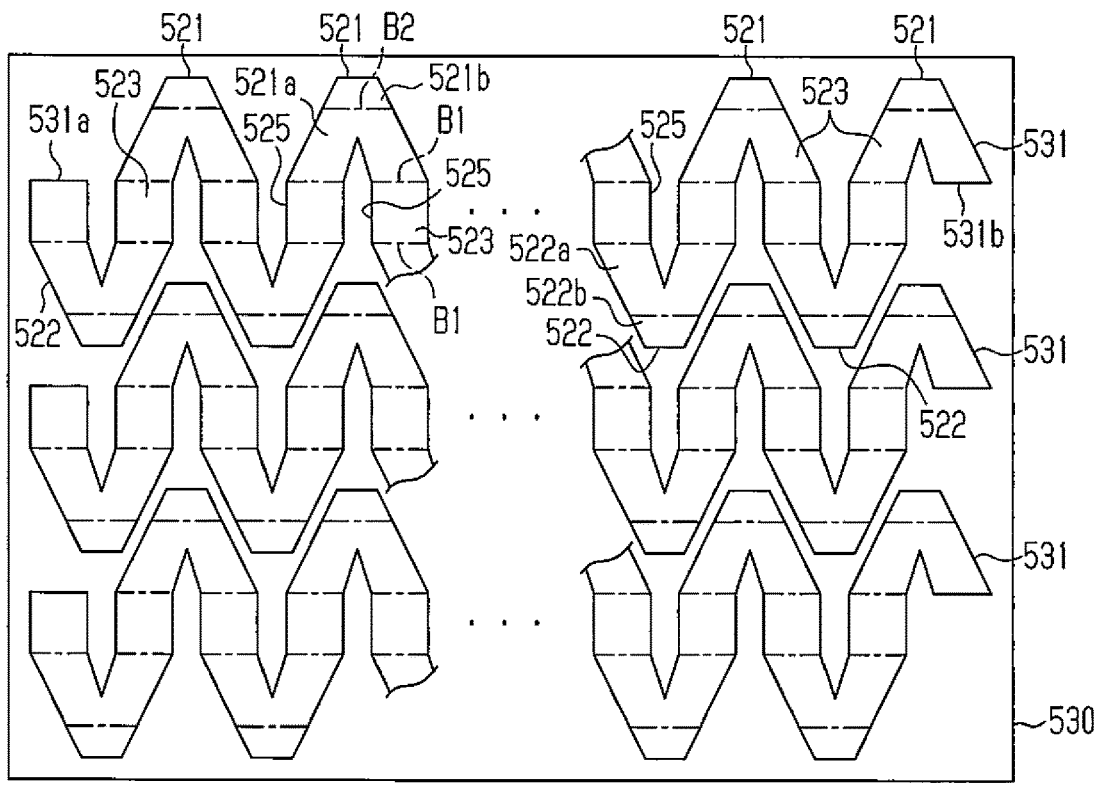
FIG. 67 is a schematic diagram for explaining a producing mode of a stator core shown in FIG. 66.

As shown in FIG. 67, a plurality of punched materials 531 are first punched out from an electromagnetic steel plate 530 (punching step). At this time, the first and second claw-shaped magnetic poles 521 and 522 and the core back portions 523 are integrally formed with each of the punched materials 531. The plurality of first claw-shaped magnetic poles 521 are formed such that their tip ends (second extending portions 521a) are oriented in the same direction, and the plurality of second claw-shaped magnetic poles 522 are formed such that their tip ends (second extending portions 522a) are oriented in the same direction (direction opposite from the orienting direction of first claw-shaped magnetic poles 521). When the plurality of punched materials 531 are punched out from the electromagnetic steel plate 530 as in the ninth embodiment, it is desirable, in terms of enhancement of yield, to set a punching die such that the second claw-shaped magnetic poles 522 are placed between the first claw-shaped magnetic poles 521 of the adjacent punched material 531.

The cut out portions 525 extending to central portions of the first extending portions 521a and 522a are formed in boundary portions B1 (the portions which become angle portions 524 after bending) between the core back portions 523 and the first extending portions 521a and 522a of the claw-shaped magnetic poles 521 and 522. The cut out portions 525 are formed such that the cut out portions sever the first claw-shaped magnetic poles 521 (first extending portions 521a) which are adjacent to each other in the circumferential direction and the second claw-shaped magnetic poles 522 (first extending portions 522a) which are adjacent to each other in the circumferential direction.

Next, an annular-forming step for forming the punched material 531 into an annular shape is carried out. In this step, the punched material 531 is formed into an annular shape, longitudinal (lateral in FIG. 67) first end 531a and second end 531b of the punched material 531 are fixed to each other through welding (see FIG. 66 also). During this annular-forming step, the coil portion 515 is placed on the side of the inner periphery of the core back portions 523.

Next, a bending step of bending the first and second claw-shaped magnetic poles 521 and 522 is carried out. In this step, each of the boundary portions B1 between the core back portions 523 and the first extending portions 521a and 522a of the claw-shaped magnetic poles 521 and 522 is bent in the same direction at right angles, thereby forming the first extending portions 521a and 522a. At this time, since the cut out portions 525 are formed in the boundary portion B1, the first extending portions 521a and 522a can easily be bent even if the punched material 531 is formed into the annular shape. In the claw-shaped magnetic poles 521 and 522, boundary portions B2 between the first extending portions 521a and 522a and the second extending portions 521b and 522b are bent in mutually opposed directions at right angles, thereby forming the second extending portions 521b and 522b. In this manner, the claw-shaped magnetic poles 521 and 522 having the first extending portions 521a and 522a and the second extending portions 521b and 522b are bent and formed. According to this, the stators 513a of the ninth embodiment are completed. Then, (three) stators 513a of the three phases are stacked one another in the axial direction such that the stators 513a are displaced from one another in phase by 60° in electrical angle. At this time, it is preferable that the stators 513a of three phases are stacked on one another such that connected portions (connected portions between first and second ends 531a and 531b) of the punched materials 531 in the three-phase stators 513a are located at equal intervals from one another (120°) in the circumferential direction. According to this, magnetic unbalance which may be caused by the connected portion between the punched materials 531 is suppressed, and this can contribute to enhancement of motor quality.

According to this producing method, the punched material 531 which is punched out from the electromagnetic steel plate 530 is formed into the annular shape to form the stator core 514. Therefore, as compared with a case where the stator core is punched out into the annular shape, a waste of the electromagnetic steel plate 530 is reduced, and yield is enhanced.

Next, characteristic advantages of the ninth embodiment will be described below.

(34) The first and second claw-shaped magnetic poles 521 and 522 are integrally formed as the punched material 531, the punched material 531 is formed into the annular shape, both the ends of the punched material 531 (first and second ends 531a and 531b) are connected to each other, thereby forming the stator core 514. According to this, there is no need to form the punching die of the punched material 531 which configures the stator core 514 into the annular shape.

Therefore, it is possible to reduce a waste of the electromagnetic steel plate 530 and as a result, yield can be enhanced.

(35) The stator core 514 has the core back portions 523 which configure the outer periphery of the stator core 514, and the first and second claw-shaped magnetic poles 521 and 522 are formed by bending the first extending portions 521a and 522a which extend toward the inner periphery from the core back portions 523 and by bending the second extending portions 521b and 522b which extend in the axial direction from the inner peripheral ends of the first extending portions 521a and 522a. According to this configuration, the first and second claw-shaped magnetic poles 521 and 522 can excellently be integrally formed on the stator core 514. Further, opposed areas of the stator 513a and the rotor 512a can be obtained by the second extending portions 521b and 522b of the claw-shaped magnetic poles 521 and 522.

(36) The cut out portions 525 are formed in the angle portions 524 formed by the core back portions 523 and the first extending portions 521a and 522a. Hence, the first extending portions 521a and 522a can easily be bent and formed with respect to the core back portions 523 which configure the outer periphery of the stator core 514.

The ninth embodiment may be changed as follows.

Configurations (shape and number of claw-shaped magnetic poles 521 and 522) of the stator core 514 (punched material 531) are not limited to the ninth embodiment, and they may appropriately be changed in accordance with a configuration.

Figure 68:
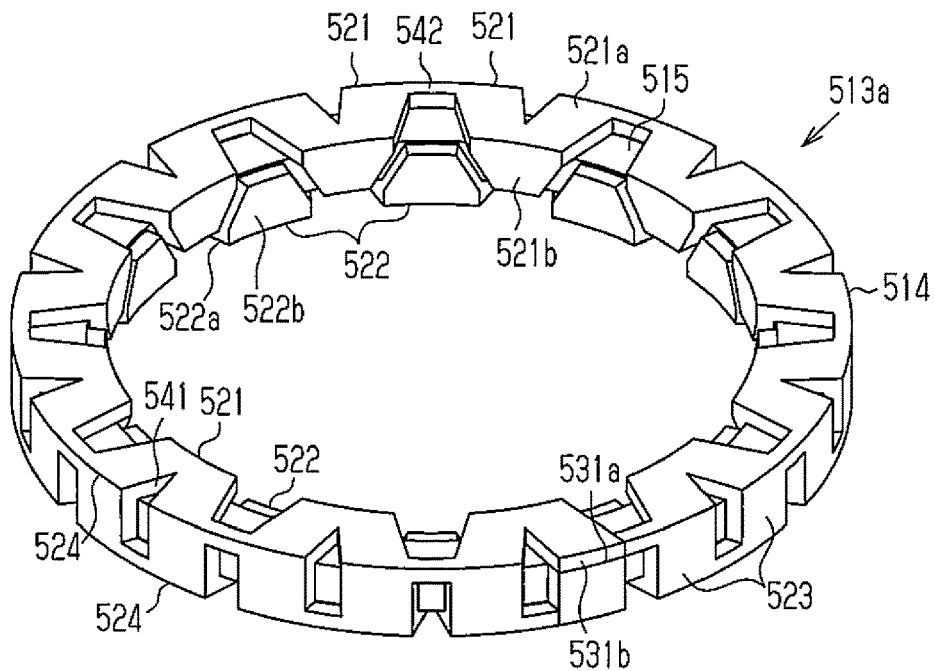
FIG. 68 is a perspective view showing a single stator of another example of the ninth embodiment.
Figure 69:
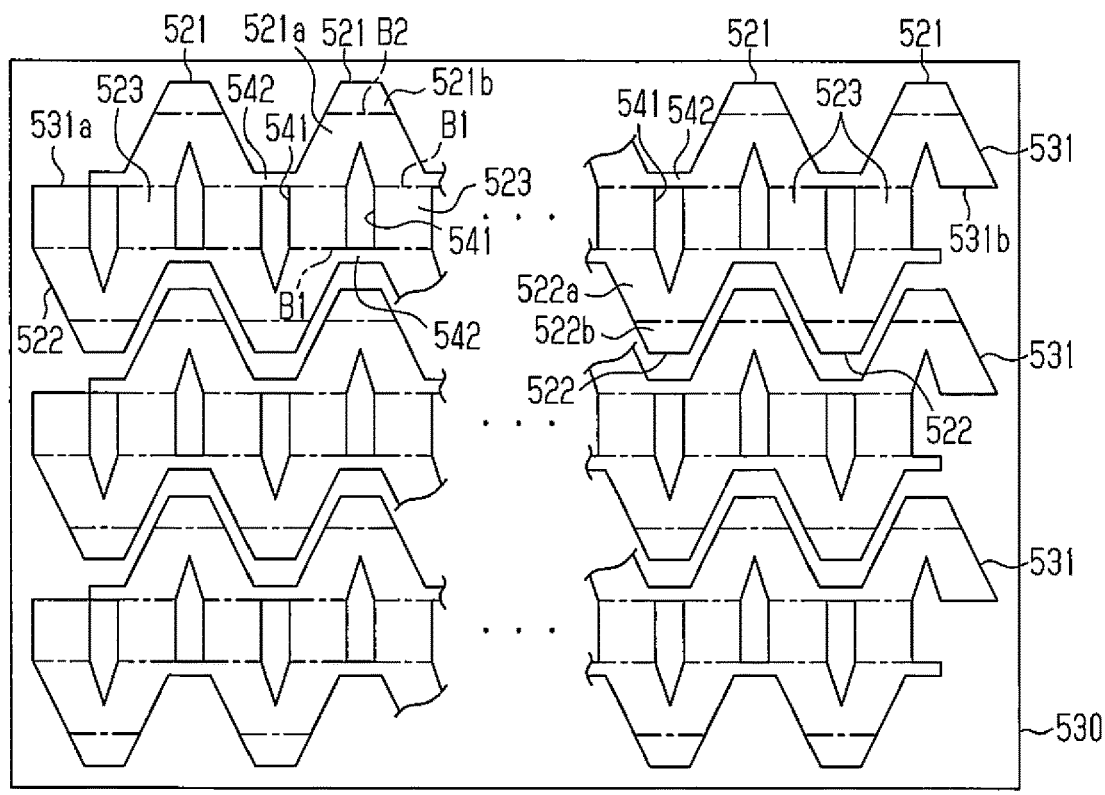
FIG. 69 is a schematic diagram for explaining a producing mode of a stator core shown in FIG. 68.

For example, the cut out portions 525 are formed in the boundary portions B1 (portions which become angle portions 524 after bending) between the core back portions 523 and the first extending portions 521a and 522a of the claw-shaped magnetic poles 521 and 522 in the ninth embodiment, but the present invention is not limited to this configuration. As shown in FIGS. 68 and 69 for example, holes 541 may be formed instead of the cut out portions 525 of the ninth embodiment. According to this configuration, the first claw-shaped magnetic poles 521 (first extending portions 521a) which are adjacent to each other in the circumferential direction and the second claw-shaped magnetic poles 522 (first extending portions 522a) which are adjacent to each other in the circumferential direction are not severed from each other unlike the ninth embodiment, and they are connected to each other through connecting portions 542. Each of the holes 541 extends from a central portion of the first extending portion 521a (first extending portion 522a of second claw-shaped magnetic poles 522) of the first claw-shaped magnetic poles 521 to the boundary portion B1 between the second claw-shaped magnetic poles 522 (first claw-shaped magnetic poles 521) and the core back portion 523. That is, since an end of the hole 541 is superposed on the boundary portion B1, the first extending portions 521a and 522a can easily be bent and formed. According to this configuration also, like the ninth embodiment, it is possible to reduce a waste of the electromagnetic steel plate 530 and as a result, yield can be enhanced.

Figure 70:
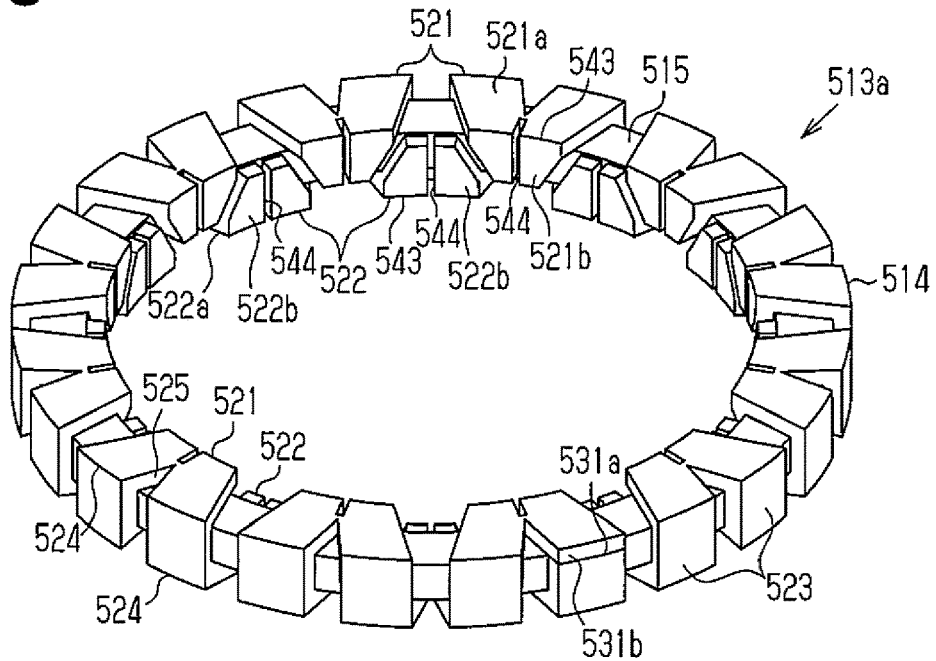
FIG. 70 is a perspective view showing a single stator of another example of the ninth embodiment.
Figure 71:
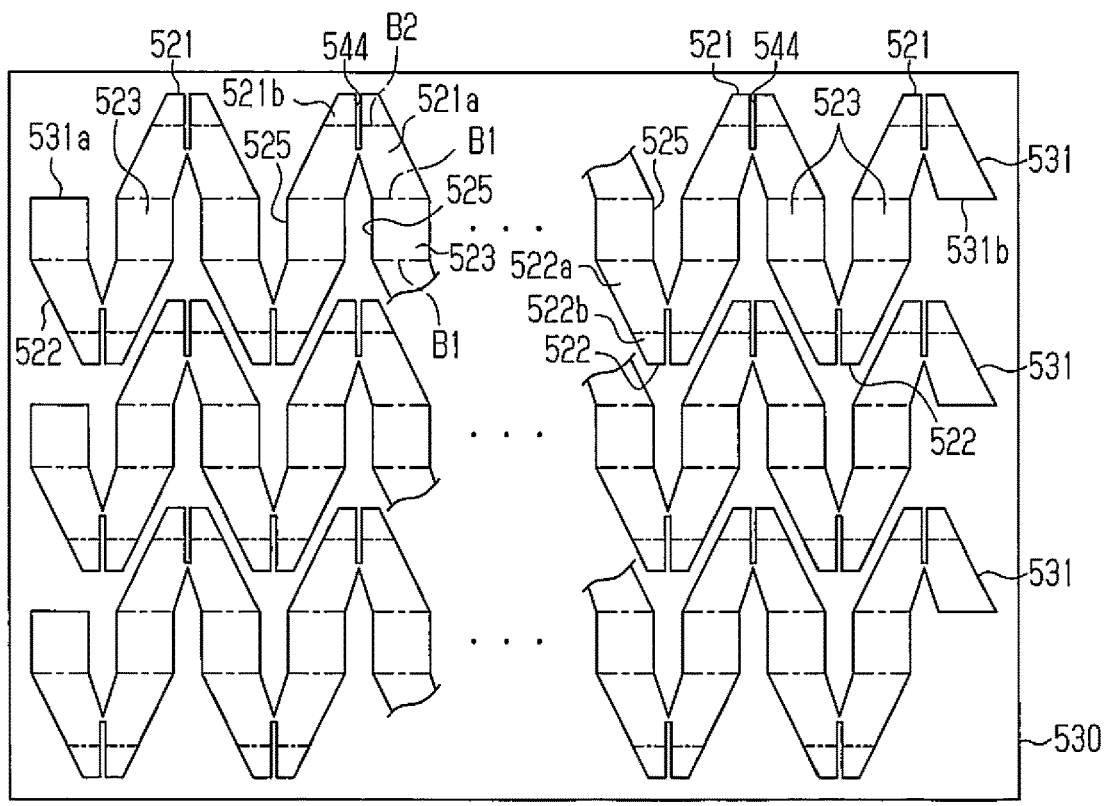
FIG. 71 is a schematic diagram for explaining a producing mode of a stator core shown in FIG. 70.

As shown in FIGS. 70 and 71, slits 544 (cut out portions) extending in the axial direction may be formed in the angle portions 543 formed by the first extending portions 521a and 522a and the second extending portions 521b and 522b of the first and second claw-shaped magnetic poles 521 and 522. According to this configuration, it becomes easy to form the inner peripheral surfaces (surfaces opposed to rotor 512a) of the second extending portions 521b and 522b into the arc shapes. If the inner peripheral surfaces of the second extending portions 521b and 522b are formed into the arc shapes, an air gap between the outer peripheral surface of the rotor 512a and the inner peripheral surface of the stator 513a can be equalized and as a result, this configuration can contribute to enhancement of the motor quality. Although the slits 544 extend to the tip ends of the second extending portions 521b and 522b in the example shown in FIGS. 70 and 71, the invention is not limited to this configuration. Instead of the slits 544, at least holes may be formed in the angle portions 543.

The connecting configuration of both the ends of the punched material 531 (configuration of first and second ends 531a and 531b) is not limited to the ninth embodiment, and the connecting configuration may appropriately be changed in accordance with a configuration.

In the producing step of the stator core 514, the order of the annular-forming step, the bending step and the placing step of the coil portion 515 is not limited to the ninth embodiment, and the order of these steps may be changed.

Although the invention is embodied in the inner rotor type motor M in which the rotor 512 is placed on the side of the inner periphery of the stator 513 in the ninth embodiment, the invention may be embodied in an outer rotor type motor in which the rotor is placed on the side of an outer periphery of the stator.

Tenth Embodiment

A tenth embodiment of the motor will be described below.

Figure 72:
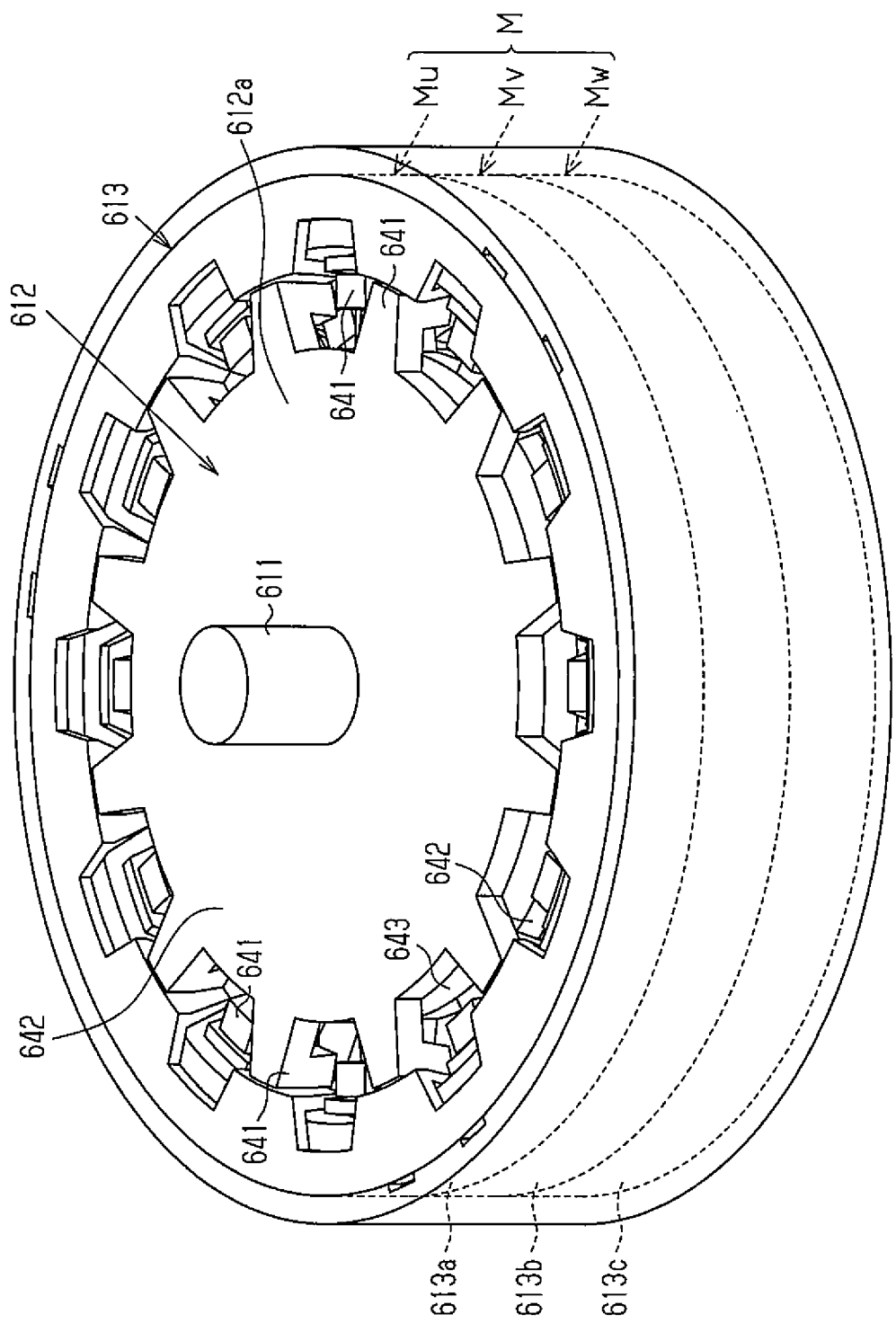
FIG. 72 is a perspective view of a motor according to a tenth embodiment of the present invention.

As shown in FIG. 72, a brushless motor M of the tenth embodiment has such a configuration that an annular stator 613 accommodated in a yoke housing H (housing) is placed on the outer side of a rotor 612 fixed to a rotation shaft 611.

Figure 73:
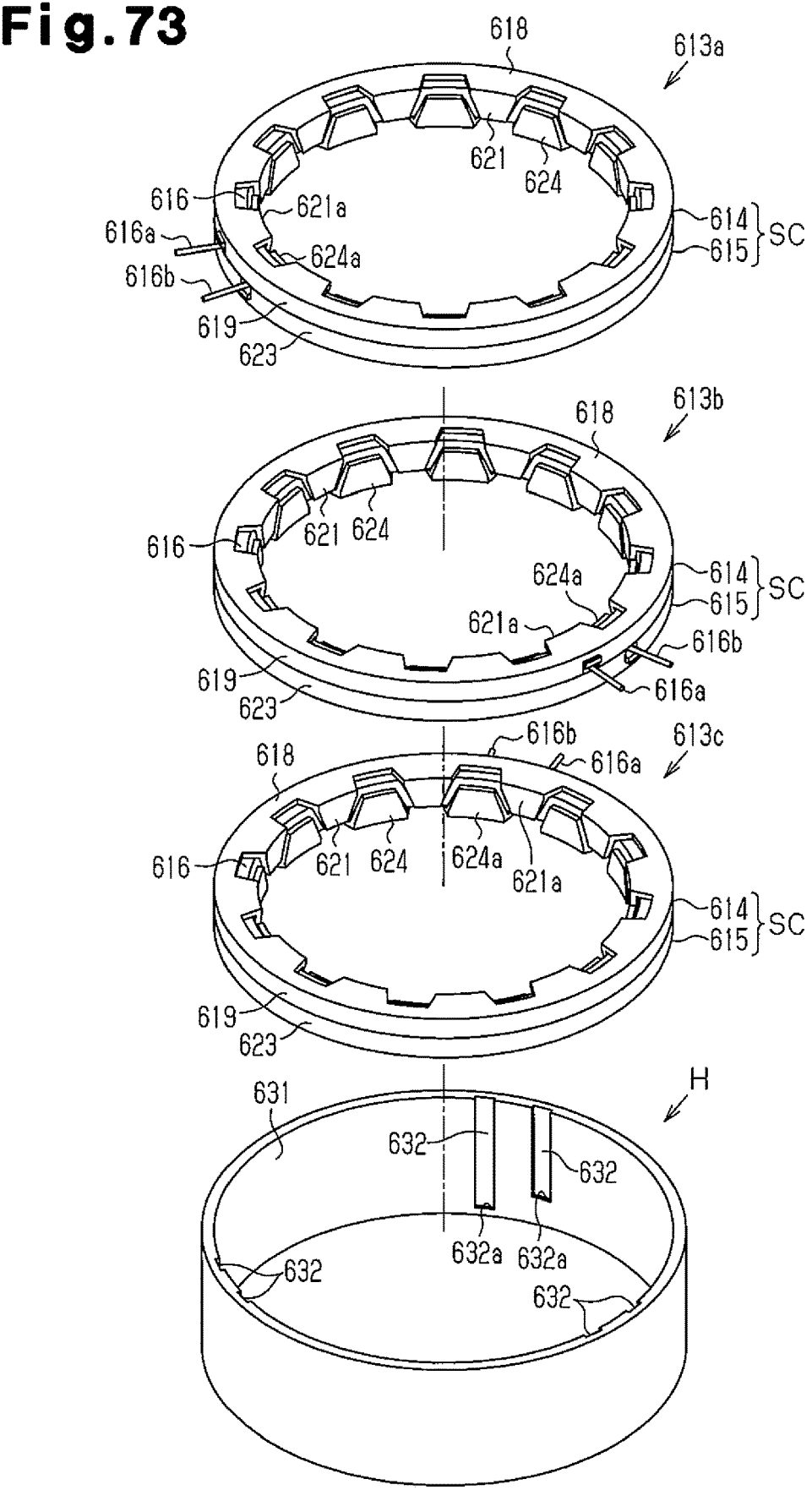
FIG. 73 is an exploded perspective view of a yoke housing and a stator shown in FIG. 72.

As shown in FIGS. 72 and 73, the brushless motor M is formed by stacking three single motor portions, i.e., a U-phase motor portion Mu, a V-phase motor portion Mv and a W-phase motor portion Mw in an axial direction of the motor from above in this order. That is, the brushless motor M includes a U-phase stator 613a, a V-phase stator 613b, a W-phase stator 613c, and three rotors (only U-phase rotor 612a is shown in FIG. 72) which are opposed to the respective stators 613a, 613b and 613c in a radial direction of the motor.

Figure 74:
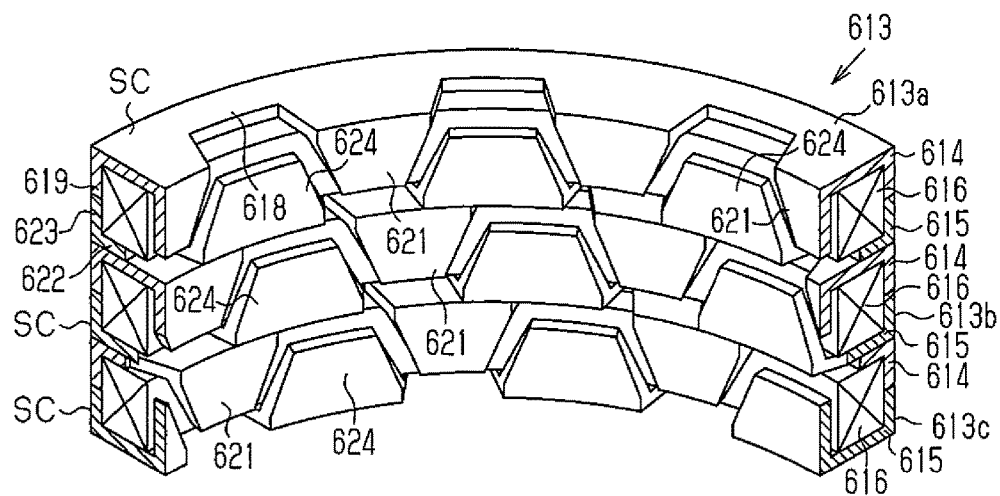
FIG. 74 is a partially sectional perspective view of the stator shown in FIG. 73.

As shown in FIG. 74, the U-phase stator 613a in the stator 613 includes a stator core SC including a first core member 614 and a second core member 615, and a coil portion 616.

More specifically, the first core member 614 includes a substantially annular plate-shaped first core base portion 618 arranged on one side (upper side in FIG. 74) in the axial direction, and a substantially cylindrically-formed cylindrical wall 619 (outer peripheripheral portion) extending from a radial outer end of the first core base portion 618 toward the other side (lower side in FIG. 74) in the axial direction. A plurality of (twelve in tenth embodiment) first claw-shaped magnetic poles 621 are formed on an inner peripheral end (inner peripheral portion) of the first core base portion 618 at equal intervals from one another (30° intervals) in the circumferential direction. The first claw-shaped magnetic poles 621 project radially inward from the first core base portion 618 and extend in the axial direction.

Figure 75:
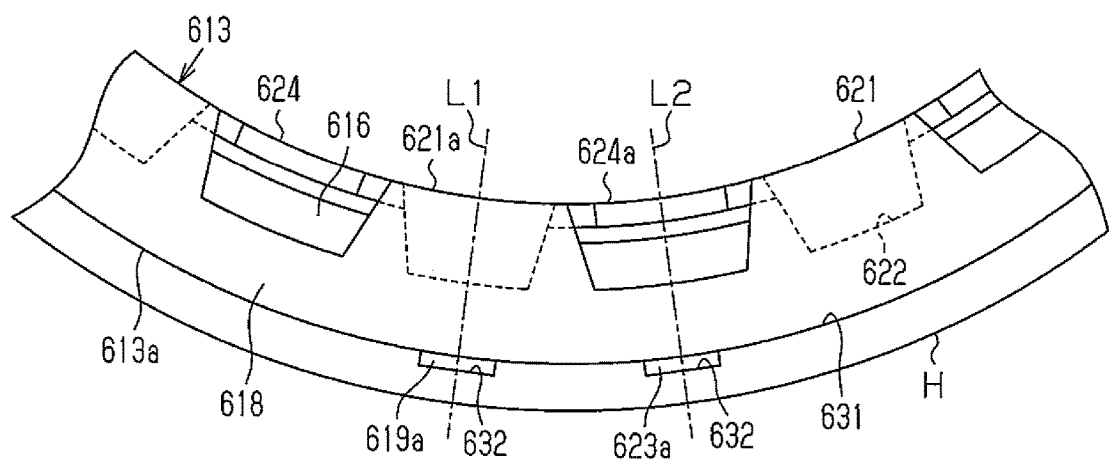
FIG. 75 is a plan view partially showing the stator and the yoke housing shown in FIG. 73.
Figure 76:
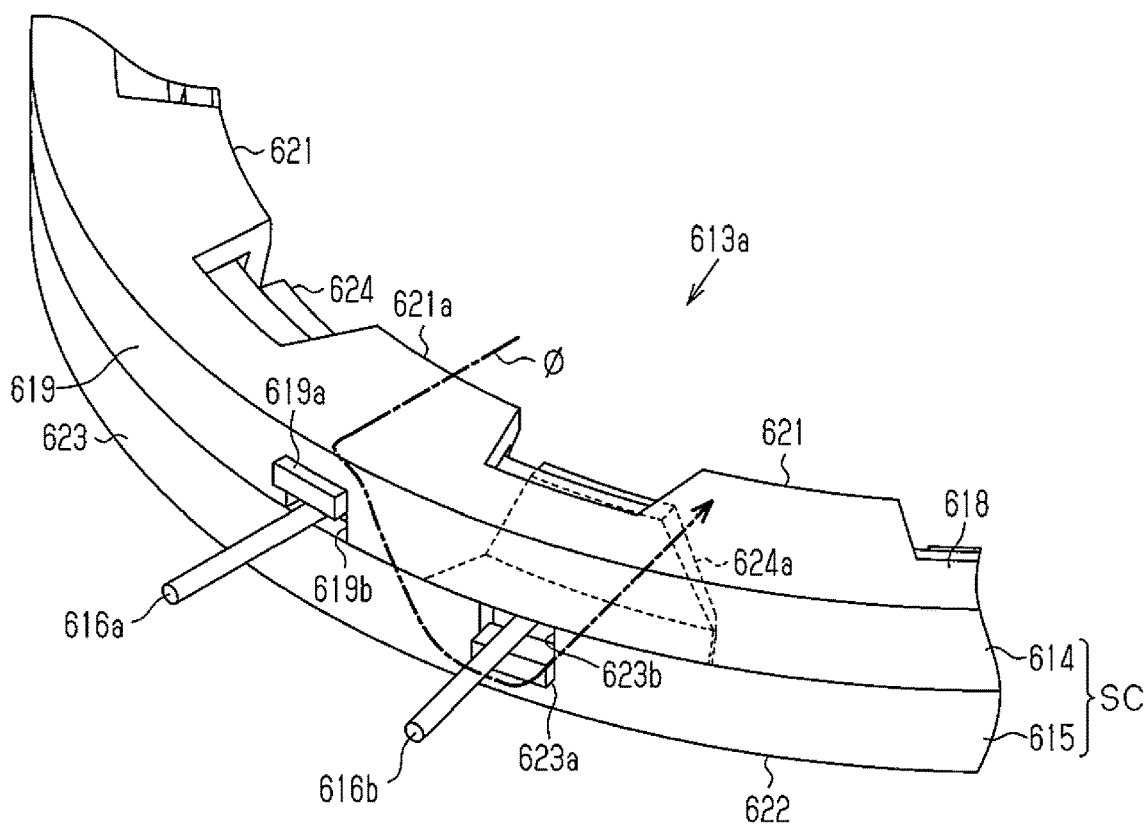
FIG. 76 is a perspective view partially showing a stator (U-phase stator) shown in FIG. 73.

As shown in FIGS. 75 and 76, a first positioning convex portion 619a projecting radially outward is formed on the cylindrical wall 619. The first positioning convex portion 619a is formed by cutting out a portion of the cylindrical wall 619 and by bending the cut out portion radially outward substantially at right angles. According to this, a cut out portion 619b is formed at a position of the cylindrical wall 619 which corresponds to the first positioning convex portion 619a, and inside and outside of the cylindrical wall 619 in the radial direction are brought into communication with each other through the cut out portion 619b. The first positioning convex portion 619a and the cut out portion 619b are formed into rectangular shapes.

The first positioning convex portion 619a is formed at a position corresponding to a circumferential center of one of the plurality of first claw-shaped magnetic poles 621 (first claw-shaped magnetic pole 621a in FIG. 75). More specifically, the first positioning convex portion 619a is formed on a circumferential center line L1 of the first claw-shaped magnetic pole 621a as viewed from the axial direction.

As shown in FIGS. 73 to 75, the second core member 615 has substantially the same shape as that of the first core member 614, and includes a second core base portion 622, a cylindrical wall 623 provided with second positioning convex portion 623a and a cut out portion 623b, and second claw-shaped magnetic poles 624.

The second core member 615 is arranged on the other side (lower side in FIG. 74) in the axial direction with respect to the first core base portion 618 such that the second core member 615 is opposed to the second core base portion 622. The second core member 615 is provided such that the second claw-shaped magnetic poles 624 extend toward one side in the axial direction and the second claw-shaped magnetic pole 624 and the first claw-shaped magnetic poles 621 are adjacent to each other in the circumferential direction.

As shown in FIGS. 75 and 76, the second positioning convex portion 623a formed on the cylindrical wall 623 of the second core member 615 has the same shape as that of the first positioning convex portion 619a, and the second positioning convex portion 623a is formed at a position corresponding to a circumferential center of a second claw-shaped magnetic pole 624a which is adjacent to the first claw-shaped magnetic pole 621a in the circumferential direction. More specifically, the second positioning convex portion 623a is formed on a circumferential center line L2 of the second claw-shaped magnetic pole 624a as viewed from the axial direction. The cut out portion 623b is formed at a position of the cylindrical wall 623 which corresponds to the second positioning convex portion 623a, and inside and outside of the cylindrical wall 623 in the radial direction are brought into communication with each other through the cut out portion 623b.

The cylindrical walls 619 and 623 of the first and second core members 614 and 615 are in abutment against each other in the axial direction, and the cylindrical walls 619 and 623 connect outer peripheral edges of the first and second core base portions 618 and 622 to each other in the axial direction. According to this, the cylindrical walls 619 and 623 configure an outer peripheral wall of the stator core SC. The outer peripheral wall of the stator core SC formed by the cylindrical walls 619 and 623 opens in the radial direction in the cut out portions 619b and 623b.

As shown in FIGS. 74 to 76, each of the coil portions 616 is formed by winding a conductor a plurality of times, and the coil portion 616 is placed between the first core base portion 618 and the second core base portion 622 in the axial direction. The first claw-shaped magnetic poles 621 and the second claw-shaped magnetic poles 624 are alternately placed in the circumferential direction, and the coil portion 616 causes them to function as magnetic poles which are different from each other based on energization.

One end of the coil portion 616 (first terminal line 616a) is led out (pulled out) toward an outer periphery of the stator core SC from the cut out portion 619b of the first core member 614, and the other end of the coil portion 616 (second terminal line 616b) is led out toward the outer periphery of the stator core SC from the cut out portion 623b of the second core member 615.

As shown in FIGS. 73 and 74, the V-phase stator 613b has substantially the same configuration as that of the U-phase stator 613a. The V-phase stator 613b is stacked such that angle positions of the first and second claw-shaped magnetic poles 621 and 624 are displaced from the U-phase stator 613a by 60° in electrical angle (5° in mechanical angle) in the clockwise direction. That is, the V-phase stator 613b is stacked such that it is displaced from the U-phase stator 613a in phase by 60° in electrical angle in the clockwise direction.

The W-phase stator 613c has substantially the same configuration as that of the U-phase stator 613a. The W-phase stator 613c is stacked such that angle positions of the first and second claw-shaped magnetic poles 621 and 624 are displaced from the V-phase stator 613b by 60° in electrical angle (5° in mechanical angle) in the clockwise direction. That is, the W-phase stator 613c is stacked such that it is displaced from the V-phase stator 613b in phase by 60° in electrical angle in the clockwise direction.

If sets of the first and second positioning convex portions 619a and 623a in the stator cores SC of the respective phases are viewed as one group, the stators 613a, 613b and 613c are stacked on one another such that these sets are located substantially at equal intervals from one another (substantially 120° intervals) in the circumferential direction.

As shown in FIG. 72, the stators 613a, 613b and 613c are accommodated in the cylindrical yoke housing H in a state where the stators are stacked on one another in the axial direction.

Here, as shown in FIG. 73, six positioning recesses 632 (housing-side positioning portions) which are recessed in the radial direction are formed in the inner peripheral surface 631 of the yoke housing H. The positioning recesses 632 are formed at positions corresponding to the first and second positioning convex portions 619a and 623a formed on the stator cores SC of the respective phases. That is, the positioning recesses 632 are formed two each at three locations of the yoke housing H substantially at equal intervals from one another (substantially 120° intervals) in the circumferential direction.

The positioning recesses 632 straightly extend in the axial direction from an axial end surface of the yoke housing H to an axial intermediate portion of the yoke housing H. That is, one axial end of each of the positioning recesses 632 is an opening end into which the first and second positioning convex portions 619a and 623a can be inserted from the axial direction, and the other axial end of the positioning recess 632 is a closed end 632a which can abut against the first and second positioning convex portions 619a and 623a in the axial direction. Circumferential widths of the positioning recesses 632 are substantially equal to circumferential widths of the first and second positioning convex portions 619a and 623a.

The first and second positioning convex portions 619a and 623a are press fitted into and fixed to the positioning recesses 632 from the axial direction, and are engaged with both circumferential sides of the positioning recesses 632 (see FIG. 75). According to this, the stators 613 of the respective phases are positioned with respect to the yoke housing H in the circumferential direction.

The first and second positioning convex portions 619a and 623a abut against the closed ends 632a of the positioning recesses 632 in the axial direction. According to this, the stators 613 of the respective phases are positioned with respect to the yoke housing H in the axial direction. The closed ends 632a of the positioning recesses 632 are formed such that their axial positions are different in accordance with differences in axial positions of the positioning convex portion 619a and 623a.

As shown in FIG. 72, the U-phase rotor 612a in the rotor 612 includes a pair of rotor cores 642 on which claw-shaped magnetic poles 641 are respectively formed, and a field magnet 643 placed between the rotor cores 642 in the axial direction. The field magnet 643 is magnetized in the axial direction, and the field magnet 643 causes the claw-shaped magnetic poles 641 to function as magnetic poles which are alternately different from each other in the circumferential direction. That is, the rotor 612a is of so-called Lundell type structure. Since the V-phase rotor and the W-phase rotor (not shown) are the same as the U-phase rotor 612a, description thereof will be omitted.

The V-phase rotor is stacked such that it is displaced from the U-phase rotor 612a in phase by 60° in electrical angle in the counterclockwise direction. The W-phase rotor is stacked such that it is displaced from the V-phase rotor in phase by 60° in electrical angle in the counterclockwise direction (i.e., W-phase rotor is displaced from U-phase rotor 612a in phase by 120° in electrical angle in the counterclockwise direction). That is, a phase-deviating direction of the three-phase rotor in the rotor 612 is opposite from the phase-deviating direction (deviation in the clockwise direction) of three-phase in the stator 613.

Next, operations of the tenth embodiment will be described.

If three-phase drive current is supplied to the U-phase, V-phase and W-phase coil portions 616 by a drive circuit (not shown), rotating field is generated by the stator 613, and the rotor 612 is rotated and driven. At this time, rotation (speed and direction of rotation) of the rotor 612 is detected by a Hall IC (not shown). Based on the detection signal, three-phase drive current is supplied from the drive circuit to the coil portions 616 at optimal timing. According to this, rotating field is excellently generated, and the rotor 612 is excellently and continuously rotated and driven.

Here, in the tenth embodiment, the first and second positioning convex portions 619a and 623a of the stator 613 are fastened to the positioning recesses 632 of the yoke housing H in the circumferential direction and the axial direction. According to this, the stator 613 is precisely assembled with respect to the yoke housing H.

As shown in FIG. 76, when the rotor 612 rotates, for example, magnetic fluxes φ flow through the first claw-shaped magnetic poles 621 on the side of their outer peripheries, branch off toward both sides at the cylindrical wall 619 in the circumferential direction, the branched magnetic fluxes φ pass through the cylindrical wall 623 of the second core member 615, and flow into the second claw-shaped magnetic poles 624 on the side of inner peripheries thereof. Here, the first and second positioning convex portions 619a and 623a are formed on the circumferential center lines L1 and L2 of the first and second claw-shaped magnetic poles 621 and 624. That is, the positioning convex portion 619a and 623a are formed at positions where a flow of magnetic fluxes φ is less prone to be hindered. As a result, reduction in motor output is suppressed.

Next, characteristic advantages of the tenth embodiment will be described below.

(37) The first and second positioning convex portions 619a and 623a are respectively formed on the cylindrical walls 619 and 623 of the stator core SC. The first and second positioning convex portions 619a and 623a can engage with the positioning recesses 632 in the circumferential direction. The positioning recesses 632 are provided in the inner peripheral surface 631 of the yoke housing H. Hence, it is possible to position the stator 613 in the circumferential direction by a simple configuration.

(38) The first and second positioning convex portions 619a and 623a are respectively formed by radially outwardly bending and forming portions of the cylindrical walls 619 and 623. Hence, it is possible to position the stator 613 in the circumferential direction by a simple configuration, i.e., by bending and forming the positioning convex portion 619a and 623a.

(39) The first and second positioning convex portions 619a and 623a are respectively formed by cut out portions of the cylindrical walls 619 and 623. Terminal lines 616a and 616b of the coil portion 616 are led out from the cut out portions 619b and 623b formed by forming the positioning convex portion 619a and 623a. That is, the terminal lines 616a and 616b of the coil portion 616 are led out from the cut out portions 619b and 623b which are formation traces of the positioning convex portion 619a and 623a. Hence, a shape of the stator core SC can be simplified by the configuration of the tenth embodiment.

(40) The first and second positioning convex portions 619a and 623a are engaged with the positioning recesses 632 (closed ends 632a) of the yoke housing H also in the axial direction. Hence, it is possible to position the stator 613 in the axial direction by a simple configuration.

(41) The first and second positioning convex portions 619a and 623a are formed at positions respectively corresponding to circumferential centers of the first and second claw-shaped magnetic poles 621 and 624. According to this configuration, the first and second positioning convex portions 619a and 623a are formed at position of the stator core SC displaced from a main path of magnetic fluxes. Hence, it is possible to restrain the first and second positioning convex portions 619a and 623a from hindering a flow of magnetic fluxes.

(42) The stators 613a, 613b and 613c are stacked on one another such that the sets of the first and second positioning convex portions 619a and 623a (and sets of pairs of the positioning recesses 632) are located substantially at equal intervals (substantial 120° intervals) from one another in the circumferential direction. Hence, it is possible to substantially equalize a stress applied from the stator 613 to the yoke housing H, and it is possible to fix the stator 613 to the yoke housing H in a well balanced manner.

(43) The rotor 612 includes a pair of rotor cores 642 on which the plurality of claw-shaped magnetic poles 641 are respectively formed, and the field magnet 643 placed between the rotor cores 642 in the axial direction. The field magnet 643 is magnetized in the axial direction to cause the claw-shaped magnetic poles 641 to function as magnetic poles which are alternately different from each other in the circumferential direction. The stators 613 and the rotors 612 are arranged in a multi-part manner in the axial direction. According to this configuration, in the motor in which the stators 613 and the rotors 612 are arranged in the multi-part manner in the axial direction, it is possible to position the stators 613 with respect to the yoke housing H in the circumferential direction by a simple configuration.

(44) The stator 613 includes the U-phase, V-phase and W-phase stators 613a to 613c which are arranged in a three-part manner in the axial direction, and the rotor 612 also includes the U-phase, V-phase and W-phase rotors which are arranged in a three-part manner in the axial direction. The V-phase rotor (second part rotor) is placed such that it is displaced from the U-phase rotor 612a (first part rotor) in the counterclockwise direction, and the W-phase rotor (third part rotor) is placed such that it is displaced from the V-phase rotor in the counterclockwise direction. The V-phase stator 613b (second part stator) is placed such that it is displaced from the U-phase stator 613a (first part stator) in the clockwise direction, and the W-phase stator 613c (third part stator) is placed such that it is displaced from the V-phase stator 613b in the clockwise direction. That is, the phase-deviating direction of the three-phase rotor 612 is opposite from the phase-deviating direction of three-phase stator 613. Hence, the rotor 612 can excellently rotate.

Eleventh Embodiment

Figure 78:
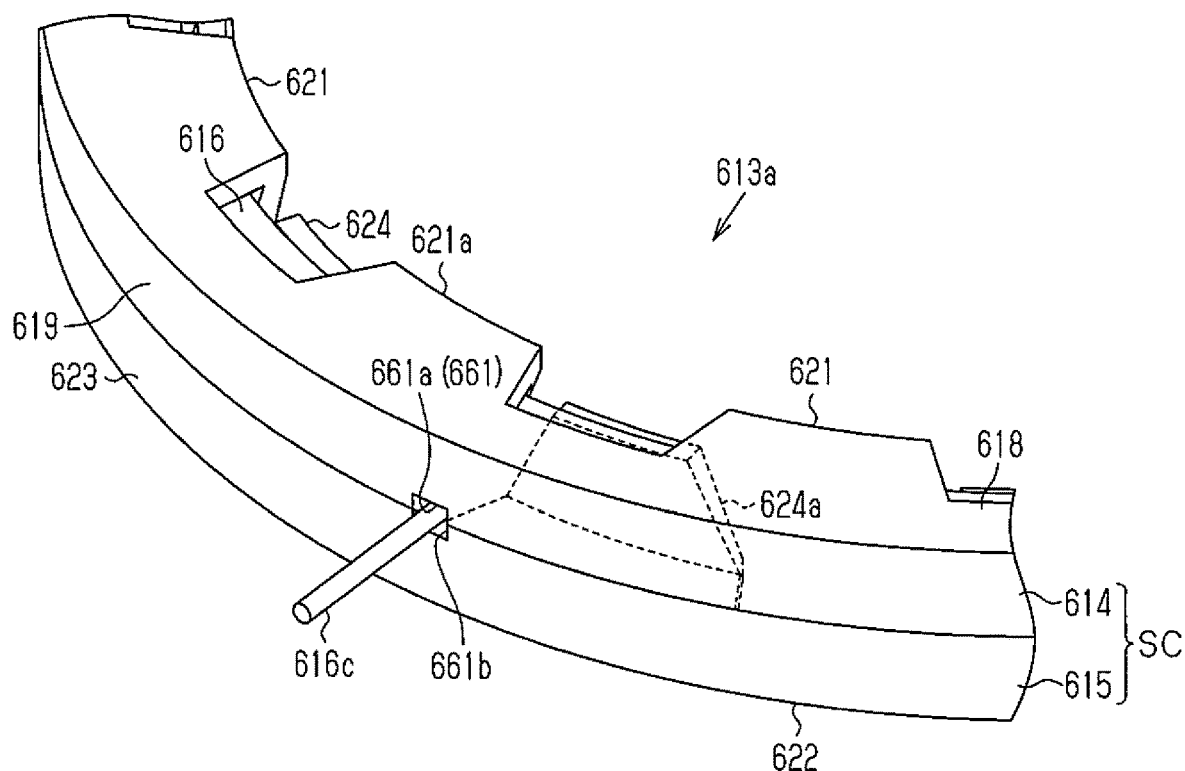
FIG. 78 is a perspective view partially showing a stator (one phase) according to an eleventh embodiment of the present invention.

An eleventh embodiment of the motor will be described below in accordance with FIG. 78. In the eleventh embodiment, a configuration of a winding lead-out hole which is formed in an outer peripheral portion (cylindrical walls 619 and 623) of a stator core SC and from which an end (lead) of a coil portion 616 is led out is different from that of the tenth embodiment. Therefore, the same reference numerals as those of the tenth embodiment are allocated to similar configurations, and detailed description thereof will be omitted. In FIG. 78, a U-phase stator 613a will be described as an example.

As shown in FIG. 78, cylindrical walls 619 and 623 of first and second core members 614 and 615 includes cut out portions 661a and 661b which are formed by cut out portions of ends of the cylindrical walls 619 and 623 which abut against each other in the axial direction. Circumferential widths of the cut out portions 661a and 661b are equally formed, and the cut out portions 661a and 661b are formed at the same position in the circumferential direction. The cut out portions 661a and 661b configure one winding lead-out hole 661 which extends through an outer peripheral wall of the stator core SC in the radial direction. The stator core SC is configured by the cylindrical walls 619 and 623. An end (lead 616c) of the coil portion 616 is inserted into the winding lead-out hole 661 in the radial direction, and is led out toward an outer periphery of the stator core SC. It is preferable that positions where the cut out portions 661a and 661b are formed are set to positions which are circumferentially displaced from portions (portions having narrow circumferential widths) between first claw-shaped magnetic poles 621 and between second claw-shaped magnetic poles 624 in the core base portions 618 and 622.

When the stator 613a of the eleventh embodiment is assembled, the coil portion 616 is first placed on the second core member 615, and the lead 616c of the coil portion 616 is inserted into the cut out portion 661b of the second core member 615. At this time, a portion of the lead 616c projects in the axial direction from an axial end (cut out portion 661b) of the cylindrical wall 623.

Next, the first core member 614 and the second core member 615 are assembled such that they sandwich the coil portion 616. At this time, a circumferential position of the first core member 614 is aligned such that the lead 616c projecting from the cut out portion 661b of the second core member 615 is fitted into the cut out portion 661a of the first core member 614, and the cylindrical wall 619 of the first core member 614 is made to abut against the cylindrical wall 623 of the second core member 615 in the axial direction. According to this, the circumferential positions of the cut out portions 661a and 661b coincide with each other, and the lead 616c is led out from the winding lead-out hole 661 formed by the cut out portions 661a and 661b.

Next, characteristic advantages of the eleventh embodiment will be described below.

(45) The circumferential positions of the cut out portions 661a and 661b respectively formed in the first and second core members 614 and 615 are made to coincide with each other, thereby configuring the winding lead-out hole 661. The lead 616c of the coil portion 616 is led out from the winding lead-out hole 661. According to this configuration, since the circumferential positions of the cut out portions 661a and 661b are made to coincide with each other to configure the winding lead-out hole 661. Therefore, it is possible to position the first and second core members 614 and 615 in the stator core SC in the circumferential direction by the simple configuration. In the eleventh embodiment, to enhance positioning precision of the first and second core members 614 and 615 in the circumferential direction, it is preferable that a circumferential widths of the cut out portions 661a and 661b are set substantially equal to a diameter of the lead 616c (coil wire).

(46) The first and second core members 614 and 615 are configured such that their cylindrical walls 619 and 623 (outer peripheripheral portions) abut against each other in the axial direction. The winding lead-out hole 661 formed from the cut out portions 661a and 661b respectively formed in the cylindrical walls 619 and 623 is configured such that the winding lead-out hole 661 opens in the radial direction of the stator core SC. According to this configuration, the lead 616c of the coil portion 616 can be led out radially outward of the stator core SC.

The eleventh embodiment may be changed as follows.

Figure 79:
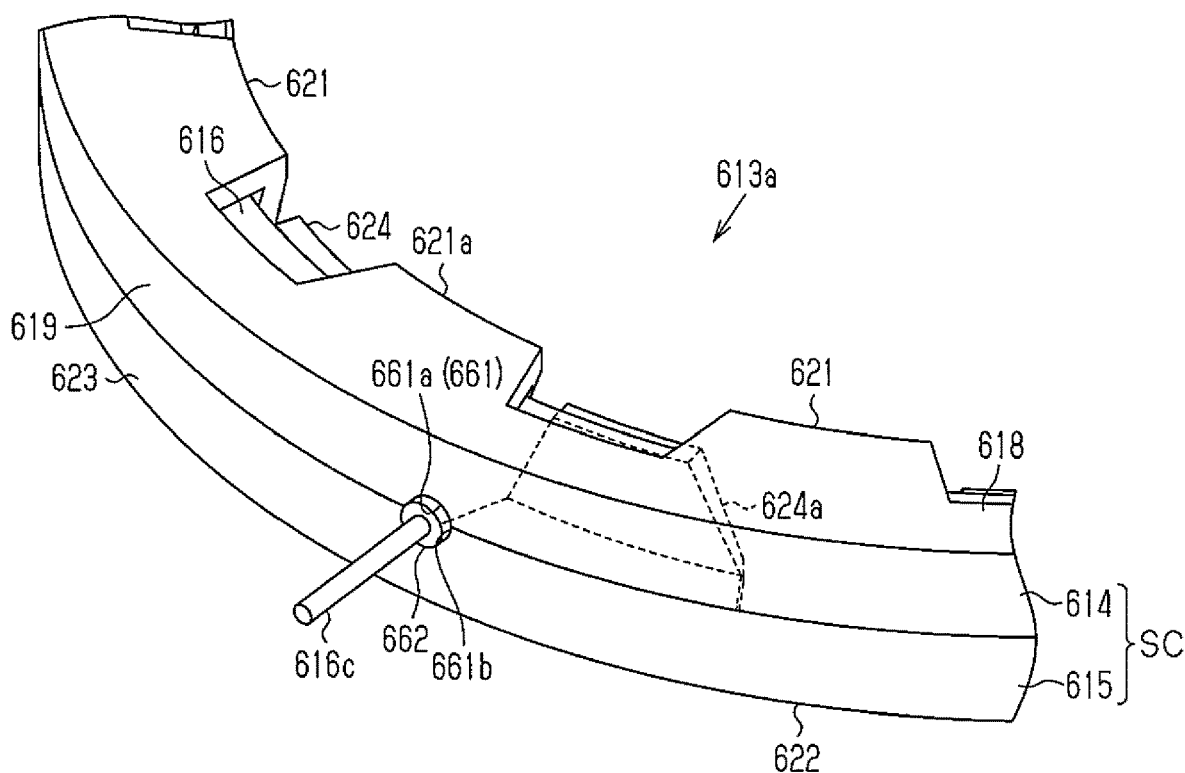
FIG. 79 is a perspective view partially showing a stator (one phase) of another example of the eleventh embodiment.
Figure 80:
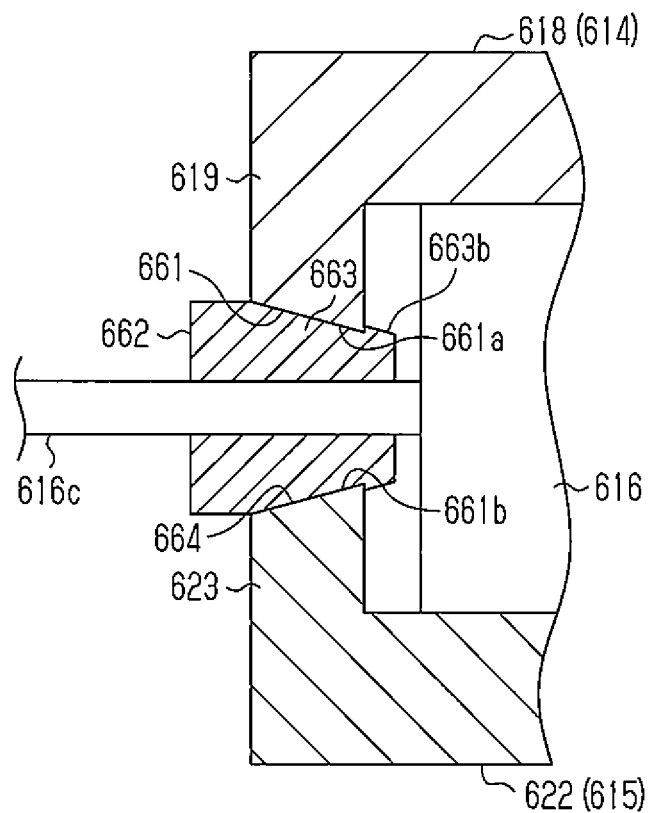
FIG. 80 is a sectional view schematically showing a portion of a state (one phase) in another example of the eleventh embodiment.
Figure 81:
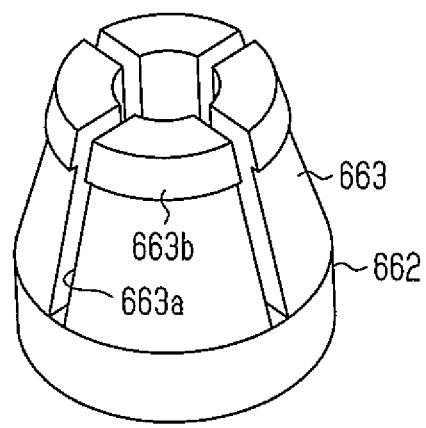
FIG. 81 is a perspective view showing a winding fixing member (interposed member) in another example of FIG. 80.

As shown in FIGS. 79 and 80, a winding fixing member 662 (interposed member) may be provided between the winding lead-out hole 661 and the lead 616c. In this another example, the winding fixing member 662 is made of resin, and formed into a substantially cylindrical shape as shown in FIGS. 80 and 81.

The winding fixing member 662 includes a winding holding portion 663 which is tapered (diameter is reduced) toward one side of the winding fixing member 662 in the axial direction. Four slits 663a are formed in the winding holding portion 663 at equal intervals from one another (90° intervals) in the circumferential direction of the winding fixing member 662. Each of the slits 663a forms a straight line extending along an axial direction of the winding fixing member 662. According to this, the winding holding portion 663 is configured such that it bends in its radial direction.

Fastening claws 663b (fastening portions) projecting radially outward of the winding fixing member 662 are formed on tip ends of the winding holding portions 663. The fastening claws 663b are fastened to the inner peripheral surfaces of the cylindrical walls 619 and 623.

In this another example, the cut out portions 661a and 661b are recessed into semi-circular shapes, and the winding lead-out hole 661 formed from the cut out portions 661a and 661b is circular in shape as viewed from the radial direction of the stator core SC. A tapered portion 664 whose diameter is reduced radially inward of the stator core SC is formed on an inner peripheral surface of the winding lead-out hole 661. The tapered portion 664 inclines with respect to a radial direction (inserting direction of lead 616c) of the stator core SC. The tapered portion 664 abuts against the outer peripheral surface of the winding holding portion 663.

When the stator 613a of this another example is assembled, first, the first and second core members 614 and 615 are assembled to sandwich the coil portion 616. At this time, the circumferential positions of the cut out portions 661a and 661b are made to coincide with each other to form the winding lead-out hole 661, and the lead 616c of the coil portion 616 is inserted into the winding lead-out hole 661 in the radial direction.

Thereafter, the lead 616c which is led out from an outer peripheral wall (cylindrical walls 619 and 623) of the stator core SC toward the outer periphery is inserted into the winding fixing member 662. Then, the winding fixing member 662 is inserted into the winding lead-out hole 661 from the outer periphery side. At this time, the winding holding portion 663 in which the slits 663a are formed abuts against the tapered portion 664 of the winding lead-out hole 661, and the winding holding portion 663 bends radially inward of the winding lead-out hole 661. The fastening claw 663b of the tip end of the winding holding portion 663 is fastened to the inner peripheral surfaces of the cylindrical walls 619 and 623 by elastic restoration of the winding holding portion 663. According to this, the winding fixing member 662 is restrained from coming out from the winding lead-out hole 661. The winding holding portion 663 is narrowed radially to the inward side of the tapered portion 664 by engagement between the tapered portion 664 and the winding holding portions 663, and the lead 616c is sandwiched by the winding holding portions 663. According to this, a fixed state of the lead 616c is stabilized.

According to this configuration also, the circumferential positions of the cut out portions 661a and 661b are made to coincide with each other, and it is possible to configure the winding lead-out hole 661. Therefore, it is possible to position the first and second core members 614 and 615 in the stator core SC in the circumferential direction by a simple configuration.

Further, according to this another example, since the winding fixing member 662 is provide between the winding holding portions 663 and the lead 616c, it is possible to prevent, by the winding fixing member 662, the lead 616c from coming into contact directly with the winding lead-out hole 661. As a result, it is possible to restrain the lead 616c from being damaged.

The winding lead-out hole 661 includes the tapered portion 664 which inclines with respect to the inserting direction (radial direction) of the lead 616c, and the winding fixing member 662 includes the winding holding portions 663 which hold the lead 616c radially inward (direction intersecting with inserting direction of the lead 616c at right angles) of the winding fixing member 662 by engagement with the tapered portion 664. According to this configuration, by attaching the winding fixing member 662, it is possible to easily fix the lead 616c to the winding lead-out hole 661.

The winding fixing member 662 includes the fastening claws 663b which are fastened to the inner peripheral surfaces of the cylindrical walls 619 and 623. Hence, it is possible to restrain the winding fixing member 662 from coming out from the winding lead-out hole 661.

Figure 82:
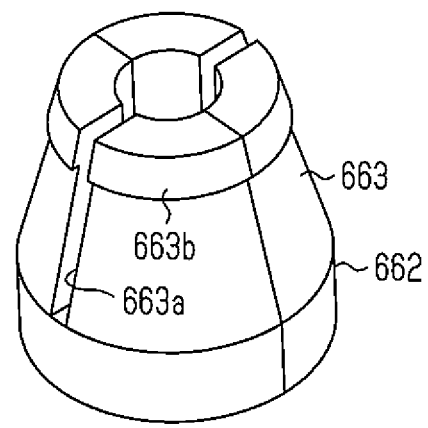
FIG. 82 is a perspective view showing a winding fixing member of another example of the eleventh embodiment.
Figure 83:
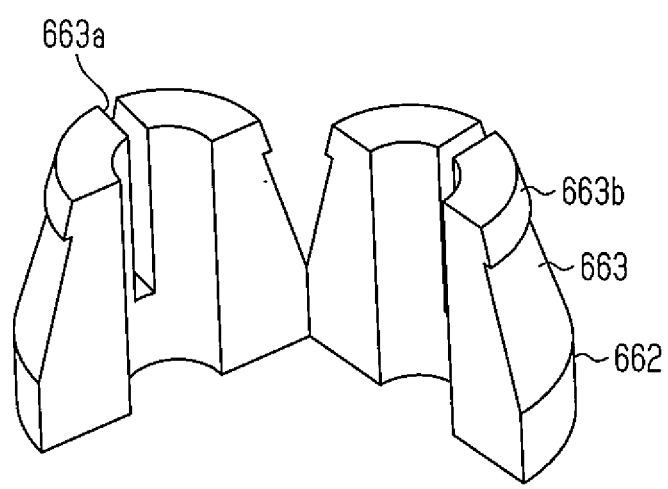
FIG. 83 is a perspective view showing an opened state of a winding fixing member of another example of FIG. 82.

A configuration such as a shape of the winding fixing member 662 is not limited to the example shown in FIGS. 79 to 81. As shown in FIGS. 82 and 83 for example, the winding fixing member 662 may be divided into two members in the radial direction as a divided structure. According to this configuration, the winding fixing member 662 can be attached to an intermediate portion of the lead 616c without inserting the end of the lead 616c into the winding fixing member 662.

Further, in the winding fixing member 662 shown in FIGS. 81 and 82, the slits 663a and the fastening claws 663b may be omitted from the winding holding portion 663.

In this another example, the winding fixing member 662 is attached to the winding lead-out hole 661 from the outer peripheral side, but the invention is not especially limited to this configuration. The winding fixing member 662 may be attached to the winding lead-out hole 661 from the inner peripheral side.

In the example shown in FIGS. 78 and 79, the stator 613a is the outer stator provided at its inner periphery with the first and second claw-shaped magnetic poles 621 and 624, but the invention is not especially limited to this configuration. The invention may be applied to an inner stator provided at its outer periphery with the first and second claw-shaped magnetic poles.

The tenth and eleventh embodiments may be changed as follows.

A convex and concave relation between the positioning recess 632 and the positioning convex portion 619a and 623a in the tenth embodiment may be reversed.

Figure 77:
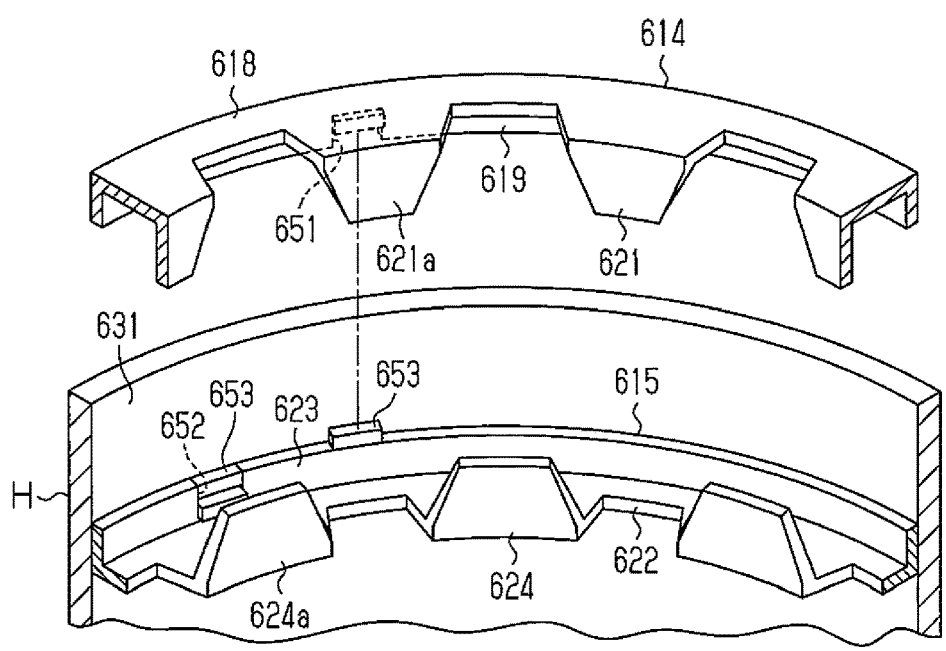
FIG. 77 is a perspective view partially showing a stator core and a yoke housing of another example of the tenth embodiment.

In the example shown in FIG. 77 for example, the cylindrical walls 619 and 623 of the first and second core members 614 and 615 respectively include cut out recesses 651 and 652 (stator-side positioning portions) which are formed by cut out portions of the cylindrical walls 619 and 623 from their axial tip end surfaces, and bending these cut out portions radially inward substantially at right angles. The recesses 651 and 652 in FIG. 77 are formed at the same positions as those of the positioning convex portion 619a and 623a (cut out portions 619b and 623b) of the tenth embodiment.

A plurality of housing-side positioning portions 653 projecting radially inward are formed on the inner peripheral surface 631 of the yoke housing H, and the housing-side positioning portions 653 are fitted into the cut out recesses 651 and 652. The housing-side positioning portions 653 are fastened to the cut out recesses 651 and 652 in the circumferential direction and the axial direction. According to this, the first and second core members 614 and 615 are positioned with respect to the yoke housing H in the circumferential direction and the axial direction. According to this configuration also, the same advantages as those of the tenth embodiment can be obtained.

A configuration such as a shape of the stator core SC formed from the separate first and second core members 614 and 615 is not limited to those of the tenth and eleventh embodiments. For example, although the cylindrical walls 619 and 623 are respectively arranged on the first and second core members 614 and 615 in the tenth embodiment, the cylindrical wall may be formed only on the first core member 614 or the second core member 615. The first and second core members 614 and 615 of the tenth embodiment may be configured as an integral stator core. The number of and shapes of the first and second claw-shaped magnetic poles 621 and 624 may appropriately be changed.

Configurations such as formed positions, the number of and shapes of the positioning convex portions 619a and 623a are not limited to those of the tenth and eleventh embodiments. For example, the first and second positioning convex portions 619a and 623a may be formed at positions displaced from the circumferential center lines L1 and L2 of the first and second claw-shaped magnetic poles 621 and 624. One or three or more positioning convex portions may be arranged on each of the U-phase, V-phase and W-phase stators 613a, 613b and 613c. The positioning convex portion 619a and 623a may not be formed by the cutting out and bending operations unlike the tenth and eleventh embodiments only if the positioning convex portions 619a and 623a project radially outward.

Although the present invention is applied to the brushless motor M having the three layered rotors 612 and the stators 613 in the tenth and eleventh embodiments, the invention may be applied to a motor having four or more layered rotors and stators.

Twelfth Embodiment

A twelfth embodiment of the present invention will be described below.

Figure 84:
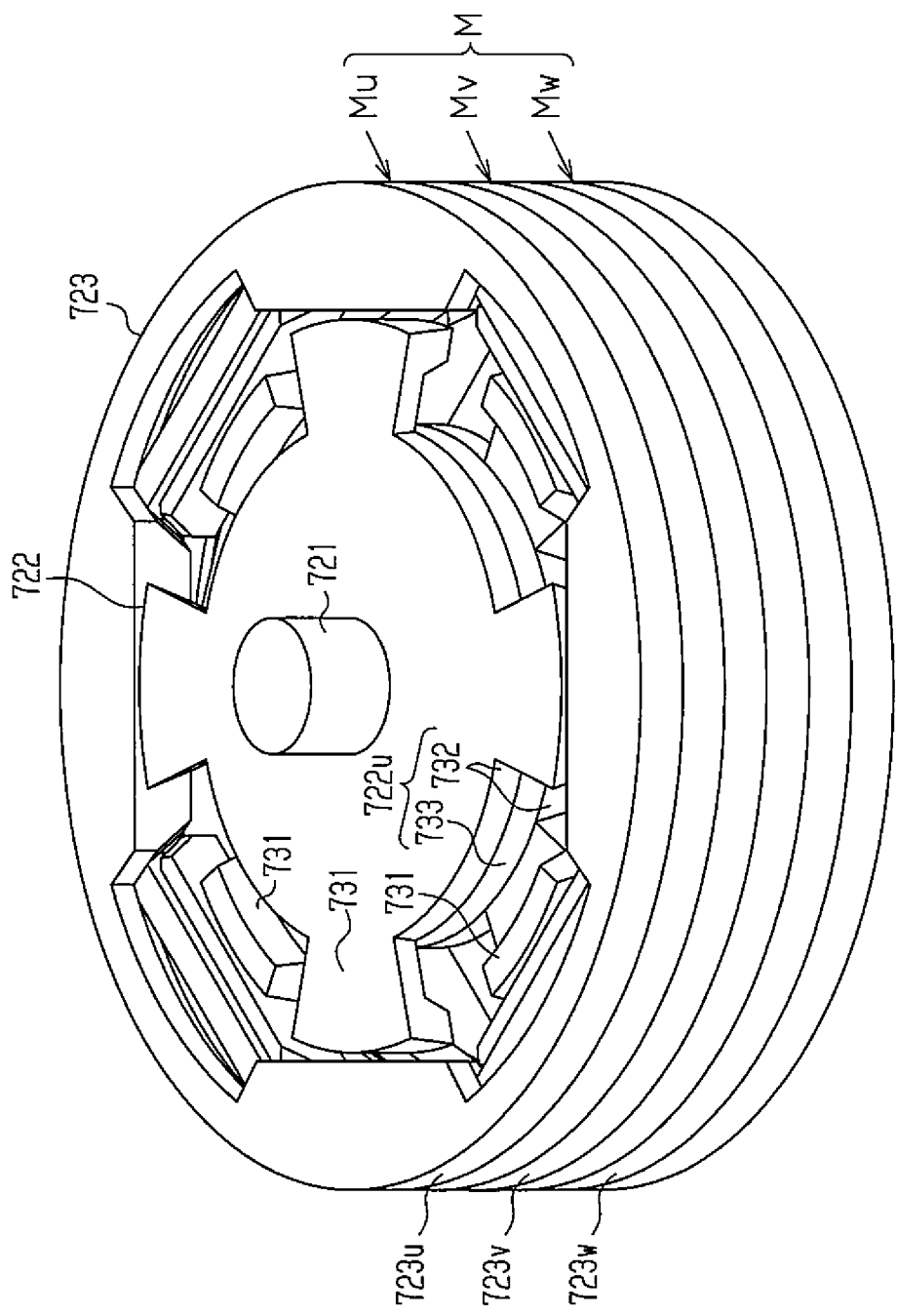
FIG. 84 is a perspective view of a motor according to a twelfth embodiment of the present invention.

As shown in FIG. 84, a brushless motor M includes a rotor 722 fixed to a rotation shaft 721, and a stator 723 placed on the outer side of the rotor 722. The rotation shaft 721 is rotatably supported by a motor housing (not shown). The stator 723 is fixed to the motor housing (not shown) for example. The stator 723 may be accommodated in a yoke housing (not shown) and the yoke housing may be fixed to the motor housing.

The brushless motor M has such a structure that three motor portions are arranged in an axial direction of the rotation shaft 721. That is, the brushless motor M includes a U-phase motor portion Mu, a V-phase motor portion Mv and a W-phase motor portion Mw. The U-phase motor portion Mu includes a rotor 722u and a stator 723u. Similarly, the V-phase motor portion Mv includes a rotor (not shown) and a stator 723v, and the W-phase motor portion Mw includes a rotor (not shown) and a stator 723w. Therefore, corresponding to the motor portions Mu, Mv and Mw, the rotor 722 includes a U-phase rotor 722u, a V-phase rotor (not shown) and a W-phase rotor (not shown). Similarly, corresponding to the motor portions Mu, Mv and Mw, the stator 723 includes a U-phase stator 723u, a V-phase stator 723v and a W-phase stator 723w.

As shown in FIG. 84, the U-phase rotor 722u includes a pair of rotor cores 732 respectively possessed by claw-shaped magnetic poles 731, and a field magnet 733 placed between the rotor cores 732 in the axial direction. The field magnet 733 is magnetized in the axial direction, thereby causing the claw-shaped magnetic poles 731 to function as magnetic poles which are alternately different from each other in a circumferential direction of the motor. That is, the U-phase rotor 722u is of so-called Lundell type structure. Since the V-phase rotor and the W-phase rotor (both not shown) have the same configuration as that of the U-phase rotor 722, description thereof will be omitted.

An outline of the three-phase rotor will be described. The V-phase rotor is stacked such that it is displaced from the U-phase rotor 722u in phase by 60° in electrical angle in the counterclockwise direction. The W-phase rotor is stacked such that it is displaced from the V-phase rotor in phase by 60° in electrical angle in the counterclockwise direction (W-phase rotor is displaced from the U-phase rotor 722u in phase by 120° in electrical angle in the counterclockwise direction). That is, in the rotor 722, a phase-deviating direction of the three-phase rotor is opposite from a phase-deviating direction (deviation in the clockwise direction) of the three-phase rotor in the stator 723.

Next, the stator 723 will be described. Since the stators 723u, 723v and 723w have the same structures, the U-phase rotor 723u will be described, and illustration and description of the V-phase stator 723v and the W-phase stator 723w will be omitted.

Figure 85:
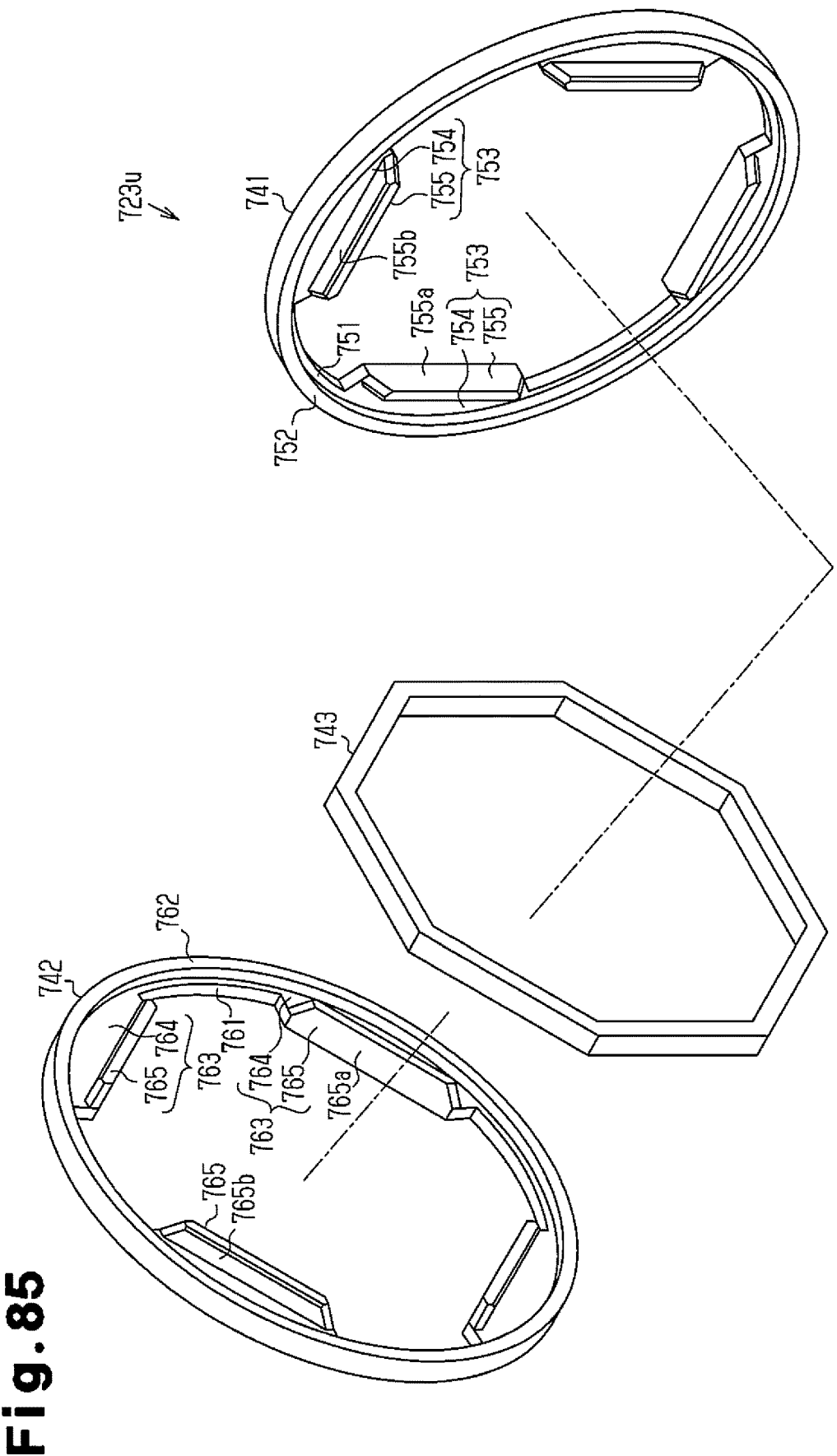
FIG. 85 is an exploded perspective view of a single stator shown in FIG. 84.

As shown in FIG. 85, the stator 723u includes a first stator core 741, a second stator core 742 and a coil 743.

The first stator core 741 includes an annular plate-shaped first core base 751. A cylindrical first core back 752 extending toward the second stator core 742 in the axial direction is arranged on an outer peripheral end of the first core base 751. A plurality of (four in twelfth embodiment) first claw-shaped magnetic poles 753 are formed on an inner peripheral end of the first core base 751 at equal intervals from one another (90° intervals) in the circumferential direction. Each of the first claw-shaped magnetic poles 753 includes a first base portion 754 extending radially inward from an inner peripheral end of the first core base 751, and a first magnetic pole portion 755 extending in the axial direction from an inner end of the first base portion 754. The first magnetic pole portion 755 is formed into a substantially trapezoidal plate-shape as viewed from a radial direction of the motor. That is, in the first magnetic pole portion 755, a radial inner side surface (inner surface) 755a and a radial outer side surface (outer surface) 755b are flat surfaces.

The second stator core 742 is formed in the same way as the first stator core 741. The second stator core 742 includes an annular plate-shaped second core base 761. A cylindrical second core back 762 extending toward the first core base 751 in the axial direction is arranged on an outer peripheral end of the second core base 761. A plurality of (four in twelfth embodiment) second claw-shaped magnetic poles 763 are formed on an inner peripheral end of the second core base 761 at equal intervals from one another (90° intervals) in the circumferential direction. Each of the second claw-shaped magnetic poles 763 includes a second base portion 764 extending radially inward from an inner peripheral end of the second core base 761, and a second magnetic pole portion 765 extending in the axial direction from an inner end of the second base portion 764. The second magnetic pole portion 765 is formed into a substantially trapezoidal plate-shape as viewed from the radial direction. The inner surface 765a and an outer surface 765b of the second magnetic pole portion 765 are flat surfaces.

The first stator core 741 and the second stator core 742 are combined with each other such that the first core base 751 and the second core base 761 are opposed to each other in the axial direction, and the first claw-shaped magnetic poles 753 and the second claw-shaped magnetic pole 763 are adjacent to each other in the circumferential direction. The first core back 752 of the first stator core 741 and the second core back 762 of the second stator core 742 are in abutment against each other in the axial direction.

The coil 743 is placed between the first core base 751 and the second core base 761 in the axial direction. A wound shape (outward shape) of the coil 743 is an annular shape (octagonal annular shape in the drawings) in accordance with shapes of the first claw-shaped magnetic poles 753 and the second claw-shaped magnetic pole 763. The coil 743 has a conductor (copper wire for example) which is wound a plurality of times in accordance with the wound shape.

Figure 86:
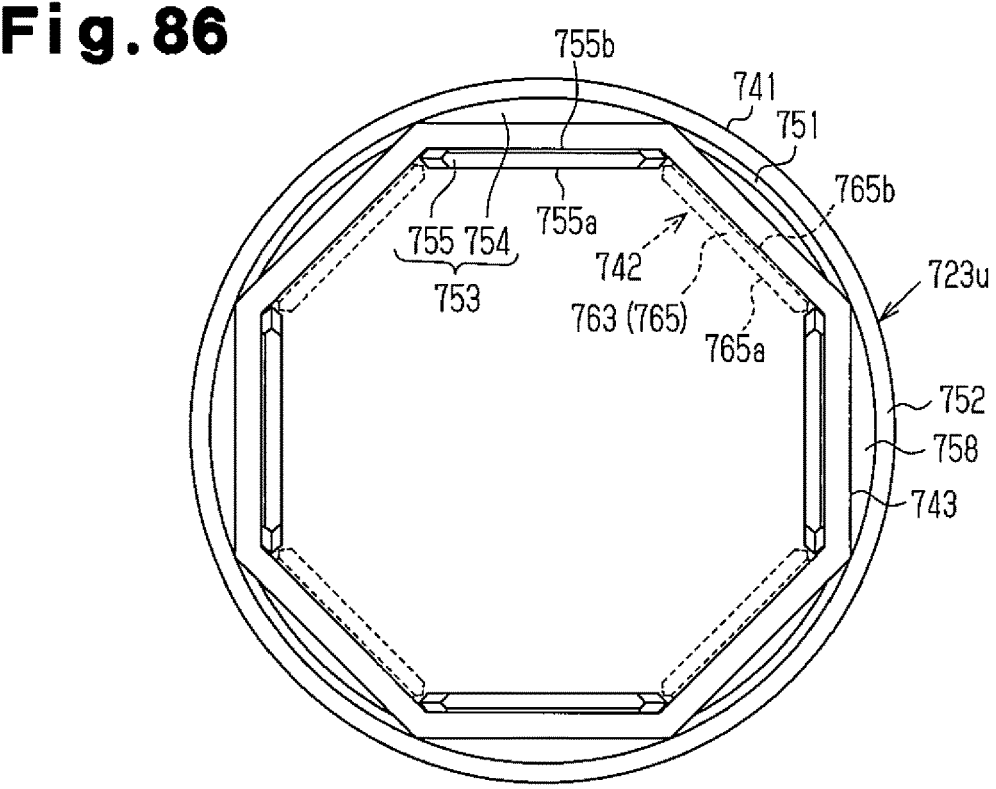
FIG. 86 is a plan view of a stator core and a coil shown in FIG. 85.

As shown in FIG. 86, in the stator 723u, the first claw-shaped magnetic poles 753 and the second claw-shaped magnetic poles 763 (shown by broken lines) are alternately placed in the circumferential direction.

In the radial direction, an outer surface 755b of the first magnetic pole portion 755 of the first claw-shaped magnetic pole 753 is a flat surface. Similarly, in the radial direction, an outer surface 765b of the second magnetic pole portion 765 of the second claw-shaped magnetic pole 763 is a flat surface. The coil 743 is formed into a polygonal annular shape (octagonal annular shape) in accordance with the outer surfaces 755b and 765b.

Next, operations of the brushless motor M will be described.

As shown in FIG. 86, the coil 743 is formed into the polygonal annular shape (octagonal annular shape) in accordance with the first claw-shaped magnetic pole 753 of the first stator core 741 and the second claw-shaped magnetic pole 763 of the second stator core 742. Therefore, the coil 743 is positioned by the first claw-shaped magnetic pole 753 and the second claw-shaped magnetic pole 763 in the circumferential direction of the first stator core 741 and the second stator core 742. According to this, movement of the coil 743 in the circumferential direction, i.e., a rotating direction of the brushless motor M is suppressed.

For example, the coil formed into an annular shape moves in the rotating direction of the brushless motor M. If the coil moves, a stress is applied to a wire through which drive current is supplied to the coil, and there is fear that a problem such as breaking of wire occurs.

On the other hand, the coil 743 of the twelfth embodiment is positioned by the first claw-shaped magnetic poles 753 and the second claw-shaped magnetic poles 763 in the circumferential direction of the first stator core 741. Hence, the movement of the coil 743 in the circumferential direction is suppressed, and a stress applied to a wire through which power is supplied to the coil 743 can be reduced. Further, in the circumferential direction of the first stator core 741, the coil 743 abuts against the claw-shaped magnetic poles 753 and 763 (magnetic pole portions 755 and 765) at a plurality of locations. Stresses applied to the coil 743 at individual contact locations becomes small as compared with a case where a coil is fixed at one location. Hence, generation of a problem such as breaking of wire in the coil 743 can be suppressed.

Further, the coil 743 of the twelfth embodiment is formed into the octagonal annular shape. Therefore, since a loop is formed in the coil 743 through a shorter path as compared with an annular coil, a length of a wound conductor (copper wire) becomes short. Hence, a resistance value (winding resistance) in the coil 743 can be reduced. For example, in the case of an octagonal annular coil having a diagonal distance which is equal to a diameter of the annular coil, a resistance value of the octagonal annular coil becomes smaller than a resistance value of an annular coil by about 3%. Since the resistance value of the coil 743 is reduced, an amount of current flowing through the coil 743 is increased, and an amount of magnetic fluxes generated in the stator 723u is increased in accordance with the amount of current. As described above, it is possible to enhance characteristics in the brushless motor M.

As shown in FIG. 86, spaces 758 are formed between the coil 743 and the first core back 752 of the first stator core 741. Spaces are also formed by the second stator core 742. It is possible to lead out, in the axial direction, wires through which power is supplied to the coils 743 of the motor portions Mu, Mv and Mw through the spaces 758.

The first stator core 741 is punched out from a steel plate by metal punching for example. The first claw-shaped magnetic pole 753 is formed by bending by metal punching. Similarly, the second stator core 742 is punched out from a steel plate by metal punching for example, and the first claw-shaped magnetic pole 753 is formed by bending by metal punching. In this manner, the stator 723u (first stator core 741 and second stator core 742) can be formed by metal punching. Since the stator 723u can be formed by metal punching, the number of steps required for a machining operation is reduced, and costs can be reduced.

The twelfth embodiment has the following advantages.

(47) In the first stator core 741, the outer surface 755b of the first claw-shaped magnetic pole 753 (magnetic pole portion 755) is a flat surface. In the second stator core 742, the outer surface 765b of the second claw-shaped magnetic pole 763 (magnetic pole portion 765) is a flat surface. The first claw-shaped magnetic pole 753 and the second claw-shaped magnetic pole 763 can be formed by bending a steel plate by metal punching. In this manner, the stator 723u including the first stator core 741 and the second stator core 742 can easily be formed.

(48) The coil 743 placed between the first core base 751 of the first stator core 741 and the second core base 761 of the second stator core 742 is formed into a polygonal annular shape (octagonal annular shape) in accordance with the first claw-shaped magnetic poles 753 of the first stator core 741 and the second claw-shaped magnetic poles 763 of the second stator core 742. Therefore, the coil 743 is positioned by the first claw-shaped magnetic poles 753 and the second claw-shaped magnetic poles 763 in the circumferential direction of the first stator core 741 and the second stator core 742. According to this, it is possible to suppress movement of the coil 743 in the circumferential direction, i.e., the rotating direction of the brushless motor M.

(49) The coil 743 is formed into the polygonal annular shape (octagonal annular shape). Since the loop is formed in the coil 743 through a shorter path as compared with an annular coil, a length of a wound conduct (copper wire) becomes short. Hence, a resistance value (winding resistance) in the coil 743 can be made smaller than that of an annular coil.

The twelfth embodiment may be carried out in the following manners.

In the twelfth embodiment, a terminal for fixing an end of the coil 743 may be placed in the spaces 758 shown in FIG. 86.

Figure 87:
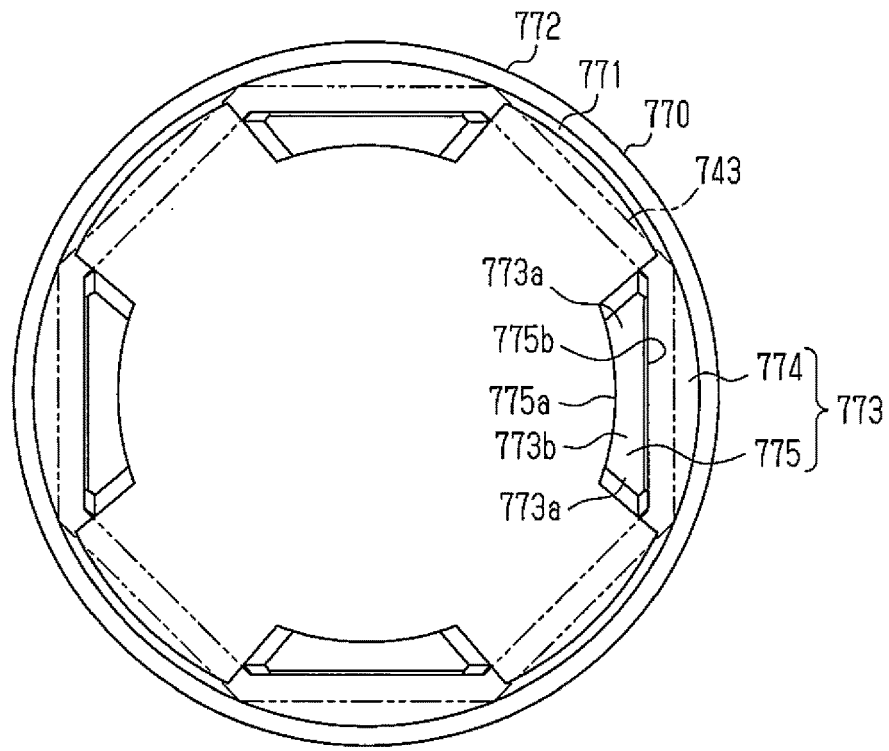
FIG. 87 is a plan view of a stator core and a coil of another example of the twelfth embodiment.
Figure 88A:
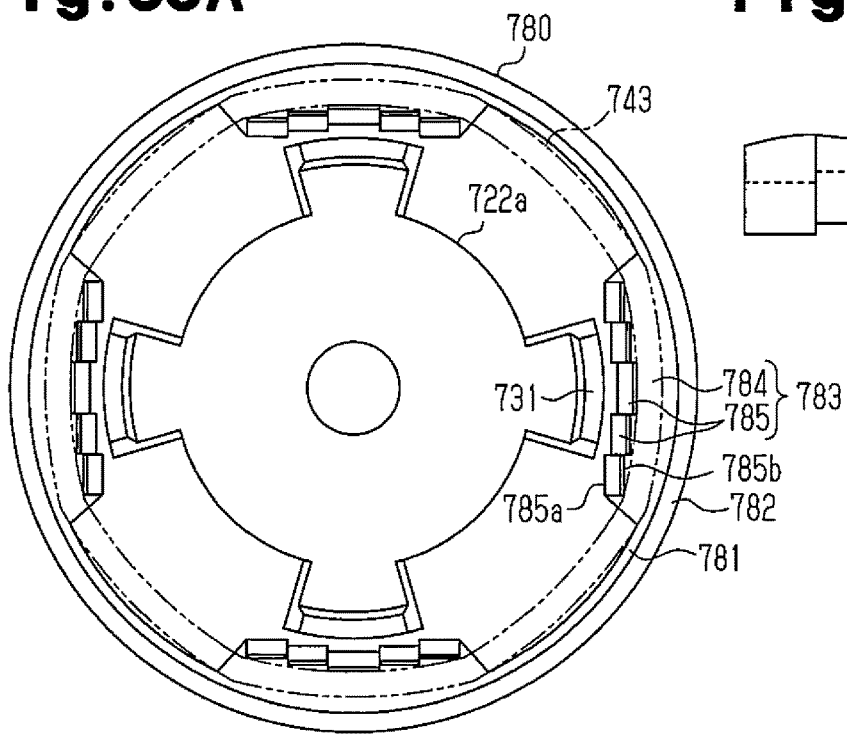
FIG. 88A is a plan view of a stator core and a rotor core of another example of the twelfth embodiment.
Figure 88B:
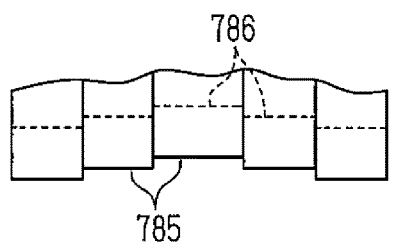
FIG. 88B is an enlarged view of a claw-shaped magnetic pole shown in FIG. 88A.
Figure 89:
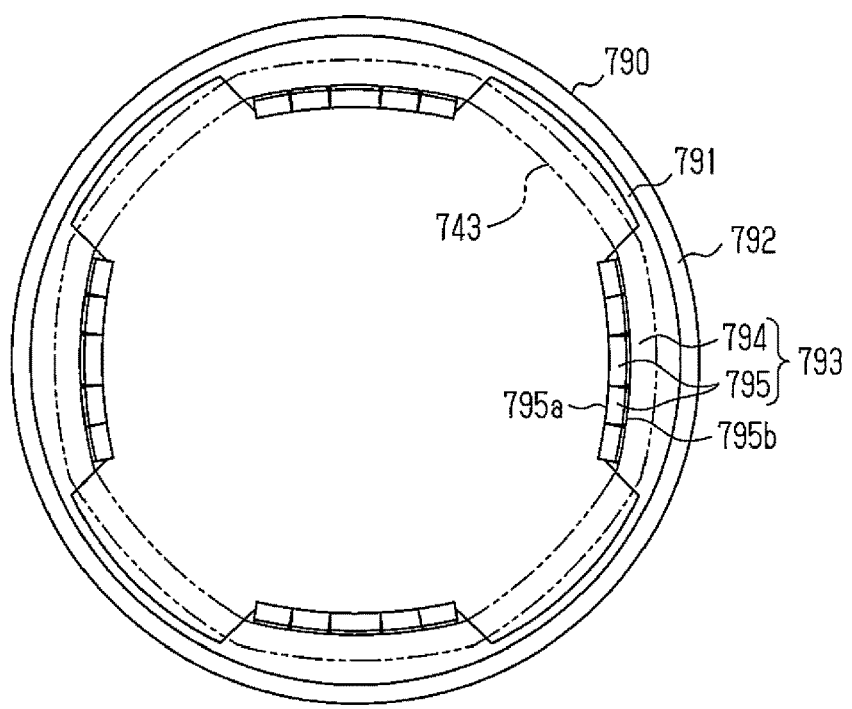
FIG. 89 is a plan view of a stator core of another example of the twelfth embodiment.

A shape of the claw-shaped magnetic pole in the twelfth embodiment may appropriately be changed as shown in FIGS. 87 to 89.

As shown in FIG. 87 for example, the stator core 770 includes an annular core base 771, and a cylindrical core back 772 extending in the axial direction (surface direction in FIG. 87) is arranged on an outer peripheral portion of the core base 771. A plurality of claw-shaped magnetic poles 773 are formed on an inner periphery of the core base 771. Each of the claw-shaped magnetic poles 773 includes a base portion 774 extending radially inward from an inner end of the core base 771, and a magnetic pole portion 775 extending in the axial direction (surface direction in FIG. 87) from the base portion 774. An outer surface 775b of the magnetic pole portion 775 is a flat surface, and an inner surface 775a of the magnetic pole portion 775 is a curved surface which is curved along the circumferential direction. The claw-shaped magnetic pole 773 is formed by bending a steel plate by metal punching like the twelfth embodiment. The inner surface 775a can be formed simultaneously with the bending operation depending upon a shape of a punch used for the metal punching. Since the stator core 770 can be formed by the metal punching in this manner, the number of steps required for a machining operation is reduced, and costs can be reduced.

According to the claw-shaped magnetic pole 773 (magnetic pole portion 775) shown in FIG. 87, a thickness of the end 773a in the circumferential direction is greater than that of a central portion 773b. According to this, a magnetic flux density in the end 773a can be made smaller than that of the central portion 773b. According to this, it is possible to suppress inconvenience such as magnetic saturation.

As shown in FIG. 88A, a stator core 780 includes an annular core base 781, and a cylindrical core back 782 extending in the axial direction (surface direction in FIG. 88A) is arranged on an outer peripheral portion of the core base 781. A plurality of claw-shaped magnetic poles 783 are formed on an inner periphery of the core base 781. Each of the claw-shaped magnetic poles 783 includes a base portion 784 extending radially inward from an inner end of the core base 781, and a plurality of magnetic pole pieces 785 extending in the axial direction (surface direction in FIG. 88A) from the base portion 784. Each of the magnetic pole pieces 785 is formed into a rectangular parallelepiped shape. Therefore, an inner surface 785a and an outer surface 785B of each of the magnetic pole pieces 785 are flat surfaces. As shown in FIG. 88B for example, the magnetic pole piece 785 is formed by bending the strip-shaped magnetic pole piece 785 at positions shown by broken lines 786 by metal punching for example. If the bending positions shown by the broken lines 786 is formed into a staircase pattern along the circumferential direction, gaps (air gaps) between tip ends of the claw-shaped magnetic poles 731 of the rotor 722u and the magnetic pole pieces 785 can substantially be equalized. By forming the claw-shaped magnetic poles 783 by the plurality of magnetic pole pieces 785, it is possible to reduce eddy current.

As shown in FIG. 89, a stator core 790 includes an annular core base 791, and a cylindrical core back 792 extending in the axial direction (surface direction in FIG. 89) is arranged on an outer peripheral portion of the core base 791. A plurality of claw-shaped magnetic poles 793 are formed on an inner periphery of the core base 791. Each of the claw-shaped magnetic poles 793 includes a base portion 794 extending radially inward from an inner end of the core base 791, and a plurality of magnetic pole pieces 795 extending in the axial direction (surface direction in FIG. 89) from the base portion 794. Each of the magnetic pole pieces 795 is formed into a rectangular parallelepiped shape. Therefore, an inner surface 795a and an outer surface 795b of the magnetic pole piece 795 are flat surfaces. For example, the bending position of the magnetic pole piece 795 is set along a circumferential direction of the stator core 790. Each of the magnetic pole pieces 795 is formed such that its outer surface 795b faces the radial direction. According to this, when the stator is configured, the magnetic pole piece 795 is placed substantially cylindrically. By setting the bending direction of the magnetic pole piece 795 as described above, the air gap can be equalized. Like the stator core 780 shown in FIG. 88A, it is possible to reduce eddy current by configuring the claw-shaped magnetic poles 793 in the stator core 790 by the plurality of magnetic pole pieces 795.

In the stator (stator core) of the twelfth embodiment, an annular coil may be used.

What is claimed is:

1. A motor comprising:
a shaft extending along an axial direction of the motor;
a rotor including a first rotor core having a plurality of first rotor claw-shaped magnetic poles arranged at equal intervals from one another in a circumferential direction of the motor, a second rotor core having a plurality of second rotor claw-shaped magnetic poles arranged at equal intervals from one another in the circumferential direction, and an annular field magnet placed between the first and second rotor cores and magnetized in the axial direction, the first and second rotor claw-shaped magnetic poles being alternately placed in the circumferential direction, and the field magnet is configured so as to cause the first and second rotor claw-shaped magnetic poles to function as magnetic poles which are different from each other;
a stator including a first stator core having a plurality of first stator claw-shaped magnetic poles arranged at equal intervals from one another in the circumferential direction, a second stator core having a plurality of second stator claw-shaped magnetic poles arranged at equal intervals from one another in the circumferential direction, and a coil portion placed between the first and second stator cores and wound in the circumferential direction, the first and second stator claw-shaped magnetic poles being placed alternately in the circumferential direction and being opposed to the first and second rotor claw-shaped magnetic poles, and the coil portion is configured so as to cause the first and second stator claw-shaped magnetic poles to function as magnetic poles which are different from each other based on energization to the coil portion, and cause polarities of the first and second stator claw-shaped magnetic poles to switch to each other; and
a cylindrical housing, which accommodates the first and second stator cores, wherein
the shaft extends through one of the rotor and the stator,
the first and second rotor cores and the first and second stator cores have an equal number of claw-shaped magnetic poles, housing-side positioning portions are arranged on an inner peripheral surface of the housing,
the first stator core and the second stator core respectively include outer peripheral portions, the outer peripheral portions connect the first stator core and the second stator core to each other, which are opposed in the axial direction,
the plurality of first stator claw-shaped magnetic poles and the plurality of second stator claw-shaped magnetic poles are respectively arranged on an inner peripheral portion of the first stator core and an inner peripheral portion of the second stator core,
stator-side positioning portions which engage with the housing-side positioning portions in the circumferential direction are respectively formed on an outer peripheral portion of the first stator core and an outer peripheral portion of the second stator core,
the stator-side positioning portion of the first stator core is located at a position corresponding to one of the plurality of first stator claw-shaped magnetic poles in the circumferential direction, and
the stator-side positioning portion of the second stator core is located at a position corresponding to one of the plurality of second stator claw-shaped magnetic poles in the circumferential direction.

2. The motor according to claim 1, further comprising the stator is at least one of a plurality of stators,
the stators are stacked in the axial direction and accommodated in the housing,
when viewing the stator-side positioning portions of the plurality of stators in the axial direction, the stator-side positioning portions of respective stators are arranged at equal intervals in the circumferential direction.

3. The motor according to claim 2, wherein
each of the stator-side positioning portions is a positioning convex portion,
the positioning convex portion is formed by bending a portion of the outer peripheral portion of the stator radially outward,
each of the housing-side positioning portions is recessed in the inner peripheral surface of the housing, and the positioning convex portion is fitted to the housing-side positioning portion.

4. The motor according to claim 3, wherein
the positioning convex portion is formed by cutting out the portion of the outer peripheral portion of the stator so as to form a cut out portion, and
one end of the coil portion is led out from the cut out portion.

5. The motor according to claim 2, wherein
each of the stator-side positioning portions is a cut out recess formed by cutting out the portion of the outer peripheral portion of the stator,
each of the housing-side positioning portions is projected from the inner peripheral surface of the housing, and
the housing-side positioning portion is fitted to the cut out recess.

6. The motor according to claim 2, wherein
the stator-side positioning portions engage with the housing-side positioning portions in the axial direction.

7. The motor according to claim 2, wherein
each of the stator-side positioning portions is formed at a position corresponding to a circumferential center of at least one of the first and second stator claw-shaped magnetic poles.

8. The motor according to claim 2, wherein
the first and second stator cores each include a cut out portion, the cut out portions of the first and second stator cores being made to coincide with each other to form a winding lead-out hole, and
an end of the coil portion is led out from the winding lead-out hole.

9. The motor according to claim 8, wherein
the coil portion includes a lead that extends through the winding lead-out hole, and
the motor further comprising an interposed member arranged between the winding lead-out hole and the lead of the coil portion.

10. The motor according to claim 9, wherein
the winding lead-out hole includes a tapered portion that inclines with respect to an inserting direction of the lead, and
the interposed member includes a winding holding portion that holds the lead in a direction intersecting with the inserting direction.

11. The motor according to claim 9, wherein
the interposed member includes a fastening portion fastened to the stator.

12. The motor according to claim 8, wherein
the cut out portions of the first and second stator cores are formed in the outer peripheral portions of the first and second stator cores, and
the winding lead-out hole opens along a radial direction of the stator.

13. The motor according to claim 2, wherein
when the stator-side positioning portions in each stator are viewed as one group, the stators are stacked so that the groups are located substantially at equal intervals from one another in the circumferential direction.

\* \* \* \* \*